United States Patent
Cosic

(10) Patent No.: US 12,400,101 B1
(45) Date of Patent: *Aug. 26, 2025

(54) ARTIFICIALLY INTELLIGENT SYSTEMS, DEVICES, AND METHODS FOR LEARNING AND/OR USING AN AVATAR'S CIRCUMSTANCES FOR AUTONOMOUS AVATAR OPERATION

(71) Applicant: Autonomous Devices LLC, Melbourne, FL (US)

(72) Inventor: Jasmin Cosic, Melbourne, FL (US)

( * ) Notice: Subject to any disclaimer, the term of this patent is extended or adjusted under 35 U.S.C. 154(b) by 449 days.

This patent is subject to a terminal disclaimer.

(21) Appl. No.: 17/954,018

(22) Filed: Sep. 27, 2022

Related U.S. Application Data

(63) Continuation of application No. 16/796,663, filed on Feb. 20, 2020, now Pat. No. 11,494,607, which is a continuation of application No. 15/382,743, filed on Dec. 19, 2016, now Pat. No. 10,607,134.

(51) Int. Cl.
| | |
|---|---|
| G06F 9/46 | (2006.01) |
| G06F 8/20 | (2018.01) |
| G06F 15/02 | (2006.01) |
| G06N 3/006 | (2023.01) |
| G06N 20/00 | (2019.01) |

(52) U.S. Cl.
CPC ............. *G06N 3/006* (2013.01); *G06F 8/20* (2013.01); *G06F 15/0283* (2013.01); *G06N 20/00* (2019.01)

(58) Field of Classification Search
CPC .......... G06N 3/006; G06N 20/00; G06F 8/20; G06F 15/0283
See application file for complete search history.

(56) References Cited

U.S. PATENT DOCUMENTS

| | | |
|---|---|---|
| 4,370,707 A | 1/1983 | Phillips et al. |
| 4,730,315 A | 3/1988 | Saito et al. |
| 4,860,203 A | 8/1989 | Corrigan et al. |
| 5,219,264 A | 6/1993 | McClure et al. |
| 5,560,011 A | 9/1996 | Uyama |
| 5,592,661 A | 1/1997 | Eisenberg et al. |
| 5,602,982 A | 2/1997 | Judd et al. |
| 5,758,333 A | 5/1998 | Bauer et al. |
| 5,874,834 A | 2/1999 | New |
| 5,983,232 A | 11/1999 | Zhang |
| 6,026,234 A | 2/2000 | Hanson et al. |
| 6,088,731 A | 7/2000 | Kiraly et al. |
| 6,106,299 A | 8/2000 | Ackermann et al. |
| 6,126,330 A | 10/2000 | Knight |

(Continued)

FOREIGN PATENT DOCUMENTS

JP     2016126605    7/2016

OTHER PUBLICATIONS

Chen et al. Case-Based Reasoning System and Artificial Neural Networks: A Review Neural Comput & Applic (2001) 10: pp. 264-276, 13 pages.

(Continued)

*Primary Examiner* — Gregory A Kessler

(57) ABSTRACT

Aspects of the disclosure generally relate to computing devices and/or systems, and may be generally directed to devices, systems, methods, and/or applications for learning an avatar's or an application's operation in various circumstances, storing this knowledge in a knowledgebase (i.e. neural network, graph, sequences, etc.), and/or enabling autonomous operation of the avatar or the application.

74 Claims, 39 Drawing Sheets

(56) References Cited

U.S. PATENT DOCUMENTS

| | | |
|---|---|---|
| 6,314,558 B1 | 11/2001 | Angel et al. |
| 6,408,262 B1 | 6/2002 | Leerberg et al. |
| 6,643,842 B2 | 11/2003 | Angel et al. |
| 6,728,689 B1 | 4/2004 | Drissi et al. |
| 6,735,632 B1 | 5/2004 | Kiraly et al. |
| 6,754,631 B1 | 6/2004 | Din |
| 6,801,912 B2 | 10/2004 | Moskowitz et al. |
| 6,842,877 B2 | 1/2005 | Robarts et al. |
| 6,850,942 B2 | 2/2005 | Cotner et al. |
| 6,915,105 B2 | 7/2005 | Masuda |
| 6,973,446 B2 | 12/2005 | Mamitsuka et al. |
| 6,996,758 B1 | 2/2006 | Herron et al. |
| 7,017,153 B2 | 3/2006 | Gouriou et al. |
| 7,052,277 B2 | 5/2006 | Kellman |
| 7,082,435 B1 | 7/2006 | Guzman et al. |
| 7,090,576 B2 | 8/2006 | Herbrich et al. |
| 7,113,946 B2 | 9/2006 | Cosic |
| 7,117,225 B2 | 10/2006 | Cosic |
| 7,222,127 B1 | 5/2007 | Bem et al. |
| 7,240,335 B2 | 7/2007 | Angel et al. |
| 7,249,349 B2 | 7/2007 | Hundt et al. |
| 7,395,255 B2 | 7/2008 | Li |
| 7,399,224 B2 | 7/2008 | Hirai |
| 7,409,401 B2 | 8/2008 | Hansen et al. |
| 7,424,705 B2 | 9/2008 | Lewis et al. |
| 7,444,338 B1 | 10/2008 | Fisher |
| 7,478,371 B1 | 1/2009 | Gove |
| 7,484,205 B2 | 1/2009 | Venkatapathy |
| 7,533,128 B1 | 5/2009 | Sanchez et al. |
| 7,565,340 B2 | 7/2009 | Herlocker et al. |
| 7,675,519 B2 | 3/2010 | Tobias |
| 7,721,218 B2 | 5/2010 | Awe et al. |
| 7,765,537 B2 | 7/2010 | Havin et al. |
| 7,797,259 B2 | 9/2010 | Jiang et al. |
| 7,831,564 B1 | 11/2010 | Wei et al. |
| 7,840,060 B2 | 11/2010 | Podilchuk |
| 7,849,114 B2 | 12/2010 | Boss et al. |
| 7,925,984 B2 | 4/2011 | Awe et al. |
| 7,987,144 B1 | 7/2011 | Drissi et al. |
| 8,005,828 B2 | 8/2011 | Buchner et al. |
| 8,019,699 B2 | 9/2011 | Baxter |
| 8,078,556 B2 | 12/2011 | Adi et al. |
| 8,090,669 B2 | 1/2012 | Shahani et al. |
| 8,137,112 B2 | 3/2012 | Woolf et al. |
| 8,142,268 B2 | 3/2012 | Thomas et al. |
| 8,152,640 B2 | 4/2012 | Shirakawa et al. |
| 8,166,463 B2 | 4/2012 | Gill et al. |
| 8,195,674 B1 | 6/2012 | Bem et al. |
| 8,196,119 B2 | 6/2012 | Gill et al. |
| 8,244,730 B2 | 8/2012 | Gupta |
| 8,245,163 B1 | 8/2012 | Yuan et al. |
| 8,251,704 B2 | 8/2012 | Woolf et al. |
| 8,261,199 B2 | 9/2012 | Cradick et al. |
| 8,266,608 B2 | 9/2012 | Hecht et al. |
| 8,335,805 B2 | 12/2012 | Cosic |
| 8,356,026 B2 | 1/2013 | Heimendinger |
| 8,364,612 B2 | 1/2013 | Van Gael et al. |
| 8,386,401 B2 | 2/2013 | Virkar et al. |
| 8,397,227 B2 | 3/2013 | Fan et al. |
| 8,417,740 B2 | 4/2013 | Cosic |
| 8,453,061 B2 | 5/2013 | Bromenshenkel et al. |
| 8,464,225 B2 | 6/2013 | Greifeneder |
| 8,549,359 B2 | 10/2013 | Zheng |
| 8,572,035 B2 | 10/2013 | Cosic |
| 8,589,414 B2 | 11/2013 | Waite et al. |
| 8,595,154 B2 | 11/2013 | Breckenridge et al. |
| 8,639,644 B1 | 1/2014 | Hickman et al. |
| 8,655,260 B2 | 2/2014 | Yueh et al. |
| 8,655,900 B2 | 2/2014 | Cosic |
| 8,667,472 B1 | 3/2014 | Molinari |
| 8,682,485 B2 | 3/2014 | Anhalt et al. |
| 8,762,428 B2 | 6/2014 | Kulack et al. |
| 8,949,186 B1 | 2/2015 | Yueh et al. |
| 8,965,621 B2 | 2/2015 | Urmson et al. |
| 8,996,432 B1 | 3/2015 | Fu |
| 9,008,840 B1 | 4/2015 | Ponulak et al. |
| 9,047,324 B2 | 6/2015 | Cosic |
| 9,085,080 B2 | 7/2015 | Mian |
| 9,158,813 B2 | 10/2015 | Ntoulas et al. |
| 9,195,934 B1 | 11/2015 | Hunt et al. |
| 9,235,214 B2 | 1/2016 | Anderson |
| 9,268,454 B2 | 2/2016 | Hamilton, II et al. |
| 9,282,309 B1 | 3/2016 | Cosic |
| 9,283,674 B2 | 3/2016 | Hoffman et al. |
| 9,298,749 B2 | 3/2016 | Cosic |
| 9,305,216 B1 | 4/2016 | Mishra |
| 9,325,314 B2 | 4/2016 | Shin |
| 9,335,766 B1 | 5/2016 | Silver |
| 9,346,167 B2 | 5/2016 | O'Connor et al. |
| 9,367,806 B1 | 6/2016 | Cosic |
| 9,372,902 B2 | 6/2016 | Hosie et al. |
| 9,409,051 B2 | 8/2016 | Kaleal, III et al. |
| 9,434,072 B2 | 9/2016 | Buehler et al. |
| 9,435,653 B2 | 9/2016 | Zeng |
| 9,443,192 B1 | 9/2016 | Cosic |
| 9,488,984 B1 | 11/2016 | Williams et al. |
| 9,604,359 B1 | 3/2017 | Grotmol et al. |
| 9,630,317 B2 | 4/2017 | Izhikevich et al. |
| 9,682,481 B2 | 6/2017 | Lutz et al. |
| 9,766,626 B1 | 9/2017 | Zhu et al. |
| 9,789,605 B2 | 10/2017 | Meier et al. |
| 9,864,933 B1 | 1/2018 | Cosic |
| 9,881,420 B2 | 1/2018 | Miller |
| 9,978,425 B2 | 5/2018 | Kirk et al. |
| 10,022,867 B2 | 7/2018 | Saboo et al. |
| 10,067,915 B1 | 9/2018 | Mishraky et al. |
| 10,112,113 B2 | 10/2018 | Krishnamurthy |
| 10,162,740 B1 | 12/2018 | Setty et al. |
| 10,181,213 B2 | 1/2019 | Bullivant et al. |
| 10,217,261 B2 | 2/2019 | Li et al. |
| 10,317,854 B2 | 6/2019 | Nakagawa et al. |
| 10,350,751 B2 | 7/2019 | Guerin et al. |
| 10,406,441 B2 | 9/2019 | Nathan et al. |
| 10,452,974 B1 | 10/2019 | Cosic |
| 10,475,225 B2 | 11/2019 | Park et al. |
| 10,484,333 B2 | 11/2019 | Sethi et al. |
| 10,607,134 B1 | 3/2020 | Cosic |
| 11,023,788 B2 | 6/2021 | Huberman et al. |
| 11,055,583 B1 | 7/2021 | Cosic |
| 11,238,344 B1 | 2/2022 | Cosic |
| 11,497,052 B1 | 11/2022 | Zhang et al. |
| 11,526,275 B2 | 12/2022 | Randall et al. |
| 11,694,059 B2 | 7/2023 | Li et al. |
| 11,694,682 B1 | 7/2023 | Reinspach et al. |
| 11,887,231 B2 | 1/2024 | Park |
| 2002/0003571 A1 | 1/2002 | Schofield et al. |
| 2002/0019822 A1 | 2/2002 | Seki et al. |
| 2003/0026588 A1 | 2/2003 | Elder et al. |
| 2003/0032467 A1 | 2/2003 | Mayer et al. |
| 2003/0065662 A1 | 4/2003 | Cosic |
| 2003/0122578 A1 | 7/2003 | Masui et al. |
| 2003/0171146 A1 | 9/2003 | Mayer et al. |
| 2003/0216834 A1 | 11/2003 | Allard |
| 2004/0117771 A1 | 6/2004 | Venkatapathy |
| 2004/0194017 A1 | 9/2004 | Cosic |
| 2004/0249774 A1 | 12/2004 | Caid et al. |
| 2004/0267521 A1 | 12/2004 | Cutler et al. |
| 2005/0149517 A1 | 7/2005 | Cosic |
| 2005/0149542 A1 | 7/2005 | Cosic |
| 2005/0154745 A1 | 7/2005 | Hansen et al. |
| 2005/0240412 A1 | 10/2005 | Fujita |
| 2005/0245303 A1 | 11/2005 | Graepel et al. |
| 2005/0289105 A1 | 12/2005 | Cosic |
| 2006/0047612 A1 | 3/2006 | Stanley et al. |
| 2006/0181236 A1 | 8/2006 | Brogardh |
| 2006/0184410 A1 | 8/2006 | Ramamurthy et al. |
| 2006/0190930 A1 | 8/2006 | Hecht et al. |
| 2006/0259466 A1 | 11/2006 | Bilotti |
| 2006/0265406 A1 | 11/2006 | Chkodrov et al. |
| 2007/0006159 A1 | 1/2007 | Hecht et al. |
| 2007/0050606 A1 | 3/2007 | Ferren et al. |
| 2007/0050719 A1 | 3/2007 | Lui et al. |
| 2007/0058856 A1 | 3/2007 | Boregowda et al. |
| 2007/0061735 A1 | 3/2007 | Hoffberg et al. |

(56) References Cited

U.S. PATENT DOCUMENTS

| | | |
|---|---|---|
| 2007/0106633 A1 | 5/2007 | Reiner |
| 2008/0071770 A1 | 3/2008 | Schloter et al. |
| 2008/0144893 A1 | 6/2008 | Guo et al. |
| 2008/0207330 A1 | 8/2008 | Beale |
| 2008/0215508 A1 | 9/2008 | Hanneman et al. |
| 2008/0254429 A1 | 10/2008 | Woolf et al. |
| 2008/0281764 A1 | 11/2008 | Baxter |
| 2008/0288259 A1 | 11/2008 | Chambers et al. |
| 2009/0044113 A1 | 2/2009 | Jones et al. |
| 2009/0067727 A1 | 3/2009 | Hirohata |
| 2009/0070337 A1 | 3/2009 | Romem et al. |
| 2009/0110061 A1 | 4/2009 | Lee et al. |
| 2009/0131152 A1 | 5/2009 | Busse |
| 2009/0136095 A1 | 5/2009 | Marcon et al. |
| 2009/0141969 A1 | 6/2009 | Yu et al. |
| 2009/0199095 A1 | 8/2009 | Nicol, II et al. |
| 2009/0222388 A1 | 9/2009 | Hua et al. |
| 2009/0287643 A1 | 11/2009 | Corville et al. |
| 2009/0288001 A1 | 11/2009 | Hamilton, II |
| 2009/0324010 A1 | 12/2009 | Hou |
| 2010/0023541 A1 | 1/2010 | Cosic |
| 2010/0033780 A1 | 2/2010 | Gitter |
| 2010/0063663 A1 | 3/2010 | Tolstedt |
| 2010/0063949 A1 | 3/2010 | Eaton et al. |
| 2010/0082536 A1 | 4/2010 | Cosic |
| 2010/0114746 A1 | 5/2010 | Bobbitt et al. |
| 2010/0138370 A1 | 6/2010 | Wu et al. |
| 2010/0220930 A1 | 9/2010 | Sun |
| 2010/0241595 A1 | 9/2010 | Felsher |
| 2010/0278420 A1 | 11/2010 | Shet et al. |
| 2011/0004586 A1 | 1/2011 | Cherryholmes et al. |
| 2011/0007079 A1 | 1/2011 | Perez et al. |
| 2011/0030031 A1 | 2/2011 | Lussier et al. |
| 2011/0085734 A1 | 4/2011 | Berg et al. |
| 2011/0093435 A1 | 4/2011 | Zha et al. |
| 2011/0218672 A1 | 9/2011 | Maisonnier et al. |
| 2011/0270794 A1 | 11/2011 | Drory et al. |
| 2012/0089570 A1 | 4/2012 | Zha et al. |
| 2012/0150773 A1 | 6/2012 | DiCorpo et al. |
| 2012/0167057 A1 | 6/2012 | Schmich et al. |
| 2012/0192096 A1 | 7/2012 | Bowman et al. |
| 2012/0284026 A1 | 11/2012 | Cardillo et al. |
| 2012/0290347 A1 | 11/2012 | Elazouni et al. |
| 2013/0007532 A1 | 1/2013 | Miller et al. |
| 2013/0047049 A1 | 2/2013 | Chen et al. |
| 2013/0156345 A1 | 6/2013 | Shmunk |
| 2013/0159021 A1 | 6/2013 | Felsher |
| 2013/0204907 A1 | 8/2013 | Alonso Alarcon et al. |
| 2013/0218932 A1 | 8/2013 | Cosic |
| 2013/0226345 A1 | 8/2013 | Zhao et al. |
| 2013/0226974 A1 | 8/2013 | Cosic |
| 2013/0238533 A1 | 9/2013 | Virkar et al. |
| 2013/0278501 A1 | 10/2013 | Bulzacki |
| 2013/0278631 A1 | 10/2013 | Border et al. |
| 2013/0325768 A1 | 12/2013 | Sinyavskly et al. |
| 2013/0329946 A1 | 12/2013 | Archibald et al. |
| 2013/0343640 A1 | 12/2013 | Buehler et al. |
| 2014/0004950 A1 | 1/2014 | Szfunara |
| 2014/0052717 A1 | 2/2014 | Franks et al. |
| 2014/0075249 A1 | 3/2014 | Sato et al. |
| 2014/0089232 A1 | 3/2014 | Buibas |
| 2014/0136013 A1 | 5/2014 | Wolverton et al. |
| 2014/0143276 A1 | 5/2014 | Rogers et al. |
| 2014/0161250 A1 | 6/2014 | Leeds et al. |
| 2014/0164430 A1 | 6/2014 | Hadjieleftheriou et al. |
| 2014/0177946 A1 | 6/2014 | Im et al. |
| 2014/0207580 A1 | 7/2014 | Minnis et al. |
| 2014/0211988 A1 | 7/2014 | Fan et al. |
| 2014/0277718 A1 | 9/2014 | Izhikevich et al. |
| 2014/0278754 A1 | 9/2014 | Cronin et al. |
| 2015/0006171 A1 | 1/2015 | Westby et al. |
| 2015/0023186 A1 | 1/2015 | Vasseur et al. |
| 2015/0023205 A1 | 1/2015 | Vasseur et al. |
| 2015/0039304 A1 | 2/2015 | Wein |
| 2015/0055821 A1 | 2/2015 | Fotland |
| 2015/0089081 A1 | 3/2015 | Thubert et al. |
| 2015/0258683 A1 | 9/2015 | Izhikevich et al. |
| 2015/0264306 A1 | 9/2015 | Marilly et al. |
| 2015/0269156 A1 | 9/2015 | Awadallah et al. |
| 2015/0269415 A1 | 9/2015 | Gelbman |
| 2015/0283702 A1 | 10/2015 | Izhikevich et al. |
| 2015/0310041 A1 | 10/2015 | Kier et al. |
| 2015/0324685 A1 | 11/2015 | Bohn et al. |
| 2015/0339213 A1 | 11/2015 | Lee et al. |
| 2016/0063118 A1 | 3/2016 | Campbell et al. |
| 2016/0077166 A1 | 3/2016 | Morozov et al. |
| 2016/0140999 A1 | 5/2016 | Cosic |
| 2016/0142650 A1 | 5/2016 | Cosic |
| 2016/0167226 A1 | 6/2016 | Schnittman |
| 2016/0243701 A1 | 8/2016 | Gildert et al. |
| 2016/0246819 A1 | 8/2016 | Cosic |
| 2016/0246850 A1 | 8/2016 | Cosic |
| 2016/0246868 A1 | 8/2016 | Cosic |
| 2016/0274187 A1 | 9/2016 | Menon et al. |
| 2016/0292185 A1 | 10/2016 | Cosic |
| 2016/0306806 A1 | 10/2016 | Fackler |
| 2016/0328480 A1 | 11/2016 | Owens et al. |
| 2017/0024877 A1 | 1/2017 | Versace et al. |
| 2017/0161958 A1 | 6/2017 | Eilat |
| 2018/0017791 A1 | 1/2018 | Beckman |
| 2018/0060144 A1 | 3/2018 | Capobianco et al. |
| 2018/0068564 A1 | 3/2018 | Tanigawa et al. |
| 2018/0096261 A1 | 4/2018 | Chu et al. |
| 2018/0101146 A1 | 4/2018 | Hariharan et al. |
| 2018/0120813 A1 | 5/2018 | Coffman et al. |
| 2018/0137403 A1 | 5/2018 | Kaur |
| 2018/0174207 A1 | 6/2018 | Potucek et al. |
| 2018/0375720 A1 | 12/2018 | Yang et al. |
| 2019/0028545 A1 | 1/2019 | Yang et al. |
| 2019/0034765 A1 | 1/2019 | Kaehler et al. |
| 2019/0096503 A1 | 3/2019 | Chakravarty et al. |
| 2019/0102049 A1 | 4/2019 | Anzu Res |
| 2019/0107839 A1 | 4/2019 | Parashar et al. |
| 2019/0213446 A1 | 7/2019 | Tsou et al. |
| 2019/0347334 A1 | 11/2019 | Sundaramoorthy et al. |
| 2020/0334853 A1 | 10/2020 | Ciuc |
| 2021/0233045 A1 | 7/2021 | Singh et al. |
| 2021/0374146 A1 | 12/2021 | Hrastnik et al. |
| 2022/0342601 A1 | 10/2022 | Daoud et al. |

OTHER PUBLICATIONS

John J. Grefenstette, Connie Loggia Ramsey, Alan C. Schultz, Learning Sequential Decision Rules Using Simulation Models and Competition, 1990, Navy Center for Applied Research in Artificial Intelligence, Naval Research Laboratory, Washington, DC, 27 pages.

Alan C. Schultz, John J. Grefenstette, Using a Genetic Algorithm to Learn Behaviors for Autonomous Vehicles, 1992, Navy Center for Applied Research in Artificial Intelligence, Naval Research Laboratory, Washington, DC, 12 pages.

Koppula et al., "Anticipating human activities using object affordances for reactive robotic response", IEEE TRAMI 2016, published May 5, 2015, 16 pages.

Orme, "System design tips for entry level smartphones—part 3", found online at "https://community.arm.com/processors/b/blog/posts/system-design-tips-for-entry-level-smartphones ---part-3", Oct. 21, 2013, 12 pages.

Nowostawski, Mariusz et al., "Dynamic Demes Parallel Genetic Algorithm", May 13, 1999, 6 pages.

Stack Overflow, How can I quantify difference between two images?, accessed Aug. 2, 2017 at https://stackoverflow.com/questions/189943/how-can-i-quantify-difference-between-two-images, 8 pages.

Skolicki, Zbigniew et al., "The Influence of Migration Sizes and Intervals on Island Models", Jun. 29, 2005, 8 pages.

Vahid Lari, et al., "Decentralized dynamic resource management support for massively parallel processor arrays", Sep. 11, 2011, 8 pages.

Vahid Lari, et al., "Distributed resource reservation in massively parallel processor arrays", May 16, 2011, 4 pages.

Mohsen Hayati and Yazdan Shirvany, "Artificial Neural Network Approach for Short Term Load Forecasting for Illam Region", Jan. 2007, 5 pages.

(56) References Cited

OTHER PUBLICATIONS

Hasim Sak, Andrew Senior, and Francoise Beaufays, "Long Short-Term Memory Recurrent Neural Network Architectures for Large Scale Acoustic Modeling", Jan. 2014, 5 pages.

Jorg Walter and Klaus Schulten, "Implementation of self-organizing neural networks for visuo-motor control of an Industrial robot", Jan. 1993, 10 pages.

Heikki Hyotyniemi and Aarno Lehtola, "A Universal Relation Database Interface for Knowledge Based Systems", Apr. 1991, 5 pages.

Mrissa, Michael, et al. "An avatar architecture for the web of things." IEEE Internet Computing 19.2 (2015): 30-38., 9 pages.

Luck, Michael, and Ruth Aylett. "Applying artificial intelligence to virtual reality: Intelligent virtual environments." Applied Artificial Intelligence 14.1 (2000): 3-32., 30 pages.

Terdjimi, Mehdi, et al. "An avatar-based adaptation workflow for the web of things." Enabling Technologies: Infrastructure for Collaborative Enterprises (WETICE), 2016 IEEE 25th International Conference on. IEEE, 2016., 6 pages.

Bogdanovych, Anton, et al. "Authentic interactive reenactment of cultural heritage with 3D virtual worlds and artificial intelligence." Applied Artificial Intelligence 24.6 (2010): 617-647., 32 pages.

Hernandez, Marco E. Perez, and Stephan Reiff-Marganiec. "Autonomous and self controlling smart objects for the future internet." Future internet of things and cloud (FiCloud), 2015 3rd international conference on. IEEE, 2015., 8 pages.

Medini et al., "Building a Web of Things with Avatars", Managing the Web of Things (2017), 30 pages.

Zhang, Yiying, Lei Guo, and Nicolas D. Georganas. "AGILE: An architecture for agent-based collaborative and Interactive virtual environments." Proc. Workshop on Application Virtual Reality Technologies for Future Telecommunication System, IEEE Globecom '2000 Conference. 2000. (Year: 2000), 9 pages.

Eladhari, Mirjam P., "Semi-Autonomous Avatars in Virtual Game Worlds," Pre-conference to the ECREA 2010—3rd European Communication Conference, Avatars and Humans. Representing Users in Digital Games, Hamburg, Germany, Oct. 2010, Available from: Jan. 21, 2012 (Year: 2012), 8 pages.

About Event Tracing, retrieved from <URL: http://msdn.microsoft.com/en-US/library/aa363668(d=default,I=en-us, v=vs.85).aspx> on Jan. 12, 2014, 2 pages.

Add dynamic Java code to your application, retrieved from <URL: http://www.javaworld.com/article/2071777/design-patterns/add-dynamic-java-code-to-your-application.html> on May 13, 2014, 6 pages.

BCEL, retrieved from <URL: http://commons.apache.org> on May 13, 2014, 2 pages.

Artificial intelligence, retrieved from <URL: http://wikipedia.com> on May 21, 2014, 28 pages.

Artificial neural network, retrieved from <URL: http://wikipedia.com> on May 21, 2014, 12 pages.

Branch (computer science), retrieved from <URL: http://wikipedia.com> on May 6, 2014, 2 pages.

Branch trace, retrieved from <URL: http://wikipedia.com> on May 28, 2014, 2 pages.

C Function Call Conventions and the Stack, retrieved from <URL: http://www.csee.umbc.edu/~chang/cs313.s02/stack. shtml> on Jan. 11, 2014, 4 pages.

Call stack, retrieved from <URL: http://wikipedia.com> on Jan. 11, 2014, 5 pages.

Program compilation and execution flow, retrieved from <URL: http://cs.stackexchange.com/questions/6187/program-compilation-and-execution-flow> on Jan. 9, 2014, 2 pages.

Control unit, retrieved from <URL: http://wikipedia.com> on May 25, 2014, 2 pages.

Create dynamic applications with javax.tools, retrieved from <URL: http://www.ibm.com/developerworks/library/j-jcomp/> on May 13, 2014, 11 pages.

Creating a Debugging and Profiling Agent with JVMTI, retrieved from <URL: http://www.oracle.com/technetwork/articles/java/jvmti-136367.html> on Jan. 11, 2014, 18 pages.

Decision tree learning, retrieved from <URL: http://wikipedia.com> on Jun. 24, 2014, 5 pages.

Dynamic Bytecode Instrumentation, retrieved from <URL: http://www.drdobbs.com/tools/dynamic-bytecode-instrumentation/184406433> on Apr. 26, 2014, 6 pages.

Dynamic programming language, retrieved from <URL: http://wikipedia.com> on May 7, 2014, 4 pages.

Dynamic recompilation, retrieved from <URL: http://wikipedia.com> on May 19, 2014, 4 pages.

Eval(), retrieved from <URL: https://developer.mozilla.org/en-US/docs/Web/JavaScript/Reference/Global_Objects/eval> on May 7, 2014, 13 pages.

Function, retrieved from <URL: https://developer.mozilla.org/en-US/docs/Web/JavaScript/Reference/Global_Objects/Function> on May 7, 2014, 11 pages.

Function Enter2 Function, retrieved from <URL: https://msdn.microsoft.com/en-us/library/aa964981(d=default,I=en-us, v=vs.110).aspx> on Mar. 19, 2014, 2 pages.

FunctionLeave2 Function, retrieved from <URL: https://msdn.microsoft.com/en-us/library/aa964942(d=default,I=en-us, v=vs. 110).aspx> on Mar. 19, 2014, 1 pages.

Heuristic, retrieved from <URL: http://wikipedia.com> on May 22, 2014, 5 pages.

How to: Configure Trace Switches, retrieved from <URL: https://msdn.microsoft.com/en-us/library/vstudio/t06xyy08(d=default,I=en-us,v=vs. 100).aspx> on Mar. 19, 2014, 3 pages.

Indirect branch, retrieved from <URL: http://wikipedia.com> on May 5, 2014, 1 pages.

Instruction cycle, retrieved from <URL: http://wikipedia.com> on Apr. 30, 2014, 2 pages.

Instruction set, retrieved from <URL: http://wikipedia.com> on Apr. 29, 2014, 6 pages.

Interrupt, retrieved from <URL: http://wikipedia.com> on May 15, 2014, 5 pages.

Introduction to Instrumentation and Tracing, retrieved from <URL: http://msdn.microsoft.com/en-us/library/aa983649(d=default,l=en-us,v=vs.71).aspx> on Jan. 10, 2014, 2 pages.

Java bytecode, retrieved from <URL: http://wikipedia.com> on May 27, 2014, 4 pages.

Package java.util.logging, retrieved from <URL: http://docs.oracle.com/javase/1.5.0/docs/api/java/util/logging/package-summary.html> on Mar. 19, 2014, 2 pages.

Javac—Java programming language compiler, retrieved from <URL: http://docs.oracle.com/javase/7/docs/technotes/tools/windows/javac.html> on May 13, 2014, 12 pages.

Interface JavaCompiler, retrieved from <URL: http://wikipedia.com> on May 13, 2014, 4 pages.

Javassist, retrieved from <URL: http://wikipedia.com> on May 13, 2014, 2 pages.

Just-in-time compilation, retrieved from <URL: http://wikipedia.com> on May 19, 2014, 5 pages.

JVM Tool Interface, retrieved from <URL: http://docs.oracle.com/javase/7/docs/platform/jvmti/jvmti.html> on Apr. 26, 2014, 127 pages.

Machine code, retrieved from <URL: http://wikipedia.com> on Apr. 30, 2014, 3 pages.

Metaprogramming, retrieved from <URL: http://wikipedia.com> on May 8, 2014, 3 pages.

Microsoft.VisualBasic.Logging Namespace, retrieved from <URL: http://msdn.microsoft.com/en-us/library/ms 128122 (d=default,I=en-us,v=vs. 110).aspx> on Jan. 13, 2014, 1 pages.

Pin (computer program), retrieved from <URL: http://wikipedia.com> on May 6, 2014, 3 pages.

Processor register, retrieved from <URL: http://wikipedia.com> on Apr. 29, 2014, 4 pages.

Profiling (computer programming), retrieved from <URL: http://wikipedia.com> on Jan. 10, 2014, 4 pages.

Profiling Overview, retrieved from <URL: http://msdn.microsoft.com/en-us/library/bb384493(d=default,I=en-us, v=vs. 110).aspx> on Jan. 12, 2014, 6 pages.

(56) References Cited

OTHER PUBLICATIONS

Program counter, retrieved from <URL: http://wikipedia.com> on Apr. 24, 2014, 2 pages.
Btrace, retrieved from <URL: http://wikipedia.com> on Apr. 24, 2014, 2 pages.
Reflection (computer programming), retrieved from <URL: http://wikipedia.com> on May 7, 2014, 5 pages.
Class Runtime, retrieved from <URL: http://docs.oracle.com/javase/7/docs/api/java/lang/Runtime.html> on Jan. 10, 2014, 10 pages.
Self-modifying code, retrieved from <URL: http://wikipedia.com> on Jan. 12, 2014, 6 pages.
Subjective logic, retrieved from <URL: http://wikipedia.com> on May 22, 2014, 5 pages.
System.CodeDom.Compiler Namespace, retrieved from <URL: http://msdn.microsoft.com/en-us/library/z6b99ydt (d=default,l=en-us,v=vs. 110).aspx> on May 13, 2014, 2 pages.
System.Reflection.Emit Namespace, retrieved from <URL: http:/msdn.microsoft.com/en-us/library/xd5fw18y(d=default, =en-us, v=vs. 110).aspx> on May 13, 2014, 2 pages.
IEEE Spectrum, Evan Ackerman Erico Guizzo, iRobot Brings Visual Mapping and Navigation to the Roomba 980, Sep. 16, 2015.
Renaud Dube, et al., SegMap: 3D Segment Mapping using Data-Driven Descriptors, Apr. 25, 2018.
Joseph Redmon, Ali Farhadi, YOLO9000: Better, Faster, Stronger, Dec. 25, 2016.
Electric Jen, How Does Autopilot React to Disappearing Lane Markings?, https://www.teslarati.com/autopilot-experience-disappearing-lane-markings/, Nov. 18, 2015.
Seunghoon Hong, Hyeonwoo Noh, Bohyung Han, Decoupled Deep Neural Network for Semi-supervised Semantic Segmentation, Jun. 17, 2015.
Xinxin Dul, Marcelo H. Aug Jr., Sertac Karaman and Daniela Rus, A General Pipeline for 3D Detection of Vehicles, Feb. 12, 2018.
Wenjie Luo, Bin Yang and Raquel Urtasun, Fast and Furious: Real Time End-to-End 3D Detection, Tracking and Motion Forecasting with a Single Convolutional Net, 2018.
Huan Fu, Mingming Gong, Chaohui Wang, Kayhan Batmanghelich, Dacheng Tao, Deep Ordinal Regression Network for Monocular Depth Estimation, Jun. 6, 2018.
Gene, Firmware 7.1 Sees First Wave of Tesla Autopilot Restrictions, https://www.teslarati.com/tesla-firmware-7-1-rolls-out-autopilot-restrictions/, Jan. 9, 2016.
Net-Scale Technologies, Inc., Autonomous Off-Road Vehicle Control Using End-to-End Learning, http://www.net-scale.com, Jul. 30, 2004.
Russell Stewart, Mykhaylo Andriluka, End-to-end people detection in crowded scenes, Jul. 8, 2015.
Ping Luo, Jiamin Rene, Zhanglin Peng, Ruimao Zhang, Jingyu Li, Differentiable Learning-To-Normalize Via Switchable Normalization, Apr. 24, 2019.
Garth Woodworth, Tesla Autopilot ultrasonic sensors handle difficult merging event, https://www.teslarati.com/tesla-autopilot-ultrasonic-sensors-handle-difficult-merging-event/, Feb. 7, 2016.
Joshua Owoyemi, Behavioural Cloning Applied to Self-Driving Car on a Simulated Track, Jan. 27, 2017.
Karen Simonyan, Andrew Zisserman, Very Deep Convolutional Networks for Large-Scale Image Recognition, Apr. 10, 2015.
Liang-Chieh Cheri, Yukun Zhu, George Papandreou, Florian Schroff, and Hartwig Adam, Encoder-Decoder with Atrous Separable Convolution for Semantic Image Segmentation, Aug. 22, 2018.
Pierre Sermanet David Eigen Xiang Zhang Michael Mathieu Rob Fergus Yann LeCun, OverFeat: Integrated Recognition, Localization and Detection using Convolutional Networks, Feb. 24, 2014.
Zhichao Yin and Jianping Shi, GeoNet: Unsupervised Learning of Dense Depth, Optical Flow and Camera Pose, Mar. 12, 2018.
Ross Girshick, Jeff Donahue, Trevor Darrell, Jitendra Malik, UC Berkeley and 21CSI, Rich feature hierarchies for accurate object detection and semantic segmentation, 2014.
Brady Berlin, Testa Owners Vote on 7.1 Features & Enhancements, https://www.teslarati.com/tesla-owners-vote-on-7-1-features-enhancements/, Nov. 17, 2015.
Bin Yang, Wenjie Luo, Raquel Urtasun, PIXOR: Real-time 3D Object Detection from Point Clouds, Feb. 17, 2019.
Seunghoon Hongt Junhyuk Oh, Bohyung Hant Honglak Leet, Learning Transferrable Knowledge for Semantic Segmentation with Deep Convolutional Neural Network, Dec. 24, 2015.
Amir Sadeghian', Alexandre Alahi2, Silvio Savarese, Tracking The Untrackable:Learning to Track Multiple Cues with Long-Term Dependencies, Dec. 25, 2017.
Vijay Badrinarayanan, Alex Kendall, Roberto Cipolla, Senior Member, IEEE, SegNet: A Deep Convolutional Encoder-Decoder Architecture for Image Segmentation, Oct. 10, 2016.
Wenging Chu , Yao Liu, Chen Shen, Deng Cai, Member, IEEE, and Xian-Sheng Hua, Fellow, IEEE, Multi-Task Vehicle Detection With Region-of-Interest Voting, Oct. 12, 2017.
Young-Sik Shin, Yeong Sang Park and Ayoung Kim, Direct Visual SLAM using Sparse Depth for Camera-LIDAR System, May 2018.
Zhedong Zheng Yi Yang, Unsupervised Scene Adaptation with Memory Regularization in vivo, Feb. 7, 2023.
Visual Object Classes Challenge 2012 (VOC2012), Pascal2, 2012.
Steve Hanley, Testa v7.1 Introduces New Summoning Feature and Autopilot Enhancements, Jan. 9, 2016.
Charles R. Qi' * Wei Liu2 Chenxia Wu2 Hao Su3 Leonidas J. Guibas, Frustum PointNets for 3D Object Detection from RGB-D Data, Apr. 13, 2018.
Jifeng Dai, et al., Deformable Convolutional Networksb—MSRA COCO Detection & Segmentation Challenge 2017 Entry.
Jens Behley and Cyrill Stachniss, Efficient Surfel-Based SLAM using 3D Laser Range Data in Urban Environments, Jun. 2018.
Fred Lambert, GM's Cruise is now testing its autonomous and all-electric Chevy Bolt in Scottsdale, Arizona, Aug. 9, 2016.
Darrell Etherington, Cruise has around 30 self-driving test car right now, Sep. 14, 2016.
Ji Zhang and Sanjiv Singh, LOAM: Lidar Odometry and Mapping in Real-time, Jul. 1, 2014.
George Papandreou, Liang-Chieh Chen, Kevin Murphy, Alan L. Yuille, Weakly- and Semi-Supervised Learning of a Deep Convolutional Network for Semantic Image Segmentation, Oct. 5, 2015.
Xiaolin Song, Haotian Caol, Jiang Huang, Vehicle path planning in various driving situations based on the elastic band theory for highway collision avoidance, Dec. 12, 2013.
Gene, Tesla Model X Firmware 7.0 Features Exposed, https://www.teslarati.com/tesla-model-x-firmware-7-0-features-exposed/, Sep. 30, 2015.
Sarthak Sharma ** , Junaid Ahmed Ansarit*, J. Krishna Murthy2, K. Mandava Krishna, Beyond Pixels: Leveraging Geometry and Shape Cues for Online Multi-Object Tracking, Jul. 27, 2018.
Gene, Inside Tesla Version 8.0: release notes and screenshots, https://www.teslarati.com/tesla-version-8-release-notes-screenshots/, Sep. 22, 2016.
Eugene Kim, Amazon's $775 million deal for robotics company Kiva is starting to look really smart, https://www.businessinsider.in/amazons-775-million-deal-for-robotics-company-kiva-is-starting-to-look-really-smart/articleshow/52771614.cms, Jun. 16, 2016.
Wilko Schwarting, Javier Alonso-Mora, and Daniela Rust, Planning and Decision-Making for Autonomous Vehicles, 2018.
Julius Ziegler, Philipp Bender, Thao Dang and Christoph Stiller, Trajectory Planning for BERTHA—a Local, Continuous Method, Jun. 11, 2014.
Zhedong Zheng, Yi Yang, Rectifying Pseudo Label Learning via Uncertainty Estimation for Domain Adaptive Semantic Segmentation, Oct. 15, 2020.
Jesse Levinson, Michael Montemerlo, Sebastian Thrun, Map-Based Precision Vehicle Localization in Urban Environments, 2008.
Wenjie Luo, Bin Yang and Raquel Urtasun, Fast and Furious: Real Time End-to-End 3D Detection, Tracking and Motion Forecasting with a Single Convolutional Net, Dec. 2020.
Jonathan Long* Evan Shelhamer* Trevor Darrell, Fully Convolutional Networks for Semantic Segmentation, Nov. 14, 2014.
Wongun Choi, Near-Online Multi-target Tracking with Aggregated Local Flow Descriptor, Apr. 2015.

(56) References Cited

OTHER PUBLICATIONS

Young-Woo Seo, Ragunathan Rajkumar, A vision system for detecting and tracking of stoplines, 17th International IEEE Conference on Intelligent Transportation Systems (ITSC), Qingdao, China, pp. 1970-1975 (Oct. 2014).
R. Azimi, G. Bhatia, R. Rajkumar and p. Mudalige, Ballroom Intersection Protocol: Synchronous Autonomous Driving at Intersections, 2015 IEEE 21st International Conference on Embedded and Real-Time Computing Systems and Applications, Hong Kong, China, pp. 167-175 (Aug. 2015).
Y.-W. Seo and R. R. Rajkumar, Detection and tracking of boundary of unmarked roads, 17th International Conference on Information Fusion (FUSION), Salamanca, Spain, pp. 1-6 (2014).
Azimi, R., Bhatia, G., Rajkumar, R., and Mudalige, P., Intersection Management using Vehicular Networks, SAE Technical Paper 2012-01-0292 (Apr. 16, 2012).
J. Kim, H. Kim, K. Lakshmanan and R. Rajkumar, Parallel scheduling for cyber-physical systems: Analysis and case study on a self-driving car, 2013 ACM/IEEE International Conference on Cyber-Physical Systems (ICCPS), Philadelphia, PA, USA, pp. 31-40 (2013).
Reza Azimi, Gaurav Bhatia, Ragunathan Raj Rajkumar, and Priyantha Mudalige. STIP: Spatio-Temporal Intersection Protocols for Autonomous Vehicles, ICCPS 2014: ACM/IEEE.
5th International Conference on Cyber-Physical Systems (with CPS Week 2014) (ICCPS '14). IEEE Computer Society, USA, pp. 1-12 (Apr. 2014).
Junsung Kim, Ragunathan (Raj) Rajkumar, and Markus Jochim, Towards dependable autonomous driving vehicles: a system-level approach, ACM SIGBED Review, vol. 10, Issue 1, pp. 29-32 (Feb. 2013).
J. Wei, J. M. Snider, J. Kim, J. M. Dolan, R. Rajkumar and B. Litkouhi, Towards a viable autonomous driving research platform, 2013 IEEE Intelligent Vehicles Symposium (IV), Gold Coast, QLD, Australia, pp. 763-770 (Jun. 2013).
Y. - W. Seo and R. Rajkumar, Tracking and estimation of ego-vehicle's state for lateral localization, 17th International IEEE Conference on Intelligent Transportation Systems (ITSC), Qingdao, China, pp. 1251-1257 (2014).
Y. - W. Seo and R. R. Rajkumar, Utilizing instantaneous driving direction for enhancing lanemarking detection, 2014 IEEE Intelligent Vehicles Symposium Proceedings, Dearborn, Mi, USA, pp. 170-175 (2014).
Chris Urmson, Green lights for our self-driving vehicle prototypes, blog.google, https://blog.google/alphabet/self-driving-vehicle-prototypes-on-road/, May 15, 2015.
Nathaniel Fairfield, On the road with self-driving car user No. one, Waymo, https://waymo.com/blog/2016/12/on-road-with-self-driving-car-user.html, Dec. 13, 2016.
Udacity, Machine Learning in the Google Self-Driving Car, YouTube, https://www.youtube.com/watch?v=IL 16AQItG1g, Oct. 28, 2014.
Alexis C. Madrigal, The Trick That Makes Google's Self-Driving Cars Work, https://www.theatlantic.com/technology/ archive/2014/05/all-the-world-a-trackthe-trick-that-makes-googles-self-driving-cars-work/370871/, May 15, 2014.
Wired, Meet the Blind Man Who Convinced Google Its Self-Driving Car Is Finally Ready, YouTube, https://www.youtube.com/watch?v=X_d3MCklvg8, Dec. 13, 2016.
Google self-driving car project, Ready for the Road, YouTube, https://www.youtube.com/watch?v=uCezICQNgJU, May 15, 2015.
Waymo, Say Hello to Waymo, YouTube, https://www.youtube.com/watch?v=uHbMt6WDhQ8, appox. Sep. 2015.
Mike James, NVIDIA's Neural Network Drives A Car, https://www.i-programmer.info/news/105-artificial-intelligence/9678-nvidiasneural-network-drives-a-car.html, approx. Apr. 26, 2016.
Mariusz Bojarski, Ben Firner, Beat Flepp, Larry Jackel, Urs Muller, Karol Zieba and Davide Del Testa, End-to-End Deep Learning for Self-Driving Cars, https://developer.nvidia.com/blog/deep-learning-self-driving-cars/, Aug. 17, 2016.
Mariusz Bojarski, Davide Del Testa, Daniel Dworakowski, Bernhard Firner, Beat Flepp, Prasoon Goyal, Lawrence D. Jackel, Mathew Monfort, Urs Muller, Jiakai Zhang, Xin Zhang, Jake Zhao, Karol Zieba, End to End Learning for Self-Driving Cars, https://arxiv.org/pdf/1604.07316v1.pdf, Apr. 25, 2016.
NVIDIA, CES 2016: The NVIDIA AI Platform (part 4), YouTube, https://www.youtube.com/watch?v=e-2St_P46ms, Jan. 5, 2016.
NVIDIA, NVIDIA Drive Autonomous Vehicle Platform, YouTube, https://www.youtube.com/watch?v=0rc4RqYLtEU, Oct. 10, 2017.
Iprogrammertv, Dave-2 A Neural Network Drives A Car, YouTube, https://www.youtube.com/watch? v=NJU9ULQUwng, Apr. 26, 2016.
Darrell Etherington, Cruise has around 30 self-driving test cars on roads right now, https://techcrunch.com/2016/09/14/cruise-has-around-30-self-driving-test-carson-roads-right-now/?guccounter=1, Sep. 14, 2016.
Your Personal Chauffeur, https://web.archive.org/web/20160202084335/http://www.getcruise.com/technology, approx. Sep. 14, 2016.
Jordan Golson, Startup's self-driving test car crashes after driver takes control, Theverge, https://www.theverge.com/2016/1/21/10810726/cruise-automation-self-drivingcar-accident, Jan. 22, 2016.
Kim-Mai Cutler, Cruise Raises $12.5M From Spark, YC's Sam Altman For Self-Driving Cars; Poaches Tesla's Lead on Autopilot, Tech Crunch, https://techcrunch.com/2015/09/18/cruise-2/, Sep. 19, 2015.
· https://electrek.co/2016/08/09/gms-cruise-testing-autonomous-bolt-ev-scottsdalearizona/, approx. Sep. 14, 2016.
Wired, Uber's Self-Driving Truck Makes Its First Delivery, YouTube, https://www.youtube.com/watch? v=slICR4eG8_o, Oct. 25, 2016.
Michael Liedtke, Startup wants to put self-driving big rigs on US highways, https://web.archive.org/web/20160702084056/http://bigstory.ap.org/article/81b3112909c943b1a824a3ecb80fa40d/startup-wants-put-self-driving-big-rigs-ushighways, May 17, 2016.
Alan Ohnsman, Startup Otto Aims To Leapfrog To First In Self-Driving Vehicles With Big Trucks, Forbes, https://www.forbes.com/sites/alanohnsman/2016/08/01/startup-otto-aims-toleapfrog-to-first-in-self-driving-vehicles-with-big-trucks/? sh=628a5bfa5e5c, Aug. 1, 2016.
Marcus Gilmer, The story of Otto, the creato of Uber's self-driving truck, Mashable, https://mashable.com/article/otto-uber-self-driving-truck, Oct. 25, 2016.
Andrew J. Hawkins, Uber's self-driving trucks have a new, fresh, Otto-less look, Theverge, https://www.theverge.com/2017/7/5/15924010/uber-otto-self-driving-truck-newlook-lidar, Jul. 6, 2017.
Bloomberg Originals, Meet Amazon's New Robot Army Shipping Out Your Products, YouTube, https://www.youtube.com/watch?app=desktop&v=g6DIFpaol6A, Dec. 2, 2014.
James Martin, Meet Amazon's busiest employee—the Kiva robot, CNET, https://www.cnet.com/tech/services-and-software/meet-amazons-busiestemployee-the-kiva-robot/, approx. Dec. 2, 2014.
· https://www.businessinsider.com/kiva-robots-save-money-for-amazon-2016-6, approx. Dec. 2, 2014.
· https://www.aboutamazon.com/news/operations/10-years-of-amazon-roboticshow-robots-help-sort-packages-move-product-and-improve-safety, approx. Dec. 2, 2014.
Amazon.com to Acquire Kiva Systems, Inc., sec.gov, https://www.sec.gov/Archives/edgar/data/1018724/000119312512122135/d318297dex991.htm, approx. Dec. 2, 2014.
Inside Amazon, What's it like to work with robots at an Amazon fulfillment center?, YouTube, https://www.youtube.com/watch?v=cn86KkPNYjk&t=4s, Mar. 25, 2021.
Erico Guizzo, Kiva Systems: Three Engineers, Hundreds of Robots, One Warehouse, spectrum, https://spectrum.ieee.org/three-engineers-hundreds-of-robots-one-warehouse, Jul. 1, 2008.
Colin McRae Rally 2.0, Wikipedia, https://en.wikipedia.org/wiki/Colin_McRae_Rally_2.0, approx. 2000.
Joseph Qualls, David J. Russomanno, Applications of Neural-Based Agents in Computer Game Design, Intechopen, https://www.intechopen.com/chapters/10916, Oct. 1, 2009.
Jeff Hannan, https://web.archive.org/web/20080330203633/http://www.generation5.org/content/2001/hannan.asp, approx. 2015.
Al-Junkie, http://www.ai-junkie.com/misc/hannan/hannan.html, approx. 2015.

(56) References Cited

OTHER PUBLICATIONS

Daniele Loiacono, Alessandro Prete, Pier Luca Lanzi, Luigi Cardamone, Learning to Overtake in TORCS Using Simple Reinforcement Learning, https://www.researchgate.net/profile/Pier-LucaLanzi/publication/224177868_Learning_to_overtake_in_TORCS_using_simple_reinforcement_learning/links/5a65e5074585158bca52c1dc/Learning-to-overtakein-TORCS-using-simple-reinforcement- learning.pdf, approx. 2015.
Learning to Overtake in TORCS Using Simple Reinforcement Learning, Researchgate, https://www.researchgate.net/ profile/Pier-LucaLanzi/publication/224177868_Learning_to_overtake_in_TORCS_using_simple_reinforcement_learning/links/5a65e5074585158bca52c1dc/Learning-to-overtakein-TORCS-using-simple-reinforcement-learning.pdf, approx. 2015.
Gaudl, Swen, Building Robust Real-Time Game AI: Simplifying & Automating Integral Process Steps in Multi-Platform Design, https://purehost.bath.ac.uk/ws/portalfiles/portal/187939914/dissertationRoot.pdf, approx. 2015.
About | OpenCV, retrieved from <URL: http://opencv.org/about.html> on Dec. 13, 2014, 1 pages.
Animetrics, Inc. | 3D Facial Recognition, retrieved from <URL: http://animetrics.com/> on Dec. 13, 2014, 2 pages.
Bag-of-words model, retrieved from <URL: http://wikipedia.com> on Nov. 19, 2015, 2 pages.
Beier-Neely morphing algorithm, retrieved from <URL: http://wikipedia.com> on Nov. 19, 2015, 1 pages.
Computer vision, retrieved from <URL: http://wikipedia.com> on Nov. 19, 2015, 7 pages.
Convolutional neural network, retrieved from <URL: http://wikipedia.com> on Nov. 11, 2015, 5 pages.
Decimation (signal processing), retrieved from <URL: http://wikipedia.com> on Nov. 19, 2015, 3 pages.
Digital image processing, retrieved from <URL: http://wikipedia.com> on Nov. 19, 2015, 3 pages.
Dissolve (filmmaking), retrieved from <URL: http://wikipedia.com> on Nov. 11, 2015, 2 pages.
Facial recognition system, retrieved from <URL: http://wikipedia.com> on Nov. 11, 2015, 6 pages.
Feature detection (computer vision), retrieved from <URL: http://wikipedia.com> on Nov. 19, 2015, 3 pages.
Feature extraction, retrieved from <URL: http://wikipedia.com> on Nov. 19, 2015, 2 pages.
Gesture recognition, retrieved from <URL: http://wikipedia.com> on Nov. 19, 2015, 5 pages.
GrabCut, retrieved from <URL: http://wikipedia.com> on Nov. 1, 2015, 1 pages.
Image processing, retrieved from <URL: http://wikipedia.com> on Nov. 19, 2015, 2 pages.
Image segmentation, retrieved from <URL: http://wikipedia.com> on Nov. 19, 2015, 12 pages.
Image warping, retrieved from <URL: http://wikipedia.com> on Nov. 1, 2015, 2 pages.
Inbetweening, retrieved from <URL: http://wikipedia.com> on Nov. 11, 2015, 2 pages.
Interpolation, retrieved from <URL: http://wikipedia.com> on Nov. 1, 2015, 5 pages.
Language model, retrieved from <URL: http://wikipedia.com> on Nov. 19, 2015, 4 pages.
List of speech recognition software, retrieved from <URL: http://wikipedia.com> on Nov. 19, 2015, 4 pages.
Livewire Segmentation Technique, retrieved from <URL: http://wikipedia.com> on Nov. 1, 2015, 2 pages.
Morphing, retrieved from <URL: http://wikipedia.com> on Nov. 11, 2015, 2 pages.
Motion estimation, retrieved from <URL: http://wikipedia.com> on Nov. 19, 2015, 2 pages.
Muse: Face Morph || Mesh Warping, retrieved from <URL: http://alexwolfe.blogspot.com/2011/10/face-morph-mesh-warping.html> on Nov. 19, 2015, 2 pages.
N-gram, retrieved from <URL: http://wikipedia.com> on Nov. 1, 2015, 5 pages.
Optical flow, retrieved from <URL: http://wikipedia.com> on Nov. 1, 2015, 4 pages.
Outline of object recognition, retrieved from <URL: http://wikipedia.com> on Nov. 19, 2015, 7 pages.
Phonotactics, retrieved from <URL: http://wikipedia.com> on Nov. 19, 2015, 3 pages.
Recurrent neural network, retrieved from <URL: http://wikipedia.com> on Nov. 11, 2015, 5 pages.
Sample rate conversion, retrieved from <URL: http://wikipedia.com> on Nov. 1, 2015, 2 pages.
Simple interactive object extraction, retrieved from <URL: http://wikipedia.com> on Nov. 19, 2015, 2 pages.
Speech recognition, retrieved from <URL: http://wikipedia.com> on Nov. 11, 2015, 12 pages.
Speech segmentation, retrieved from <URL: http://wikipedia.com> on Nov. 1, 2015, 4 pages.
Welcome to recognize-speech.com, retrieved from <URL: http://recognize-speech.com/> on Oct. 18, 2015, 1 pages.
Introduction Speech, retrieved from <URL: http://recognize-speech.com/speech> on Oct. 18, 2015, 1 pages.
Preprocessing, retrieved from <URL: http://recognize-speech.com/preprocessing> on Oct. 18, 2015, 4 pages.
Feature Extraction, retrieved from <URL: http://recognize-speech.com/feature-extraction> on Oct. 18, 2015, 3 pages.
Acoustic model, retrieved from <URL: http://recognize-speech.com/acoustic-model> on Oct. 18, 2015, 2 pages.
Video content analysis, retrieved from <URL: http://wikipedia.com> on Nov. 19, 2015, 2 pages.
Video tracking, retrieved from <URL: http://wikipedia.com> on Nov. 1, 2015, 2 pages.
Andrej Karpathy, Thomas Leung, George Toderici, Rahul Sukthankar, Sanketh Shetty, Li Fei-Fei, Large-scale Video Classification with Convolutional Neural Networks, Apr. 14, 2014, 8 pages, Stanford University.
Karen Simonyan, Andrew Zisserman, Two-Stream Convolutional Networks for Action Recognition in Videos, Nov. 13, 2014, 11 pages, University of Oxford.
Matthew Rimmer, "Tesla Motors' Open Source Revolution: Intellectual Property and the Carbon Crisis," Medium (Jun. 15, 2014), 13 pages.
Keith Barry, "Guide to Lane Departure Warning and Lane Keeping Assist," Consumer Reports (Jun. 28, 2017), 13 pages.
The Tesla Team, "Dual Motor Model S and Autopilot," Tesla Blog (Oct. 10, 2014), 3 pages.
Gabe Nelson, "Tesla enables 'autopilot' for the Model S, promises a world without steering wheels," Automotive News (Oct. 15, 2015), 3 pages.
Chris Davies, "Tesla Enhanced Autopilot: What 8.1 is (and isn't) and 2016 will bring," Slash Gear (Dec. 22, 2016), 6 pages.
Andrew J. Hawkins, "Tesla has been working on a backup plan in case its self-driving promises fail," The Verge (Aug. 9, 2017), 5 pages.
Jordan Golson, "Tesla's Self-Driving Care Hardware Will Run You $8,000," The Verge (Oct. 20, 2016), 3 pages.
Kirsten Korosec, "Elon Musk Says Tesla Vehicles Will Drive Themselves in Two Years," Fortune (Dec. 21, 2015), 7 pages.
XAutoworld, "Transcript: Elon Musk's Autopilot 2.0 Conference Call," XAutoworld (Nov. 20, 2016), 17 pages.
Service, Robert F., "Minds of Their Own," Sci. Magazine. Oct. 10, 2014, 346(6206):182-183, 2 pages.
Silva, Marty, A Visual History of American Football Games, IGN, Jul. 8, 2013, 19 pages.
Macy, Seth G., A Visual History of Racing Games, IGN, updated Sept. 6, 2017, 29 pages.
Final Fantasy XI Released, IGN, updated Jun. 16, 2012, 4 pages.
Ellis, Tim, et al., Ellipse Detection and Matching with Uncertainty, pp. 137-144, 9 pages.
Pomerleau, Dean A., Neural Network Perception for Mobile Robot Guidance, Feb. 16, 1992, 216 pages.

(56) References Cited

OTHER PUBLICATIONS

Lee, Ten-min, et al., Computer Simulation of Learning Experiments with Autonomous Mobile Robots (Univ. of Manchester, Mar. 26, 1999), 8 pages.
Durrant-Whyte, Hugh, et al., Simultaneous Localisation and Mapping (SLAM): Part I The Essential Algorithms, 9 pages.
Smith, Randall, et al., Estimating Uncertain Spatial Relationships in Robotics, pp. 167-193, 27 pages.
Zimmer, Kyle, Evolution of the Game Console, 5 pages.
Stuart, Keith, PS4 and Xbox One: so why aren't they backwards compatible?, The Guardian, Dec. 12, 2023, 9 pages.
Christian, Mark, Saved Game History: Battery Backups, Memory Cards, and the Cloud, Mailchimp, Feb. 21, 2019, 19 pages.
Matthew, Vestal, Job management system for a fleet of autonomous mobile robots, WO2013119942, WIPO, Aug. 15, 2013, 89 pages.
Caporale et al, System and method for control and training of avatars in an interactive environment, U.S. Reissue Patent No. 45132, USPTO, Sep. 9, 2014, 31 pages.
Tim Paek, Bongshin Lee, Bo Thiesson, Designing Phrase Builder: A Mobile Real-Time Query Expansion Interface, Microsoft Research, 2009, 10 pages.
Karen Simonyan and Andrew Zisserman, Very Deep Convolutional Networks for Large - Scale Visual Recognition, ICLR 2015 (Apr. 10, 2015).
Katrakazas, Christos, et al., Real-time motion planning methods for autonomous on-road driving: State-of-the-art and future research directions, Transportation Research Part C: Emerging Technologies vol. 60 (Sep. 24, 2015).
Ken Goldberg, Robots With Their Heads in the Clouds, Medium, https://medium.com/aspen-ideas/robots-with-their-heads-in-the-clouds-e88ac44def8a (Aug. 25, 2014).
Kye-Hyeon Kim, Sanghoon Hong, Byungseok Roh, Yeongje Cheon, Minje Park, PVANET: Deep but Lightweight Neural Networks for Real-time Object Detection, arXiv:1608.08021 (Sep. 30, 2016).
Li, Xiaohui, et al., Real-time trajectory planning for autonomous urban driving: Framework, algorithms, and verifications, IEEE 2016 (Oct. 26, 2015).
Liang-Chieh Chen, George Papandreou, Florian Schroff, Hartwig Adam, Rethinking Atrous Convolution for Semantic Image Segmentation, arXiv:1706.05587 (Jun. 17, 2017).
Liang-Chieh Chen, George Papandreou, Iasonas Kokkinos, Kevin Murphy, Alan L Yuille, DeepLab: Semantic Image Segmentation with Deep Convolutional Nets, Atrous Convolution, and Fully Connected CRFs, arXiv:1606.00915 (Jun. 2, 2016).
Liang-Chieh Chen, George Papandreou, Iasonas Kokkinos, Kevin Murphy, Alan L. Yuille, Semantic Image Segmentation with Deep Convolutional Nets and Fully Connected CRFs, ICLR 2015 (Jun. 7, 2016).
Liang-Chieh Chen, George Papandreou, Kevin Murphy, Alan L. Yuille, Weakly-and semi-supervised learning of a DCNN for semantic image segmentation, arXiv:1502.02734 (Oct. 5, 2015).
Lifeng An, Xinyu Zhang, Hongbo Gao and Yuchao Liu, Semantic segmentation-aided visual odometry for urban autonomous driving (Oct. 30, 2017).
M. Abadi, A. Agarwal, et al., Tensorflow: Large-Scale Machine Learning on Heterogeneous Distributed Systems, arXiv:1603.04467 (Mar. 16, 2016).
Ma, Liang, et al., Efficient sampling-based motion planning for on-road autonomous driving, IEEE 2015 (Feb. 13, 2015).
Marcus Waibel, RoboEarth: A World Wide Web for Robots, IEEE Spectrum, https://spectrum.IEEE.org/roboearth-a-world-wide-web-for-robots (Feb. 5, 2011).
Mark Everingham, S. M. All Eslami, Luc Van Gool, Christopher K. I. Williams, John Winn, Andrew Zisserma, The Pascal Visual Object Classes Challenge—A Retrospective, IJCV (Jan. 1, 2015).
Mohammad O. A. Aqel, Mohammad H. Marhaban, M. Iqbal Saripan and Napsiah Bt. Ismail, Review of visual odometry: types, approaches, challenges, and applications (Oct. 28, 2016).
Mohammadreza Mostajabi, Payman Yadollahpour, Gregory Shakhnarovich, Feedforward Semantic Segmentation With Zoom-Out Features, CVPR 2015 (Dec. 2, 2014).
Moritz Werling, Julius Ziegler, Soren Kammel, Sebastian Thrun, Optimal trajectory generation for dynamic street scenarios in a frenet frame, IEEE 2010 (Jul. 15, 2010).
Net-Scale Technologies, Inc., Autonomous Off-Road Vehicle Control Using End-to-End Learning, Final Technical Report, DARPA-IPTO (Jul. 30, 2004).
Niloufar Pourian, S. Karthikeyan, and B.S. Manjunath, Weakly supervised graph based semantic segmentation by learning communities of image-parts, ICCV 2015 (Feb. 18, 2016).
Oliver Pink, Visual map matching and localization using a global feature map, IEEE 2008 (Jun. 23, 2008).
Pierre Sermanet, David Eigen, Xiang Zhang, Michael Mathieu, Rob Fergus, Yann LeCun, OverFeat: Integrated Recognition, Localization and Detection using Convolutional Networks, ICLR 2014 (Feb. 24, 2014).
Pomerleau, Dean, "Neural Network Perception for Mobile Robot Guidance" (Jul. 31, 1993).
R. K. Satzoda and Mohan M. Trivedi, Vision-Based Lane Analysis: Exploration of Issues and Approaches for Embedded Realization, IEEE 2013 (Sep. 12, 2013).
Ravi Kumar Satzoda and Mohan Manubhai Trivedi, Drive Analysis Using Vehicle Dynamics and Vision-Based Lane Semantics, IEEE 2015 (Sep. 25, 2014).
Ross Girshick, Fast R-CNN, arXiv:1504.08083 (Sep. 27, 2015).
Ross Girshick, Jeff Donahue, Trevor Darrell, Jitendra Malik, Rich feature hierarchies for accurate object detection and semantic segmentation, CVPR 2014 (Oct. 22, 2014).
Scott Drew Pendleton, Hans Andersen, Xinxin Du, Xiaotong Shen, Malika Meghjani, You Hong Eng, Daniela Rus, and Marcelo H. Ang Jr., Perception, planning, control, and coordination for autonomous vehicles, Machines 2017 (Feb. 17, 2017).
Sean Bell, C. Lawrence Zitnick, Kavita Bala, Ross Girshick, Inside-Outside Net: Detecting Objects in Context with Skip Pooling and Recurrent Neural Networks (Dec. 14, 2015).
Sebastian Thrun, Michael Montemerlo, The GraphSLAM Algorithm with Applications to Large-Scale Mapping of Urban Structures, Stanford AI Lab (May 1, 2006).
Sergey Ioffe, Christian Szegedy, Batch Normalization: Accelerating Deep Network Training by Reducing Internal Covariate Shift, arXiv:1502.03167 (Mar. 2, 2015).
Sergey Ioffe, Christian Szegedy, Batch Normalization: Accelerating Deep Network Training by Reducing Internal Covariate shift, ICML 2015 (Mar. 2, 2015).
Seunghoon Hong, Hyeonwoo Noh, Bohyung Han, Decoupled Deep Neural Network for Semisupervised Semantic Segmentation, arXiv:1506.04924 (Jun. 17, 2015).
Seunghoon Hong, Junhyuk Oh, Bohyung Han, and Honglak Lee, Learning Transferrable Knowledge for Semantic Segmentation with Deep Convolutional Neural Network, arXiv:1512.07928 (Dec. 24, 2015).
Shaoqing Ren, Kaiming He, Ross Girshick, Jian Sun, Faster R-CNN: Towards Real-Time Object Detection with Region Proposal Networks, arXiv:1506.01497 (Jan. 6, 2016).
Shuai Zheng, Sadeep Jayasumana, Bernardino Romera-Paredes, Vibhav Vineet, Zhizhong Su, Dalong Du, Chang Huang, Philip H. S. Torr, Conditional Random Fields as Recurrent Neural Networks, arXiv:1502.03240 (Apr. 13, 2016).
Simon Ulbrich, Andreas Reschka, Jens Rieken, Susanne Ernst, Gerrit Bagschik, Frank Dierkes, Marcus Nolte, Markus Maurer, Towards a Functional System Architecture for Automated Vehicles, arXiv:1703.08557 (Mar. 30, 2017).
Xiaolin Song, Haotian Cao, and Jiang Huang, Vehicle path planning in various driving situations based on the elastic band theory for highway collision avoidance, Proceedings of the Institution of Mechanical Engineers, Part D: Journal of Automobile Engineering vol. 227, (Feb. 11, 2013).
Takafumi Taketomi, Hideaki Uchiyama, Sei Ikeda, Visual SLAM algorithms: a survey from 2010 to 2016, IPSJ 2017 (Jun. 2, 2017).

(56) References Cited

OTHER PUBLICATIONS

Vijay Badrinarayanan, Alex Kendall and Roberto Cipolla, SegNet: A Deep Convolutional Encoder-Decoder Architecture for Image Segmentation, arXiv:1511.00561 (Oct. 10, 2016).
Watt, Alan & Policarpo, Fabio, 3D Games Real-time Rendering and Software Technology, Chapter 7 "Behavior and AI Games" (Jan. 1, 2001).
Wei Liu, Andrew Rabinovich, Alexander C Berg, ParseNet: Looking Wider to See Better, arXiv:1506.04579 (Nov. 19, 2015).
Wei Liu, Dragomir Anguelov, Dumitru Erhan, Christian Szegedy, Scott Reed, Cheng-Yang Fu, Alexander C. Berg, SSD: Single Shot MultiBox Detector, arXiv:1512.02325 (Mar. 30, 2016).
Wolfram Burgard, Oliver Brock, Cyrill Stachniss, Map-based precision vehicle localization in urban environments, IEEE 2008 (2008); Ji Zhang, Sanjiv Singh, LOAM: Lidar Odometry and Mapping in Real-time, RSS 2014 (Jul. 2014).
Xiaozhi Chen, Kaustav Kundu, Ziyu Zhang, Huimin Ma, Sanja Fidler, Raquel Urtasun, Monocular 3D Object Detection for Autonomous Driving, CVPR 2016 (Dec. 12, 2016).
Xinxin Du1, Marcelo H. Ang Jr., Daniela Rus, Car Detection for Autonomous Vehicle: LIDAR and Vision Fusion Approach Through Deep Learning Framework, IEEE 2017 (Sep. 24-28, 2017).
Yu Xiang, Wongun Choi, Yuanqing Lin, and Silvio Savarese, Subcategory-Aware Convolutional Neural Networks for Object Proposals and Detection, IEEE 2017 (Mar. 9, 2017).
Zhaowei Cai, Quanfu Fan, Rogerio S. Feris, and Nuno Vasconcelos, A Unified Multi-scale Deep Convolutional Neural Network for Fast Object Detection, arXiv:1607.07155 (Jul. 25, 2016).
Ziegler, Julius, et al., Trajectory planning for Bertha—A local, continuous methods, IEEE 2014 (Jul. 17, 2014).
Ziwei Liu, Xiaoxiao Li, Ping Luo, Chen Change Loy, Xiaoou Tang, Semantic Image Segmentation via Deep Parsing Network, arXiv:1509.02054 (Sep. 24, 2015).
Cho, Hyunggi, Young-Woo Seo, B.V.K. Vijaya Kumar and Ragunathan Raj Rajkumar, A multi-sensor fusion system for moving object detection and tracking in urban driving environments, 2014 IEEE International Conference on Robotics and Automation (ICRA), 1836-1843 (2014).
Tasos Lazarides, 'F1 2016' Review—Great for Solo Racing, Awful for AI Racing, Toucharcade, https://toucharcade.com/2016/11/17/f1-2016-review/, Nov. 17, 2016.
F1 2016, https://www.metacritic.com/game/f1-2016/, approx. 2016.
Joshua Anderson, Innovative Navigation Artificial Intelligence for Motor Racing Games, https://uobrep.openrepository.com/bitstream/handle/10547/618555/Binder1.pdf, May 2016.
Jay Limburn, The AI Edge in F1, Medium, https://medium.com/@ai-decoded/total-competition-the-ai-edge-in-f1-c6c9f97181b0#, Jul. 20, 2023.
F1 2015: AI difficulty, Motorsport, https://us.motorsport.com/gaming/news/f1-2015-ai-difficulty/2942811/, Aug. 16, 2015.
Justin, Codemasters F1 2015 PC Review, https://www.racedepartment.com/threads/codemasters-f1-2015-pcreview.109768/page-2, Aug. 13, 2015.
Daniele Loiacono, Alessandro Prete, Pier Luca Lanzi, Luigi Cardamone, Learning to Overtake in TORCS Using Simple Reinforcement Learning, https://www.researchgate.net/profile/Pier-LucaLanzi/publication/224177868_Learning_to_overtake_in_TORCS_using_simple_reinforcement_learning/links/5a65e5074585158bca52c1dc/Learning-to-overtakein-TORCS-using-simple-reinforcement-learning.pdf, approx. 2005.
Design, https://www.gamedeveloper.com/design/how-forza-s-drivatar-actuallyworks#close-modal, approx. 2005.
Dean Takahashi, How Microsoft's Turn 10 fashioned the A.I. for cars in Forza Motorsport 5 (interview), https://venturebeat.com/games/how-microsofts-turn-10-fashioned-the-ai-for-carsin-forza-motorsport-5-interview/, approx. 2005.
How "Forza Motorsport 5" is Defining New Generation Racing, https://news.xbox.com/en-us/2013/09/20/games-forza-6-new-gen-racing/, Sep. 20, 2013.
https://www.microsoft.com/en-US/research/project/video-games-and-artificialintelligence/, approx. 2005.
Kyle Orland, How Forza 5 and the Xbox One use the cloud to drive machine-learning AI, https://arstechnica.com/gaming/2013/10/how-forza-5-and-the-xbox-one-use-thecloud-to-drive-machine-learning-ai/, Oct. 25, 2013
Anders Drachen, Christian Thurau, Julian Togelius, Georgios Yannakakis, Christian Bauckhage, Chapter 12: Game Data Mining, · https://andersdrachen.files.wordpress.com/2012/08/gamedatamining_intro.pdf, approx. 2012.
Cassia Pollock, Self-Driving Robotic EMMA Debuts at Brain Corp Open House in Mira Mesa, NBCSandiego, https://www.nbcsandiego.com/news/local/self-driving-robotic-emma-debuts-atbrain-corp-open-house-in-mira-mesa/51855/, Oct. 5, 2016.
· https://braincorp.com/newsroom/brain-corp-launches-its-first-artificialintelligence-based-product-and-receives-innovation-of-the-year-award/, approx. Oct. 2016.
· https://media.irobot.com/2015-09-16-iRobot-Enters-the-Smart-Home-withRoomba-980-Vacuum-Cleaning-Robot, approx. Sep. 2015.
· https://spectrum.ieee.org/irobot-brings-visual-mapping-and-navigation-to-theroomba-980, approx. Sep. 2015.
· https://www.technologyreview.com/2015/09/16/247936/the-roomba-now-seesand-maps-a-home/, approx. Sep. 2015.
Edge AI and Vision Alliance, "The Roomba 980: Computer Vision Meets Consumer Robotics," a Presentation from Robot, YouTube, https://www.youtube.com/watch?v=23fvZme36-g&t=1s, Jun. 19, 2018.
ComputerVisionFoundation Videos, Three Pillars of Autonomous Driving, YouTube, https://www.youtube.com/watch?v=ntQ18oSiCPc, Sep. 2, 2016.
The System-on-Chip for Automotive Applications, Mobileye, https://www.mobileye.com/technology/eyeq-chip, approx. 2016.
· https://media.gm.com/media/US/en/socratv/home.detail.html/content/Pages/news/us/en/2016/Jan/0105-onstar.html#:~:text=Road%20Experience%20Management%20targets%20accuracy%20to%20enable%20fully%20autonomous%20driving&text=DETROIT%20%E2%80%93%20General%20Motors%20is%20exploring,that%20supports%20fully%20autonomous%20driving, approx. 2016.
· https://www.sec.gov/Archives/edgar/data/1607310/000157104916012024/t1600463_ex99-1.htm/, approx. 2016.
Udacity, Welcome to Self Driving Car Engineer Nanodegree, https://www.udacity.com/course/self-driving-car-engineer-nanodegree-nd0013, approx. Dec. 2016.
· https://chatbotslife.com/using-augmentation-to-mimic-human-driving496b569760a9#.5dpi87xzi, approx. Dec. 25, 2016.
Joshua Owoyem, Behavioural Cloning Applied to Self-Driving Car on a Simulated Track, Medium, https://towardsdatascience.com/behavioural-cloning-applied-to-self-driving-caron-a-simulated-track-5365e1082230, Jan. 27, 2017.
Vivek yadav, Behavior cloning using Neual Networks for self-driving cars.—Naive, Medium, YouTube, https://www.youtube.com/watch?v=k5GWzzE1qaU, Dec. 16, 2016.
Autonomous Off-Road Vehicle Control Using End-to-End Learning, Net-Scale, https://net-scale.com/doc/net-scale-dave-report.pdf, Jul. 30, 2004.
29 Prof. Ragunathan "Raj" Rajkumar, https://users.ece.cmu.edu/~raj/, approx. 2007.
CMU's Autonomous Cadillac SRX, https://web.archive.org/web/20130925024507/http://rtml.ece.cmu.edu/Shuster, Sep. 25, 2013.
· https://web.archive.org/web/20131006210323/http://varma.ece.cmu.edu/GMCMU-AD-CRL/, approx. 2013.
· https://web.archive.org/web/20130526052601/http://varma.ece.cmu.edu/GMCMU-AD-CRL/Videos.shtml, approx. 2013.
Raj Rajkumar, https://engineering.cmu.edu/directory/bios/rajkumar-raj.html, approx. 2007.
From 0-70 in 30, Carnegie Mellon University, https://www.cmu.edu/homepage/environment/2014/fall/from-0-70-in-30.shtml, approx. 2014.
College of Engineering, Carnegie Mellon University, Raj Rajkumar: Driverless Vehicles, YouTube, https://www.youtube.com/watch?v=QWkKOKEmooQ, Nov. 26, 2014.
Carnegie Mellon's Tartan Racing Wins $2M DARPA Urban Challenge, https://www.cmu.edu/homepage/practical/2007/fall/victory.shtml, approx. 2007.

(56) References Cited

OTHER PUBLICATIONS

DARPA Urban Challenge, https://www.darpa.mil/about-us/timeline/darpa-urban-challenge, Nov. 3, 2007.
Driverless Vehicle Makes Its Debut, https://www.cmu.edu/homepage/practical/2007/winter/meet-the-boss.shtml, approx. 2007.
Botjunkie, DARPA Urban Challenge (2007), YouTube, https://www.youtube.com/watch?v=-xibwwNVLgg, Sep. 21, 2009.
· https://web.archive.org/web/20121222215453, approx. 2012.
· https://www.rockstargames.com/jobs/position/3e1b31310eba5dfe4d6a0db32321f086/rage, approx. Oct. 2016.
Game Forest, Evolution of RAGE Engine Games 2006-2018, YouTube, https://www.youtube.com/watch?v=fruSKeMKNYO, Mar. 16, 2019.
InspirationTuts GameDev, What Game Engine Does Rockstar Use?, YouTube, https://www.youtube.com/watch?v=_oVDegAKxz0, Nov. 14, 2022.
ECO-Motion is 2K Sports next-generation in house animation technology that powers the 2K line of sports games such as NBA 2K and WWE 2K., https://www.giantbomb.com/eco-motion-engine/3015-9061, approx. Oct. 2016.
Playstation, Nba 2K14—Eco-Motion, YouTube, https://www.youtube.com/watch?v=5BJR6z1W7Ew, Nov. 7, 2013.
ESPN NFL 2K5—PS2—Review, https://www.gamezone.com/reviews/espn_nfl_2k5_ps2_review/, approx. Jul. 21, 2004.
ESPN NFL 2K5, https://en.wikipedia.org/wiki/ESPN_NFL_2K5, approx. Jul. 2004.
Rev, ESPN NFL 2K5—V.I.P. System, YouTube, https://www.youtube.com/watch?v=IvOrZ7ecvmQ, approx. Jul. 2004.
Unreal Engine, Epic Games Releases Unreal Engine 4 for All, https://www.unrealengine.com/en-US/blog/epic-games-releases-unreal-engine-4-for-all, approx. Mar. 2014.
Unreal Engine, Basics of AI | Live Training | Unreal Engine, YouTube, https://www.youtube.com/watch?v=evYE7tfWXUY, Apr. 20, 2015.
Abhishek Sharma, Oncel Tuzel, David W. Jacobs, Deep Hierarchical Parsing for Semantic Segmentation, CVPR 2015 (Mar. 30, 2015).
Akansel Cosgun, Lichao Ma, Jimmy Chiu, Jiawel Huang, Mahmut Demir, Alexandre Miranda Anon, Thang Lian, Hasan Tafish, Samir Al-Stouhi, Towards Full Automated Drive in Urban Environments: A Demonstration in GoMentum Station, California, arXiv:1705.01187 (May 2, 2017).
Alex Krizhevsky, Ilya Sutskever, Geoffrey E. Hinton, ImageNet Classification with Deep Convolutional Neural Networks, NIPS (Dec. 3, 2012).
Alexander Kolesnikov, Christoph Lampert, Seed, Expand and Constrain: Three Principles for Weakly-Supervised Image Segmentation, SEC: Seed, Expand and Constrain, ECCV 2016 (Aug. 6, 2016).
Bharath Hariharan, Pablo Arbelaez, Ross Girshick, Jitendra Malik, Hypercolumns for Object Segmentation and Fine-Grained Localization, CVPR 2015 (Apr. 25, 2015).
Brian Paden, Michal Cap, Sze Zheng Yong, Dmitry Yershov, Emilio Frazzol, A survey of motion planning and control techniques for self-driving urban vehicles, arXiv:1604.07446 (Apr. 25, 2016).
Cesar Cadena, Luca Carlone, Henry Carrillo, Yasir Latif, Davide Scaramuzza, Jose Neira, Ian Reid, John J. Leonard, Past, Present, and Future of Simultaneous Localization and Mapping: Toward the Robust-Perception Age (Dec.6, 2016).
Charles R. Qi, Hao Su, Kaichun Mo, Leonidas J. Guibas, PointNet: Deep Learning on Point Sets for 3D Classification and Segmentation, arXiv:1612.0059 (Apr. 10, 2017).
Charles R. Qi, Li Yi, Hao Su, Leonidas J. Guibas, PointNet++: Deep Hierarchical Feature Learning onPoint Sets in a Metric Space, arXiv:1706.02413 (Jun. 7, 2017).
Christian Szegedy, Wei Liu, Yangqing Jia, Pierre Sermanet, Scott Reed, Dragomir Anguelov, Dumitru Erhan, Vincent Vanhoucke, Andrew Rabinovich, Going Deeper with Convolutions, CVPR 2015 (Sep. 17, 2014).

Christos Katrakazas, Mohammed Quddus, Wen-Hua Chen, Lipika Dekaa, Real-time motion planning methods for autonomous on-road driving: State-of-the-art and future research directions, Transportation Research Part C: Emerging Technologies vol. 60, Nov. (Sep. 24, 2015).
Chu, Keonyup, Minchae Lee, and Myoungho Sunwoo, Local path planning for off-road autonomous driving with avoidance of static obstacles, IEEE 2012 (May 22, 2012).
Clement Farabet, Camille Couprie, Laurent Najman, Yann LeCun, Learning Hierarchical Features for Scene Labeling, PAMI 2013 (Oct. 24, 2012).
Clement Farabet, Camille Couprie, Laurent Najman, Yann LeCun, Scene Parsing with Multiscale Feature Learning, Purity Trees, and Optimal Covers, ICML 2012. (Jul. 13, 2012).
Cordts, Marius, Mohamed Omran, Sebastian Ramos, Timo Rehfeld, Markus Enzweiler, Rodrigo Benenson, Uwe Franke, Stefan Roth, Bernt Schiele, The Cityscapes Dataset for Semantic Urban Scene Understanding, CVPR 2016, (Apr. 7, 2016).
Dolgov, Dmitry et. al., Path planning for autonomous vehicles in unknown semi-structured environments (Jan. 25, 2010).
Erico Guizzo, Robots With Their Heads in the Clouds, IEEE Spectrum Mar. 2011 at Mar. 16-18, 2011) https://ieeexplore.ieee.org/stamp/stamp.jsp?arnumber=5719709.
Filipe Mutz, Lucas P.Verones, Thiago Oliveira-Santos, Edilsonde Aguiar, Fernando A.Auat Cheein, Alberto Ferreira De Souza, Large-scale mapping in complex field scenarios using an autonomous car, Expert Systems with Applications V. 46 (Mar. 15, 2016).
Fisher Yu, Vladlen Koltun, Multi-Scale Context Aggregation by Dilated Convolutions, ICLR 2016 (Mar. 4, 2016).
Florian Chabot, Mohamed Chaouch, Jaonary Rabarisoa, Celine Teuliere, Thierry Chateau, Deep Manta: A Coarse-to-fine Many-Task Network for joint 2D and 3D vehicle analysis from monocular image arXiv:1703.07570 (Mar. 22, 2017).
François Chollet, Xception: Deep Learning with Depthwise Separable Convolutions, CVPR 2017 (Apr. 4, 2017).
Gaidon, Adrien et al., "Virtual Worlds as Proxy for Multi-Object Tracking Analysis" (May 20,2016).
Gideon P.Stein, Ofer Mano, Amnon Shashua, Vision-based ACC with a Single Camera : Bounds on Range and Range Rate Accuracy, IEEE IV2003 (Jul. 28, 2003).
González, David, et al., A Review of Motion Planning Techniques for Automated Vehicles, IEEE 2016 (Nov. 26, 2015); Paden, Brian, et al., A survey of motion planning and control techniques for self-driving urban vehicles, IEEE 2016 (Mar. 2016).
Grefenstette, John et al., "Learning Sequential Decision Rules Using Simulation Models and Competition" (Oct. 1990).
Guillaume Bresson, Zayed Alsayed, Li Yu, Sébastien Glaser, Simultaneous Localization And Mapping: A Survey of Current Trends in Autonomous Driving (Oct. 12, 2017).
Guosheng Lin, Chunhua Shen, Ian Reid, Anton van dan Hengel, Efficient piecewise training of deep structured models for semantic segmentation, arXiv:1504.01013 (Jun. 6, 2016).
Guosheng Lin, Chunhua Shen, Ian Reid, Anton van den Hengel, Deeply Learning the Messages in Message Passing Inference, arXiv:1508.02108 (Sep. 8, 2015).
Hamid Izadinia, Fereshteh Sadeghi, Santosh Kumar Divvala, Yejin Choi, Ali Farhadi, Segment-Phrase Table for Semantic Segmentation, Visual Entailment and Paraphrasing, ICCV 2015 (Feb. 18, 2016).
Haozhi Qi, Zheng Zhang, Bin Xiao, Han Hu, Bowen Cheng, Yichen Wei, Jifeng Dai, Deformable Convolutional Networks, ICCV COCO Challenge Workshop 2017 (Jun. 5, 2017).
Hengshuang Zhao, Jianping Shi, Xiaojuan Qi, Xiaogang Wang, Jiaya Jia, Pyramid Scene Parsing Network, CVPR 2017 (Apr. 27, 2017).
Holger Caesar, Jasper Uijlings, Vittorio Ferrari, Joint Calibration for Semantic Segmentation, arXiv:1507.01581 (Aug. 12, 2015).
Hu, Xuemin, et al., Dynamic path planning for autonomous driving on various roads with avoidance of static and moving obstacles, Mechanical Systems and Signal Processing vol. 100 (Aug. 5, 2017).
Hyeonwoo Noh, Seunghoon Hong, Bohyung Han, Learning Deconvolution Network for Semantic Segmentation, arXiv:1505.04366 (May 17, 2015).

(56) References Cited

OTHER PUBLICATIONS

Iasonas Kokkinos, Pushing the Boundaries of Boundary Detection using Deep Learning, arXiv:1511.07386 (Jan. 22, 2016).
Igor Cviić, Josip Ćesić, Ivan Marković, Ivan Petrović, SOFT-SLAM: Computationally Efficient Stereo Visual SLAM for Autonomous UAVs, Journal of Field Robotics (Nov. 2, 2017).
Ji Zhang and Sanjiv Singh, Visual-lidar Odometry and Mapping: Low-drift, Robust, and Fast, IEEE 2015 (Jul. 26, 2015).
Jifeng Dai, Kaiming He, Jian Sun, BoxSup: Exploiting Bounding Boxes to Supervise Convolutional Networks for Semantic Segmentation, arXiv:1503.01640 (May 18, 2015).
Jifeng Dai, Yi Li, Kaiming He, Jian Sun, R-FCN: Object Detection via Region-based Fully Convolutional Networks (Jun. 21, 2016).
Jinyong Jeong, Younggun Cho, and Ayoung Kim, Road-SLAM Road Marking based SLAM with Lane-level Accuracy (Jul. 31, 2017).
Jonathan Huang, Vivek Rathod, Chen Sun, Menglong Zhu, Anoop Korattikara, Alireza Fathi, Ian Fischer, Zbigniew Wojna, Yang Song, Sergio Guadarrama, Kevin Murphy, Speed/accuracy trade-offs for modern convolutional object detectors, arXiv:1611.10012 (Nov. 30, 2016).
Jonathan Long, Evan Shelhamer, Trevor Darrell, Fully Convolutional Networks for Semantic Segmentation, CVPR 2015 (Mar. 8, 2015).
Joseph Redmon, Santosh Divvala, Ross Girshick, Ali Farhadi, You Only Look Once: Unified, Real-Time Object Detection, arXiv:1506.02640 (May 9, 2016).
Junqing Wei, Jarrod M. Snider, Tianyu Gu, John M. Dolan, Bakhtiar Litkouhi, A behavioral planning framework for autonomous driving, IEEE 2014 (Jul. 17, 2014).
Junsoo Kim, Kichun Jo, Dongchul Kim, Keonyup Chu, Myoungho Sunwoo, Behavior and path planning algorithm of autonomous vehicle AI in structured environments, IFAC Proceedings vols. vol. 46 (Jun. 1, 2013).
Kaiming He, Xiangyu Zhang, Shaoqing Ren, Jian Sun, Deep Residual Learning for Image Recognition (Dec. 10, 2015).
Kaiming He, Xiangyu Zhang, Shaoqing Ren, Jian Sun, Deep Residual Learning for Image Recognition, arXiv:1512.03385 (Dec. 10, 2015).
Kaiming He, Xiangyu Zhang, Shaoqing Ren, Jian Sun, Delving Deep into Rectifiers: Surpassing Human-Level Performance on ImageNet Classification, arXiv:1502.01852 (Feb. 6, 2015).
Kaiming He, Xiangyu Zhang, Shaoqing Ren, Jian Sun, Spatial Pyramid Pooling in Deep Convolutional Networks for Visual Recognition, ECCV 2014 (Apr. 23, 2015).
Karel Lenc, Andrea Vedaldi, R-CNN minus R, arXiv:1506.06981 (Jun. 23, 2015); Russell Stewart, Mykhaylo Andriluka, End-to-end people detection in crowded scenes, arXiv:1506.04878 (Jul. 8, 2015).
2D computer graphics, retrieved from <URL: http://wikipedia.com> on Nov. 9, 2014, 7 pages.
BD computer graphics, retrieved from <URL: http://wikipedia.com> on Nov. 9, 2014, 3 pages.
3D modeling, retrieved from <URL: http://wikipedia.com> on Nov. 9, 2014, 5 pages.
8: Mouse Handling, retrieved from <URL: http://ericsink.com/wpf3d/8_Mouse.html> on Nov. 13, 2014, 2 pages.
AutoCAD, retrieved from <URL: http://wikipedia.com> on Nov. 9, 2014, 7 pages.
Collision detection, retrieved from <URL: http://wikipedia.com> on Nov. 23, 2014, 5 pages.
Comparison of OpenGL and Direct3D, retrieved from <URL: http://wikipedia.com> on Nov. 22, 2014, 7 pages.
Data dictionary, retrieved from <URL: http://wikipedia.com> on Nov. 6, 2014, 3 pages.
DBA_TABLES, retrieved from <URL: http://wikipedia.com> on Nov. 6, 2014, 1 pages.
Digital sculpting, retrieved from <URL: http://wikipedia.com> on Nov. 12, 2014, 3 pages.
Facial recognition system, retrieved from <URL: http://wikipedia.com> on Dec. 13, 2014, 7 pages.
Game engine, retrieved from <URL: http://wikipedia.com> on Nov. 23, 2014, 4 pages.
JavaFX, retrieved from <URL: http://wikipedia.com> on Nov. 22, 2014, 7 pages.
Jreality, retrieved from <URL: http://wikipedia.com> on Nov. 22, 2014, 3 pages.
List of 14+ Image Recognition APIs, retrieved from <URL: http://blog.mashape.com/list-of-14-image-recognition-apis/> on Dec. 13, 2014, 2 pages.
List of 50+ Face Detection / Recognition APIs, libraries, and software, retrieved from <URL: http://blog.mashape.com/list-of-50-face detection-recognition-apis/> on Dec. 13, 2014, 4 pages.
List of file formats, retrieved from <URL: http://wikipedia.com> on Nov. 9, 2014, 33 pages.
List of game engines, retrieved from <URL: http://wikipedia.com> on Nov. 22, 2014, 17 pages.
Lua (programming language), retrieved from <URL: http://wikipedia.com> on Nov. 25, 2014, 10 pages.
Mantle (API), retrieved from <URL: http://wikipedia.com> on Nov. 22, 2014, 5 pages.
Microsoft XNA, retrieved from <URL: http://wikipedia.com> on Nov. 22, 2014, 7 pages.
3.4 Getting Information About Databases and Tables, retrieved from <URL: http://dev.mysql.com/doc/refman/5.7/en/getting-information.html> on Nov. 6, 2014, 2 pages.
MySQL show users—how to show the users in a MySQL database, retrieved from <URL: http://alvinalexander.com/blog/post/mysql/show-users-i-ve-created-in-mysql-database> on Nov. 6, 2014, 4 pages.
OpenCV, retrieved from <URL: http://wikipedia.com> on Dec. 13, 2014, 3 pages.
Optical character recognition, retrieved from <URL: http://wikipedia.com> on Dec. 13, 2014, 6 pages.
Outline of object recognition, retrieved from <URL: http://wikipedia.com> on Dec. 13, 2014, 8 pages.
Particle system, retrieved from <URL: http://wikipedia.com> on Nov. 12, 2014, 3 pages.
Physics engine, retrieved from <URL: http://wikipedia.com> on Nov. 23, 2014, 5 pages.
Polygonal modeling, retrieved from <URL: http://wikipedia.com> on Nov. 12, 2014, 4 pages.
POV-Ray, retrieved from <URL: http://wikipedia.com> on Nov. 10, 2014, 5 pages.
Raster graphics, retrieved from <URL: http://wikipedia.com> on Nov. 9, 2014, 3 pages.
Scene graph, retrieved from <URL: http://wikipedia.com> on Nov. 22, 2014, 4 pages.
STL (file format), retrieved from <URL: http://wikipedia.com> on Nov. 11, 2014, 4 pages.
Subdivision surface, retrieved from <URL: http://wikipedia.com> on Nov. 12, 2014, 3 pages.
Sysobjects, retrieved from <URL: http://technet.microsoft.com/en-US/library/aa260447(d=default,I=en-us,v=sql.80) aspx> on Nov. 6, 2014, 2 pages.
Vector graphics, retrieved from <URL: http://wikipedia.com> on Nov. 9, 2014, 5 pages.
Vertex (computer graphics), retrieved from <URL: http://wikipedia.com> on Nov. 9, 2014, 2 pages.
Voxel, retrieved from <URL: http://wikipedia.com> on Nov. 11, 2014, 5 pages.
Wavefront .obj file, retrieved from <URL: http://wikipedia.com> on Nov. 9, 2014, 6 pages.
Acrobat 3D tutorials—basic interaction, retrieved from <URL: https://acrobatusers.com/assets/collections/tutorials/legacy/tech_corners/3d/3d_tutorials/basic_interaction.pdf> on Nov. 23, 2014, 2 pages.
AlphaGo, https://www.deepmind.com/research/highlighted-research/alphago, approx. Mar. 2016.
Mastering the game of Go with deep neural networks and tree search, Nature, https://www.nature.com/articles/nature16961, Jan. 27, 2016.

(56) References Cited

OTHER PUBLICATIONS

Steve Hanley, Tesla Autopilot Emergency Braking Saves Driver from Head-on Collision, https://www.teslarati.com/tesla-autopilot-emergency-braking-saves-driver-from-collision/ Oct. 28, 2015.
Karel Lenc, Andrea Vedaldi, R-CNN minus R, Jun. 24, 2015.
Kaiming He et al., Deep Residual Learning, MSRA @ ILSVRC & COCO 2015 competitions.
Jason Ku, Melissa Mozifian, Jungwook Lee, Ali Harakeh, and Steven L. Waslander, Joint 3D Proposal Generation and Object Detection from View Aggregation (Jul. 12, 2018).
GM Exploring Mobileye Advanced Mapping With OnStar Data (Jan. 5, 2016).
Yu Zhang 1, Huiyan Chen1, Steven L. Waslander2, (Member, IEEE), Jianwei Gonge1, (Member, IEEE), Guangming Xiongi , Tian Yang1, and Kai Liu, Hybrid Trajectory Planning for Autonomous Driving in Highly Constrained Environments, Jun. 8, 2018.
Steve Hanley, Tesla vehicles are getting smarter: 222 million Autopilot miles and counting, https://www.teslarati.com/tesla-222-million-miles-autopilot-fleet-learning/ Oct. 8, 2016.
Teslarati, Video Compilation of Model S with Autopilot in Action, https://www.teslarati.com/video-compilation-model-s-with-autopilot/, Oct. 14, 2015.
Saswato R. Das, A Crowd of Quantum Entanglements, Mar. 2011.
Gao Huang, Zhuang Liu, Laurens van der Maaten, Densely Connected Convolutional Networks.
Testa-version-8-release-notes-8, https://www.teslarati.com/tesla-version-8-release-notes-screenshots/.
Gene, Upcoming Tesla Autopilot 1.01 Improved through Fleet Learning, https://www.teslarati.com/upcoming-tesla-autopilot-1-01-improved-fleet-learning/, Oct. 23, 2015.
Ross Girshick, Microsoft Research, Fast R-CNN, Sep. 27, 2015.
Mobileye and Nissan Aim To Integrate Mobileye's Road Experience Managementtm Technology for Autonomous Driving, https://www.sec.gov/Archives/edgar/data/1607310/000157104916012024/t1600463_ex99-1.htm, approx. 2024.
Garth Woodworth, Tesla Autopilot Perpendicular Parking Demo, https://www.teslarati.com/tesla-autopilot-perpendicular-parking-demo/, Jan. 16, 2016.
Steve Hanley, Tesla Rolls Out Improved v7.0 Software Update to Beta Testers, https://www.teslarati.com/tesla-rolls-improved-v7-0-software-update-beta-testers/, Sep. 21, 2015.
Gene, Tesla to publish details of v8.0 with "Major improvements to Autopilot" later today, https://www.teslarati.com/tesla-version-8-0-autopilot-major-improvements/, Aug. 31, 2016.
Garth Woodworth, Tesla Autopilot Delivering Safety in Bad Weather, https://www.teslarati.com/tesla-autopilot-delivering-safety-bad-weather/, Feb. 22, 2016.
ALan Ohnsman, Startup Otto Aims To Leapfrog To First In Self Driving Vehicles With Big Trucks, Aug. 1, 2016.
Wel Liul, Dragomir Anguelov2, Dumitru Erhan3, Christian Szegedy3, C Scott Reed', Cheng-Yang Fu', Alexander C. Berg, SSD: Single Shot MultiBox Detector, Mar. 30, 2016.
Davy Neven Bert De Brabandere Stamatios Georgoulis Marc Proesmans Luc Van Gool ESAT-PSI, Ku Leuven, Towards End-to-End Lane Detection: an Instance Segmentatio Approach, Feb. 15, 2018.
Gene, Video of Tesla Version 7.0 Reveals Auto-Steer and Hands-Free Driving, https://www.teslarati.com/video-of-tesla-version-7-0-reveals-auto-steer-and-hands-free-driving/, Oct. 13, 2015.
Ramazan Gokberk Cinbis, Jakob Verbeek, and Cordelia Schmid, Fellow, IEEE, Weakly Supervised Object Localization with Multi-fold Multiple Instance Learning, Feb. 22, 2016.
Steve Hanley, Tesla Building Next Gen Maps through its Autopilot Drivers, https://www.teslarati.com/tesla-building-maps-autopilot-drivers/ Oct. 16, 2015.
VivekYadav, An augmentation based deep neural network approach to learn human driving behavior, Dec. 15, 2016.
Udacity, Nanodegree Program, Self-Driving Car Engineer, Sep. 8, 2023.
Renaud Dube Daniel Dugas Elena Stumm Juan Nieto Roland Siegwart Cesar Cadena, SegMatch: Segment Based Place Recognition in 3D Point Clouds, 2016.
IRobot Enters the Smart Home with Roomba@ 980 Vacuum Cleaning Robot, https://media.irobot.com/2015-09-16-iRobot-Enters-the-Smart-Home-with-Roomba-980-Vacuum-Cleaning-Robot, Sep. 16, 2015.
Semantic Understanding of Urban Street Scenes, https://www.cityscapes-dataset.com/, Dec. 12, 2016.
Stefan Milz, Georg Arbeiter, Christian Witt Valeo Schalter and Sensoren GmbH, Bassam Abdallah Valeo Vision, Bobigny, Visual SLAM for Automated Driving: Exploring the Applications of Deep Learning, 2018.
Donna Tam, Meet Amazon's busiest employee—the Kiva robot, https://www.cnet.com/tech/services-and-software/ meet-amazons-busiest-employee-the-kiva-robot/, Nov. 30, 2014.
Rob M., What We Know About Testa Firmware 7.0, https://www.teslarati.com/what-we-know-tesla-firmware-7/, Oct. 10, 2015.
Grant Gerke, Owners Fully Engaged with Tesla's Traffic-Aware Cruise Control, https://www.teslarati.com/owners-fully-engaged-teslas-traffic-aware-cruise-control/, Apr. 15, 2015.
Brain Corp, Brain Corp Launches Its First Artificial Intelligence-based Product and Receives Innovation of the Year Award, Nov. 17, 2017.
Gene, Video Overview of Testa Summon Firmware 7.1 in Action, https://www.teslarati.com/video-overview-of-tesla-summon-firmware-7-1-in-action/, Jan. 9, 2016.
Steve Hanely, Testa Beta Firmware 7.1 Adds Autopilot Restrictions, https://www.teslarati.com/tesla-beta-firwmare-7-1-adds-autopilot-restrictions/, Dec, 9, 2015.
Rob M. My First Experience with Tesla Autopilot Features, https://www.teslarati.com/first-experience-tesla-autopilot-features/, Aug. 25, 2015.
Johannes Graeter', Alexander Wilczynski' and Martin Lauer', LIMO: Lidar-Monocular Visual Odometry, Jul. 19, 2018.
Electric Jen, Testa Autopilot—Improvements in Safety Features, https://www.teslarati.com/tesla-autopilot-improvements-safety-features/, Nov. 24, 2015.
Iasonas Kokkinos, Pushing the Boundaries of Boundary Detection Using Deep Learning, Jan. 22, 2016.
Sergey Ioffe, Christian Szegedy, Batch Normalization: Accelerating Deep Network Training by Reducing Internal Covariate Shi, Mar. 2, 2015.
Cassia Pollock, Self-Driving Robotic EMMA Debuts at Brain Corp Open House in Mira Me5a, Oct. 5, 2016.
Electric Jen, Testa Autopilot is the Perfect Traffic Companion, https://www.teslarati.com/tesla-autopilot-perfect-traffic-companion/ , Nov. 12, 2015.
Martin Sirnonl, Stefan Milzt, Karl Amendel, Horst-Michael Gross, Complex-YOLO: An Euler-Region-Proposal for Real-time 3D Object Detection on Point Clouds, Sep. 24, 2018.
Renaud Dube*, Mattia G. Gollub*, Hannes Sommer, Igor Gilitschenski, Roland Siegwart, Cesar Cadena, and Juan Nietol, Incremental Segment-Based Localization in 3D Point Clouds, 2018.
Joseph Redmon, Santosh Divvala, Ross Girshick, All Farhadi, You Only Look Once: Unified, Real-Time Object Detection, arXiv, May 9, 2016.
Christian Szegedy, Alexander Toshev, Dumitru Erhan, Deep Neural Networks for Object Detection, Google, Inc., 2013.
Tracing (software), retrieved from <URL: http://wikipedia.com> on Jan. 10, 2014, 3 pages.
Tree (data structure), retrieved from <URL: http://wikipedia.com> on Jun. 24, 2014, 6 pages.
PTRACE(2), retrieved from <URL: http://unixhelp.ed.ac.uk/CGI/man-cgi?ptrace> on Mar. 19, 2014, 5 pages.
Wevtutil, retrieved from <URL: http://technet.microsoft.com/en-us/library/cc732848(d=default,I=en-us,v=ws.11).aspx> on Apr. 28, 2014, 5 pages.
Intel Processor Trace, retrieved from <URL: https://software.intel.com/en-us/blogs/2013/09/18/processor-tracing> on Apr. 28, 2014, 3 pages.
Younghoon Jung, Java Dynamics Reflection and a lot more, Oct. 10, 2012, 55 pages, Columbia University.

(56) References Cited

OTHER PUBLICATIONS

Amitabh Srivastava, Alan Eustace, ATOM A System for Building Customized Program Analysis Tools, May 3, 2004, 12 pages.
Mathew Smithson, Kapil Anand, Aparna Kotha, Khaled Elwazeer, Nathan Giles, Rajeev Barua, Binary Rewriting without Relocation Information, Nov. 10, 2010, 11 pages, University of Maryland.
Marek Olszewski, Keir Mierte, Adam Czajkowski, Angela Demle Brown, JIT Instrumentation—A Novel Approach To Dynamically Instrument Operating Systems, Feb. 12, 2007, 14 pages, University of Toronto.
Navarro, Alex, ESPN NFL 2K5 Review, Jul. 21, 2004, found at https://www.gamespot.com/reviews/espn-nfl-2k5-review/1900-6103135/ on Nov. 28, 2024, 11 pages.
American Heritage Dictionary (1992) Excerpts, 5 pages.
Webster's Third New International Dictionary (2002) Excerpts, 4 pages.
Excerpts from Merriam-Websters Dictionary, 4 pages.
Excerpt from Merriam-Webster's Collegiate Dictionary (2014), 3 pages.
Selected Excerpts from the New Oxford American Dictionary (3d Ed.) (2010), 4 pages.
Selected Excerpts from Webster's New World College Dictionary (4th Ed.) (2012), 4 pages.
Translation of JP Patent Apl. Pub. No. JP2016126605 ("Mariko"), 82 pages.
Appeal of IPR2023-01169, 1 page.
Excerpt from Applied Mathematical Programming by Bradley, Hax, and Magnanti. Addison-Wesley, 1977. Available as of Aug. 7, 2015 (https://web.archive.org/web/20150807163238/https://web.mit.edu/15.053/www/AMP-Appendix-A.pdf), 18 pages.

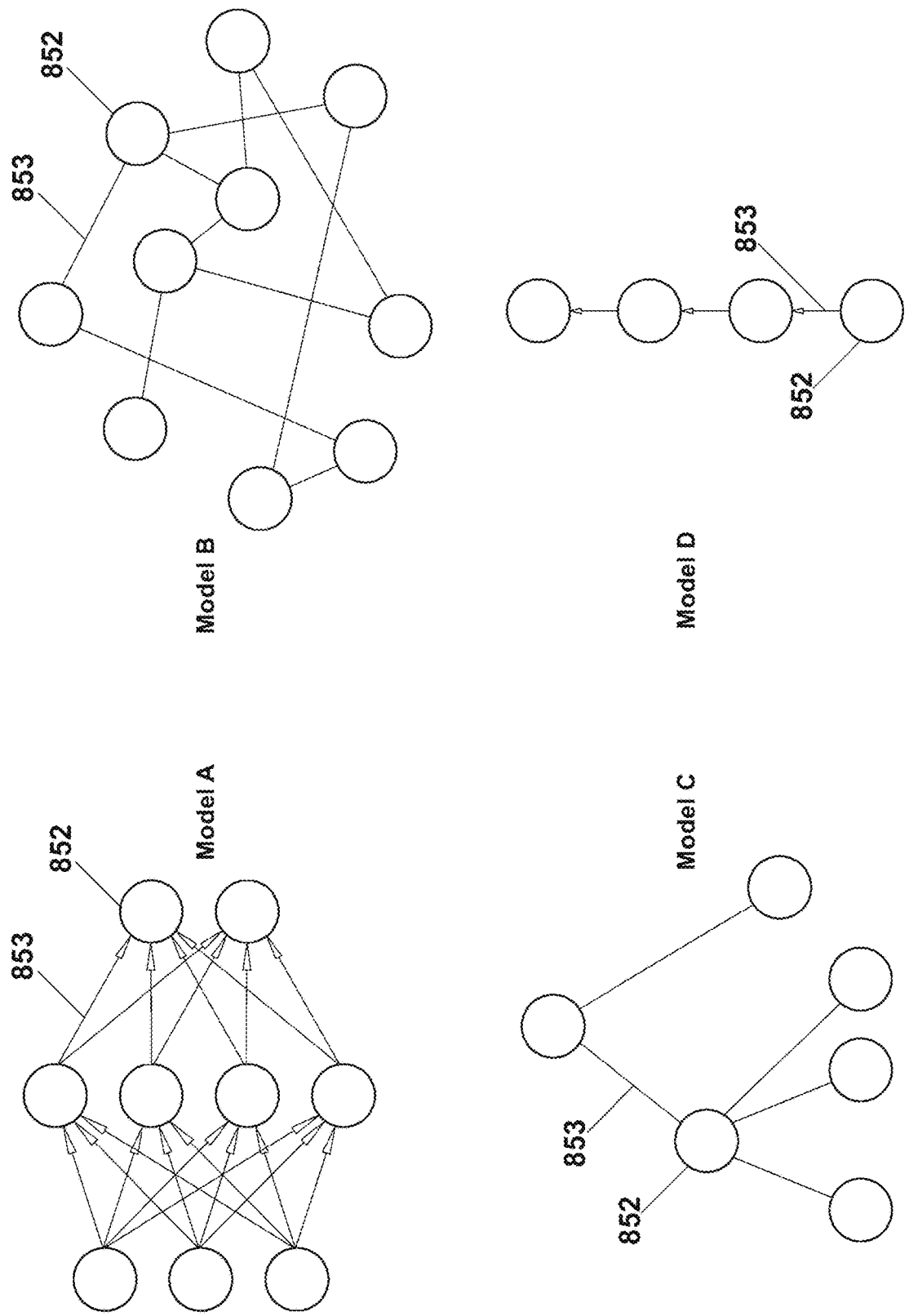

ARTIFICIALLY INTELLIGENT SYSTEMS, DEVICES, AND METHODS FOR LEARNING AND/OR USING AN AVATAR'S CIRCUMSTANCES FOR AUTONOMOUS AVATAR OPERATION

CROSS REFERENCE TO RELATED APPLICATION

This application is a continuation of, and claims priority under 35 U.S.C. § 120 from, nonprovisional U.S. patent application Ser. No. 16/796,663 entitled "ARTIFICIALLY INTELLIGENT SYSTEMS, DEVICES, AND METHODS FOR LEARNING AND/OR USING AN AVATAR'S CIRCUMSTANCES FOR AUTONOMOUS AVATAR OPERATION", filed on Feb. 20, 2020, which is a continuation of, and claims priority under 35 U.S.C. § 120 from, nonprovisional U.S. patent application Ser. No. 15/382,743 entitled "ARTIFICIALLY INTELLIGENT SYSTEMS, DEVICES, AND METHODS FOR LEARNING AND/OR USING AN AVATAR'S CIRCUMSTANCES FOR AUTONOMOUS AVATAR OPERATION", issued as U.S. Pat. No. 10,607,134, filed on Dec. 19, 2016. The disclosures of the foregoing documents are incorporated herein by reference.

FIELD

The disclosure generally relates to computing devices and/or systems. The disclosure includes devices, apparatuses, systems, and related methods for providing advanced learning, anticipating, decision making, automation, and/or other functionalities.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Applications and/or avatars thereof commonly operate by receiving a user's operating directions in various circumstances. Instructions are then executed to effect the operation of an application and/or avatar based on user's operating directions. Hence, applications and/or avatars rely on the user to direct their behaviors. Commonly employed application and/or avatar operating techniques lack a way to learn operation of an application and/or avatar and enable autonomous operation of an application and/or avatar.

SUMMARY

In some aspects, the disclosure relates to a system for learning and using an avatar's circumstances for autonomous avatar operating. The system may be implemented at least in part on one or more computing devices. In some embodiments, the system comprises: a processor circuit configured to execute instruction sets of an application. The system may further comprise: a memory unit configured to store data. The system may further comprise: an artificial intelligence unit configured to. The artificial intelligence unit may be configured to: receive a first collection of object representations, the first collection of object representations including one or more object representations representing one or more objects of the application. The artificial intelligence unit may be further configured to: receive a first one or more instruction sets for operating an avatar of the application. The artificial intelligence unit may be further configured to: learn the first collection of object representations correlated with the first one or more instruction sets for operating the avatar of the application. The artificial intelligence unit may be further configured to: receive a new collection of object representations, the new collection of object representations including one or more object representations representing one or more objects of the application. The artificial intelligence unit may be further configured to: anticipate the first one or more instruction sets for operating the avatar of the application correlated with the first collection of object representations based on at least a partial match between the new collection of object representations and the first collection of object representations. The artificial intelligence unit may be further configured to: cause the processor circuit to execute the first one or more instruction sets for operating the avatar of the application correlated with the first collection of object representations, the causing performed in response to the anticipating of the artificial intelligence unit, wherein the avatar of the application performs one or more operations defined by the first one or more instruction sets for operating the avatar of the application correlated with the first collection of object representations.

In certain embodiments, the processor circuit includes one or more processor circuits. In further embodiments, the application includes a computer game, a virtual world, a 3D graphics application, a 2D graphics application, a web browser, a media application, a word processing application, a spreadsheet application, a database application, a forms-based application, an operating system, a device control application, a system control application, or a computer application. In further embodiments, at least one of: the processor circuit, the memory unit, or the artificial intelligence unit of the system are part of a single computing device.

In some embodiments, the memory unit includes one or more memory units. In further embodiments, the memory unit resides on a remote computing device or a remote computing system. The remote computing device or the remote computing system may include a server, a cloud, a computing device, or a computing system accessible over a network or an interface.

In certain embodiments, the artificial intelligence unit includes a circuit, a computing apparatus, a computing system, or a hardware element. In further embodiments, the artificial intelligence unit includes an application. In further embodiments, the artificial intelligence unit is coupled to the memory unit. In further embodiments, the artificial intelligence unit is a hardware element that is part of, an application operating on, or an element coupled to the processor circuit. In further embodiments, the artificial intelligence unit is part of or coupled to the application. In further embodiments, the artificial intelligence unit is part of or coupled to the avatar of the application. In further embodiments, the system further comprises: an additional processor circuit, wherein the artificial intelligence unit is a hardware element that is part of, an application operating on, or an element coupled to the additional processor circuit. In further embodiments, the artificial intelligence unit is a hardware element that is part of, an application operating on, or an element coupled to a remote computing device or a remote computing system. In further embodiments, the artificial intelligence unit is attachable to the processor circuit. In further embodiments, the artificial intelligence unit is attachable to the application. In further embodiments, the artificial intelligence unit is attachable to the avatar of the application. In further embodiments, the artificial intelligence unit is embedded or built into the processor circuit. In further embodiments, the artificial intelligence unit is embedded or built into the application. In further embodiments, the artificial intelligence unit is embedded or built into the avatar of the application. In further embodiments, the artificial intelligence unit is provided as a feature of the processor circuit. In further embodiments, the artificial intelligence unit is provided as a feature of the application. In further embodiments, the artificial intelligence unit is provided as a feature of the avatar of the application. In further embodiments, the artificial intelligence unit is further configured to: take control from, share control with, or release control to the processor circuit. In further embodiments, the artificial intelligence unit is further configured to: take control from, share control with, or release control to the application. In further embodiments, the artificial intelligence unit is further configured to: take control from, share control with, or release control to the avatar of the application.

In some embodiments, the one or more objects of the application include a 2D model, a 3D model, a 2D shape, a 3D shape, a graphical user interface element, a form element, a data or database element, a spreadsheet element, a link, a picture, a text, a number, or a computer object. In further embodiments, the one or more objects of the application include one or more objects of the application in the avatar's surrounding. The avatar's surrounding may include an area of interest around the avatar. In further embodiments, the avatar of the application includes a user-controllable object of the application. In further embodiments, an avatar's circumstance includes one or more objects of the application.

In certain embodiments, the first collection of object representations is received at a first time. In further embodiments, the new collection of object representations is received at a new time. In further embodiments, the first collection of object representations includes a unit of knowledge of the avatar's circumstance at a first time. In further embodiments, the new collection of object representations includes a unit of knowledge of the avatar's circumstance at a new time. In further embodiments, an object representation includes one or more properties of an object of the application. In further embodiments, an object representation includes one or more information on an object of the application. In further embodiments, the first or the new collection of object representations includes or is associated with a time stamp, an order, or a time related information. In further embodiments, the first collection of object representations includes a comparative collection of object representations whose at least one portion can be used for comparisons with at least one portion of collections of object representations subsequent to the first collection of object representations, the collections of object representations subsequent to the first collection of object representations comprising the new collection of object representations. In further embodiments, the first collection of object representations includes a comparative collection of object representations that can be used for comparison with the new collection of object representations. In further embodiments, the new collection of object representations includes an anticipatory collection of object representations that can be compared with collections of object representations whose correlated one or more instruction sets for operating the avatar of the application can be used for anticipation of one or more instruction sets to be executed in autonomous operating of the avatar of the application. In further embodiments, the first collection of object representations includes a stream of collections of object representations. In further embodiments, the new collection of object representations includes a stream of collections of object representations.

In some embodiments, the receiving the first collection of object representations includes receiving one or more properties of the one or more objects of the application. The one or more properties of the one or more objects of the application may include one or more information on the one or more objects of the application. The receiving the one or more properties of the one or more objects of the application may include receiving the one or more properties of the one or more objects of the application from an engine, an environment, or a system used to implement the application. The receiving the one or more properties of the one or more objects of the application may include at least one of: accessing or reading a scene graph or a data structure used for organizing the one or more objects of the application. The receiving the one or more properties of the one or more objects of the application may include detecting the one or more properties of the one or more objects of the application in a picture of the avatar's surrounding. The receiving the one or more properties of the one or more objects of the application may include detecting the one or more properties of the one or more objects of the application in a sound from the avatar's surrounding.

In certain embodiments, the system further comprises: an object processing unit configured to receive collections of object representations, wherein the first or the new collection of object representations is received by the object processing unit.

In some embodiments, the first one or more instruction sets for operating the avatar of the application include one or more instruction sets that temporally correspond to the first collection of object representations. The one or more instruction sets that temporally correspond to the first collection of object representations may include one or more instruction sets executed at a time of generating the first collection of object representations. The one or more instruction sets that temporally correspond to the first collection of object representations may include one or more instruction sets executed prior to generating the first collection of object representations. The one or more instruction sets that temporally correspond to the first collection of object representations may include one or more instruction sets executed within a threshold period of time prior to generating the first collection of object representations. The one or more instruction sets that temporally correspond to the first collection of object representations may include one or more instruction sets executed subsequent to generating the first collection of object representations. The one or more instruction sets that temporally correspond to the first collection of object representations may include one or more instruction sets executed within a threshold period of time subsequent to generating the first collection of object representations. The one or more instruction sets that temporally correspond to the first collection of object representations may include one or more instruction sets executed within a threshold period of time prior to generating the first collection of object representations and a threshold period of time subsequent to generating the first collection of object representations.

In certain embodiments, the first one or more instruction sets for operating the avatar of the application include one or more instruction sets executed in operating the avatar of the application. In further embodiments, the first one or more instruction sets for operating the avatar of the application are part of the application. In further embodiments, the first one or more instruction sets for operating the avatar of the application are part of the avatar of the application. In further embodiments, the first one or more instruction sets for operating the avatar of the application include one or more inputs into or one or more outputs from the processor circuit. In further embodiments, the first one or more instruction sets for operating the avatar of the application include a value or a state of a register or an element of the processor circuit. In further embodiments, the first one or more instruction sets for operating the avatar of the application include at least one of: a command, a keyword, a symbol, an instruction, an operator, a variable, a value, an object, a data structure, a function, a parameter, a state, a signal, an input, an output, a character, a digit, or a reference thereto. In further embodiments, the first one or more instruction sets for operating the avatar of the application include a source code, a bytecode, an intermediate code, a compiled code, an interpreted code, a translated code, a runtime code, an assembly code, a structured query language (SQL) code, or a machine code. In further embodiments, the first one or more instruction sets for operating the avatar of the application include one or more code segments, lines of code, statements, instructions, functions, routines, subroutines, or basic blocks. In further embodiments, the first one or more instruction sets for operating the avatar of the application include one or more instruction sets for operating the application.

In some embodiments, the receiving the first one or more instruction sets for operating the avatar of the application includes receiving the first one or more instruction sets for operating the avatar of the application executed by the processor circuit. In further embodiments, the receiving the first one or more instruction sets for operating the avatar of the application includes receiving the first one or more instruction sets for operating the avatar of the application as they are executed by the processor circuit. In further embodiments, the receiving the first one or more instruction sets for operating the avatar of the application includes obtaining the first one or more instruction sets for operating the avatar of the application from the processor circuit. In further embodiments, the receiving the first one or more instruction sets for operating the avatar of the application includes receiving the first one or more instruction sets for operating the avatar of the application from a register or an element of the processor circuit. In further embodiments, the receiving the first one or more instruction sets for operating the avatar of the application includes receiving the first one or more instruction sets for operating the avatar of the application from at least one of: the memory unit, a virtual machine, a runtime engine, a hard drive, a storage device, a peripheral device, a network connected device, or a user. In further embodiments, the receiving the first one or more instruction sets for operating the avatar of the application includes receiving the first one or more instruction sets for operating the avatar of the application from a plurality of processor circuits, applications, memory units, virtual machines, runtime engines, hard drives, storage devices, peripheral devices, network connected devices, or users. In further embodiments, the receiving the first one or more instruction sets for operating the avatar of the application includes obtaining the first one or more instruction sets for operating the avatar of the application from the application. In further embodiments, the receiving the first one or more instruction sets for operating the avatar of the application includes obtaining the first one or more instruction sets for operating the avatar of the application from the avatar of the application. In further embodiments, the receiving the first one or more instruction sets for operating the avatar of the application includes receiving the one or more instruction sets for operating the avatar of the application at a source code write time, a compile time, an interpretation time, a translation time, a linking time, a loading time, or a runtime. In further embodiments, the receiving the first one or more instruction sets for operating the avatar of the application includes at least one of: tracing, profiling, or instrumentation of a source code, a bytecode, an intermediate code, a compiled code, an interpreted code, a translated code, a runtime code, an assembly code, a structured query language (SQL) code, or a machine code. In further embodiments, the receiving the first one or more instruction sets for operating the avatar of the application includes at least one of: tracing, profiling, or instrumentation of a register of the processor circuit, the memory unit, a storage, or a repository where the first one or more instruction sets for operating the avatar of the application are stored. In further embodiments, the receiving the first one or more instruction sets for operating the avatar of the application includes at least one of: tracing, profiling, or instrumentation of the processor circuit, a virtual machine, a runtime engine, an operating system, an execution stack, a program counter, or a processing element. In further embodiments, the receiving the first one or more instruction sets for operating the avatar of the application includes at least one of: tracing, profiling, or instrumentation of the processor circuit or tracing, profiling, or instrumentation of a component of the processor circuit. In further embodiments, the receiving the first one or more instruction sets for operating the avatar of the application includes at least one of: tracing, profiling, or instrumentation of the application. In further embodiments, the receiving the first one or more instruction sets for operating the avatar of the application includes at least one of: tracing, profiling, or instrumentation of the avatar of the application. In further embodiments, the receiving the first one or more instruction sets for operating the avatar of the application includes at least one of: tracing, profiling, or instrumentation at a source code write time, a compile time, an interpretation time, a translation time, a linking time, a loading time, or a runtime. In further embodiments, the receiving the first one or more instruction sets for operating the avatar of the application includes at least one of: tracing, profiling, or instrumentation of one or more code segments, lines of code, statements, instructions, functions, routines, subroutines, or basic blocks. In further embodiments, the receiving the first one or more instruction sets for operating the avatar of the application includes at least one of: tracing, profiling, or instrumentation of a user input. In further embodiments, the receiving the first one or more instruction sets for operating the avatar of the application includes at least one of: a manual, an automatic, a dynamic, or a just in time (JIT) tracing, profiling, or instrumentation. In further embodiments, the receiving the first one or more instruction sets for operating the avatar of the application includes utilizing at least one of: a .NET tool, a .NET application programming interface (API), a Java tool, a Java API, a logging tool, or an independent tool for obtaining instruction sets. In further embodiments, the receiving the first one or more instruction sets for operating the avatar of the application includes utilizing an assembly language. In further embodiments, the receiving the first one or more instruction sets for operating the avatar of the application includes utilizing a branch or a jump. In further embodiments, the receiving the first one or more instruction sets for operating the avatar of the application includes a branch tracing or a simulation tracing. In further embodiments, the system further comprises: an interface configured to receive instruction sets, wherein the first one or more instruction sets for operating the avatar of the application are received via the interface. The interface may include an acquisition interface.

In certain embodiments, the first collection of object representations correlated with the first one or more instruction sets for operating the avatar of the application include a unit of knowledge of how the avatar of the application operated in a circumstance. In further embodiments, the first collection of object representations correlated with the first one or more instruction sets for operating the avatar of the application are included in a neuron, a node, a vertex, or an element of a knowledgebase. The knowledgebase may include a neural network, a graph, a collection of sequences, a sequence, a collection of knowledge cells, a knowledge structure, or a data structure. Some of the neurons, nodes, vertices, or elements may be interconnected. In further embodiments, the first collection of object representations correlated with the first one or more instruction sets for operating the avatar of the application are structured into a knowledge cell. In further embodiments, the knowledge cell is included in a neuron, a node, a vertex, or an element of a knowledgebase. The knowledgebase may include a neural network, a graph, a collection of sequences, a sequence, a collection of knowledge cells, a knowledge structure, or a data structure. Some of the neurons, nodes, vertices, or elements may be interconnected. In further embodiments, the learning the first collection of object representations correlated with the first one or more instruction sets for operating the avatar of the application includes correlating the first collection of object representations with the first one or more instruction sets for operating the avatar of the application. The correlating the first collection of object representations with the first one or more instruction sets for operating the avatar of the application may include generating a knowledge cell, the knowledge cell comprising the first collection of object representations correlated with the first one or more instruction sets for operating the avatar of the application. The correlating the first collection of object representations with the first one or more instruction sets for operating the avatar of the application may include structuring a unit of knowledge of how the avatar of the application operated in a circumstance. In further embodiments, the learning the first collection of object representations correlated with the first one or more instruction sets for operating the avatar of the application includes learning a user's knowledge, style, or methodology of operating the avatar of the application in a circumstance.

In some embodiments, the learning the first collection of object representations correlated with the first one or more instruction sets for operating the avatar of the application includes storing the first collection of object representations correlated with the first one or more instruction sets for operating the avatar of the application into the memory unit, the memory unit comprising a plurality of collections of object representations correlated with one or more instruction sets for operating the avatar of the application. In further embodiments, the plurality of collections of object representations correlated with one or more instruction sets for operating the avatar of the application include a neural network, a graph, a collection of sequences, a sequence, a collection of knowledge cells, a knowledgebase, a knowledge structure, or a data structure. In further embodiments, the plurality of collections of object representations correlated with one or more instruction sets for operating the avatar of the application are organized into a neural network, a graph, a collection of sequences, a sequence, a collection of knowledge cells, a knowledgebase, a knowledge structure, or a data structure. In further embodiments, one or more collection of object representations correlated with one or more instruction sets for operating the avatar of the application of the plurality of collections of object representations correlated with one or more instruction sets for operating the avatar of the application are included in one or more neurons, nodes, vertices, or elements of a knowledgebase. The knowledgebase may include a neural network, a graph, a collection of sequences, a sequence, a collection of knowledge cells, a knowledge structure, or a data structure. Some of the neurons, nodes, vertices, or elements may be interconnected. In further embodiments, the plurality of collections of object representations correlated with one or more instruction sets for operating the avatar of the application include a user's knowledge, style, or methodology of operating the avatar of the application in circumstances. In further embodiments, the plurality of collections of object representations correlated with one or more instruction sets for operating the avatar of the application are stored on a remote computing device or a remote computing system. In further embodiments, the plurality of collections of object representations correlated with one or more instruction sets for operating the avatar of the application include an artificial intelligence system for knowledge structuring, storing, or representation. The artificial intelligence system for knowledge structuring, storing, or representation may include at least one of: a deep learning system, a supervised learning system, an unsupervised learning system, a neural network, a search-based system, an optimization-based system, a logic-based system, a fuzzy logic-based system, a tree-based system, a graph-based system, a hierarchical system, a symbolic system, a sub-symbolic system, an evolutionary system, a genetic system, a multi-agent system, a deterministic system, a probabilistic system, or a statistical system.

In certain embodiments, the anticipating the first one or more instruction sets for operating the avatar of the application correlated with the first collection of object representations based on at least a partial match between the new collection of object representations and the first collection of object representations includes comparing at least one portion of the new collection of object representations with at least one portion of the first collection of object representations. The at least one portion of the new collection of object representations may include at least one object representation or at least one object property of the new collection of object representations. The at least one portion of the first collection of object representations may include at least one object representation or at least one object property of the first collection of object representations. In further embodiments, the anticipating the first one or more instruction sets for operating the avatar of the application correlated with the first collection of object representations based on at least a partial match between the new collection of object representations and the first collection of object representations includes comparing at least one object representation from the new collection of object representations with at least one object representation from the first collection of object representations. In further embodiments, the comparing at least one object representation from the new collection of object representations with at least one object representation from the first collection of object representations includes comparing at least one object property of the at least one object representation from the new collection of object representations with at least one object property of the at least one object representation from the first collection of object representations. In further embodiments, the anticipating the first one or more instruction sets for operating the avatar of the application correlated with the first collection of object representations based on at least a partial match between the new collection of object representations and the first collection of object representations includes comparing at least one object property of at least one object representation from the new collection of object representations with at least one object property of at least one object representation from the first collection of object representations.

In some embodiments, the anticipating the first one or more instruction sets for operating the avatar of the application correlated with the first collection of object representations based on at least a partial match between the new collection of object representations and the first collection of object representations includes determining that there is at least a partial match between the new collection of object representations and the first collection of object representations. In further embodiments, the determining that there is at least a partial match between the new collection of object representations and the first collection of object representations includes determining that there is at least a partial match between one or more portions of the new collection of object representations and one or more portions of the first collection of object representations. In further embodiments, the determining that there is at least a partial match between the new collection of object representations and the first collection of object representations includes determining that a similarity between at least one portion of the new collection of object representations and at least one portion of the first collection of object representations exceeds a similarity threshold. In further embodiments, the determining that there is at least a partial match between the new collection of object representations and the first collection of object representations includes determining a substantial similarity between at least one portion of the new collection of object representations and at least one portion of the first collection of object representations. The substantial similarity may be achieved when a similarity between the at least one portion of the new collection of object representations and the at least one portion of the first collection of object representations exceeds a similarity threshold. The substantial similarity may be achieved when a number or a percentage of matching or partially matching portions of the new collection of object representations and portions of the first collection of object representations exceeds a threshold number or threshold percentage. In further embodiments, the determining that there is at least a partial match between the new collection of object representations and the first collection of object representations includes determining that a number or a percentage of matching or partially matching object representations from the new collection of object representations and from the first collection of object representations exceeds a threshold number or threshold percentage. The matching or partially matching object representations from the new collection of object representations and from the first collection of object representations may be determined factoring in at least one of: a type of an object representation, an importance of an object representation, a threshold for a similarity in an object representation, or a threshold for a difference in an object representation. In further embodiments, the determining that there is at least a partial match between the new collection of object representations and the first collection of object representations includes determining that a number or a percentage of matching or partially matching object properties from the new collection of object representations and from the first collection of object representations exceeds a threshold number or threshold percentage. The matching or partially matching object properties from the new collection of object representations and from the first collection of object representations may be determined factoring in at least one of: an association of an object property with an object representation, a category of an object property, an importance of an object property, a threshold for a similarity in an object property, or a threshold for a difference in an object property. In further embodiments, the determining that there is at least a partial match between the new collection of object representations and the first collection of object representations includes determining that there is at least a partial match between at least one object representation from the new collection of object representations and at least one object representation from the first collection of object representations. The determining that there is at least a partial match between at least one object representation from the new collection of object representations and at least one object representation from the first collection of object representations may include determining that there is at least a partial match between at least one object property of the at least one object representation from the new collection of object representations and at least one object property of the at least one object representation from the first collection of object representations.

In certain embodiments, the causing the processor circuit to execute the first one or more instruction sets for operating the avatar of the application correlated with the first collection of object representations includes causing the processor circuit to execute the first one or more instruction sets for operating the avatar of the application correlated with the first collection of object representations instead of or prior to an instruction set that would have been executed next. In further embodiments, the causing the processor circuit to execute the first one or more instruction sets for operating the avatar of the application correlated with the first collection of object representations includes modifying one or more instruction sets of the processor circuit. In further embodiments, the causing the processor circuit to execute the first one or more instruction sets for operating the avatar of the application correlated with the first collection of object representations includes modifying a register or an element of the processor circuit. In further embodiments, the causing the processor circuit to execute the first one or more instruction sets for operating the avatar of the application correlated with the first collection of object representations includes inserting the first one or more instruction sets for operating the avatar of the application correlated with the first collection of object representations into a register or an element of the processor circuit. In further embodiments, the causing the processor circuit to execute the first one or more instruction sets for operating the avatar of the application correlated with the first collection of object representations includes redirecting the processor circuit to the first one or more instruction sets for operating the avatar of the application correlated with the first collection of object representations. In further embodiments, the causing the processor circuit to execute the first one or more instruction sets for operating the avatar of the application correlated with the first collection of object representations includes redirecting the processor circuit to one or more alternate instruction sets, the alternate instruction sets comprising the first one or more instruction sets for operating the avatar of the application correlated with the first collection of object representations. In further embodiments, the causing the processor circuit to execute the first one or more instruction sets for operating the avatar of the application correlated with the first collection of object representations includes transmitting, to the processor circuit for execution, the first one or more instruction sets for operating the avatar of the application correlated with the first collection of object representations. In further embodiments, the causing the processor circuit to execute the first one or more instruction sets for operating the avatar of the application correlated with the first collection of object representations includes issuing an interrupt to the processor circuit and executing the first one or more instruction sets for operating the avatar of the application correlated with the first collection of object representations following the interrupt. In further embodiments, the causing the processor circuit to execute the first one or more instruction sets for operating the avatar of the application correlated with the first collection of object representations includes causing the application to execute the first one or more instruction sets for operating the avatar of the application correlated with the first collection of object representations. In further embodiments, the causing the processor circuit to execute the first one or more instruction sets for operating the avatar of the application correlated with the first collection of object representations includes modifying one or more instruction sets of the application. In further embodiments, the causing the processor circuit to execute the first one or more instruction sets for operating the avatar of the application correlated with the first collection of object representations includes modifying the application. In further embodiments, the causing the processor circuit to execute the first one or more instruction sets for operating the avatar of the application correlated with the first collection of object representations includes redirecting the application to the first one or more instruction sets for operating the avatar of the application correlated with the first collection of object representations. In further embodiments, the causing the processor circuit to execute the first one or more instruction sets for operating the avatar of the application correlated with the first collection of object representations includes redirecting the application to one or more alternate instruction sets, the alternate instruction sets comprising the first one or more instruction sets for operating the avatar of the application correlated with the first collection of object representations. In further embodiments, the causing the processor circuit to execute the first one or more instruction sets for operating the avatar of the application correlated with the first collection of object representations includes causing the avatar of the application to execute the first one or more instruction sets for operating the avatar of the application correlated with the first collection of object representations. In further embodiments, the causing the processor circuit to execute the first one or more instruction sets for operating the avatar of the application correlated with the first collection of object representations includes modifying one or more instruction sets of the avatar of the application. In further embodiments, the causing the processor circuit to execute the first one or more instruction sets for operating the avatar of the application correlated with the first collection of object representations includes modifying the avatar of the application. In further embodiments, the causing the processor circuit to execute the first one or more instruction sets for operating the avatar of the application correlated with the first collection of object representations includes redirecting the avatar of the application to the first one or more instruction sets for operating the avatar of the application correlated with the first collection of object representations. In further embodiments, the causing the processor circuit to execute the first one or more instruction sets for operating the avatar of the application correlated with the first collection of object representations includes redirecting the avatar of the application to one or more alternate instruction sets, the alternate instruction sets comprising the first one or more instruction sets for operating the avatar of the application correlated with the first collection of object representations. In further embodiments, the causing the processor circuit to execute the first one or more instruction sets for operating the avatar of the application correlated with the first collection of object representations includes modifying a source code, a bytecode, an intermediate code, a compiled code, an interpreted code, a translated code, a runtime code, an assembly code, or a machine code. In further embodiments, the causing the processor circuit to execute the first one or more instruction sets for operating the avatar of the application correlated with the first collection of object representations includes modifying at least one of: the memory unit, a register of the processor circuit, a storage, or a repository where instruction sets are stored or used. In further embodiments, the causing the processor circuit to execute the first one or more instruction sets for operating the avatar of the application correlated with the first collection of object representations includes modifying at least one of: an element of the processor circuit, an element of the application, an element of the avatar of the application, a virtual machine, a runtime engine, an operating system, an execution stack, a program counter, or a user input. In further embodiments, the causing the processor circuit to execute the first one or more instruction sets for operating the avatar of the application correlated with the first collection of object representations includes modifying one or more instruction sets at a source code write time, a compile time, an interpretation time, a translation time, a linking time, a loading time, or a runtime. In further embodiments, the causing the processor circuit to execute the first one or more instruction sets for operating the avatar of the application correlated with the first collection of object representations includes modifying one or more code segments, lines of code, statements, instructions, functions, routines, subroutines, or basic blocks. In further embodiments, the causing the processor circuit to execute the first one or more instruction sets for operating the avatar of the application correlated with the first collection of object representations includes a manual, an automatic, a dynamic, or a just in time (JIT) instrumentation of the application. In further embodiments, the causing the processor circuit to execute the first one or more instruction sets for operating the avatar of the application correlated with the first collection of object representations includes a manual, an automatic, a dynamic, or a just in time (JIT) instrumentation of the avatar of the application. In further embodiments, the causing the processor circuit to execute the first one or more instruction sets for operating the avatar of the application correlated with the first collection of object representations includes utilizing one or more of a .NET tool, a .NET application programming interface (API), a Java tool, a Java API, an operating system tool, or an independent tool for modifying instruction sets. In further embodiments, the causing the processor circuit to execute the first one or more instruction sets for operating the avatar of the application correlated with the first collection of object representations includes utilizing at least one of: a dynamic, an interpreted, or a scripting programming language. In further embodiments, the causing the processor circuit to execute the first one or more instruction sets for operating the avatar of the application correlated with the first collection of object representations includes utilizing at least one of: a dynamic code, a dynamic class loading, or a reflection. In further embodiments, the causing the processor circuit to execute the first one or more instruction sets for operating the avatar of the application correlated with the first collection of object representations includes utilizing an assembly language. In further embodiments, the causing the processor circuit to execute the first one or more instruction sets for operating the avatar of the application correlated with the first collection of object representations includes utilizing at least one of: a metaprogramming, a self-modifying code, or an instruction set modification tool. In further embodiments, the causing the processor circuit to execute the first one or more instruction sets for operating the avatar of the application correlated with the first collection of object representations includes utilizing at least one of: just in time (JIT) compiling, JIT interpretation, JIT translation, dynamic recompiling, or binary rewriting. In further embodiments, the causing the processor circuit to execute the first one or more instruction sets for operating the avatar of the application correlated with the first collection of object representations includes utilizing at least one of: a dynamic expression creation, a dynamic expression execution, a dynamic function creation, or a dynamic function execution. In further embodiments, the causing the processor circuit to execute the first one or more instruction sets for operating the avatar of the application correlated with the first collection of object representations includes adding or inserting additional code into a code of the application. In further embodiments, the causing the processor circuit to execute the first one or more instruction sets for operating the avatar of the application correlated with the first collection of object representations includes at least one of: modifying, removing, rewriting, or overwriting a code of the application. In further embodiments, the causing the processor circuit to execute the first one or more instruction sets for operating the avatar of the application correlated with the first collection of object representations includes at least one of: branching, redirecting, extending, or hot swapping a code of the application. In further embodiments, the causing the processor circuit to execute the first one or more instruction sets for operating the avatar of the application correlated with the first collection of object representations includes adding or inserting additional code into a code of the avatar of the application. In further embodiments, the causing the processor circuit to execute the first one or more instruction sets for operating the avatar of the application correlated with the first collection of object representations includes at least one of: modifying, removing, rewriting, or overwriting a code of the avatar of the application. In further embodiments, the causing the processor circuit to execute the first one or more instruction sets for operating the avatar of the application correlated with the first collection of object representations includes at least one of: branching, redirecting, extending, or hot swapping a code of the avatar of the application. In further embodiments, the causing the processor circuit to execute the first one or more instruction sets for operating the avatar of the application correlated with the first collection of object representations includes implementing a user's knowledge, style, or methodology of operating the avatar of the application in a circumstance. In further embodiments, the system further comprises: an interface configured to cause execution of instruction sets, wherein the executing the first one or more instruction sets for operating the avatar of the application correlated with the first collection of object representations by the processor circuit is caused by the interface. The interface may include a modification interface.

In some embodiments, the avatar's performing the one or more operations defined by the first one or more instruction sets for operating the avatar of the application correlated with the first collection of object representations includes implementing a user's knowledge, style, or methodology of operating the avatar of the application in a circumstance.

In certain embodiments, the artificial intelligence unit is further configured to: receive at least one extra information. In further embodiments, the at least one extra information include one or more of: a time information, a location information, a computed information, a visual information, an acoustic information, or a contextual information. In further embodiments, the at least one extra information include one or more of: an information on the avatar of the application, an information on the avatar's circumstance, an information on an object, an information on an object representation, an information on a collection of object representations, an information on an instruction set, an information on the application, an information on the processor circuit, or an information on a user. In further embodiments, the artificial intelligence unit is further configured to: learn the first collection of object representations correlated with the at least one extra information. The learning the first collection of object representations correlated with at least one extra information may include correlating the first collection of object representations with the at least one extra information. The learning the first collection of object representations correlated with at least one extra information may include storing the first collection of object representations correlated with the at least one extra information into the memory unit. In further embodiments, the anticipating the first one or more instruction sets for operating the avatar of the application correlated with the first collection of object representations based on at least a partial match between the new collection of object representations and the first collection of object representations includes anticipating the first one or more instruction sets for operating the avatar of the application correlated with the first collection of object representations based on at least a partial match between an extra information correlated with the new collection of object representations and an extra information correlated with the first collection of object representations. The anticipating the first one or more instruction sets for operating the avatar of the application correlated with the first collection of object representations based on at least a partial match between an extra information correlated with the new collection of object representations and an extra information correlated with the first collection of object representations may include comparing an extra information correlated with the new collection of object representations and an extra information correlated with the first collection of object representations. The anticipating the first one or more instruction sets for operating the avatar of the application correlated with the first collection of object representations based on at least a partial match between an extra information correlated with the new collection of object representations and an extra information correlated with the first collection of object representations may include determining that a similarity between an extra information correlated with the new collection of object representations and an extra information correlated with the first collection of object representations exceeds a similarity threshold.

In some embodiments, the system of further comprises: a user interface, wherein the artificial intelligence unit is further configured to: cause the user interface to present a user with an option to execute the first one or more instruction sets for operating the avatar of the application correlated with the first collection of object representations. In further embodiments, the system of further comprises: a user interface, wherein the artificial intelligence unit is further configured to: receive, via the user interface, a user's selection to execute the first one or more instruction sets for operating the avatar of the application correlated with the first collection of object representations.

In further embodiments, the artificial intelligence unit is further configured to: rate the executed first one or more instruction sets for operating the avatar of the application correlated with the first collection of object representations. The rating the executed first one or more instruction sets for operating the avatar of the application correlated with the first collection of object representations may include causing a user interface to display the executed first one or more instruction sets for operating the avatar of the application correlated with the first collection of object representations along with one or more rating values as options to be selected by a user. The rating the executed first one or more instruction sets for operating the avatar of the application correlated with the first collection of object representations may include rating the executed first one or more instruction sets for operating the avatar of the application correlated with the first collection of object representations without a user input.

In certain embodiments, the system further comprises: a user interface, wherein the artificial intelligence unit is further configured to: cause the user interface to present a user with an option to cancel the execution of the executed first one or more instruction sets for operating the avatar of the application correlated with the first collection of object representations. In further embodiments, the canceling the execution of the executed first one or more instruction sets for operating the avatar of the application correlated with the first collection of object representations includes restoring the processor circuit, the application, or the avatar of the application to a prior state. The restoring the processor circuit, the application, or the avatar of the application to a prior state may include saving the state of the processor circuit, the application, or the avatar of the application prior to executing the first one or more instruction sets for operating the avatar of the application correlated with the first collection of object representations.

In some embodiments, the system further comprises: an input device configured to receive a user's operating directions, the user's operating directions for instructing the processor circuit, the application, or the avatar of the application on how to operate the avatar of the application.

In certain embodiments, the autonomous avatar operating includes a partially or a fully autonomous avatar operating. The partially autonomous avatar operating may include executing the first one or more instruction sets for operating the avatar of the application correlated with the first collection of object representations responsive to a user confirmation. The fully autonomous avatar operating may include executing the first one or more instruction sets for operating the avatar of the application correlated with the first collection of object representations without a user confirmation.

In some embodiments, the artificial intelligence unit is further configured to: receive a second collection of object representations, the second collection of object representations including one or more object representations representing one or more objects of the application; receive a second one or more instruction sets for operating an avatar of the application; and learn the second collection of object representations correlated with the second one or more instruction sets for operating the avatar of the application. In further embodiments, the second collection of object representations is received at a second time. In further embodiments, the second collection of object representations includes a unit of knowledge of the avatar's circumstance at a second time. In further embodiments, the second collection of object representations includes a stream of collections of object representations. In further embodiments, the second collection of object representations includes or is associated with a time stamp, an order, or a time related information. In further embodiments, the learning the first collection of object representations correlated with the first one or more instruction sets for operating the avatar of the application and the learning the second collection of object representations correlated with the second one or more instruction sets for operating the avatar of the application include creating a connection between the first collection of object representations correlated with the first one or more instruction sets for operating the avatar of the application and the second collection of object representations correlated with the second one or more instruction sets for operating the avatar of the application. The connection may include or be associated with at least one of: an occurrence count, a weight, a parameter, or a data. In further embodiments, the learning the first collection of object representations correlated with the first one or more instruction sets for operating the avatar of the application and the learning the second collection of object representations correlated with the second one or more instruction sets for operating the avatar of the application include updating a connection between the first collection of object representations correlated with the first one or more instruction sets for operating the avatar of the application and the second collection of object representations correlated with the second one or more instruction sets for operating the avatar of the application. The updating the connection between the first collection of object representations correlated with the first one or more instruction sets for operating the avatar of the application and the second collection of object representations correlated with the second one or more instruction sets for operating the avatar of the application may include updating at least one of: an occurrence count, a weight, a parameter, or a data included in or associated with the connection. In further embodiments, the learning the first collection of object representations correlated with the first one or more instruction sets for operating the avatar of the application includes storing the first collection of object representations correlated with the first one or more instruction sets for operating the avatar of the application into a first node of a knowledgebase, and wherein the learning the second collection of object representations correlated with the second one or more instruction sets for operating the avatar of the application includes storing the second collection of object representations correlated with the second one or more instruction sets for operating the avatar of the application into a second node of the knowledgebase. The knowledgebase may include a neural network, a graph, a collection of sequences, a sequence, a collection of knowledge cells, a knowledge structure, or a data structure. The knowledgebase may be stored in the memory unit. The learning the first collection of object representations correlated with the first one or more instruction sets for operating the avatar of the application and the learning the second collection of object representations correlated with the second one or more instruction sets for operating the avatar of the application may include creating a connection between the first node and the second node. The learning the first collection of object representations correlated with the first one or more instruction sets for operating the avatar of the application and the learning the second collection of object representations correlated with the second one or more instruction sets for operating the avatar of the application may include updating a connection between the first node and the second node. In further embodiments, the first collection of object representations correlated with the first one or more instruction sets for operating the avatar of the application is stored into a first node of a neural network and the second collection of object representations correlated with the second one or more instruction sets for operating the avatar of the application is stored into a second node of the neural network. The first node and the second node may be connected by a connection. The first node may be part of a first layer of the neural network and the second node may be part of a second layer of the neural network. In further embodiments, the first collection of object representations correlated with the first one or more instruction sets for operating the avatar of the application is stored into a first node of a graph and the second collection of object representations correlated with the second one or more instruction sets for operating the avatar of the application is stored into a second node of the graph. The first node and the second node may be connected by a connection. In further embodiments, the first collection of object representations correlated with the first one or more instruction sets for operating the avatar of the application is stored into a first node of a sequence and the second collection of object representations correlated with the second one or more instruction sets for operating the avatar of the application is stored into a second node of the sequence.

In some aspects, the disclosure relates to a non-transitory computer storage medium having a computer program stored thereon, the program including instructions that when executed by one or more processor circuits cause the one or more processor circuits to perform operations comprising: receiving a first collection of object representations, the first collection of object representations including one or more object representations representing one or more objects of an application. The operations may further comprise: receiving a first one or more instruction sets for operating an avatar of the application. The operations may further comprise: learning the first collection of object representations correlated with the first one or more instruction sets for operating the avatar of the application. The operations may further comprise: receiving a new collection of object representations, the new collection of object representations including one or more object representations representing one or more objects of the application. The operations may further comprise: anticipating the first one or more instruction sets for operating the avatar of the application correlated with the first collection of object representations based on at least a partial match between the new collection of object representations and the first collection of object representations. The operations may further comprise: causing an execution of the first one or more instruction sets for operating the avatar of the application correlated with the first collection of object representations, the causing performed in response to the anticipating the first one or more instruction sets for operating the avatar of the application correlated with the first collection of object representations based on at least a partial match between the new collection of object representations and the first collection of object representations, wherein the avatar of the application performs one or more operations defined by the first one or more instruction sets for operating the avatar of the application correlated with the first collection of object representations.

In some embodiments, the receiving the first one or more instruction sets for operating the avatar of the application includes receiving the first one or more instruction sets for operating the avatar of the application from the one or more processor circuits or from another one or more processor circuits. In further embodiments, the execution of the first one or more instruction sets for operating the avatar of the application correlated with the first collection of object representations is performed by the one or more processor circuits or by another one or more processor circuits.

In some aspects, the disclosure relates to a method comprising: (a) receiving a first collection of object representations by a processor circuit, the first collection of object representations including one or more object representations representing one or more objects of an application. The method may further comprise: (b) receiving a first one or more instruction sets for operating an avatar of the application by the processor circuit. The method may further comprise: (c) learning the first collection of object representations correlated with the first one or more instruction sets for operating the avatar of the application, the learning of (c) performed by the processor circuit. The method may further comprise: (d) receiving a new collection of object representations by the processor circuit, the new collection of object representations including one or more object representations representing one or more objects of the application. The method may further comprise: (e) anticipating the first one or more instruction sets for operating the avatar of the application correlated with the first collection of object representations based on at least a partial match between the new collection of object representations and the first collection of object representations, the anticipating of (e) performed by the processor circuit. The method may further comprise: (f) executing the first one or more instruction sets for operating the avatar of the application correlated with the first collection of object representations, the executing of (f) performed in response to the anticipating of (e). The method may further comprise: (g) performing, by the avatar of the application, one or more operations defined by the first one or more instruction sets for operating the avatar of the application correlated with the first collection of object representations.

In certain embodiments, the receiving of (b) includes receiving the first one or more instruction sets for operating the avatar of the application from the processor circuit or from another processor circuit. In further embodiments, the executing of (f) is performed by the processor circuit or by another processor circuit.

The aforementioned system, the non-transitory computer storage medium, and/or the method may include any elements, operations, steps, and embodiments of the above described systems, non-transitory computer storage media, and/or methods as applicable as well as the following embodiments.

In some embodiments, the first one or more instruction sets for operating the avatar of the application include one or more instruction sets executed in operating the avatar of the application. In further embodiments, the first one or more instruction sets for operating the avatar of the application are part of the application. In further embodiments, the first one or more instruction sets for operating the avatar of the application are part of the avatar of the application. In further embodiments, the first one or more instruction sets for operating the avatar of the application include one or more inputs into or one or more outputs from a processor circuit. In further embodiments, the first one or more instruction sets for operating the avatar of the application include a value or a state of a register or an element of a processor circuit. In further embodiments, the first one or more instruction sets for operating the avatar of the application include at least one of: a command, a keyword, a symbol, an instruction, an operator, a variable, a value, an object, a data structure, a function, a parameter, a state, a signal, an input, an output, a character, a digit, or a reference thereto. In further embodiments, the first one or more instruction sets for operating the avatar of the application include a source code, a bytecode, an intermediate code, a compiled code, an interpreted code, a translated code, a runtime code, an assembly code, a structured query language (SQL) code, or a machine code. In further embodiments, the first one or more instruction sets for operating the avatar of the application include one or more code segments, lines of code, statements, instructions, functions, routines, subroutines, or basic blocks. In further embodiments, the first one or more instruction sets for operating the avatar of the application include one or more instruction sets for operating the application.

In certain embodiments, the receiving the first one or more instruction sets for operating the avatar of the application includes receiving the first one or more instruction sets for operating the avatar of the application executed by a processor circuit. In further embodiments, the receiving the first one or more instruction sets for operating the avatar of the application includes receiving the first one or more instruction sets for operating the avatar of the application as they are executed by a processor circuit. In further embodiments, the receiving the first one or more instruction sets for operating the avatar of the application includes obtaining the first one or more instruction sets for operating the avatar of the application from a processor circuit. In further embodiments, the receiving the first one or more instruction sets for operating the avatar of the application includes receiving the first one or more instruction sets for operating the avatar of the application from a register or an element of a processor circuit. In further embodiments, the receiving the first one or more instruction sets for operating the avatar of the application includes receiving the first one or more instruction sets for operating the avatar of the application from at least one of: the memory unit, a virtual machine, a runtime engine, a hard drive, a storage device, a peripheral device, a network connected device, or a user. In further embodiments, the receiving the first one or more instruction sets for operating the avatar of the application includes receiving the first one or more instruction sets for operating the avatar of the application from a plurality of processor circuits, applications, memory units, virtual machines, runtime engines, hard drives, storage devices, peripheral devices, network connected devices, or users. In further embodiments, the receiving the first one or more instruction sets for operating the avatar of the application includes obtaining the first one or more instruction sets for operating the avatar of the application from the application. In further embodiments, the receiving the first one or more instruction sets for operating the avatar of the application includes obtaining the first one or more instruction sets for operating the avatar of the application from the avatar of the application. In further embodiments, the receiving the first one or more instruction sets for operating the avatar of the application includes receiving the one or more instruction sets for operating the avatar of the application at a source code write time, a compile time, an interpretation time, a translation time, a linking time, a loading time, or a runtime. In further embodiments, the receiving the first one or more instruction sets for operating the avatar of the application includes at least one of: tracing, profiling, or instrumentation of a source code, a bytecode, an intermediate code, a compiled code, an interpreted code, a translated code, a runtime code, an assembly code, a structured query language (SQL) code, or a machine code. In further embodiments, the receiving the first one or more instruction sets for operating the avatar of the application includes at least one of: tracing, profiling, or instrumentation of a register of a processor circuit, a memory unit, a storage, or a repository where the first one or more instruction sets for operating the avatar of the application are stored. In further embodiments, the receiving the first one or more instruction sets for operating the avatar of the application includes at least one of: tracing, profiling, or instrumentation of a processor circuit, a virtual machine, a runtime engine, an operating system, an execution stack, a program counter, or a processing element. In further embodiments, the receiving the first one or more instruction sets for operating the avatar of the application includes at least one of: tracing, profiling, or instrumentation of a processor circuit or tracing, profiling, or instrumentation of a component of a processor circuit. In further embodiments, the receiving the first one or more instruction sets for operating the avatar of the application includes at least one of: tracing, profiling, or instrumentation of the application. In further embodiments, the receiving the first one or more instruction sets for operating the avatar of the application includes at least one of: tracing, profiling, or instrumentation of the avatar of the application. In further embodiments, the receiving the first one or more instruction sets for operating the avatar of the application includes at least one of: tracing, profiling, or instrumentation at a source code write time, a compile time, an interpretation time, a translation time, a linking time, a loading time, or a runtime. In further embodiments, the receiving the first one or more instruction sets for operating the avatar of the application includes at least one of: tracing, profiling, or instrumentation of one or more code segments, lines of code, statements, instructions, functions, routines, subroutines, or basic blocks. In further embodiments, the receiving the first one or more instruction sets for operating the avatar of the application includes at least one of: tracing, profiling, or instrumentation of a user input. In further embodiments, the receiving the first one or more instruction sets for operating the avatar of the application includes at least one of: a manual, an automatic, a dynamic, or a just in time (JIT) tracing, profiling, or instrumentation. In further embodiments, the receiving the first one or more instruction sets for operating the avatar of the application includes utilizing at least one of: a .NET tool, a .NET application programming interface (API), a Java tool, a Java API, a logging tool, or an independent tool for obtaining instruction sets. In further embodiments, the receiving the first one or more instruction sets for operating the avatar of the application includes utilizing an assembly language. In further embodiments, the receiving the first one or more instruction sets for operating the avatar of the application includes utilizing a branch or a jump. In further embodiments, the receiving the first one or more instruction sets for operating the avatar of the application includes a branch tracing or a simulation tracing. In further embodiments, the receiving the first one or more instruction sets for operating the avatar of the application includes receiving the first one or more instruction sets for operating the avatar of the application via an interface. The interface may include an acquisition interface.

In some embodiments, the learning the first collection of object representations correlated with the first one or more instruction sets for operating the avatar of the application includes storing the first collection of object representations correlated with the first one or more instruction sets for operating the avatar of the application into a memory unit, the memory unit comprising a plurality of collections of object representations correlated with one or more instruction sets for operating the avatar of the application.

In certain embodiments, the executing the first one or more instruction sets for operating the avatar of the application correlated with the first collection of object representations includes executing the first one or more instruction sets for operating the avatar of the application correlated with the first collection of object representations instead of or prior to an instruction set that would have been executed next. In further embodiments, the executing the first one or more instruction sets for operating the avatar of the application correlated with the first collection of object representations includes modifying one or more instruction sets of a processor circuit. In further embodiments, the executing the first one or more instruction sets for operating the avatar of the application correlated with the first collection of object representations includes modifying a register or an element of a processor circuit. In further embodiments, the executing the first one or more instruction sets for operating the avatar of the application correlated with the first collection of object representations includes inserting the first one or more instruction sets for operating the avatar of the application correlated with the first collection of object representations into a register or an element of a processor circuit. In further embodiments, the executing the first one or more instruction sets for operating the avatar of the application correlated with the first collection of object representations includes redirecting a processor circuit to the first one or more instruction sets for operating the avatar of the application correlated with the first collection of object representations. In further embodiments, the executing the first one or more instruction sets for operating the avatar of the application correlated with the first collection of object representations includes redirecting a processor circuit to one or more alternate instruction sets, the alternate instruction sets comprising the first one or more instruction sets for operating the avatar of the application correlated with the first collection of object representations. In further embodiments, the executing the first one or more instruction sets for operating the avatar of the application correlated with the first collection of object representations includes transmitting, to a processor circuit for execution, the first one or more instruction sets for operating the avatar of the application correlated with the first collection of object representations. In further embodiments, the executing the first one or more instruction sets for operating the avatar of the application correlated with the first collection of object representations includes issuing an interrupt to a processor circuit and executing the first one or more instruction sets for operating the avatar of the application correlated with the first collection of object representations following the interrupt. In further embodiments, the executing the first one or more instruction sets for operating the avatar of the application correlated with the first collection of object representations includes causing the application to execute the first one or more instruction sets for operating the avatar of the application correlated with the first collection of object representations. In further embodiments, the executing the first one or more instruction sets for operating the avatar of the application correlated with the first collection of object representations includes modifying one or more instruction sets of the application. In further embodiments, the executing the first one or more instruction sets for operating the avatar of the application correlated with the first collection of object representations includes modifying the application. In further embodiments, the executing the first one or more instruction sets for operating the avatar of the application correlated with the first collection of object representations includes redirecting the application to the first one or more instruction sets for operating the avatar of the application correlated with the first collection of object representations. In further embodiments, the executing the first one or more instruction sets for operating the avatar of the application correlated with the first collection of object representations includes redirecting the application to one or more alternate instruction sets, the alternate instruction sets comprising the first one or more instruction sets for operating the avatar of the application correlated with the first collection of object representations. In further embodiments, the executing the first one or more instruction sets for operating the avatar of the application correlated with the first collection of object representations includes causing the avatar of the application to execute the first one or more instruction sets for operating the avatar of the application correlated with the first collection of object representations. In further embodiments, the executing the first one or more instruction sets for operating the avatar of the application correlated with the first collection of object representations includes modifying one or more instruction sets of the avatar of the application. In further embodiments, the executing the first one or more instruction sets for operating the avatar of the application correlated with the first collection of object representations includes modifying the avatar of the application. In further embodiments, the executing the first one or more instruction sets for operating the avatar of the application correlated with the first collection of object representations includes redirecting the avatar of the application to the first one or more instruction sets for operating the avatar of the application correlated with the first collection of object representations. In further embodiments, the executing the first one or more instruction sets for operating the avatar of the application correlated with the first collection of object representations includes redirecting the avatar of the application to one or more alternate instruction sets, the alternate instruction sets comprising the first one or more instruction sets for operating the avatar of the application correlated with the first collection of object representations. In further embodiments, the executing the first one or more instruction sets for operating the avatar of the application correlated with the first collection of object representations includes modifying a source code, a bytecode, an intermediate code, a compiled code, an interpreted code, a translated code, a runtime code, an assembly code, or a machine code. In further embodiments, the executing the first one or more instruction sets for operating the avatar of the application correlated with the first collection of object representations includes modifying at least one of: a memory unit, a register of a processor circuit, a storage, or a repository where instruction sets are stored or used. In further embodiments, the executing the first one or more instruction sets for operating the avatar of the application correlated with the first collection of object representations includes modifying at least one of: an element of a processor circuit, an element of the application, an element of the avatar of the application, a virtual machine, a runtime engine, an operating system, an execution stack, a program counter, or a user input. In further embodiments, the executing the first one or more instruction sets for operating the avatar of the application correlated with the first collection of object representations includes modifying one or more instruction sets at a source code write time, a compile time, an interpretation time, a translation time, a linking time, a loading time, or a runtime. In further embodiments, the executing the first one or more instruction sets for operating the avatar of the application correlated with the first collection of object representations includes modifying one or more code segments, lines of code, statements, instructions, functions, routines, subroutines, or basic blocks. In further embodiments, the executing the first one or more instruction sets for operating the avatar of the application correlated with the first collection of object representations includes a manual, an automatic, a dynamic, or a just in time (JIT) instrumentation of the application. In further embodiments, the executing the first one or more instruction sets for operating the avatar of the application correlated with the first collection of object representations includes a manual, an automatic, a dynamic, or a just in time (JIT) instrumentation of the avatar of the application. In further embodiments, the executing the first one or more instruction sets for operating the avatar of the application correlated with the first collection of object representations includes utilizing one or more of a .NET tool, a .NET application programming interface (API), a Java tool, a Java API, an operating system tool, or an independent tool for modifying instruction sets. In further embodiments, the executing the first one or more instruction sets for operating the avatar of the application correlated with the first collection of object representations includes utilizing at least one of: a dynamic, an interpreted, or a scripting programming language. In further embodiments, the executing the first one or more instruction sets for operating the avatar of the application correlated with the first collection of object representations includes utilizing at least one of: a dynamic code, a dynamic class loading, or a reflection. In further embodiments, the executing the first one or more instruction sets for operating the avatar of the application correlated with the first collection of object representations includes utilizing an assembly language. In further embodiments, the executing the first one or more instruction sets for operating the avatar of the application correlated with the first collection of object representations includes utilizing at least one of: a metaprogramming, a self-modifying code, or an instruction set modification tool. In further embodiments, the executing the first one or more instruction sets for operating the avatar of the application correlated with the first collection of object representations includes utilizing at least one of: just in time (JIT) compiling, JIT interpretation, JIT translation, dynamic recompiling, or binary rewriting. In further embodiments, the executing the first one or more instruction sets for operating the avatar of the application correlated with the first collection of object representations includes utilizing at least one of: a dynamic expression creation, a dynamic expression execution, a dynamic function creation, or a dynamic function execution. In further embodiments, the executing the first one or more instruction sets for operating the avatar of the application correlated with the first collection of object representations includes adding or inserting additional code into a code of the application. In further embodiments, the executing the first one or more instruction sets for operating the avatar of the application correlated with the first collection of object representations includes at least one of: modifying, removing, rewriting, or overwriting a code of the application. In further embodiments, the executing the first one or more instruction sets for operating the avatar of the application correlated with the first collection of object representations includes at least one of: branching, redirecting, extending, or hot swapping a code of the application. In further embodiments, the executing the first one or more instruction sets for operating the avatar of the application correlated with the first collection of object representations includes adding or inserting additional code into a code of the avatar of the application. In further embodiments, the executing the first one or more instruction sets for operating the avatar of the application correlated with the first collection of object representations includes at least one of: modifying, removing, rewriting, or overwriting a code of the avatar of the application. In further embodiments, the executing the first one or more instruction sets for operating the avatar of the application correlated with the first collection of object representations includes at least one of: branching, redirecting, extending, or hot swapping a code of the avatar of the application. In further embodiments, the executing the first one or more instruction sets for operating the avatar of the application correlated with the first collection of object representations includes implementing a user's knowledge, style, or methodology of operating the avatar of the application in a circumstance. In further embodiments, the executing the first one or more instruction sets for operating the avatar of the application correlated with the first collection of object representations includes executing the first one or more instruction sets for operating the avatar of the application correlated with the first collection of object representations via an interface. The interface may include a modification interface.

In certain embodiments, the operations of the non-transitory computer storage medium and/or the method further comprise: receiving at least one extra information. In some embodiments, the operations of the non-transitory computer storage medium and/or the method further comprise: learning the first collection of object representations correlated with the at least one extra information. In certain embodiments, the operations of the non-transitory computer storage medium and/or the method further comprise: presenting, via a user interface, a user with an option to execute the first one or more instruction sets for operating the avatar of the application correlated with the first collection of object representations. In some embodiments, the operations of the non-transitory computer storage medium and/or the method further comprise: receiving, via a user interface, a user's selection to execute the first one or more instruction sets for operating the avatar of the application correlated with the first collection of object representations. In certain embodiments, the operations of the non-transitory computer storage medium and/or the method further comprise: rating the executed first one or more instruction sets for operating the avatar of the application correlated with the first collection of object representations. In some embodiments, the operations of the non-transitory computer storage medium and/or the method further comprise: presenting, via a user interface, a user with an option to cancel the execution of the executed first one or more instruction sets for operating the avatar of the application correlated with the first collection of object representations. In certain embodiments, the operations of the non-transitory computer storage medium and/or the method further comprise: receiving, via an input device, a user's operating directions, the user's operating directions for instructing the processor circuit, the application, or the avatar of the application on how to operate the avatar of the application. In some embodiments, the operations of the non-transitory computer storage medium and/or the method further comprise: receiving a second collection of object representations, the second collection of object representations including one or more object representations representing one or more objects of the application; receiving a second one or more instruction sets for operating the avatar of the application; and learning the second collection of object representations correlated with the second one or more instruction sets for operating the avatar of the application.

In some aspects, the disclosure relates to a system for learning an avatar's circumstances for autonomous avatar operating. The system may be implemented at least in part on one or more computing devices. In some embodiments, the system comprises: a processor circuit configured to execute instruction sets of an application. The system may further comprise: a memory unit configured to store data. The system may further comprise: an artificial intelligence unit. The artificial intelligence unit may be configured to: receive a first collection of object representations, the first collection of object representations including one or more object representations representing one or more objects of the application. The artificial intelligence unit may be further configured to: receive a first one or more instruction sets for operating an avatar of the application. The artificial intelligence unit may be further configured to: learn the first collection of object representations correlated with the first one or more instruction sets for operating the avatar of the application.

In some aspects, the disclosure relates to a non-transitory computer storage medium having a computer program stored thereon, the program including instructions that when executed by one or more processor circuits cause the one or more processor circuits to perform operations comprising: receiving a first collection of object representations, the first collection of object representations including one or more object representations representing one or more objects of an application. The operations may further comprise: receiving a first one or more instruction sets for operating an avatar of the application. The operations may further comprise: learning the first collection of object representations correlated with the first one or more instruction sets for operating the avatar of the application.

In some aspects, the disclosure relates to a method comprising: (a) receiving a first collection of object representations by a processor circuit, the first collection of object representations including one or more object representations representing one or more objects of an application. The method may further comprise: (b) receiving a first one or more instruction sets for operating an avatar of the application by the processor circuit. The method may further comprise: (c) learning the first collection of object representations correlated with the first one or more instruction sets for operating the avatar of the application, the learning of (c) performed by the processor circuit.

The aforementioned system, the non-transitory computer storage medium, and/or the method may include any elements, operations, steps, and embodiments of the above described systems, non-transitory computer storage media, and/or methods as applicable as well as the following embodiments.

In some aspects, the disclosure relates to a system for using an avatar's circumstances for autonomous avatar operating. The system may be implemented at least in part on one or more computing devices. In some embodiments, the system comprises: a processor circuit configured to execute instruction sets of an application. The system may further comprise: a memory unit configured to store data. The system may further comprise: an artificial intelligence unit. The artificial intelligence unit may be configured to: access the memory unit that comprises a plurality of collections of object representations correlated with one or more instruction sets for operating an avatar of the application, the plurality of collections of object representations correlated with one or more instruction sets for operating the avatar of the application including a first collection of object representations correlated with a first one or more instruction sets for operating the avatar of the application. The artificial intelligence unit may be further configured to: receive a new collection of object representations, the new collection of object representations including one or more object representations representing one or more objects of the application. The artificial intelligence unit may be further configured to: anticipate the first one or more instruction sets for operating the avatar of the application correlated with the first collection of object representations based on at least a partial match between the new collection of object representations and the first collection of object representations. The artificial intelligence unit may be further configured to: cause the processor circuit to execute the first one or more instruction sets for operating the avatar of the application correlated with the first collection of object representations, the causing performed in response to the anticipating of the artificial intelligence unit, wherein the avatar of the application performs one or more operations defined by the first one or more instruction sets for operating the avatar of the application correlated with the first collection of object representations.

In some aspects, the disclosure relates to a non-transitory computer storage medium having a computer program stored thereon, the program including instructions that when executed by one or more processor circuits cause the one or more processor circuits to perform operations comprising: accessing a memory unit that comprises a plurality of collections of object representations correlated with one or more instruction sets for operating an avatar of an application, the plurality of collections of object representations correlated with one or more instruction sets for operating the avatar of the application including a first collection of object representations correlated with a first one or more instruction sets for operating the avatar of the application. The operations may further comprise: receiving a new collection of object representations, the new collection of object representations including one or more object representations representing one or more objects of the application. The operations may further comprise: anticipating the first one or more instruction sets for operating the avatar of the application correlated with the first collection of object representations based on at least a partial match between the new collection of object representations and the first collection of object representations. The operations may further comprise: causing an execution of the first one or more instruction sets for operating the avatar of the application correlated with the first collection of object representations, the causing performed in response to the anticipating the first one or more instruction sets for operating the avatar of the application correlated with the first collection of object representations based on at least a partial match between the new collection of object representations and the first collection of object representations, wherein the avatar of the application performs one or more operations defined by the first one or more instruction sets for operating the avatar of the application correlated with the first collection of object representations.

In some aspects, the disclosure relates to a method comprising: (a) accessing a memory unit that comprises a plurality of collections of object representations correlated with one or more instruction sets for operating an avatar of an application, the plurality of collections of object representations correlated with one or more instruction sets for operating the avatar of the application including a first collection of object representations correlated with a first one or more instruction sets for operating the avatar of the application, the accessing of (a) performed by a processor circuit. The method may further comprise: (b) receiving a new collection of object representations by the processor circuit, the new collection of object representations including one or more object representations representing one or more objects of the application. The method may further comprise: (c) anticipating the first one or more instruction sets for operating the avatar of the application correlated with the first collection of object representations based on at least a partial match between the new collection of object representations and the first collection of object representations, the anticipating of (c) performed by the processor circuit. The method may further comprise: (d) executing the first one or more instruction sets for operating the avatar of the application correlated with the first collection of object representations, the executing of (d) performed in response to the anticipating of (c). The method may further comprise: (e) performing, by the avatar of the application, one or more operations defined by the first one or more instruction sets for operating the avatar of the application correlated with the first collection of object representations.

The aforementioned system, the non-transitory computer storage medium, and/or the method may include any elements, operations, steps, and embodiments of the above described systems, non-transitory computer storage media, and/or methods as applicable as well as the following embodiments.

In some aspects, the disclosure relates to a system for learning and using an avatar's circumstances for autonomous avatar operating. The system may be implemented at least in part on one or more computing devices. In some embodiments, the system comprises: a processor circuit configured to execute instruction sets of an application. The system may further comprise: a memory unit configured to store data. The system may further comprise: an artificial intelligence unit. The artificial intelligence unit may be configured to: receive a first stream of collections of object representations, the first stream of collections of object representations including one or more object representations representing one or more objects of the application. The artificial intelligence unit may be further configured to: receive a first one or more instruction sets for operating an avatar of the application. The artificial intelligence unit may be further configured to: learn the first stream of collections of object representations correlated with the first one or more instruction sets for operating the avatar of the application. The artificial intelligence unit may be further configured to: receive a new stream of collections of object representations, the new stream of collections of object representations including one or more object representations representing one or more objects of the application. The artificial intelligence unit may be further configured to: anticipate the first one or more instruction sets for operating the avatar of the application correlated with the first stream of collections of object representations based on at least a partial match between the new stream of collections of object representations and the first stream of collections of object representations. The artificial intelligence unit may be further configured to: cause the processor circuit to execute the first one or more instruction sets for operating the avatar of the application correlated with the first stream of collections of object representations, the causing performed in response to the anticipating of the artificial intelligence unit, wherein the avatar of the application performs one or more operations defined by the first one or more instruction sets for operating the avatar of the application correlated with the first stream of collections of object representations.

In certain embodiments, the first stream of collections of object representations includes one or more collections of object representations, and wherein each collection of object representations of the first stream of collections of object representations includes one or more object representations. In further embodiments, the new stream of collections of object representations includes one or more collections of object representations, and wherein each collection of object representations of the new stream of collections of object representations includes one or more object representations. In further embodiments, the first stream of collections of object representations is received over a first time period. In further embodiments, the new stream of collections of object representations is received over a new time period. In further embodiments, the first stream of collections of object representations includes a unit of knowledge of the avatar's circumstance over a first time period. In further embodiments, the new stream of collections of object representations includes a unit of knowledge of the avatar's circumstance over a new time period. In further embodiments, an object representation includes one or more properties of an object of the application. In further embodiments, an object representation includes one or more information on an object of the application. In further embodiments, the first or the new stream of collections of object representations includes or is associated with a time stamp, an order, or a time related information. In further embodiments, the first stream of collections of object representations includes a comparative stream of collections of object representations whose at least one portion can be used for comparisons with at least one portion of streams of collections of object representations subsequent to the first stream of collections of object representations, the streams of collections of object representations subsequent to the first stream of collections of object representations comprising the new stream of collections of object representations. In further embodiments, the first stream of collections of object representations includes a comparative stream of collections of object representations that can be used for comparison with the new stream of collections of object representations. In further embodiments, the new stream of collections of object representations includes an anticipatory stream of collections of object representations that can be compared with streams of collections of object representations whose correlated one or more instruction sets for operating the avatar of the application can be used for anticipation of one or more instruction sets to be executed in autonomous operating of the avatar of the application.

In some embodiments, the receiving the first stream of collections of object representations includes receiving one or more properties of the one or more objects of the application. The one or more properties of the one or more objects of the application may include one or more information on the one or more objects of the application. The receiving the one or more properties of the one or more objects of the application may include receiving the one or more properties of the one or more objects of the application from an engine, an environment, or a system used to implement the application. The receiving the one or more properties of the one or more objects of the application may include at least one of: accessing or reading a scene graph or a data structure used for organizing the one or more objects of the application. The receiving the one or more properties of the one or more objects of the application may include detecting the one or more properties of the one or more objects of the application in a picture of the avatar's surrounding. The receiving the one or more properties of the one or more objects of the application may include detecting the one or more properties of the one or more objects of the application in a sound from the avatar's surrounding.

In certain embodiments, the system further comprises: an object processing unit configured to receive streams of collections of object representations, wherein the first or the new stream of collections of object representations is received by the object processing unit.

In some embodiments, the first one or more instruction sets for operating the avatar of the application include one or more instruction sets that temporally correspond to the first stream of collections of object representations. The one or more instruction sets that temporally correspond to the first stream of collections of object representations may include one or more instruction sets executed at a time of generating the first stream of collections of object representations. The one or more instruction sets that temporally correspond to the first stream of collections of object representations may include one or more instruction sets executed prior to generating the first stream of collections of object representations. The one or more instruction sets that temporally correspond to the first stream of collections of object representations may include one or more instruction sets executed within a threshold period of time prior to generating the first stream of collections of object representations. The one or more instruction sets that temporally correspond to the first stream of collections of object representations may include one or more instruction sets executed subsequent to generating the first stream of collections of object representations. The one or more instruction sets that temporally correspond to the first stream of collections of object representations may include one or more instruction sets executed within a threshold period of time subsequent to generating the first stream of collections of object representations. The one or more instruction sets that temporally correspond to the first stream of collections of object representations may include one or more instruction sets executed within a threshold period of time prior to generating the first stream of collections of object representations and a threshold period of time subsequent to generating the first stream of collections of object representations.

In some embodiments, the first stream of collections of object representations correlated with the first one or more instruction sets for operating the avatar of the application include a unit of knowledge of how the avatar of the application operated in a circumstance. In further embodiments, the first stream of collections of object representations correlated with the first one or more instruction sets for operating the avatar of the application are included in a neuron, a node, a vertex, or an element of a knowledgebase. The knowledgebase may include a neural network, a graph, a collection of sequences, a sequence, a collection of knowledge cells, a knowledge structure, or a data structure. Some of the neurons, nodes, vertices, or elements are interconnected. In further embodiments, the first stream of collections of object representations correlated with the first one or more instruction sets for operating the avatar of the application are structured into a knowledge cell. In further embodiments, the knowledge cell is included in a neuron, a node, a vertex, or an element of a knowledgebase. The knowledgebase may include a neural network, a graph, a collection of sequences, a sequence, a collection of knowledge cells, a knowledge structure, or a data structure. Some of the neurons, nodes, vertices, or elements are interconnected.

In further embodiments, the learning the first stream of collections of object representations correlated with the first one or more instruction sets for operating the avatar of the application includes correlating the first stream of collections of object representations with the first one or more instruction sets for operating the avatar of the application. The correlating the first stream of collections of object representations with the first one or more instruction sets for operating the avatar of the application may include generating a knowledge cell, the knowledge cell comprising the first stream of collections of object representations correlated with the first one or more instruction sets for operating the avatar of the application. The correlating the first stream of collections of object representations with the first one or more instruction sets for operating the avatar of the application may include structuring a unit of knowledge of how the avatar of the application operated in a circumstance. In further embodiments, the learning the first stream of collections of object representations correlated with the first one or more instruction sets for operating the avatar of the application includes learning a user's knowledge, style, or methodology of operating the avatar of the application in a circumstance.

In certain embodiments, the learning the first stream of collections of object representations correlated with the first one or more instruction sets for operating the avatar of the application includes storing the first stream of collections of object representations correlated with the first one or more instruction sets for operating the avatar of the application into the memory unit, the memory unit comprising a plurality of streams of collections of object representations correlated with one or more instruction sets for operating the avatar of the application. In further embodiments, the plurality of streams of collections of object representations correlated with one or more instruction sets for operating the avatar of the application include a neural network, a graph, a collection of sequences, a sequence, a collection of knowledge cells, a knowledgebase, a knowledge structure, or a data structure. In further embodiments, the plurality of streams of collections of object representations correlated with one or more instruction sets for operating the avatar of the application are organized into a neural network, a graph, a collection of sequences, a sequence, a collection of knowledge cells, a knowledgebase, a knowledge structure, or a data structure. In further embodiments, one or more streams of collections of object representations correlated with one or more instruction sets for operating the avatar of the application of the plurality of streams of collections of object representations correlated with one or more instruction sets for operating the avatar of the application are included in one or more neurons, nodes, vertices, or elements of a knowledgebase. The knowledgebase may include a neural network, a graph, a collection of sequences, a sequence, a collection of knowledge cells, a knowledge structure, or a data structure. Some of the neurons, nodes, vertices, or elements are interconnected. In further embodiments, the plurality of streams of collections of object representations correlated with one or more instruction sets for operating the avatar of the application include a user's knowledge, style, or methodology of operating the avatar of the application in circumstances. In further embodiments, the plurality of streams of collections of object representations correlated with one or more instruction sets for operating the avatar of the application are stored on a remote computing device or a remote computing system. In further embodiments, the plurality of streams of collections of object representations correlated with one or more instruction sets for operating the avatar of the application include an artificial intelligence system for knowledge structuring, storing, or representation. The artificial intelligence system for knowledge structuring, storing, or representation may include at least one of: a deep learning system, a supervised learning system, an unsupervised learning system, a neural network, a search-based system, an optimization-based system, a logic-based system, a fuzzy logic-based system, a tree-based system, a graph-based system, a hierarchical system, a symbolic system, a sub-symbolic system, an evolutionary system, a genetic system, a multi-agent system, a deterministic system, a probabilistic system, or a statistical system.

In some embodiments, the anticipating the first one or more instruction sets for operating the avatar of the application correlated with the first stream of collections of object representations based on at least a partial match between the new stream of collections of object representations and the first stream of collections of object representations includes comparing at least one portion of the new stream of collections of object representations with at least one portion of the first stream of collections of object representations. In further embodiments, the at least one portion of the new stream of collections of object representations include at least one collection of object representations, at least one object representation, or at least one object property of the new stream of collections of object representations. In further embodiments, the at least one portion of the first stream of collections of object representations include at least one collection of object representations, at least one object representation, or at least one object property of the first stream of collections of object representations. In further embodiments, the anticipating the first one or more instruction sets for operating the avatar of the application correlated with the first stream of collections of object representations based on at least a partial match between the new stream of collections of object representations and the first stream of collections of object representations includes comparing at least one collection of object representations from the new stream of collections of object representations with at least one collection of object representations from the first stream of collections of object representations. In further embodiments, the comparing at least one collection of object representations from the new stream of collections of object representations with at least one collection of object representations from the first stream of collections of object representations includes comparing at least one object representation of the at least one collection of object representations from the new stream of collections of object representations with at least one object representation of the at least one collection of object representations from the first stream of collections of object representations. The comparing at least one object representation of the at least one collection of object representations from the new stream of collections of object representations with at least one object representation of the at least one collection of object representations from the first stream of collections of object representations may include comparing at least one object property of the at least one object representation of the at least one collection of object representations from the new stream of collections of object representations with at least one object property of the at least one object representation of the at least one collection of object representations from the first stream of collections of object representations. In further embodiments, the anticipating the first one or more instruction sets for operating the avatar of the application correlated with the first stream of collections of object representations based on at least a partial match between the new stream of collections of object representations and the first stream of collections of object representations includes comparing at least one object representation of the at least one collection of object representations from the new stream of collections of object representations with at least one object representation of the at least one collection of object representations from the first stream of collections of object representations. In further embodiments, the anticipating the first one or more instruction sets for operating the avatar of the application correlated with the first stream of collections of object representations based on at least a partial match between the new stream of collections of object representations and the first stream of collections of object representations includes comparing at least one object property of at least one object representation of at least one collection of object representations from the new stream of collections of object representations with at least one object property of at least one object representation of at least one collection of object representations from the first stream of collections of object representations.

In certain embodiments, the anticipating the first one or more instruction sets for operating the avatar of the application correlated with the first stream of collections of object representations based on at least a partial match between the new stream of collections of object representations and the first stream of collections of object representations includes determining that there is at least a partial match between the new stream of collections of object representations and the first stream of collections of object representations. In further embodiments, the determining that there is at least a partial match between the new stream of collections of object representations and the first stream of collections of object representations includes determining that there is at least a partial match between one or more portions of the new stream of collections of object representations and one or more portions of the first stream of collections of object representations. In further embodiments, the determining that there is at least a partial match between the new stream of collections of object representations and the first stream of collections of object representations includes determining that a similarity between at least one portion of the new stream of collections of object representations and at least one portion of the first stream of collections of object representations exceeds a similarity threshold. In further embodiments, the determining that there is at least a partial match between the new stream of collections of object representations and the first stream of collections of object representations includes determining a substantial similarity between at least one portion of the new stream of collections of object representations and at least one portion of the first stream of collections of object representations. The substantial similarity may be achieved when a similarity between the at least one portion of the new stream of collections of object representations and the at least one portion of the first stream of collections of object representations exceeds a similarity threshold. The substantial similarity may be achieved when a number or a percentage of matching or partially matching portions of the new stream of collections of object representations and portions of the first stream of collections of object representations exceeds a threshold number or threshold percentage. In further embodiments, the determining that there is at least a partial match between the new stream of collections of object representations and the first stream of collections of object representations includes determining that a number or a percentage of matching or partially matching collections of object representations from the new stream of collections of object representations and from the first stream of collections of object representations exceeds a threshold number or threshold percentage. The matching or partially matching collections of object representations from the new stream of collections of object representations and from the first stream of collections of object representations may be determined factoring in at least one of: an importance of a collection of object representations, an order of a collection of object representations, a threshold for a similarity in a collection of object representations, or a threshold for a difference in a collection of object representations. In further embodiments, the determining that there is at least a partial match between the new stream of collections of object representations and the first stream of collections of object representations includes determining that a number or a percentage of matching or partially matching object representations from the new stream of collections of object representations and from the first stream of collections of object representations exceeds a threshold number or threshold percentage. The matching or partially matching object representations from the new stream of collections of object representations and from the first stream of collections of object representations may be determined factoring in at least one of: an association of an object representation with a collection of object representations, a type of an object representation, an importance of an object representation, a threshold for a similarity in an object representation, or a threshold for a difference in an object representation. In further embodiments, the determining that there is at least a partial match between the new stream of collections of object representations and the first stream of collections of object representations includes determining that a number or a percentage of matching or partially matching object properties from the new stream of collections of object representations and from the first stream of collections of object representations exceeds a threshold number or threshold percentage. The matching or partially matching object properties from the new stream of collections of object representations and from the first stream of collections of object representations may be determined factoring in at least one of: an association of an object property with an object representation, an association of an object property with a collection of object representations, a category of an object property, an importance of an object property, a threshold for a similarity in an object property, or a threshold for a difference in an object property. In further embodiments, the determining that there is at least a partial match between the new stream of collections of object representations and the first stream of collections of object representations includes determining that there is at least a partial match between at least one collection of object representations from the new stream of collections of object representations and at least one collection of object representations from the first stream of collections of object representations. The determining that there is at least a partial match between at least one collection of object representations from the new stream of collections of object representations and at least one collection of object representations from the first stream of collections of object representations may include determining that there is at least a partial match between at least one object representation of the at least one collection of object representations from the new stream of collections of object representations and at least one object representation of the at least one collection of object representations from the first stream of collections of object representations. The determining that there is at least a partial match between at least one object representation of the at least one collection of object representations from the new stream of collections of object representations and at least one object representation of the at least one collection of object representations from the first stream of collections of object representations may include determining that there is at least a partial match between at least one object property of the at least one object representation of the at least one collection of object representations from the new stream of collections of object representations and at least one object property of the at least one object representation of the at least one collection of object representations from the first stream of collections of object representations.

In some embodiments, the causing the processor circuit to execute the first one or more instruction sets for operating the avatar of the application correlated with the first stream of collections of object representations includes causing the processor circuit to execute the first one or more instruction sets for operating the avatar of the application correlated with the first stream of collections of object representations instead of or prior to an instruction set that would have been executed next. In further embodiments, the causing the processor circuit to execute the first one or more instruction sets for operating the avatar of the application correlated with the first stream of collections of object representations includes modifying one or more instruction sets of the processor circuit. In further embodiments, the causing the processor circuit to execute the first one or more instruction sets for operating the avatar of the application correlated with the first stream of collections of object representations includes modifying a register or an element of the processor circuit. In further embodiments, the causing the processor circuit to execute the first one or more instruction sets for operating the avatar of the application correlated with the first stream of collections of object representations includes inserting the first one or more instruction sets for operating the avatar of the application correlated with the first stream of collections of object representations into a register or an element of the processor circuit. In further embodiments, the causing the processor circuit to execute the first one or more instruction sets for operating the avatar of the application correlated with the first stream of collections of object representations includes redirecting the processor circuit to the first one or more instruction sets for operating the avatar of the application correlated with the first stream of collections of object representations. In further embodiments, the causing the processor circuit to execute the first one or more instruction sets for operating the avatar of the application correlated with the first stream of collections of object representations includes redirecting the processor circuit to one or more alternate instruction sets, the alternate instruction sets comprising the first one or more instruction sets for operating the avatar of the application correlated with the first stream of collections of object representations. In further embodiments, the causing the processor circuit to execute the first one or more instruction sets for operating the avatar of the application correlated with the first stream of collections of object representations includes transmitting, to the processor circuit for execution, the first one or more instruction sets for operating the avatar of the application correlated with the first stream of collections of object representations. In further embodiments, the causing the processor circuit to execute the first one or more instruction sets for operating the avatar of the application correlated with the first stream of collections of object representations includes issuing an interrupt to the processor circuit and executing the first one or more instruction sets for operating the avatar of the application correlated with the first stream of collections of object representations following the interrupt. In further embodiments, the causing the processor circuit to execute the first one or more instruction sets for operating the avatar of the application correlated with the first stream of collections of object representations includes causing the application to execute the first one or more instruction sets for operating the avatar of the application correlated with the first stream of collections of object representations. In further embodiments, the causing the processor circuit to execute the first one or more instruction sets for operating the avatar of the application correlated with the first stream of collections of object representations includes modifying one or more instruction sets of the application. In further embodiments, the causing the processor circuit to execute the first one or more instruction sets for operating the avatar of the application correlated with the first stream of collections of object representations includes modifying the application. In further embodiments, the causing the processor circuit to execute the first one or more instruction sets for operating the avatar of the application correlated with the first stream of collections of object representations includes redirecting the application to the first one or more instruction sets for operating the avatar of the application correlated with the first stream of collections of object representations. In further embodiments, the causing the processor circuit to execute the first one or more instruction sets for operating the avatar of the application correlated with the first stream of collections of object representations includes redirecting the application to one or more alternate instruction sets, the alternate instruction sets comprising the first one or more instruction sets for operating the avatar of the application correlated with the first stream of collections of object representations. In further embodiments, the causing the processor circuit to execute the first one or more instruction sets for operating the avatar of the application correlated with the first stream of collections of object representations includes causing the avatar of the application to execute the first one or more instruction sets for operating the avatar of the application correlated with the first stream of collections of object representations. In further embodiments, the causing the processor circuit to execute the first one or more instruction sets for operating the avatar of the application correlated with the first stream of collections of object representations includes modifying one or more instruction sets of the avatar of the application. In further embodiments, the causing the processor circuit to execute the first one or more instruction sets for operating the avatar of the application correlated with the first stream of collections of object representations includes modifying the avatar of the application. In further embodiments, the causing the processor circuit to execute the first one or more instruction sets for operating the avatar of the application correlated with the first stream of collections of object representations includes redirecting the avatar of the application to the first one or more instruction sets for operating the avatar of the application correlated with the first stream of collections of object representations. In further embodiments, the causing the processor circuit to execute the first one or more instruction sets for operating the avatar of the application correlated with the first stream of collections of object representations includes redirecting the avatar of the application to one or more alternate instruction sets, the alternate instruction sets comprising the first one or more instruction sets for operating the avatar of the application correlated with the first stream of collections of object representations. In further embodiments, the causing the processor circuit to execute the first one or more instruction sets for operating the avatar of the application correlated with the first stream of collections of object representations includes modifying a source code, a bytecode, an intermediate code, a compiled code, an interpreted code, a translated code, a runtime code, an assembly code, or a machine code. In further embodiments, the causing the processor circuit to execute the first one or more instruction sets for operating the avatar of the application correlated with the first stream of collections of object representations includes modifying at least one of: the memory unit, a register of the processor circuit, a storage, or a repository where instruction sets are stored or used. In further embodiments, the causing the processor circuit to execute the first one or more instruction sets for operating the avatar of the application correlated with the first stream of collections of object representations includes modifying at least one of: an element of the processor circuit, an element of the application, an element of the avatar of the application, a virtual machine, a runtime engine, an operating system, an execution stack, a program counter, or a user input. In further embodiments, the causing the processor circuit to execute the first one or more instruction sets for operating the avatar of the application correlated with the first stream of collections of object representations includes modifying one or more instruction sets at a source code write time, a compile time, an interpretation time, a translation time, a linking time, a loading time, or a runtime. In further embodiments, the causing the processor circuit to execute the first one or more instruction sets for operating the avatar of the application correlated with the first stream of collections of object representations includes modifying one or more code segments, lines of code, statements, instructions, functions, routines, subroutines, or basic blocks. In further embodiments, the causing the processor circuit to execute the first one or more instruction sets for operating the avatar of the application correlated with the first stream of collections of object representations includes a manual, an automatic, a dynamic, or a just in time (JIT) instrumentation of the application. In further embodiments, the causing the processor circuit to execute the first one or more instruction sets for operating the avatar of the application correlated with the first stream of collections of object representations includes a manual, an automatic, a dynamic, or a just in time (JIT) instrumentation of the avatar of the application. In further embodiments, the causing the processor circuit to execute the first one or more instruction sets for operating the avatar of the application correlated with the first stream of collections of object representations includes utilizing one or more of a .NET tool, a .NET application programming interface (API), a Java tool, a Java API, an operating system tool, or an independent tool for modifying instruction sets. In further embodiments, the causing the processor circuit to execute the first one or more instruction sets for operating the avatar of the application correlated with the first stream of collections of object representations includes utilizing at least one of: a dynamic, an interpreted, or a scripting programming language. In further embodiments, the causing the processor circuit to execute the first one or more instruction sets for operating the avatar of the application correlated with the first stream of collections of object representations includes utilizing at least one of: a dynamic code, a dynamic class loading, or a reflection. In further embodiments, the causing the processor circuit to execute the first one or more instruction sets for operating the avatar of the application correlated with the first stream of collections of object representations includes utilizing an assembly language. In further embodiments, the causing the processor circuit to execute the first one or more instruction sets for operating the avatar of the application correlated with the first stream of collections of object representations includes utilizing at least one of: a metaprogramming, a self-modifying code, or an instruction set modification tool. In further embodiments, the causing the processor circuit to execute the first one or more instruction sets for operating the avatar of the application correlated with the first stream of collections of object representations includes utilizing at least one of: just in time (JIT) compiling, JIT interpretation, JIT translation, dynamic recompiling, or binary rewriting. In further embodiments, the causing the processor circuit to execute the first one or more instruction sets for operating the avatar of the application correlated with the first stream of collections of object representations includes utilizing at least one of: a dynamic expression creation, a dynamic expression execution, a dynamic function creation, or a dynamic function execution. In further embodiments, the causing the processor circuit to execute the first one or more instruction sets for operating the avatar of the application correlated with the first stream of collections of object representations includes adding or inserting additional code into a code of the application. In further embodiments, the causing the processor circuit to execute the first one or more instruction sets for operating the avatar of the application correlated with the first stream of collections of object representations includes at least one of: modifying, removing, rewriting, or overwriting a code of the application. In further embodiments, the causing the processor circuit to execute the first one or more instruction sets for operating the avatar of the application correlated with the first stream of collections of object representations includes at least one of: branching, redirecting, extending, or hot swapping a code of the application. In further embodiments, the causing the processor circuit to execute the first one or more instruction sets for operating the avatar of the application correlated with the first stream of collections of object representations includes adding or inserting additional code into a code of the avatar of the application. In further embodiments, the causing the processor circuit to execute the first one or more instruction sets for operating the avatar of the application correlated with the first stream of collections of object representations includes at least one of: modifying, removing, rewriting, or overwriting a code of the avatar of the application. In further embodiments, the causing the processor circuit to execute the first one or more instruction sets for operating the avatar of the application correlated with the first stream of collections of object representations includes at least one of: branching, redirecting, extending, or hot swapping a code of the avatar of the application. In further embodiments, the causing the processor circuit to execute the first one or more instruction sets for operating the avatar of the application correlated with the first stream of collections of object representations includes implementing a user's knowledge, style, or methodology of operating the avatar of the application in a circumstance. In further embodiments, the system further comprises: an interface configured to cause execution of instruction sets, wherein the executing the first one or more instruction sets for operating the avatar of the application correlated with the first stream of collections of object representations by the processor circuit is caused by the interface. The interface may include a modification interface.

In certain embodiments, the avatar's performing the one or more operations defined by the first one or more instruction sets for operating the avatar of the application correlated with the first stream of collections of object representations includes implementing a user's knowledge, style, or methodology of operating the avatar of the application in a circumstance.

In some embodiments, the artificial intelligence unit is further configured to: receive at least one extra information. In further embodiments, the at least one extra information include one or more of: a time information, a location information, a computed information, a visual information, an acoustic information, or a contextual information. In further embodiments, the at least one extra information include one or more of: an information on the avatar of the application, an information on the avatar's circumstance, an information on an object, an information on an object representation, an information on a collection of object representations, an information on a stream of collections of object representations, an information on an instruction set, an information on the application, an information on the processor circuit, or an information on a user. In further embodiments, the artificial intelligence unit is further configured to: learn the first stream of collections of object representations correlated with the at least one extra information. The learning the first stream of collections of object representations correlated with at least one extra information may include correlating the first stream of collections of object representations with the at least one extra information. The learning the first stream of collections of object representations correlated with at least one extra information may include storing the first stream of collections of object representations correlated with the at least one extra information into the memory unit. In further embodiments, the anticipating the first one or more instruction sets for operating the avatar of the application correlated with the first stream of collections of object representations based on at least a partial match between the new stream of collections of object representations and the first stream of collections of object representations includes anticipating the first one or more instruction sets for operating the avatar of the application correlated with the first stream of collections of object representations based on at least a partial match between an extra information correlated with the new stream of collections of object representations and an extra information correlated with the first stream of collections of object representations. The anticipating the first one or more instruction sets for operating the avatar of the application correlated with the first stream of collections of object representations based on at least a partial match between an extra information correlated with the new stream of collections of object representations and an extra information correlated with the first stream of collections of object representations may include comparing an extra information correlated with the new stream of collections of object representations and an extra information correlated with the first stream of collections of object representations. The anticipating the first one or more instruction sets for operating the avatar of the application correlated with the first stream of collections of object representations based on at least a partial match between an extra information correlated with the new stream of collections of object representations and an extra information correlated with the first stream of collections of object representations may include determining that a similarity between an extra information correlated with the new stream of collections of object representations and an extra information correlated with the first stream of collections of object representations exceeds a similarity threshold.

In certain embodiments, the system further comprises: a user interface, wherein the artificial intelligence unit is further configured to: cause the user interface to present a user with an option to execute the first one or more instruction sets for operating the avatar of the application correlated with the first stream of collections of object representations. In further embodiments, the system further comprises: a user interface, wherein the artificial intelligence unit is further configured to: receive, via the user interface, a user's selection to execute the first one or more instruction sets for operating the avatar of the application correlated with the first stream of collections of object representations. In further embodiments, the artificial intelligence unit is further configured to: rate the executed first one or more instruction sets for operating the avatar of the application correlated with the first stream of collections of object representations. The rating the executed first one or more instruction sets for operating the avatar of the application correlated with the first stream of collections of object representations may include causing a user interface to display the executed first one or more instruction sets for operating the avatar of the application correlated with the first stream of collections of object representations along with one or more rating values as options to be selected by a user. The rating the executed first one or more instruction sets for operating the avatar of the application correlated with the first stream of collections of object representations may include rating the executed first one or more instruction sets for operating the avatar of the application correlated with the first stream of collections of object representations without a user input. In further embodiments, the system further comprises: a user interface, wherein the artificial intelligence unit is further configured to: cause the user interface to present a user with an option to cancel the execution of the executed first one or more instruction sets for operating the avatar of the application correlated with the first stream of collections of object representations. In further embodiments, the canceling the execution of the executed first one or more instruction sets for operating the avatar of the application correlated with the first stream of collections of object representations includes restoring the processor circuit, the application, or the avatar of the application to a prior state. The restoring the processor circuit, the application, or the avatar of the application to a prior state may include saving the state of the processor circuit, the application, or the avatar of the application prior to executing the first one or more instruction sets for operating the avatar of the application correlated with the first stream of collections of object representations.

In some embodiments, the system further comprises: an input device configured to receive a user's operating directions, the user's operating directions for instructing the processor circuit, the application, or the avatar of the application on how to operate the avatar of the application.

In certain embodiments, the autonomous avatar operating includes a partially or a fully autonomous avatar operating. The partially autonomous avatar operating may include executing the first one or more instruction sets for operating the avatar of the application correlated with the first stream of collections of object representations responsive to a user confirmation. The fully autonomous avatar operating may include executing the first one or more instruction sets for operating the avatar of the application correlated with the first stream of collections of object representations without a user confirmation.

In some embodiments, the artificial intelligence unit is further configured to: receive a second stream of collections of object representations, the second stream of collections of object representations including one or more object representations representing one or more objects of the application; receive a second one or more instruction sets for operating the avatar of the application; and learn the second stream of collections of object representations correlated with the second one or more instruction sets for operating the avatar of the application. In further embodiments, the second stream of collections of object representations includes one or more collections of object representations, and wherein each collection of object representations of the second stream of collections of object representations includes one or more object representations. In further embodiments, the second stream of collections of object representations is received over a second time period. In further embodiments, the second stream of collections of object representations includes a unit of knowledge of the avatar's circumstance over a second time period. In further embodiments, the second stream of collections of object representations includes or is associated with a time stamp, an order, or a time related information. In further embodiments, the learning the first stream of collections of object representations correlated with the first one or more instruction sets for operating the avatar of the application and the learning the second stream of collections of object representations correlated with the second one or more instruction sets for operating the avatar of the application include creating a connection between the first stream of collections of object representations correlated with the first one or more instruction sets for operating the avatar of the application and the second stream of collections of object representations correlated with the second one or more instruction sets for operating the avatar of the application. The connection may include or is associated with at least one of: an occurrence count, a weight, a parameter, or a data. In further embodiments, the learning the first stream of collections of object representations correlated with the first one or more instruction sets for operating the avatar of the application and the learning the second stream of collections of object representations correlated with the second one or more instruction sets for operating the avatar of the application include updating a connection between the first stream of collections of object representations correlated with the first one or more instruction sets for operating the avatar of the application and the second stream of collections of object representations correlated with the second one or more instruction sets for operating the avatar of the application. In further embodiments, the updating the connection between the first stream of collections of object representations correlated with the first one or more instruction sets for operating the avatar of the application and the second stream of collections of object representations correlated with the second one or more instruction sets for operating the avatar of the application includes updating at least one of: an occurrence count, a weight, a parameter, or a data included in or associated with the connection. In further embodiments, the learning the first stream of collections of object representations correlated with the first one or more instruction sets for operating the avatar of the application includes storing the first stream of collections of object representations correlated with the first one or more instruction sets for operating the avatar of the application into a first node of a knowledgebase, and wherein the learning the second stream of collections of object representations correlated with the second one or more instruction sets for operating the avatar of the application includes storing the second stream of collections of object representations correlated with the second one or more instruction sets for operating the avatar of the application into a second node of the knowledgebase. The knowledgebase may include a neural network, a graph, a collection of sequences, a sequence, a collection of knowledge cells, a knowledge structure, or a data structure. The knowledgebase may be stored in the memory unit. The learning the first stream of collections of object representations correlated with the first one or more instruction sets for operating the avatar of the application and the learning the second stream of collections of object representations correlated with the second one or more instruction sets for operating the avatar of the application may include creating a connection between the first node and the second node. The learning the first stream of collections of object representations correlated with the first one or more instruction sets for operating the avatar of the application and the learning the second stream of collections of object representations correlated with the second one or more instruction sets for operating the avatar of the application may include updating a connection between the first node and the second node. In further embodiments, the first stream of collections of object representations correlated with the first one or more instruction sets for operating the avatar of the application is stored into a first node of a neural network and the second stream of collections of object representations correlated with the second one or more instruction sets for operating the avatar of the application is stored into a second node of the neural network. The first node and the second node may be connected by a connection. The first node may be part of a first layer of the neural network and the second node may be part of a second layer of the neural network. In further embodiments, the first stream of collections of object representations correlated with the first one or more instruction sets for operating the avatar of the application is stored into a first node of a graph and the second stream of collections of object representations correlated with the second one or more instruction sets for operating the avatar of the application is stored into a second node of the graph. The first node and the second node may be connected by a connection. In further embodiments, the first stream of collections of object representations correlated with the first one or more instruction sets for operating the avatar of the application is stored into a first node of a sequence and the second stream of collections of object representations correlated with the second one or more instruction sets for operating the avatar of the application is stored into a second node of the sequence.

In some aspects, the disclosure relates to a non-transitory computer storage medium having a computer program stored thereon, the program including instructions that when executed by one or more processor circuits cause the one or more processor circuits to perform operations comprising: receiving a first stream of collections of object representations, the first stream of collections of object representations including one or more object representations representing one or more objects of an application. The operations may further comprise: receiving a first one or more instruction sets for operating an avatar of the application. The operations may further comprise: learning the first stream of collections of object representations correlated with the first one or more instruction sets for operating the avatar of the application. The operations may further comprise: receiving a new stream of collections of object representations, the new stream of collections of object representations including one or more object representations representing one or more objects of the application. The operations may further comprise: anticipating the first one or more instruction sets for operating the avatar of the application correlated with the first stream of collections of object representations based on at least a partial match between the new stream of collections of object representations and the first stream of collections of object representations. The operations may further comprise: causing an execution of the first one or more instruction sets for operating the avatar of the application correlated with the first stream of collections of object representations, the causing performed in response to the anticipating the first one or more instruction sets for operating the avatar of the application correlated with the first stream of collections of object representations based on at least a partial match between the new stream of collections of object representations and the first stream of collections of object representations, wherein the avatar of the application performs one or more operations defined by the first one or more instruction sets for operating the avatar of the application correlated with the first stream of collections of object representations.

In certain embodiments, the receiving the first one or more instruction sets for operating the avatar of the application includes receiving the first one or more instruction sets for operating the avatar of the application from the one or more processor circuits or from another one or more processor circuits. In further embodiments, the execution of the first one or more instruction sets for operating the avatar of the application correlated with the first stream of collections of object representations is performed by the one or more processor circuits or by another one or more processor circuits.

In some aspects, the disclosure relates to a method comprising: (a) receiving a first stream of collections of object representations by a processor circuit, the first stream of collections of object representations including one or more object representations representing one or more objects of an application. The method may further comprise: (b) receiving a first one or more instruction sets for operating an avatar of the application by the processor circuit. The method may further comprise: (c) learning the first stream of collections of object representations correlated with the first one or more instruction sets for operating the avatar of the application, the learning of (c) performed by the processor circuit. The method may further comprise: (d) receiving a new stream of collections of object representations by the processor circuit, the new stream of collections of object representations including one or more object representations representing one or more objects of the application. The method may further comprise: (e) anticipating the first one or more instruction sets for operating the avatar of the application correlated with the first stream of collections of object representations based on at least a partial match between the new stream of collections of object representations and the first stream of collections of object representations, the anticipating of (e) performed by the processor circuit. The method may further comprise: (f) executing the first one or more instruction sets for operating the avatar of the application correlated with the first stream of collections of object representations, the executing of (f) performed in response to the anticipating of (e). The method may further comprise: (g) performing, by the avatar of the application, one or more operations defined by the first one or more instruction sets for operating the avatar of the application correlated with the first stream of collections of object representations.

In some embodiments, the receiving of (b) includes receiving the first one or more instruction sets for operating the avatar of the application from the processor circuit or from another processor circuit. In further embodiments, the executing of (f) is performed by the processor circuit or by another processor circuit.

The aforementioned system, the non-transitory computer storage medium, and/or the method may include any elements, operations, steps, and embodiments of the above described systems, non-transitory computer storage media, and/or methods as applicable as well as the following embodiments.

In certain embodiments, the learning the first stream of collections of object representations correlated with the first one or more instruction sets for operating the avatar of the application includes storing the first stream of collections of object representations correlated with the first one or more instruction sets for operating the avatar of the application into the memory unit, the memory unit comprising a plurality of streams of collections of object representations correlated with one or more instruction sets for operating the avatar of the application.

In some embodiments, the executing the first one or more instruction sets for operating the avatar of the application correlated with the first stream of collections of object representations includes executing the first one or more instruction sets for operating the avatar of the application correlated with the first stream of collections of object representations instead of or prior to an instruction set that would have been executed next. In further embodiments, the executing the first one or more instruction sets for operating the avatar of the application correlated with the first stream of collections of object representations includes modifying one or more instruction sets of a processor circuit. In further embodiments, the executing the first one or more instruction sets for operating the avatar of the application correlated with the first stream of collections of object representations includes modifying a register or an element of a processor circuit. In further embodiments, the executing the first one or more instruction sets for operating the avatar of the application correlated with the first stream of collections of object representations includes inserting the first one or more instruction sets for operating the avatar of the application correlated with the first stream of collections of object representations into a register or an element of a processor circuit. In further embodiments, the executing the first one or more instruction sets for operating the avatar of the application correlated with the first stream of collections of object representations includes redirecting a processor circuit to the first one or more instruction sets for operating the avatar of the application correlated with the first stream of collections of object representations. In further embodiments, the executing the first one or more instruction sets for operating the avatar of the application correlated with the first stream of collections of object representations includes redirecting a processor circuit to one or more alternate instruction sets, the alternate instruction sets comprising the first one or more instruction sets for operating the avatar of the application correlated with the first stream of collections of object representations. In further embodiments, the executing the first one or more instruction sets for operating the avatar of the application correlated with the first stream of collections of object representations includes transmitting, to a processor circuit for execution, the first one or more instruction sets for operating the avatar of the application correlated with the first stream of collections of object representations. In further embodiments, the executing the first one or more instruction sets for operating the avatar of the application correlated with the first stream of collections of object representations includes issuing an interrupt to a processor circuit and executing the first one or more instruction sets for operating the avatar of the application correlated with the first stream of collections of object representations following the interrupt. In further embodiments, the executing the first one or more instruction sets for operating the avatar of the application correlated with the first stream of collections of object representations includes causing the application to execute the first one or more instruction sets for operating the avatar of the application correlated with the first stream of collections of object representations. In further embodiments, the executing the first one or more instruction sets for operating the avatar of the application correlated with the first stream of collections of object representations includes modifying one or more instruction sets of the application. In further embodiments, the executing the first one or more instruction sets for operating the avatar of the application correlated with the first stream of collections of object representations includes modifying the application. In further embodiments, the executing the first one or more instruction sets for operating the avatar of the application correlated with the first stream of collections of object representations includes redirecting the application to the first one or more instruction sets for operating the avatar of the application correlated with the first stream of collections of object representations. In further embodiments, the executing the first one or more instruction sets for operating the avatar of the application correlated with the first stream of collections of object representations includes redirecting the application to one or more alternate instruction sets, the alternate instruction sets comprising the first one or more instruction sets for operating the avatar of the application correlated with the first stream of collections of object representations. In further embodiments, the executing the first one or more instruction sets for operating the avatar of the application correlated with the first stream of collections of object representations includes causing the avatar of the application to execute the first one or more instruction sets for operating the avatar of the application correlated with the first stream of collections of object representations. In further embodiments, the executing the first one or more instruction sets for operating the avatar of the application correlated with the first stream of collections of object representations includes modifying one or more instruction sets of the avatar of the application. In further embodiments, the executing the first one or more instruction sets for operating the avatar of the application correlated with the first stream of collections of object representations includes modifying the avatar of the application. In further embodiments, the executing the first one or more instruction sets for operating the avatar of the application correlated with the first stream of collections of object representations includes redirecting the avatar of the application to the first one or more instruction sets for operating the avatar of the application correlated with the first stream of collections of object representations. In further embodiments, the executing the first one or more instruction sets for operating the avatar of the application correlated with the first stream of collections of object representations includes redirecting the avatar of the application to one or more alternate instruction sets, the alternate instruction sets comprising the first one or more instruction sets for operating the avatar of the application correlated with the first stream of collections of object representations. In further embodiments, the executing the first one or more instruction sets for operating the avatar of the application correlated with the first stream of collections of object representations includes modifying a source code, a bytecode, an intermediate code, a compiled code, an interpreted code, a translated code, a runtime code, an assembly code, or a machine code. In further embodiments, the executing the first one or more instruction sets for operating the avatar of the application correlated with the first stream of collections of object representations includes modifying at least one of: a memory unit, a register of a processor circuit, a storage, or a repository where instruction sets are stored or used. In further embodiments, the executing the first one or more instruction sets for operating the avatar of the application correlated with the first stream of collections of object representations includes modifying at least one of: an element of a processor circuit, an element of the application, an element of the avatar of the application, a virtual machine, a runtime engine, an operating system, an execution stack, a program counter, or a user input. In further embodiments, the executing the first one or more instruction sets for operating the avatar of the application correlated with the first stream of collections of object representations includes modifying one or more instruction sets at a source code write time, a compile time, an interpretation time, a translation time, a linking time, a loading time, or a runtime. In further embodiments, the executing the first one or more instruction sets for operating the avatar of the application correlated with the first stream of collections of object representations includes modifying one or more code segments, lines of code, statements, instructions, functions, routines, subroutines, or basic blocks. In further embodiments, the executing the first one or more instruction sets for operating the avatar of the application correlated with the first stream of collections of object representations includes a manual, an automatic, a dynamic, or a just in time (JIT) instrumentation of the application. In further embodiments, the executing the first one or more instruction sets for operating the avatar of the application correlated with the first stream of collections of object representations includes a manual, an automatic, a dynamic, or a just in time (JIT) instrumentation of the avatar of the application. In further embodiments, the executing the first one or more instruction sets for operating the avatar of the application correlated with the first stream of collections of object representations includes utilizing one or more of a .NET tool, a .NET application programming interface (API), a Java tool, a Java API, an operating system tool, or an independent tool for modifying instruction sets. In further embodiments, the executing the first one or more instruction sets for operating the avatar of the application correlated with the first stream of collections of object representations includes utilizing at least one of: a dynamic, an interpreted, or a scripting programming language. In further embodiments, the executing the first one or more instruction sets for operating the avatar of the application correlated with the first stream of collections of object representations includes utilizing at least one of: a dynamic code, a dynamic class loading, or a reflection. In further embodiments, the executing the first one or more instruction sets for operating the avatar of the application correlated with the first stream of collections of object representations includes utilizing an assembly language. In further embodiments, the executing the first one or more instruction sets for operating the avatar of the application correlated with the first stream of collections of object representations includes utilizing at least one of: a metaprogramming, a self-modifying code, or an instruction set modification tool. In further embodiments, the executing the first one or more instruction sets for operating the avatar of the application correlated with the first stream of collections of object representations includes utilizing at least one of: just in time (JIT) compiling, JIT interpretation, JIT translation, dynamic recompiling, or binary rewriting. In further embodiments, the executing the first one or more instruction sets for operating the avatar of the application correlated with the first stream of collections of object representations includes utilizing at least one of: a dynamic expression creation, a dynamic expression execution, a dynamic function creation, or a dynamic function execution. In further embodiments, the executing the first one or more instruction sets for operating the avatar of the application correlated with the first stream of collections of object representations includes adding or inserting additional code into a code of the application. In further embodiments, the executing the first one or more instruction sets for operating the avatar of the application correlated with the first stream of collections of object representations includes at least one of: modifying, removing, rewriting, or overwriting a code of the application. In further embodiments, the executing the first one or more instruction sets for operating the avatar of the application correlated with the first stream of collections of object representations includes at least one of: branching, redirecting, extending, or hot swapping a code of the application. In further embodiments, the executing the first one or more instruction sets for operating the avatar of the application correlated with the first stream of collections of object representations includes adding or inserting additional code into a code of the avatar of the application. In further embodiments, the executing the first one or more instruction sets for operating the avatar of the application correlated with the first stream of collections of object representations includes at least one of: modifying, removing, rewriting, or overwriting a code of the avatar of the application. In further embodiments, the executing the first one or more instruction sets for operating the avatar of the application correlated with the first stream of collections of object representations includes at least one of: branching, redirecting, extending, or hot swapping a code of the avatar of the application. In further embodiments, the executing the first one or more instruction sets for operating the avatar of the application correlated with the first stream of collections of object representations includes implementing a user's knowledge, style, or methodology of operating the avatar of the application in a circumstance. In further embodiments, the executing the first one or more instruction sets for operating the avatar of the application correlated with the first stream of collections of object representations includes executing the first one or more instruction sets for operating the avatar of the application correlated with the first stream of collections of object representations via an interface. The interface may include a modification interface.

In certain embodiments, the operations of the non-transitory computer storage medium and/or the method further comprise: receiving at least one extra information. In some embodiments, the operations of the non-transitory computer storage medium and/or the method further comprise: learning the first stream of collections of object representations correlated with the at least one extra information. In certain embodiments, the operations of the non-transitory computer storage medium and/or the method further comprise: presenting, via a user interface, a user with an option to execute the first one or more instruction sets for operating the avatar of the application correlated with the first stream of collections of object representations. In some embodiments, the operations of the non-transitory computer storage medium and/or the method further comprise: receiving, via a user interface, a user's selection to execute the first one or more instruction sets for operating the avatar of the application correlated with the first stream of collections of object representations. In certain embodiments, the operations of the non-transitory computer storage medium and/or the method further comprise: rating the executed first one or more instruction sets for operating the avatar of the application correlated with the first stream of collections of object representations. In some embodiments, the operations of the non-transitory computer storage medium and/or the method further comprise: presenting, via a user interface, a user with an option to cancel the execution of the executed first one or more instruction sets for operating the avatar of the application correlated with the first stream of collections of object representations. In certain embodiments, the operations of the non-transitory computer storage medium and/or the method further comprise: receiving, via an input device, a user's operating directions, the user's operating directions for instructing the processor circuit, the application, or the avatar of the application on how to operate the avatar of the application. In some embodiments, the operations of the non-transitory computer storage medium and/or the method further comprise: receiving a second stream of collections of object representations, the second stream of collections of object representations including one or more object representations representing one or more objects of the application; receiving a second one or more instruction sets for operating the avatar of the application; and learning the second stream of collections of object representations correlated with the second one or more instruction sets for operating the avatar of the application.

The aforementioned system, the non-transitory computer storage medium, and/or the method may include any elements, operations, steps, and embodiments of the above described systems, non-transitory computer storage media, and/or methods as applicable as well as the following embodiments.

In some aspects, the disclosure relates to a system for learning an avatar's circumstances for autonomous avatar operating. The system may be implemented at least in part on one or more computing devices. In some embodiments, the system comprises: a processor circuit configured to execute instruction sets of an application. The system may further comprise: a memory unit configured to store data. The system may further comprise: an artificial intelligence unit. The artificial intelligence unit may be configured to: receive a first stream of collections of object representations, the first stream of collections of object representations including one or more object representations representing one or more objects of the application. The artificial intelligence unit may be further configured to: receive a first one or more instruction sets for operating an avatar of the application. The artificial intelligence unit may be further configured to: learn the first stream of collections of object representations correlated with the first one or more instruction sets for operating the avatar of the application.

In some aspects, the disclosure relates to a non-transitory computer storage medium having a computer program stored thereon, the program including instructions that when executed by one or more processor circuits cause the one or more processor circuits to perform operations comprising: receiving a first stream of collections of object representations, the first stream of collections of object representations including one or more object representations representing one or more objects of an application. The operations may further comprise: receiving a first one or more instruction sets for operating an avatar of the application. The operations may further comprise: learning the first stream of collections of object representations correlated with the first one or more instruction sets for operating the avatar of the application.

In some aspects, the disclosure relates to a method comprising: (a) receiving a first stream of collections of object representations by a processor circuit, the first stream of collections of object representations including one or more object representations representing one or more objects of an application. The method may further comprise: (b) receiving a first one or more instruction sets for operating an avatar of the application by the processor circuit. The method may further comprise: (c) learning the first stream of collections of object representations correlated with the first one or more instruction sets for operating the avatar of the application, the learning of (c) performed by the processor circuit.

The aforementioned system, the non-transitory computer storage medium, and/or the method may include any elements, operations, steps, and embodiments of the above described systems, non-transitory computer storage media, and/or methods as applicable as well as the following embodiments.

In some aspects, the disclosure relates to a system for using an avatar's circumstances for autonomous avatar operating. The system may be implemented at least in part on one or more computing devices. In some embodiments, the system comprises: a processor circuit configured to execute instruction sets of an application. The system may further comprise: a memory unit configured to store data. The system may further comprise: an artificial intelligence unit. The artificial intelligence unit may be configured to: access the memory unit that comprises a plurality of streams of collections of object representations correlated with one or more instruction sets for operating an avatar of the application, the plurality of streams of collections of object representations correlated with one or more instruction sets for operating the avatar of the application including a first stream of collections of object representations correlated with a first one or more instruction sets for operating the avatar of the application. The artificial intelligence unit may be further configured to: receive a new stream of collections of object representations, the new stream of collections of object representations including one or more object representations representing one or more objects of the application. The artificial intelligence unit may be further configured to: anticipate the first one or more instruction sets for operating the avatar of the application correlated with the first stream of collections of object representations based on at least a partial match between the new stream of collections of object representations and the first stream of collections of object representations. The artificial intelligence unit may be further configured to: cause the processor circuit to execute the first one or more instruction sets for operating the avatar of the application correlated with the first stream of collections of object representations, the causing performed in response to the anticipating of the artificial intelligence unit, wherein the avatar of the application performs one or more operations defined by the first one or more instruction sets for operating the avatar of the application correlated with the first stream of collections of object representations.

In some aspects, the disclosure relates to a non-transitory computer storage medium having a computer program stored thereon, the program including instructions that when executed by one or more processor circuits cause the one or more processor circuits to perform operations comprising: accessing a memory unit that comprises a plurality of streams of collections of object representations correlated with one or more instruction sets for operating an avatar of an application, the plurality of streams of collections of object representations correlated with one or more instruction sets for operating the avatar of the application including a first stream of collections of object representations correlated with a first one or more instruction sets for operating the avatar of the application. The operations may further comprise: receiving a new stream of collections of object representations, the new stream of collections of object representations including one or more object representations representing one or more objects of the application. The operations may further comprise: anticipating the first one or more instruction sets for operating the avatar of the application correlated with the first stream of collections of object representations based on at least a partial match between the new stream of collections of object representations and the first stream of collections of object representations. The operations may further comprise: causing an execution of the first one or more instruction sets for operating the avatar of the application correlated with the first stream of collections of object representations, the causing performed in response to the anticipating the first one or more instruction sets for operating the avatar of the application correlated with the first stream of collections of object representations based on at least a partial match between the new stream of collections of object representations and the first stream of collections of object representations, wherein the avatar of the application performs one or more operations defined by the first one or more instruction sets for operating the avatar of the application correlated with the first stream of collections of object representations.

In some aspects, the disclosure relates to a method comprising: (a) accessing a memory unit that comprises a plurality of streams of collections of object representations correlated with one or more instruction sets for operating an avatar of an application, the plurality of streams of collections of object representations correlated with one or more instruction sets for operating the avatar of the application including a first stream of collections of object representations correlated with a first one or more instruction sets for operating the avatar of the application, the accessing of (a) performed by a processor circuit. The method may further comprise: (b) receiving a new stream of collections of object representations by the processor circuit, the new stream of collections of object representations including one or more object representations representing one or more objects of the application. The method may further comprise: (c) anticipating the first one or more instruction sets for operating the avatar of the application correlated with the first stream of collections of object representations based on at least a partial match between the new stream of collections of object representations and the first stream of collections of object representations, the anticipating of (c) performed by the processor circuit. The method may further comprise: (d) executing the first one or more instruction sets for operating the avatar of the application correlated with the first stream of collections of object representations, the executing of (d) performed in response to the anticipating of (c). The method may further comprise: (e) performing, by the avatar of the application, one or more operations defined by the first one or more instruction sets for operating the avatar of the application correlated with the first stream of collections of object representations.

The aforementioned system, the non-transitory computer storage medium, and/or the method may include any elements, operations, steps, and embodiments of the above described systems, non-transitory computer storage media, and/or methods as applicable as well as the following embodiments.

In some aspects, the disclosure relates to a system for learning and using an application's circumstances for autonomous application operating. The system may be implemented at least in part on one or more computing devices. In some embodiments, the system comprises: a processor circuit configured to execute instruction sets of an application. The system may further comprise: a memory unit configured to store data. The system may further comprise: an artificial intelligence unit. The artificial intelligence unit may be configured to: receive a first collection of object representations, the first collection of object representations including one or more object representations representing one or more objects of the application. The artificial intelligence unit may be further configured to: receive a first one or more instruction sets for operating the application. The artificial intelligence unit may be further configured to: learn the first collection of object representations correlated with the first one or more instruction sets for operating the application. The artificial intelligence unit may be further configured to: receive a new collection of object representations, the new collection of object representations including one or more object representations representing one or more objects of the application. The artificial intelligence unit may be further configured to: anticipate the first one or more instruction sets for operating the application correlated with the first collection of object representations based on at least a partial match between the new collection of object representations and the first collection of object representations. The artificial intelligence unit may be further configured to: cause the processor circuit to execute the first one or more instruction sets for operating the application correlated with the first collection of object representations, the causing performed in response to the anticipating of the artificial intelligence unit, wherein the application performs one or more operations defined by the first one or more instruction sets for operating the application correlated with the first collection of object representations.

In certain embodiments, the first collection of object representations includes a unit of knowledge of the application's circumstance at a first time. In further embodiments, an application's circumstance includes one or more objects of the application.

In some embodiments, the first one or more instruction sets for operating the application include one or more instruction sets executed in operating the application. In further embodiments, the receiving the first one or more instruction sets for operating the application includes at least one of: tracing, profiling, or instrumentation of the application.

In certain embodiments, the first collection of object representations correlated with the first one or more instruction sets for operating the application include a unit of knowledge of how the application operated in a circumstance. In further embodiments, the learning the first collection of object representations correlated with the first one or more instruction sets for operating the application includes learning a user's knowledge, style, or methodology of operating the application in a circumstance.

In some embodiments, the learning the first collection of object representations correlated with the first one or more instruction sets for operating the application includes storing the first collection of object representations correlated with the first one or more instruction sets for operating the application into the memory unit, the memory unit comprising a plurality of collections of object representations correlated with one or more instruction sets for operating the application. The plurality of collections of object representations correlated with one or more instruction sets for operating the application may include a neural network, a graph, a collection of sequences, a sequence, a collection of knowledge cells, a knowledgebase, a knowledge structure, or a data structure.

In certain embodiments, the causing the processor circuit to execute the first one or more instruction sets for operating the application correlated with the first collection of object representations includes causing the application to execute the first one or more instruction sets for operating the application correlated with the first collection of object representations. In further embodiments, the causing the processor circuit to execute the first one or more instruction sets for operating the application correlated with the first collection of object representations includes implementing a user's knowledge, style, or methodology of operating the application in a circumstance.

In some embodiments, the artificial intelligence unit is further configured to: receive a second collection of object representations, the second collection of object representations including one or more object representations representing one or more objects of the application; receive a second one or more instruction sets for operating the application; and learn the second collection of object representations correlated with the second one or more instruction sets for operating the application. In further embodiments, the learning the first collection of object representations correlated with the first one or more instruction sets for operating the application includes storing the first collection of object representations correlated with the first one or more instruction sets for operating the application into a first node of a knowledgebase, and wherein the learning the second collection of object representations correlated with the second one or more instruction sets for operating the application includes storing the second collection of object representations correlated with the second one or more instruction sets for operating the application into a second node of the knowledgebase. The knowledgebase may include a neural network, a graph, a collection of sequences, a sequence, a collection of knowledge cells, a knowledge structure, or a data structure.

In some aspects, the disclosure relates to a non-transitory computer storage medium having a computer program stored thereon, the program including instructions that when executed by one or more processor circuits cause the one or more processor circuits to perform operations comprising: receiving a first collection of object representations, the first collection of object representations including one or more object representations representing one or more objects of an application. The operations may further comprise: receiving a first one or more instruction sets for operating the application. The operations may further comprise: learning the first collection of object representations correlated with the first one or more instruction sets for operating the application. The operations may further comprise: receiving a new collection of object representations, the new collection of object representations including one or more object representations representing one or more objects of the application. The operations may further comprise: anticipating the first one or more instruction sets for operating the application correlated with the first collection of object representations based on at least a partial match between the new collection of object representations and the first collection of object representations. The operations may further comprise: causing an execution of the first one or more instruction sets for operating the application correlated with the first collection of object representations, the causing performed in response to the anticipating the first one or more instruction sets for operating the application correlated with the first collection of object representations based on at least a partial match between the new collection of object representations and the first collection of object representations, wherein the application performs one or more operations defined by the first one or more instruction sets for operating the application correlated with the first collection of object representations.

In some embodiments, the receiving the first one or more instruction sets for operating the application includes receiving the first one or more instruction sets for operating the application from the one or more processor circuits or from another one or more processor circuits. In further embodiments, the execution of the first one or more instruction sets for operating the application correlated with the first collection of object representations is performed by the one or more processor circuits or by another one or more processor circuits.

In some aspects, the disclosure relates to a method comprising: (a) receiving a first collection of object representations by a processor circuit, the first collection of object representations including one or more object representations representing one or more objects of an application. The method may further comprise: (b) receiving a first one or more instruction sets for operating an application by the processor circuit. The method may further comprise: (c) learning the first collection of object representations correlated with the first one or more instruction sets for operating the application, the learning of (c) performed by the processor circuit. The method may further comprise: (d) receiving a new collection of object representations by the processor circuit, the new collection of object representations including one or more object representations representing one or more objects of the application. The method may further comprise: (e) anticipating the first one or more instruction sets for operating the application correlated with the first collection of object representations based on at least a partial match between the new collection of object representations and the first collection of object representations, the anticipating of (e) performed by the processor circuit. The method may further comprise: (f) executing the first one or more instruction sets for operating the application correlated with the first collection of object representations, the executing of (f) performed in response to the anticipating of (e). The method may further comprise: (g) performing, by the application, one or more operations defined by the first one or more instruction sets for operating the application correlated with the first collection of object representations.

In certain embodiments, the receiving of (b) includes receiving the first one or more instruction sets for operating the application from the processor circuit or from another processor circuit. In further embodiments, the executing of (f) is performed by the processor circuit or by another processor circuit.

The aforementioned system, the non-transitory computer storage medium, and/or the method may include any elements, operations, steps, and embodiments of the above described systems, non-transitory computer storage media, and/or methods as applicable as well as the following embodiments.

In some aspects, the disclosure relates to a system for learning and using an application's circumstances for autonomous application operating. The system may be implemented at least in part on one or more computing devices. In some embodiments, the system comprises: a processor circuit configured to execute instruction sets of an application. The system may further comprise: a memory unit configured to store data. The system may further comprise: an artificial intelligence unit. The artificial intelligence unit may be configured to: receive a first stream of collections of object representations, the first stream of collections of object representations including one or more object representations representing one or more objects of the application. The artificial intelligence unit may be further configured to: receive a first one or more instruction sets for operating the application. The artificial intelligence unit may be further configured to: learn the first stream of collections of object representations correlated with the first one or more instruction sets for operating the application. The artificial intelligence unit may be further configured to: receive a new stream of collections of object representations, the new stream of collections of object representations including one or more object representations representing one or more objects of the application. The artificial intelligence unit may be further configured to: anticipate the first one or more instruction sets for operating the application correlated with the first stream of collections of object representations based on at least a partial match between the new stream of collections of object representations and the first stream of collections of object representations. The artificial intelligence unit may be further configured to: cause the processor circuit to execute the first one or more instruction sets for operating the application correlated with the first stream of collections of object representations, the causing performed in response to the anticipating of the artificial intelligence unit, wherein the application performs one or more operations defined by the first one or more instruction sets for operating the application correlated with the first stream of collections of object representations.

In some embodiments, the first stream of collections of object representations includes a unit of knowledge of the application's circumstance over a first time period. In further embodiments, an application's circumstance includes one or more objects of the application.

In certain embodiments, the first stream of collections of object representations correlated with the first one or more instruction sets for operating the application include a unit of knowledge of how the application operated in a circumstance. In further embodiments, the learning the first stream of collections of object representations correlated with the first one or more instruction sets for operating the application includes learning a user's knowledge, style, or methodology of operating the application in a circumstance.

In some embodiments, the learning the first stream of collections of object representations correlated with the first one or more instruction sets for operating the application includes storing the first stream of collections of object representations correlated with the first one or more instruction sets for operating the application into the memory unit, the memory unit comprising a plurality of streams of collections of object representations correlated with one or more instruction sets for operating the application. The plurality of streams of collections of object representations correlated with one or more instruction sets for operating the application may include a neural network, a graph, a collection of sequences, a sequence, a collection of knowledge cells, a knowledgebase, a knowledge structure, or a data structure. In certain embodiments, the causing the processor circuit to execute the first one or more instruction sets for operating the application correlated with the first stream of collections of object representations includes causing the application to execute the first one or more instruction sets for operating the application correlated with the first stream of collections of object representations. In further embodiments, the causing the processor circuit to execute the first one or more instruction sets for operating the application correlated with the first stream of collections of object representations includes implementing a user's knowledge, style, or methodology of operating the application in a circumstance.

In some embodiments, the artificial intelligence unit is further configured to: receive a second stream of collections of object representations, the second stream of collections of object representations including one or more object representations representing one or more objects of the application; receive a second one or more instruction sets for operating the application; and learn the second stream of collections of object representations correlated with the second one or more instruction sets for operating the application. In further embodiments, the learning the first stream of collections of object representations correlated with the first one or more instruction sets for operating the application includes storing the first stream of collections of object representations correlated with the first one or more instruction sets for operating the application into a first node of a knowledgebase, and wherein the learning the second stream of collections of object representations correlated with the second one or more instruction sets for operating the application includes storing the second stream of collections of object representations correlated with the second one or more instruction sets for operating the application into a second node of the knowledgebase. The knowledgebase may include a neural network, a graph, a collection of sequences, a sequence, a collection of knowledge cells, a knowledge structure, or a data structure.

In some aspects, the disclosure relates to a non-transitory computer storage medium having a computer program stored thereon, the program including instructions that when executed by one or more processor circuits cause the one or more processor circuits to perform operations comprising: receiving a first stream of collections of object representations, the first stream of collections of object representations including one or more object representations representing one or more objects of an application. The operations may further comprise: receiving a first one or more instruction sets for operating the application. The operations may further comprise: learning the first stream of collections of object representations correlated with the first one or more instruction sets for operating the application. The operations may further comprise: receiving a new stream of collections of object representations, the new stream of collections of object representations including one or more object representations representing one or more objects of the application. The operations may further comprise: anticipating the first one or more instruction sets for operating the application correlated with the first stream of collections of object representations based on at least a partial match between the new stream of collections of object representations and the first stream of collections of object representations. The operations may further comprise: causing an execution of the first one or more instruction sets for operating the application correlated with the first stream of collections of object representations, the causing performed in response to the anticipating the first one or more instruction sets for operating the application correlated with the first stream of collections of object representations based on at least a partial match between the new stream of collections of object representations and the first stream of collections of object representations, wherein the application performs one or more operations defined by the first one or more instruction sets for operating the application correlated with the first stream of collections of object representations.

In certain embodiments, the receiving the first one or more instruction sets for operating the application includes receiving the first one or more instruction sets for operating the application from the one or more processor circuits or from another one or more processor circuits. In further embodiments, the execution of the first one or more instruction sets for operating the application correlated with the first stream of collections of object representations is performed by the one or more processor circuits or by another one or more processor circuits.

In some aspects, the disclosure relates to a method comprising: (a) receiving a first stream of collections of object representations by a processor circuit, the first stream of collections of object representations including one or more object representations representing one or more objects of an application. The method may further comprise: (b) receiving a first one or more instruction sets for operating the application by the processor circuit. The method may further comprise: (c) learning the first stream of collections of object representations correlated with the first one or more instruction sets for operating the application, the learning of (c) performed by the processor circuit. The method may further comprise: (d) receiving a new stream of collections of object representations by the processor circuit, the new stream of collections of object representations including one or more object representations representing one or more objects of the application. The method may further comprise: (e) anticipating the first one or more instruction sets for operating the application correlated with the first stream of collections of object representations based on at least a partial match between the new stream of collections of object representations and the first stream of collections of object representations, the anticipating of (e) performed by the processor circuit. The method may further comprise: (f) executing the first one or more instruction sets for operating the application correlated with the first stream of collections of object representations, the executing of (f) performed in response to the anticipating of (e). The method may further comprise: (g) performing, by the application, one or more operations defined by the first one or more instruction sets for operating the application correlated with the first stream of collections of object representations.

In some embodiments, the receiving of (b) includes receiving the first one or more instruction sets for operating the application from the processor circuit or from another processor circuit. In further embodiments, the executing of (f) is performed by the processor circuit or by another processor circuit.

The aforementioned system, the non-transitory computer storage medium, and/or the method may include any elements, operations, steps, and embodiments of the above described systems, non-transitory computer storage media, and/or methods as applicable as well as the following embodiments.

Other features and advantages of the disclosure will become apparent from the following description, including the claims and drawings.

BRIEF DESCRIPTION OF THE DRAWINGS

FIG. 16 illustrates various artificial intelligence methods, systems, and/or models that can be utilized in ACAAO Unit 100 embodiments.

Figure 1:
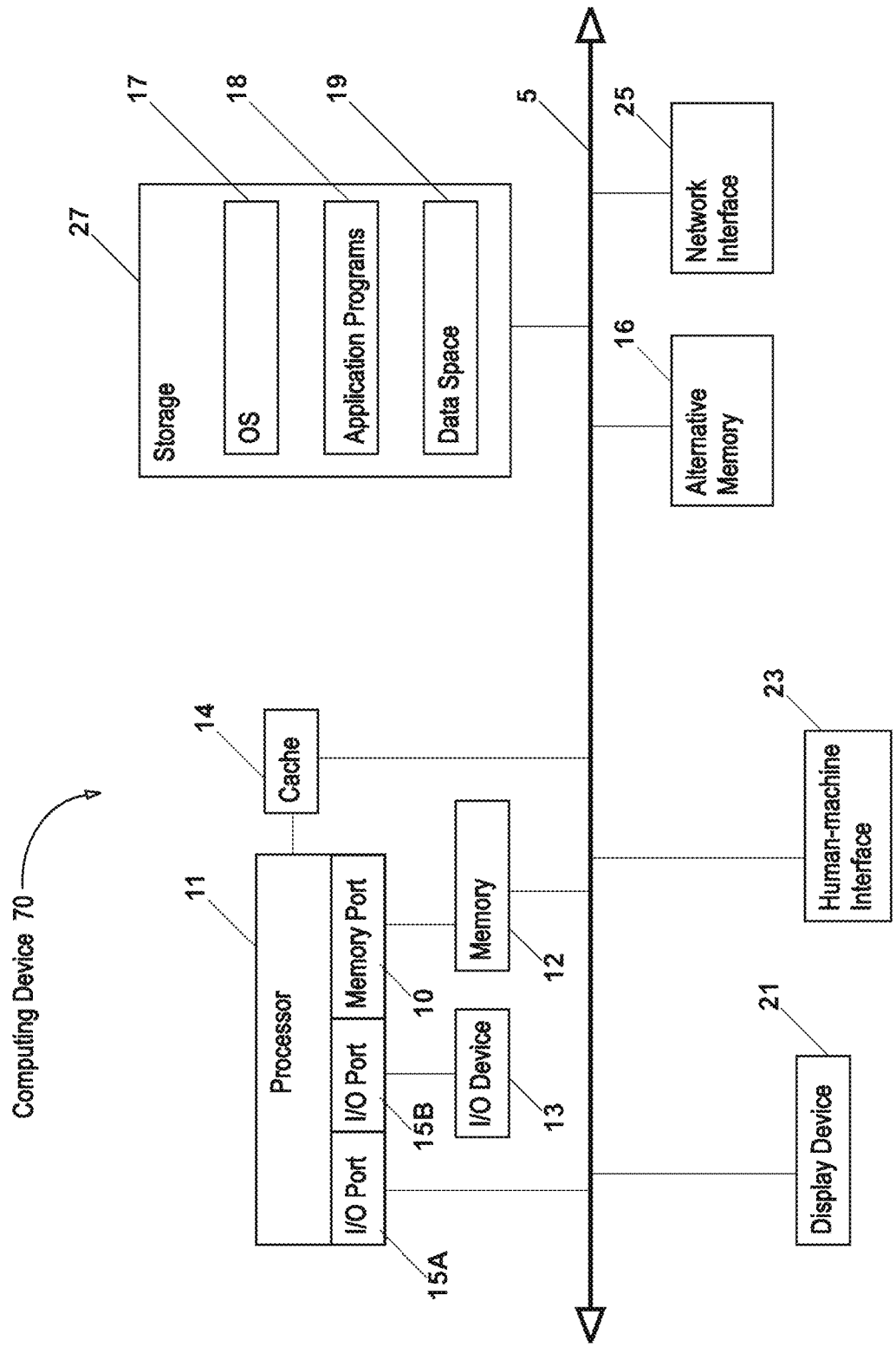
FIG. 1 illustrates a block diagram of Computing Device 70 that can provide processing capabilities used in some of the disclosed embodiments.

Like reference numerals in different figures indicate like elements. Horizontal or vertical " . . . " or other such indicia may be used to indicate additional instances of the same type of element. n, m, x, or other such letters or indicia represent integers or other sequential numbers that follow the sequence where they are indicated. It should be noted that n, m, x, or other such letters or indicia may represent different numbers in different elements even where the elements are depicted in the same figure. In general, n, m, x, or other such letters or indicia may follow the sequence and/or context where they are indicated. Any of these or other such letters or indicia may be used interchangeably depending on context and space available. The drawings are not necessarily to scale, with emphasis instead being placed upon illustrating the embodiments, principles, and concepts of the disclosure. A line or arrow between any of the disclosed elements comprises an interface that enables the coupling, connection, and/or interaction between the elements.

DETAILED DESCRIPTION

The disclosed artificially intelligent devices, systems, and methods for learning and/or using an avatar's circumstances for autonomous avatar operation comprise apparatuses, systems, methods, features, functionalities, and/or applications that enable learning an avatar's circumstances including objects with various properties along with correlated instruction sets for operating the avatar, storing this knowledge in a knowledgebase (i.e. neural network, graph, sequences, etc.), and/or operating an avatar autonomously. The disclosed artificially intelligent devices, systems, and methods for learning and/or using an avatar's circumstances for autonomous avatar operation, any of their elements, any of their embodiments, or a combination thereof can generally be referred to as ACAAO, ACAAO Unit, or as other suitable name or reference.

Referring now to FIG. 1, an embodiment is illustrated of Computing Device 70 (also referred to simply as computing device, computing system, or other suitable name or reference, etc.) that can provide processing capabilities used in some embodiments of the forthcoming disclosure. Later described devices, systems, and methods, in combination with processing capabilities of Computing Device 70, enable learning and/or using an avatar's circumstances for autonomous avatar operation and/or other functionalities described herein. Various embodiments of the disclosed devices, systems, and methods include hardware, functions, logic, programs, and/or a combination thereof that can be implemented using any type or form of computing, computing enabled, or other device or system such as a mobile device, a computer, a computing enabled telephone, a server, a gaming device, a television device, a digital camera, a GPS receiver, a media player, an embedded device, a supercomputer, a wearable device, an implantable device, a cloud, or any other type or form of computing, computing enabled, or other device or system capable of performing the operations described herein.

In some designs, Computing Device 70 comprises hardware, processing techniques or capabilities, programs, or a combination thereof. Computing Device 70 includes one or more central processing units, which may also be referred to as processors 11. Processor 11 includes one or more memory ports 10 and/or one or more input-output ports, also referred to as I/O ports 15, such as I/O ports 15A and 15B. Processor 11 may be special or general purpose. Computing Device 70 may further include memory 12, which can be connected to the remainder of the components of Computing Device 70 via bus 5. Memory 12 can be connected to processor 11 via memory port 10.

Computing Device 70 may also include display device 21 such as a monitor, projector, glasses, and/or other display device. Computing Device 70 may also include Human-machine Interface 23 such as a keyboard, a pointing device, a mouse, a touchscreen, a joystick, a remote controller, and/or other input device. In some implementations, Human-machine Interface 23 can be connected with bus 5 or directly connected with specific elements of Computing Device 70. Computing Device 70 may include additional elements such as one or more input/output devices 13. Processor 11 may include or be interfaced with cache memory 14. Storage 27 may include memory, which provides an operating system 17 (i.e. also referred to as OS 17, etc.), additional application programs 18, and/or data space 19 in which additional data or information can be stored. Alternative memory device 16 can be connected to the remaining components of Computing Device 70 via bus 5. Network interface 25 can also be connected with bus 5 and be used to communicate with external computing devices via a network. Some or all described elements of Computing Device 70 can be directly or operatively connected or coupled with each other using any other connection means known in art. Other additional elements may be included as needed, or some of the disclosed ones may be excluded, or a combination thereof may be utilized in alternate implementations of Computing Device 70.

Processor 11 includes one or more circuits or devices that can execute instructions fetched from memory 12 and/or other element. Processor 11 may include any combination of hardware and/or processing techniques or capabilities for executing or implementing logic functions or programs. Processor 11 may include a single core or a multi core processor. Processor 11 includes the functionality for loading operating system 17 and operating any application programs 18 thereon. In some embodiments, Processor 11 can be provided in a microprocessing or a processing unit, such as, for example, Snapdragon processor produced by Qualcomm Inc., processor by Intel Corporation of Mountain View, California, processor manufactured by Motorola Corporation of Schaumburg, Ill.; processor manufactured by Transmeta Corporation of Santa Clara, Calif.; processor manufactured by International Business Machines of White Plains, N.Y.; processor manufactured by Advanced Micro Devices of Sunnyvale, California, or any computing circuit or device for performing similar functions. In other embodiments, processor 11 can be provided in a graphics processing unit (GPU), visual processing unit (VPU), or other highly parallel processing circuit or device such as, for example, nVidia GeForce line of GPUs, AMD Radeon line of GPUs, and/or others. Such GPUs or other highly parallel processing circuits or devices may provide superior performance in processing operations on neural networks, graphs, and/or other data structures. In further embodiments, processor 11 can be provided in a micro controller such as, for example, Texas instruments, Atmel, Microchip Technology, ARM, Silicon Labs, Intel, and/or other lines of micro controllers. In further embodiments, processor 11 can be provided in a quantum processor such as, for example, D-Wave Systems, Microsoft, Intel, IBM, Google, Toshiba, and/or other lines of quantum processors. In further embodiments, processor 11 can be provided in a biocomputer such as DNA-based computer, protein-based computer, molecule-based computer, and/or others. In further embodiments, processor 11 includes any circuit or device for performing logic operations. Processor 11 can be based on any of the aforementioned or other available processors capable of operating as described herein. Computing Device 70 may include one or more of the aforementioned or other processors. In some designs, processor 11 can communicate with memory 12 via a system bus 5. In other designs, processor 11 can communicate directly with memory 12 via a memory port 10.

Memory 12 includes one or more circuits or devices capable of storing data. In some embodiments, Memory 12 can be provided in a semiconductor or electronic memory chip such as static random access memory (SRAM), Flash memory, Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), and/or others. In other embodiments, Memory 12 includes any volatile memory. In general, Memory 12 can be based on any of the aforementioned or other available memories capable of operating as described herein.

Storage 27 includes one or more devices or mediums capable of storing data. In some embodiments, Storage 27 can be provided in a device or medium such as a hard drive, flash drive, optical disk, and/or others. In other embodiments, Storage 27 can be provided in a biological storage device such as DNA-based storage device, protein-based storage device, molecule-based storage device, and/or others. In further embodiments, Storage 27 can be provided in an optical storage device such as holographic storage, and/or others. In further embodiments, Storage 27 may include any non-volatile memory. In general, Storage 27 can be based on any of the aforementioned or other available storage devices or mediums capable of operating as described herein. In some aspects, Storage 27 may include any features, functionalities, and embodiments of Memory 12, and vice versa, as applicable.

Processor 11 can communicate directly with cache memory 14 via a connection means such as a secondary bus which may also sometimes be referred to as a backside bus. In some embodiments, processor 11 can communicate with cache memory 14 using the system bus 5. Cache memory 14 may typically have a faster response time than main memory 12 and can include a type of memory which is considered faster than main memory 12 such as, for example, SRAM, BSRAM, or EDRAM. Cache memory includes any structure such as multilevel caches, for example. In some embodiments, processor 11 can communicate with one or more I/O devices 13 via a system bus 5. Various busses can be used to connect processor 11 to any of the I/O devices 13 such as a VESA VL bus, an ISA bus, an EISA bus, a MicroChannel Architecture (MCA) bus, a PCI bus, a PCI-X bus, a PCI-Express bus, a NuBus, and/or others. In some embodiments, processor 11 can communicate directly with I/O device 13 via HyperTransport, Rapid I/O, or InfiniBand. In further embodiments, local busses and direct communication can be mixed. For example, processor 11 can communicate with an I/O device 13 using a local interconnect bus and communicate with another I/O device 13 directly. Similar configurations can be used for any other components described herein.

Computing Device 70 may further include alternative memory such as a SD memory slot, a USB memory stick, an optical drive such as a CD-ROM drive, a CD-R/RW drive, a DVD-ROM drive or a BlueRay disc, a hard-drive, and/or any other device comprising non-volatile memory suitable for storing data or installing application programs. Computing Device 70 may further include a storage device 27 comprising any type or form of non-volatile memory for storing an operating system (OS) such as any type or form of Windows OS, Mac OS, Unix OS, Linux OS, Android OS, iPhone OS, mobile version of Windows OS, an embedded OS, or any other OS that can operate on Computing Device 70. Computing Device 70 may also include application programs 18, and/or data space 19 for storing additional data or information. In some embodiments, alternative memory 16 can be used as or similar to storage device 27. Additionally, OS 17 and/or application programs 18 can be operable from a bootable medium such as, for example, a flash drive, a micro SD card, a bootable CD or DVD, and/or other bootable medium.

Application Program 18 (also referred to as program, computer program, application, script, code, or other suitable name or reference) comprises instructions that can provide functionality when executed by processor 11. Application program 18 can be implemented in a high-level procedural or object-oriented programming language, or in a low-level machine or assembly language. Any language used can be compiled, interpreted, or translated into machine language. Application program 18 can be deployed in any form including as a stand-alone program or as a module, component, subroutine, or other unit suitable for use in a computing system. Application program 18 does not necessarily correspond to a file in a file system. A program can be stored in a portion of a file that may hold other programs or data, in a single file dedicated to the program, or in multiple files (i.e. files that store one or more modules, sub programs, or portions of code, etc.). Application Program 18 can be delivered in various forms such as, for example, executable file, library, script, plugin, addon, applet, interface, console application, web application, application service provider (ASP)-type application, operating system, and/or other forms. Application program 18 can be deployed to be executed on one computing device or on multiple computing devices (i.e. cloud, distributed, or parallel computing, etc.), or at one site or distributed across multiple sites interconnected by a network or an interface. Examples of Application Program 18 include a computer game, a virtual world application, a graphics application, a media application, a word processing application, a spreadsheet application, a database application, a web browser, a forms-based application, a global positioning system (GPS) application, a 2D application, a 3D application, an operating system, a factory automation application, a device control application, a vehicle control application, and/or other application or program.

Network interface 25 can be utilized for interfacing Computing Device 70 with other devices via a network through a variety of connections including telephone lines, wired or wireless connections, LAN or WAN links (i.e. 802.11, T1, T3, 56 kb, X.25, etc.), broadband connections (i.e. ISDN, Frame Relay, ATM, etc.), or a combination thereof. Examples of networks include the Internet, an intranet, an extranet, a local area network (LAN), a wide area network (WAN), a personal area network (PAN), a home area network (HAN), a campus area network (CAN), a metropolitan area network (MAN), a global area network (GAN), a storage area network (SAN), virtual network, a virtual private network (VPN), a Bluetooth network, a wireless network, a wireless LAN, a radio network, a HomePNA, a power line communication network, a G.hn network, an optical fiber network, an Ethernet network, an active networking network, a client-server network, a peer-to-peer network, a bus network, a star network, a ring network, a mesh network, a star-bus network, a tree network, a hierarchical topology network, and/or other networks. Network interface 25 may include a built-in network adapter, network interface card, PCMCIA network card, card bus network adapter, wireless network adapter, Bluetooth network adapter, WiFi network adapter, USB network adapter, modem, and/or any other device suitable for interfacing Computing Device 70 with any type of network capable of communication and/or operations described herein.

I/O devices 13 may be present in various shapes or forms in Computing Device 70. Examples of I/O device 13 capable of input include a joystick, a keyboard, a mouse, a trackpad, a trackpoint, a trackball, a microphone, a drawing tablet, a glove, a tactile input device, a still or video camera, and/or other input device. Examples of I/O device 13 capable of output include a video display, a projector, a glasses, a speaker, a tactile output device, and/or other output device. Examples of I/O device 13 capable of input and output include a touchscreen, a disk drive, an optical storage device, a modem, a network card, and/or other input/output device. I/O device 13 can be interfaced with processor 11 via an I/O port 15, for example. In some aspects, I/O device 13 can be a bridge between system bus 5 and an external communication bus such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, a Serial Attached small computer system interface bus, and/or other bus.

An output interface (not shown) such as a graphical output interface, an acoustic output interface, a tactile output interface, a renderer, any device driver (i.e. audio, video, or other driver), and/or other output interface or system can be utilized to process output from elements of Computing Device 70 for conveyance on an output device such as Display 21. In some aspects, Display 21 or other output device itself may include an output interface for processing output from elements of Computing Device 70. Further, an input interface (not shown) such as a keyboard listener, a touchscreen listener, a mouse listener, any device driver (i.e. audio, video, keyboard, mouse, touchscreen, or other driver), and/or other input interface or system can be utilized to process input from Human-machine Interface 23 or other input device for use by elements of Computing Device 70. In some aspects, Human-machine Interface 23 or other input device itself may include an input interface for processing input for use by elements of Computing Device 70.

Computing Device 70 may include or be connected to multiple display devices 21. Display devices 21 can each be of the same or different type or form. Computing Device 70 and/or its elements comprise any type or form of suitable hardware, programs, or a combination thereof to support, enable, or provide for the connection and use of multiple display devices 21. In one example, Computing Device 70 includes any type or form of video adapter, video card, driver, and/or library to interface, communicate, connect, or otherwise use display devices 21. In some aspects, a video adapter may include multiple connectors to interface to multiple display devices 21. In other aspects, Computing Device 70 includes multiple video adapters, with each video adapter connected to one or more display devices 21. In some embodiments, Computing Device's 70 operating system can be configured for using multiple displays 21. In other embodiments, one or more display devices 21 can be provided by one or more other computing devices such as remote computing devices connected to Computing Device 70 via a network or an interface.

Computing Device 70 can operate under the control of operating system 17, which may support Computing Device's 70 basic functions, interface with and manage hardware resources, interface with and manage peripherals, provide common services for application programs, schedule tasks, and/or perform other functionalities. A modern operating system enables features and functionalities such as a high resolution display, graphical user interface (GUI), touchscreen, cellular network connectivity (i.e. mobile operating system, etc.), Bluetooth connectivity, WiFi connectivity, global positioning system (GPS) capabilities, mobile navigation, microphone, speaker, still picture camera, video camera, voice recorder, speech recognition, music player, video player, near field communication, personal digital assistant (PDA), and/or other features, functionalities, or applications. For example, Computing Device 70 can use any conventional operating system, any embedded operating system, any real-time operating system, any open source operating system, any video gaming operating system, any proprietary operating system, any online operating system, any operating system for mobile computing devices, or any other operating system capable of running on Computing Device 70 and performing operations described herein. Example of operating systems include Windows XP, Windows 7, Windows 8, Windows 10, etc. manufactured by Microsoft Corporation of Redmond, Wash.; Mac OS, iPhone OS, etc. manufactured by Apple Computer of Cupertino, Calif.; OS/2 manufactured by International Business Machines of Armonk, N.Y.; Linux, a freely-available operating system distributed by Caldera Corp. of Salt Lake City, Utah; or any type or form of a Unix operating system, and/or others. Any operating systems such as the ones for Android devices can similarly be utilized.

Computing Device 70 can be implemented as or be part of various model architectures such as web services, distributed computing, grid computing, cloud computing, and/or other architectures. For example, in addition to the traditional desktop, server, or mobile operating system architectures, a cloud-based operating system can be utilized to provide the structure on which embodiments of the disclosure can be implemented. Other aspects of Computing Device 70 can also be implemented in the cloud without departing from the spirit and scope of the disclosure. For example, memory, storage, processing, and/or other elements can be hosted in the cloud. In some embodiments, Computing Device 70 can be implemented on multiple devices. For example, a portion of Computing Device 70 can be implemented on a mobile device and another portion can be implemented on wearable electronics.

Computing Device 70 can be or include any mobile device, a mobile phone, a smartphone (i.e. iPhone, Windows phone, Blackberry phone, Android phone, etc.), a tablet, a personal digital assistant (PDA), wearable electronics, implantable electronics, and/or other mobile device capable of implementing the functionalities described herein. Computing Device 70 can also be or include an embedded device, which can be any device or system with a dedicated function within another device or system. Embedded systems range from the simplest ones dedicated to one task with no user interface to complex ones with advanced user interface that may resemble modern desktop computer systems. Examples of devices comprising an embedded device include a mobile telephone, a personal digital assistant (PDA), a gaming device, a media player, a digital still or video camera, a pager, a television device, a set-top box, a personal navigation device, a global positioning system (GPS) receiver, a portable storage device (i.e. a USB flash drive, etc.), a digital watch, a DVD player, a printer, a microwave oven, a washing machine, a dishwasher, a gateway, a router, a hub, an automobile entertainment system, an automobile navigation system, a refrigerator, a washing machine, a factory automation device, an assembly line device, a factory floor monitoring device, a thermostat, an automobile, a factory controller, a telephone, a network bridge, and/or other devices. An embedded device can operate under the control of an operating system for embedded devices such as MicroC/OS-II, QNX, VxWorks, eCos, TinyOS, Windows Embedded, Embedded Linux, and/or other embedded device operating systems.

Various implementations of the disclosed devices, systems, and methods can be realized in digital electronic circuitry, integrated circuitry, logic gates, application specific integrated circuits (ASICs), field programmable gate arrays (FPGAs), computer hardware, firmware, programs, virtual machines, and/or combinations thereof including their structural, logical, and/or physical equivalents.

The disclosed devices, systems, and methods may include clients and servers. A client and server are generally, but not always, remote from each other and typically, but not always, interact via a network or an interface.

The relationship of a client and server may arise by virtue of computer programs running on their respective computers and having a client-server relationship to each other, for example.

The disclosed devices, systems, and methods can be implemented in a computing system that includes a back end component, a middleware component, a front end component, or any combination thereof. The components of the system can be interconnected by any form or medium of digital data communication such as, for example, a network.

Computing Device 70 may include or be interfaced with a computer program product comprising instructions or logic encoded on a computer-readable medium. Such instructions or logic, when executed, may configure or cause one or more processors 11 to perform the operations and/or functionalities disclosed herein. For example, a computer program can be provided or encoded on a computer-readable medium such as an optical medium (i.e. DVD-ROM, etc.), flash drive, hard drive, any memory, firmware, or other medium. Machine-readable medium, computer-readable medium, or other such terms may refer to any computer program product, apparatus, and/or device for providing instructions and/or data to one or more programmable processors. As such, machine-readable medium includes any medium that can send and/or receive machine instructions as a machine-readable signal. Examples of a machine-readable medium include a volatile and/or non-volatile medium, a removable and/or non-removable medium, a communication medium, a storage medium, and/or other medium. A non-transitory machine-readable medium comprises all machine-readable media except for a transitory, propagating signal.

In some embodiments, the disclosed artificially intelligent devices, systems, and methods for learning and/or using an avatar's circumstances for autonomous avatar operation, or elements thereof, can be implemented entirely or in part in a device (i.e. microchip, circuitry, logic gates, electronic device, computing device, special or general purpose processor, etc.) or system that comprises (i.e. hard coded, internally stored, etc.) or is provided with (i.e. externally stored, etc.) instructions for implementing ACAAO functionalities. As such, the disclosed artificially intelligent devices, systems, and methods for learning and/or using an avatar's circumstances for autonomous avatar operation, or elements thereof, may include the processing, memory, storage, and/or other features, functionalities, and embodiments of Computing Device 70 or elements thereof. Such device or system can operate on its own (i.e. standalone device or system, etc.), be embedded in another device or system (i.e. an industrial machine, a robot, a vehicle, a toy, a smartphone, a television device, an appliance, and/or any other device or system capable of housing the elements needed for ACAAO functionalities), work in combination with other devices or systems, or be available in any other configuration. In other embodiments, the disclosed artificially intelligent devices, systems, and methods for learning and/or using an avatar's circumstances for autonomous avatar operation, or elements thereof, may include or be interfaced with Alternative Memory 16 that provides instructions for implementing ACAAO functionalities to one or more Processors 11. In further embodiments, the disclosed artificially intelligent devices, systems, and methods for learning and/or using an avatar's circumstances for autonomous avatar operation, or elements thereof, can be implemented entirely or in part as a computer program and executed by one or more Processors 11. Such program can be implemented in one or more modules or units of a single or multiple computer programs. Such program may be able to attach to or interface with, inspect, and/or take control of another application program to implement ACAAO functionalities. In further embodiments, the disclosed artificially intelligent devices, systems, and methods for learning and/or using an avatar's circumstances for autonomous avatar operation, or elements thereof, can be implemented as a network, web, distributed, cloud, or other such application accessed on one or more remote computing devices (i.e. servers, cloud, etc.) via Network Interface 25, such remote computing devices including processing capabilities and instructions for implementing ACAAO functionalities. In further embodiments, the disclosed artificially intelligent devices, systems, and methods for learning and/or using an avatar's circumstances for autonomous avatar operation, or elements thereof, can be (1) attached to or interfaced with any computing device or application program, (2) included as a feature of an operating system, (3) built (i.e. hard coded, etc.) into any computing device or application program, and/or (4) available in any other configuration to provide its functionalities.

In some embodiments, the disclosed artificially intelligent devices, systems, and methods for learning and/or using an avatar's circumstances for autonomous avatar operation, or elements thereof, can be implemented at least in part in a computer program such as Java application or program. Java provides a robust and flexible environment for application programs including flexible user interfaces, robust security, built-in network protocols, powerful application programming interfaces, database or DBMS connectivity and interfacing functionalities, file manipulation capabilities, support for networked applications, and/or other features or functionalities. Application programs based on Java can be portable across many devices, yet leverage each device's native capabilities. Java supports the feature sets of most smartphones and a broad range of connected devices while still fitting within their resource constraints. Various Java platforms include virtual machine features comprising a runtime environment for application programs. Java platforms provide a wide range of user-level functionalities that can be implemented in application programs such as displaying text and graphics, playing and recording audio content, displaying and recording visual content, communicating with another computing device, and/or other functionalities. It should be understood that the disclosed artificially intelligent devices, systems, and methods for learning and/or using an avatar's circumstances for autonomous avatar operation, or elements thereof, are programming language, platform, and operating system independent. Examples of programming languages that can be used instead of or in addition to Java include C, C++, Cobol, Python, Java Script, Tcl, Visual Basic, Pascal, VB Script, Perl, PHP, Ruby, and/or other programming languages capable of implementing the functionalities described herein.

Where a reference to a specific file or file type is used herein, other files or file types can be substituted.

Where a reference to a data structure is used herein, it should be understood that any variety of data structures can be used such as, for example, array, list, linked list, doubly linked list, queue, tree, heap, graph, map, grid, matrix, multi-dimensional matrix, table, database, database management system (DBMS), file, neural network, and/or any other type or form of a data structure including a custom one. A data structure may include one or more fields or data fields that are part of or associated with the data structure. A field or data field may include a data, an object, a data structure, and/or any other element or a reference/pointer thereto. A data structure can be stored in one or more memories, files, or other repositories. A data structure and/or elements thereof, when stored in a memory, file, or other repository, may be stored in a different arrangement than the arrangement of the data structure and/or elements thereof. For example, a sequence of elements can be stored in an arrangement other than a sequence in a memory, file, or other repository.

Where a reference to a repository is used herein, it should be understood that a repository may be or include one or more files or file systems, one or more storage locations or structures, one or more storage systems, one or more memory locations or structures, and/or other file, storage, memory, or data arrangements.

Where a reference to an interface is used herein, it should be understood that the interface comprises any hardware, device, system, program, method, and/or combination thereof that enable direct or operative coupling, connection, and/or interaction of the elements between which the interface is indicated. A line or arrow shown in the figures between any of the depicted elements comprises such interface. Examples of an interface include a direct connection, an operative connection, a wired connection (i.e. wire, cable, etc.), a wireless connection, a device, a network, a bus, a circuit, a firmware, a driver, a bridge, a program, a combination thereof, and/or others.

Where a reference to an element coupled or connected to another element is used herein, it should be understood that the element may be in communication or other interactive relationship with the other element. Furthermore, an element coupled or connected to another element can be coupled or connected to any other element in alternate implementations. Terms coupled, connected, interfaced, or other such terms may be used interchangeably herein depending on context.

Where a reference to an element matching another element is used herein, it should be understood that the element may be equivalent or similar to the other element. Therefore, the term match or matching can refer to total equivalence or similarity depending on context.

Where a reference to a device is used herein, it should be understood that the device may include or be referred to as a system, and vice versa depending on context, since a device may include a system of elements and a system may be embodied in a device.

Where a reference to a collection of elements is used herein, it should be understood that the collection of elements may include one or more elements. In some aspects or contexts, a reference to a collection of elements does not imply that the collection is an element itself.

Where a mention of a function, method, routine, subroutine, or other such procedure is used herein, it should be understood that the function, method, routine, subroutine, or other such procedure comprises a call, reference, or pointer to the function, method, routine, subroutine, or other such procedure.

Where a mention of data, object, data structure, item, element, or thing is used herein, it should be understood that the data, object, data structure, item, element, or thing comprises a reference or pointer to the data, object, data structure, item, element, or thing.

Figure 2:
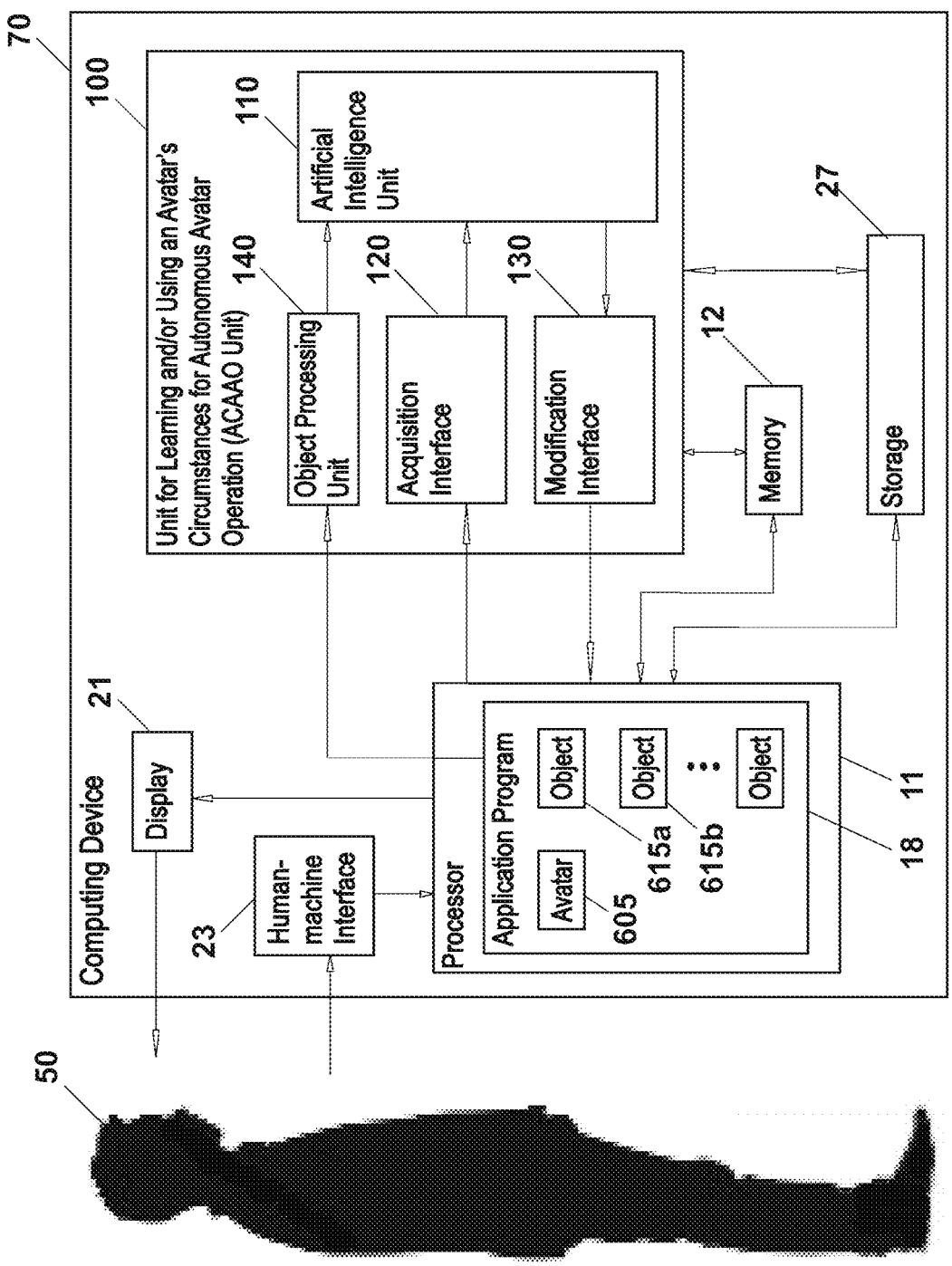
FIG. 2 illustrates an embodiment of Computing Device 70 comprising Unit for Learning and/or Using an Avatar's Circumstances for Autonomous Avatar Operation (ACAAO Unit 100).

Referring to FIG. 2, an embodiment of Computing Device 70 comprising Unit for Learning and/or Using an Avatar's Circumstances for Autonomous Avatar Operation (ACAAO Unit 100) is illustrated. Computing Device 70 also comprises interconnected Processor 11, Display 21, Human-machine Interface 23, Memory 12, and Storage 27.

Processor 11 includes or executes Application Program 18 comprising Avatar 605 and/or one or more Objects 615. ACAAO Unit 100 comprises interconnected Artificial Intelligence Unit 110, Acquisition Interface 120, Modification Interface 130, and Object Processing Unit 140. Other additional elements can be included as needed, or some of the disclosed ones can be excluded, or a combination thereof can be utilized in alternate embodiments.

In one example, the teaching presented by the disclosure can be implemented in a device or system for learning and/or using an avatar's circumstances for autonomous avatar operating. The device or system may include a processor circuit (i.e. Processor 11, etc.) configured to execute instruction sets (i.e. Instruction Sets 526, etc.) of an application. The device or system may further include a memory unit (i.e. Memory 12, etc.) configured to store data. The device or system may further include an artificial intelligence unit (i.e. Artificial Intelligence Unit 110, etc.). The artificial intelligence unit may be configured to receive a first collection of object representations (i.e. Collection of Object Representations 525, etc.), the first collection of object representations including one or more object representations representing one or more objects of the application. The artificial intelligence unit may also be configured to receive a first one or more instruction sets for operating an avatar of the application. The artificial intelligence unit may also be configured to learn the first collection of object representations correlated with the first one or more instruction sets for operating the avatar of the application. The artificial intelligence unit may also be configured to receive a new collection of object representations, the new collection of object representations including one or more object representations representing one or more objects of the application. The artificial intelligence unit may also be configured to anticipate the first one or more instruction sets for operating the avatar of the application correlated with the first collection of object representations based on at least a partial match between the new collection of object representations and the first collection of object representations. The artificial intelligence unit may also be configured to cause the processor circuit to execute the first one or more instruction sets for operating the avatar of the application correlated with the first collection of object representations, the causing performed in response to the anticipating of the artificial intelligence unit, wherein the avatar of the application performs one or more operations defined by the first one or more instruction sets for operating the avatar of the application correlated with the first collection of object representations. Any of the operations of the aforementioned elements can be performed repeatedly and/or in different orders in alternate embodiments. In some embodiments, a collection of object representations may include or be substituted with a stream of collections of object representations. In some embodiments of applications that do not comprise an avatar or rely on avatar for their operation, the teaching presented by the disclosure can be implemented in a device or system for learning and/or using an application's circumstances for autonomous application operating. In such embodiments, an instruction set for operating an avatar of an application may include or be substituted with an instruction set for operating an application. Other additional elements can be included as needed, or some of the disclosed ones can be excluded, or a combination thereof can be utilized in alternate embodiments. The disclosed devices and systems may include any actions or operations of any of the disclosed methods such as methods 9100, 9200, 9300, 9400, 9500, 9600, and/or others (all later described).

User 50 (also referred to simply as user or other suitable name or reference) comprises a human user or non-human user. A non-human User 50 includes any device, system, program, and/or other mechanism for operating or controlling Application Program 18, Avatar 605, Computing Device 70, and/or elements thereof. For example, User 50 may issue an operating direction to Application Program 18 responsive to which Application Program's 18 instructions or instruction sets may be executed by Processor 11 to perform a desired operation with/on Avatar 605. User's 50 operating directions comprise any user inputted data (i.e. values, text, symbols, etc.), directions (i.e. move right, move up, move forward, copy an item, click on a link, etc.), instructions or instruction sets (i.e. manually inputted instructions or instruction sets, etc.), and/or other inputs or information. A non-human User 50 can utilize more suitable interfaces instead of, or in addition to, Human-machine Interface 23 and/or Display 21 for controlling Application Program 18, Avatar 605, Computing Device 70, and/or elements thereof. Examples of such interfaces include an application programming interface (API), bridge (i.e. bridge between applications, devices, or systems, etc.), driver, socket, direct or operative connection, handle, function/routine/subroutine, and/or other interfaces.

Avatar 605 may be or comprises an object of Application Program 18. While Avatar 605 may include any features, functionalities, and embodiments of Object 615 (later described), Avatar 605 is distinguished herein to portray the relationships and/or interactions between Avatar 605 and other Objects 615 of Application Program 18. In some aspects, Avatar 605 includes a User 50-controllable object of Application Program 18. Avatar 605 may, therefore, be a representation of User 50 or of User's 50 actions, thoughts, and/or other expressions. In some designs, Avatar 605 includes a 2D model, a 3D model, a 2D shape (i.e. point, line, square, rectangle, circle, triangle, etc.), a 3D shape (i.e. cube, sphere, etc.), a graphical user interface (GUI) element, a picture, and/or other models, shapes, elements, or objects. Avatar 605 may perform one or more operations within Application Program 18. For example, Avatar 605 may perform operations including moving, maneuvering, jumping, running, shooting, and/or other operations within a game or virtual world Application Program 18. While all possible variations of operations on/by/with Avatar 605 are too voluminous to list and limited only by Avatar's 605 and/or Application Program's 18 design, and/or User's 50 utilization, other operations on/by/with Avatar 605 are within the scope of this disclosure.

Object Processing Unit 140 comprises the functionality for obtaining information of interest on objects of Application Program 18, and/or other functionalities. As such, Object Processing Unit 140 can be used to obtain objects and/or their properties in Avatar's 605 surrounding within Application Program 18. Avatar's 605 surrounding may include or be defined by Area of Interest 450 (later described), part of Application Program 18 that is shown to User 50 (i.e. on a display, via a graphical user interface, etc.), the entire Application Program 18, any part of Application Program 18, and/or other techniques. In some embodiments, Object Processing Unit 140 comprises the functionality for creating or generating Collection of Object Representations 525 (also referred to as Coll of Obj Rep or other suitable name or reference) and storing one or more Object Representations 625 (also referred to simply as object representations, representations of objects, or other suitable name or reference), Object Properties 630 (also referred to simply as object properties or other suitable name or reference), and/or other elements or information into the Collection of Object Representations 525. As such, Collection of Object Representations 525 comprises the functionality for storing one or more Object Representations 625, Object Properties 630, and/or other elements or information. In some designs, Object Representation 625 may include a representation of an object (i.e. Object 615 [later described], etc.) in Avatar's 605 surrounding within Application Program 18. As such, Object Representation 625 may include any information related to an object. In other designs, Object Representation 625 may include or be replaced with an object itself, in which case Object Representation 625 as an element can be omitted. In some aspects, Collection of Object Representations 525 includes one or more Object Representations 625, Object Properties 630, and/or other elements or information related to objects in Avatar's 605 surrounding at a particular time. Collection of Object Representations 525 may, therefore, include knowledge (i.e. unit of knowledge, etc.) of Avatar's 605 circumstance including objects with various properties at a particular time. In some designs, a Collection of Object Representations 525 may include or be associated with a time stamp (not shown), order (not shown), or other time related information. For example, one Collection of Object Representations 525 may be associated with time stamp t1, another Collection of Object Representations 525 may be associated with time stamp t2, and so on. Time stamps t1, t2, etc. may indicate the times of generating Collections of Object Representations 525, for instance. In other embodiments, Object Processing Unit 140 comprises the functionality for creating or generating a stream of Collections of Object Representations 525. A stream of Collections of Object Representations 525 may include one Collection of Object Representations 525 or a group, sequence, or other plurality of Collections of Object Representations 525. In some aspects, a stream of Collections of Object Representations 525 includes one or more Collections of Object Representations 525, and/or other elements or information related to objects in Avatar's 605 surrounding over time. A stream of Collections of Object Representations 525 may, therefore, include knowledge (i.e. unit of knowledge, etc.) of Avatar's 605 circumstance including objects with various properties over time. As circumstances including objects with various properties in Avatar's 605 surrounding change (i.e. objects and/or their properties change, move, act, transform, etc.) over time, this change may be captured in a stream of Collections of Object Representations 525. In some designs, each Collection of Object Representations 525 in a stream may include or be associated with the aforementioned time stamp, order, or other time related information. For example, one Collection of Object Representations 525 in a stream may be associated with order 1, a next Collection of Object Representations 525 in the stream may be associated with order 2, and so on. Orders 1, 2, etc. may indicate the orders or places of Collections of Object Representations 525 within a stream (i.e. sequence, etc.), for instance. In some implementations, Object Processing Unit 140 and/or any of its elements or functionalities can be included or embedded in Computing Device 70, Processor 11, Application Program 18, and/or other elements. Object Processing Unit 140 can be provided in any suitable configuration.

Examples of Objects 615 (also referred to simply as objects, etc.) include models of a person, animal, tree, rock, building, vehicle, and/or others in a context of a computer game, virtual world, 3D or 2D graphics Application Program 18, and/or others. More generally, examples of Objects 615 include a 2D model, a 3D model, a 2D shape (i.e. point, line, square, rectangle, circle, triangle, etc.), a 3D shape (i.e. cube, sphere, etc.), a graphical user interface (GUI) element, a form element (i.e. text field, radio button, push button, check box, etc.), a data or database element, a spreadsheet element, a link, a picture, a text (i.e. character, word, etc.), a number, and/or others in a context of a web browser, a media application, a word processing application, a spreadsheet application, a database application, a forms-based application, an operating system, a device/system control application, and/or others. Object 615 may perform operations within Application Program 18. In one example, a person Object 615 may perform operations including moving, maneuvering, jumping, running, shooting, and/or other operations within a computer game, virtual world, and/or 3D or 2D graphics Application Program 18. In another example, a character Object 615 may perform operations including appearing (i.e. when typed, etc.), disappearing (i.e. when deleted, etc.), formatting (i.e. bolding, italicizing, underlining, coloring, resizing, etc.), and/or other operations within a word processing Application Program 18. In a further example, a picture Object 615 may perform operations including resizing, repositioning, rotating, deforming, and/or other operations within a graphics Application Program 18. While all possible variations of operations on/by/with Object 615 are too voluminous to list and limited only by Object's 615 and/or Application Program's 18 design, and/or User's 50 utilization, other operations on/by/with Object 615 are within the scope of this disclosure. In some aspects, any part of Object 615 can be identified as an Object 615 itself. For instance, instead of or in addition to identifying a building as an Object 615, a window, door, roof, and/or other parts of the building can be identified as Objects 615. In general, Object 615 may include any object or part thereof that can be obtained or recognized.

Examples of Object Properties 630 (i.e. also referred to simply as object properties, etc.) include existence of Object 615, type of Object 615 (i.e. person, animal, tree, rock, building, vehicle, etc.), identity of Object 615 (i.e. name, identifier, etc.), distance of Object 615, bearing/angle of Object 615, location of Object 615 (i.e. distance and bearing/angle from a known point, coordinates, etc.), shape/size of Object 615 (i.e. scale, height, width, depth, computer model, etc.), activity of Object 615 (i.e. motion, gestures, etc.), and/or other properties of Object 615. Type of Object 615, for example, may include any classification of objects ranging from detailed such as person, animal, tree, rock, building, vehicle, etc. to generalized such as biological object, nature object, manmade object, etc., or models thereof, including their sub-types. Location of Object 615, for example, can include a relative location such as one defined by distance and bearing/angle from a known point or location (i.e. Avatar 605 location, etc.). Location of Object 615, for example, can also include absolute location such as one defined by object coordinates. In general, Object Property 630 may include any attribute of Object 615 (i.e. existence of Object 615, type of Object 615, identity of Object 615, shape/size of Object 615, etc.), any relationship of Object 615 with Avatar 605, other Object 615, or the environment (i.e. distance of Object 615, bearing/angle of Object 615, friend/foe relationship, etc.), and/or other information related to Object 615.

In some embodiments, Object Processing Unit 140 can be utilized for obtaining properties of Objects 615 in Avatar's 605 surrounding within Application Program 18. In some designs, an engine, environment, or other system used to implement Application Program 18 includes functions for providing properties or other information on Objects 615. Object Processing Unit 140 can obtain Object Properties 630 by utilizing the functions. In some aspects, existence of Object 615 in a 2D or 3D engine or environment can be obtained by utilizing functions such as GameObject.FindObjectsOfType(GameObject), GameObject.FindGameObjectsWithTag("TagN"), or GameObject.Find("ObjectN") in Unity 3D Engine; GetAllActorsOfClass( ) or IsActorInitializedo in Unreal Engine; —and/or other functions, procedures, or methods in other 2D or 3D engines or environments. In other aspects, type or other classification (i.e. person, animal, tree, rock, building, vehicle, etc.) of Object 615 in a 2D or 3D engine or environment can be obtained by utilizing functions such as GetClassName(ObjectN) or ObjectN.getType( ) in Unity 3D Engine; ActorN.Get Class( ) in Unreal Engine; ObjectN.getClassName( ) or ObjectN.getType( ) in Torque 3D Engine; and/or other functions, procedures, or methods in other 2D or 3D engines or environments. In further aspects, identity of Object 615 in a 2D or 3D engine or environment can be obtained by utilizing functions such as ObjectN.name or ObjectN.GetInstanceID( ) in Unity 3D Engine; ActorN.GetObjectName( ) or ActorN.GetUniqueID( ) in Unreal Engine; ObjectN.getName( ) or ObjectN.getID( ) in Torque 3D Engine; and/or other functions, procedures, or methods in other 2D or 3D engines or environments. In further aspects, distance of Object 615 relative to Avatar 605 in a 2D or 3D engine or environment can be obtained by utilizing functions such as VectorN.Distance(ObjectA.transform.position, ObjectB.transform.position) in Unity 3D Engine; GetDistanceTo(ActorA, ActorB) in Unreal Engine; VectorDist(VectorA, VectorB) or VectorDist(ObjectA.getPositiono,ObjectB.getPosition( ) in Torque 3D Engine; and/or other functions, procedures, or methods in other 2D or 3D engines or environments. In further aspects, angle, bearing, or direction of Object 615 relative to Avatar 605 in a 2D or 3D engine or environment can be obtained by utilizing functions such as ObjectB.transform.position—ObjectA.transform.position in Unity 3D Engine; FindLookAtRotation(TargetVector, StartVector) or ActorB→GetActor Location( )—ActorA→GetActorLocation( ) in Unreal Engine; ObjectB→getPosition( )—ObjectA→getPosition( ) in Torque 3D Engine; and/or other functions, procedures, or methods in other 2D or 3D engines or environments. In further aspects, location of Object 615 in a 2D or 3D engine or environment can be obtained by utilizing functions such as ObjectN.transform.position in Unity 3D Engine; ActorN.GetActorLocation( ) in Unreal Engine; ObjectN.getPosition(in Torque 3D Engine; and/or other similar functions, procedures, or methods in other 2D or 3D engines or environments. In another example, location (i.e. coordinates, etc.) of Object 615 on a screen can be obtained by utilizing WorldToScreeno or other similar function or method in various 2D or 3D engines or environments. In some designs, distance, angle/bearing, and/or other properties of Object 615 relative to Avatar 605 can then be calculated, inferred, derived, or estimated from Object's 615 and Avatar's 605 location information. Object Processing Unit 140 may include computational functionalities to perform such calculations, inferences, derivations, or estimations by utilizing, for example, geometry, trigonometry, Pythagorean theorem, and/or other theorems, formulas, or disciplines. In further aspects, shape/size of Object 615 in a 2D or 3D engine or environment can be obtained by utilizing functions such as Bounds.size, ObjectN.transform.localScale, or ObjectN.transform.lossyScale in Unity 3D Engine; ActorN.GetActorBounds(, ActorN.GetActorScaleo, or ActorN.GetActorScale3D( ) in Unreal Engine; ObjectN.getObjectBox(or ObjectN.getScaleo in Torque 3D Engine; and/or other similar functions, procedures, or methods in other 2D or 3D engines or environments. In some designs, detailed shape of Object 615 can be obtained by accessing the object's mesh or computer model. In general, any of the aforementioned and/or other properties of Object 615 can be obtained by accessing a scene graph or other data structure used for organizing objects in a particular engine or environment, finding a specific Object 615, and obtaining or reading any property from the Object 615. Such accessing can be performed by using the engine's or environment's functions for accessing objects in the scene graph or other data structure or by directly accessing the scene graph or other data structure. In some designs, functions and/or other instructions for obtaining properties or other information on Objects 615 of Application Program 18 can be inserted or utilized in Application Program's 18 source code. In other designs, functions and/or other instructions for obtaining properties or other information on Objects 615 of Application Program 18 can be inserted into Application Program 18 through manual, automatic, dynamic, or just-in-time (JIT) instrumentation (later described). In further designs, functions and/or other instructions for providing properties or other information on Objects 615 of Application Program 18 can be inserted into Application Program 18 through utilizing dynamic code, dynamic class loading, reflection, and/or other functionalities of a programming language or platform; utilizing dynamic, interpreted, and/or scripting programming languages; utilizing metaprogramming; and/or utilizing other techniques (later described). Object Processing Unit 140 may include any features, functionalities, and embodiments of Acquisition Interface 120, Modification Interface 130, and/or other elements. One of ordinary skill in art will understand that the aforementioned techniques for obtaining objects and/or their properties are described merely as examples of a variety of possible implementations, and that while all possible techniques for obtaining objects and/or their properties are too voluminous to describe, other techniques for obtaining objects and/or their properties known in art are within the scope of this disclosure. It should be noted that Unity 3D Engine, Unreal Engine, and Torque 3D Engine are used merely as examples of a variety of engines, environments, or systems that can be used to implement Application Program 18 and any of the aforementioned functionalities may be provided in other engines, environments, or systems. Also, in some embodiments, Application Program 18 may not use any engine, environment, or system for its implementation, in which case the aforementioned functionalities can be implemented within Application Program 18. In general, the disclosed devices, systems, and methods are independent of the engine, environment, or system used to implement Application Program 18.

In some embodiments of Application Programs 18 that do not comprise Avatar 605 or rely on Avatar 605 for their operation, Object Processing Unit 140 may obtain objects and/or their properties in Application Program 18 or a part thereof. For example, Object Processing Unit 140 can obtain objects and/or their properties in the entire Application Program 18, a part of Application Program 18 that is shown to User 50 (i.e. on a display, via a graphical user interface, etc.), or any part or area of interest (later described) of Application Program 18. In such embodiments, Object Processing Unit 140 can create or generate Collections of Object Representations 525 or streams of Collections of Object Representations 525 comprising knowledge (i.e. unit of knowledge, etc.) of Application Program's 18 circumstances including objects with various properties. It should be noted that a reference to Avatar 605 may include or be substituted with a reference to Application Program 18 and/or other processing element, and vice versa, depending on context (i.e. whether Avatar's 605 or Application Program's 18 operation is being learned and/or used, etc.). Also, a reference to operating and/or autonomous operating of Avatar 605 may include or be substituted with a reference to operating and/or autonomous operating of Application Program 18 and/or other processing element depending on context.

Figure 3:
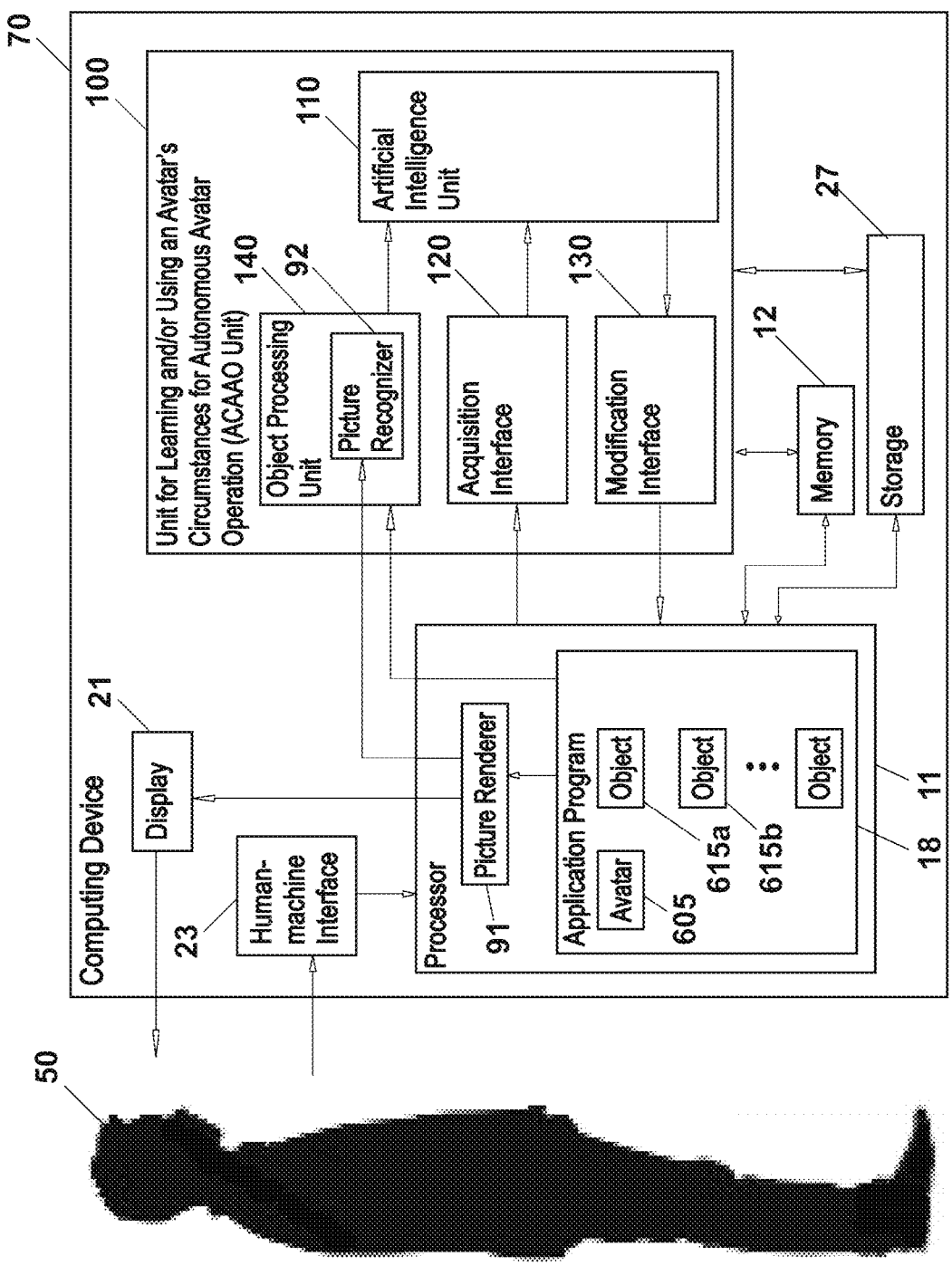
FIG. 3 illustrates an embodiment of utilizing Picture Renderer 91 and Picture Recognizer 92.

Referring to FIG. 3, an embodiment of utilizing Picture Renderer 91 and Picture Recognizer 92 is illustrated.

Picture Renderer 91 comprises the functionality for rendering or generating one or more digital pictures, and/or other functionalities. Picture Renderer 91 comprises the functionality for rendering or generating one or more digital pictures of Application Program 18. In some aspects, as a camera is used to capture pictures of a physical environment, Picture Renderer 91 can be used to render or generate pictures of a computer modeled or represented environment. As such, Picture Renderer 91 can be used to render or generate views of Application Program 18. In some designs, Picture Renderer 91 can be used to render or generate one or more digital pictures depicting a view of an Avatar's 605 visual surrounding in a 3D Application Program 18 (i.e. 3D computer game, virtual world application, CAD application, etc.). In one example, a view may include a first-person view or perspective such as a view through an avatar's eyes that shows objects around the avatar, but does not typically show the avatar itself. First-person view may sometimes include the avatar's hands, feet, other body parts, and/or objects that the avatar is holding. In another example, a view may include a third-person view or perspective such as a view that shows an avatar as well as objects around the avatar from an observer's point of view. In a further example, a view may include a view from a front of an avatar. In a further example, a view may include a view from a side of an avatar. In a further example, a view may include any stationary or movable view such as a view through a simulated camera in a 3D Application Program 18. In other designs, Picture Renderer 91 can be used to render or generate one or more digital pictures depicting a view of a 2D Application Program 18. In one example, a view may include a screenshot or portion thereof of a 2D Application Program 18. In a further example, a view may include an area of interest of a 2D Application Program 18. In a further example, a view may include a top-down view of a 2D Application Program 18. In a further example, a view may include a side-on view of a 2D Application Program 18. Any other view can be utilized in alternate designs. Any view utilized in a 3D Application Program 18 can similarly be utilized in a 2D Application Program 18 as applicable, and vice versa. In some implementations, Picture Renderer 91 may include any graphics processing device, apparatus, system, or application that can render or generate one or more digital pictures from a computer (i.e. 3D, 2D, etc.) model or representation. In some aspects, rendering, when used casually, may refer to rendering or generating one or more digital pictures from a computer model or representation, providing the one or more digital pictures to a display device, and/or displaying of the one or more digital pictures on a display device. In some embodiments, Picture Renderer 91 can be a program executing or operating on Processor 11. In one example, Picture Renderer 91 can be provided in a rendering engine such as Direct3D, OpenGL, Mantle, and/or other programs or systems for rendering or processing 3D or 2D graphics. In other embodiments, Picture Renderer 91 can be part of, embedded into, or built into Processor 11. In further embodiments, Picture Renderer 91 can be a hardware element coupled to Processor 11 and/or other elements. In further embodiments, Picture Renderer 91 can be a program or hardware element that is part of or embedded into another element. In one example, a graphics card and/or its graphics processing unit (i.e. GPU, etc.) may typically include Picture Renderer 91. In another example, ACAAO Unit 100 may include Picture Renderer 91. In a further example, Application Program 18 may include Picture Renderer 91. In general, Picture Renderer 91 can be implemented in any suitable configuration to provide its functionalities. Picture Renderer 91 may render or generate one or more digital pictures or streams of digital pictures (i.e. motion pictures, video, etc.) in various formats examples of which include JPEG, GIF, TIFF, PNG, PDF, MPEG, AVI, FLV, MOV, RM, SWF, WMV, DivX, and/or others. In some designs, Picture Renderer 91 can render or generate different digital pictures of Avatar's 605 visual surrounding or of views of Application Program 18 for displaying on Display 21 and for facilitating object recognition functionalities herein. For example, a third-person view may be displayed on Display 21 for User 50 to see and a first-person view may be used to facilitate object recognition functionalities herein. In some implementations of non-graphical Application Programs 18 such as simulations, calculations, and/or others, Picture Renderer 91 may render or generate one or more digital pictures of Avatar's 605 visual surrounding or of views of Application Program 18 to facilitate object recognition functionalities herein where the one or more digital pictures are never displayed. In some aspects, instead of or in addition to Picture Renderer 91, one or more digital pictures of Avatar's 605 visual surrounding or of views of Application Program 18 can be obtained from any element of a computing device or system that can provide such digital pictures. Examples of such elements include a graphics circuit, a graphics system, a graphics driver, a graphics interface, and/or others.

Picture Recognizer 92 comprises the functionality for detecting or recognizing objects and/or their properties in visual data, and/or other disclosed functionalities. Visual data includes digital motion pictures, digital still pictures, and/or other visual data. Examples of file formats that can be utilized to store visual data include JPEG, GIF, TIFF, PNG, PDF, MPEG, AVI, FLV, MOV, RM, SWF, WMV, DivX, and/or other file formats. In some designs, Picture Recognizer 92 can be used for detecting or recognizing objects and/or their properties in one or more digital pictures from Picture Renderer 91. For example, Picture Recognizer 92 can be utilized in detecting or recognizing existence of an object, type of an object, identity of an object, shape/size of an object, activity of an object, and/or other properties of an object. In general, Picture Recognizer 92 can be used for any operation supported by Picture Recognizer 92. Picture Recognizer 92 may detect or recognize an object and/or its properties as well as track the object and/or its properties in one or more digital pictures or streams of digital pictures (i.e. motion pictures, video, etc.). In the case of a person, Picture Recognizer 92 may detect or recognize a human head or face, upper body, full body, or portions/combinations thereof. In some aspects, Picture Recognizer 92 may detect or recognize objects and/or their properties from a digital picture by comparing regions of pixels from the digital picture with collections of pixels comprising known objects and/or their properties. The collections of pixels comprising known objects and/or their properties can be learned or manually, programmatically, or otherwise defined. The collections of pixels comprising known objects and/or their properties can be stored in any data structure or repository (i.e. one or more files, database, etc.) that resides locally on Computing Device 70, or remotely on a remote computing device (i.e. server, cloud, etc.) accessible over a network or an interface. In other aspects, Picture Recognizer 92 may detect or recognize objects and/or their properties from a digital picture by comparing features (i.e. lines, edges, ridges, corners, blobs, regions, etc.) of the digital picture with features of known objects and/or their properties. The features of known objects and/or their properties can be learned or manually, programmatically, or otherwise defined. The features of known objects and/or their properties can be stored in any data structure or repository (i.e. neural network, one or more files, database, etc.) that resides locally on Computing Device 70, or remotely on a remote computing device (i.e. server, cloud, etc.) accessible over a network or an interface. Typical steps or elements in a feature oriented picture recognition include pre-processing, feature extraction, detection/segmentation, decision-making, and/or others, or a combination thereof, each of which may include its own sub-steps or sub-elements depending on the application. In further aspects, Picture Recognizer 92 may detect or recognize multiple objects and/or their properties from a digital picture using the aforementioned pixel or feature comparisons, and/or other detection or recognition techniques. For example, a picture may depict two objects in two of its regions both of which Picture Recognizer 92 can detect simultaneously. In further aspects, where objects and/or their properties span multiple pictures, Picture Recognizer 92 may detect or recognize objects and/or their properties by applying the aforementioned pixel or feature comparisons and/or other detection or recognition techniques over a stream of digital pictures (i.e. motion picture, video, etc.). For example, once an object is detected in a digital picture (i.e. frame, etc.) of a stream of digital pictures (i.e. motion picture, video, etc.), the region of pixels comprising the detected object or the object's features can be searched in other pictures of the stream of digital pictures, thereby tracking the object through the stream of digital pictures. In further aspects, Picture Recognizer 92 may detect or recognize an object's activities by identifying and/or analyzing differences between a detected region of pixels of one picture (i.e. frame, etc.) and detected regions of pixels of other pictures in a stream of digital pictures. For example, a region of pixels comprising a person's face can be detected in multiple consecutive pictures of a stream of digital pictures (i.e. motion picture, video, etc.). Differences among the detected regions of the consecutive pictures may be identified in the mouth part of the person's face to indicate smiling or speaking activity. In further aspects, Picture Recognizer 92 may detect or recognize objects and/or their properties using one or more artificial neural networks, which may include statistical techniques. Examples of artificial neural networks that can be used in Picture Recognizer 92 include convolutional neural networks (CNNs), time delay neural networks (TDNNs), deep neural networks, and/or others. In one example, picture recognition techniques and/or tools involving convolutional neural networks may include identifying and/or analyzing tiled and/or overlapping regions or features of a digital picture, which may then be used to search for pictures with matching regions or features. In another example, features of different convolutional neural networks responsible for spatial and temporal streams can be fused to detect objects and/or their properties in streams of digital pictures (i.e. motion pictures, videos, etc.). In general, Picture Recognizer 92 may include any machine learning, deep learning, and/or other artificial intelligence techniques. Any other techniques known in art can be utilized in Picture Recognizer 92. For example, thresholds for similarity, statistical techniques, and/or optimization techniques can be utilized to determine a match in any of the above-described detection or recognition techniques.

Various aspects or properties of digital pictures or pixels can be taken into account by Picture Recognizer 92 in any of the recognizing or comparisons. Examples of such aspects or properties include color adjustment, size adjustment, content manipulation, transparency (i.e. alpha channel, etc.), use of mask, and/or others. In some implementations, as digital pictures can be captured or generated by various equipment, in various environments, and under various lighting conditions, Picture Recognizer 92 can adjust lighting or color of pixels or otherwise manipulate pixels before or during comparison. Lighting or color adjustment (also referred to as gray balance, neutral balance, white balance, etc.) may generally include manipulating or rebalancing the intensities of the colors (i.e. red, green, and/or blue if RGB color model is used, etc.) of one or more pixels. For example, Picture Recognizer 92 can adjust lighting or color of some or all pixels of one picture to make it more comparable to another picture. Picture Recognizer 92 can also incrementally adjust the pixels such as increasing or decreasing the red, green, and/or blue pixel values by a certain amount in each cycle of comparisons in order to find a similarity or match at one of the incremental adjustment levels. Any of the publically available, custom, or other lighting or color adjustment techniques or programs can be utilized such as color filters, color balancing, color correction, and/or others. In other implementations, Picture Recognizer 92 can resize or otherwise transform a digital picture before or during comparison. Such resizing or transformation may include increasing or decreasing the number of pixels of a digital picture. For example, Picture Recognizer 92 can increase or decrease the size of a digital picture proportionally (i.e. increase or decrease length and/or width keeping aspect ratio constant, etc.) to equate its size with the size of another digital picture. Picture Recognizer 92 can also incrementally resize a digital picture such as increasing or decreasing the size of the digital picture proportionally by a certain amount in each cycle of comparisons in order to find a similarity or match at one of the incremental sizes. Any of the publically available, custom, or other digital picture resizing techniques or programs can be utilized such as nearest-neighbor interpolation, bilinear interpolation, bicubic interpolation, and/or others. In further implementations, Picture Recognizer 92 can manipulate content (i.e. all pixels, one or more regions, one or more depicted objects, etc.) of a digital picture before or during comparison. Such content manipulation may include moving, centering, aligning, resizing, transforming, and/or otherwise manipulating content of a digital picture. For example, Picture Recognizer 92 can move, center, or align content of one picture to make it more comparable to another picture. Any of the publically available, custom, or other digital picture manipulation techniques or programs can be utilized such as pixel moving, warping, distorting, aforementioned interpolations, and/or others. In further implementations, in digital pictures comprising transparency features or functionalities, Picture Recognizer 92 can utilize a threshold for acceptable number or percentage transparency difference. Alternatively, transparency can be applied to one or more pixels of a digital picture and color difference may then be determined between compared pixels taking into account the transparency related color effect. Alternatively, transparent pixels can be excluded from comparison. In further implementations, certain regions or subsets of pixels can be ignored or excluded during comparison using a mask. In general, any region or subset of a picture determined to contain no content of interest can be excluded from comparison using a mask. Examples of such regions or subsets include background, transparent or partially transparent regions, regions comprising insignificant content, or any arbitrary region or subset. Picture Recognizer 92 can perform any other pre-processing or manipulation of digital pictures or pixels before or during recognizing or comparison.

In some exemplary embodiments, object recognition techniques and/or tools such as OpenCV (Open Source Computer Vision) library, CamFind API, Kooaba, 6px API, Dextro API, and/or others can be utilized for detecting or recognizing objects and/or their properties in digital pictures. In some aspects, picture recognition techniques and/or tools involve identifying and/or analyzing features such as lines, edges, ridges, corners, blobs, regions, and/or their relative positions, sizes, shapes, etc., which may then be used to search for pictures with matching features. For example, OpenCV library can detect an object (i.e. person, animal, vehicle, rock, etc.) and/or its properties in one or more digital pictures from Picture Renderer 91 or stored in an electronic repository, which can then be utilized in ACAAO Unit 100, Artificial Intelligence Unit 110, and/or other elements. In other exemplary embodiments, facial recognition techniques and/or tools such as OpenCV (Open Source Computer Vision) library, Animetrics FaceR API, Lambda Labs Facial Recognition API, Face++SDK, Neven Vision (also known as N-Vision) Engine, and/or others can be utilized for detecting or recognizing faces in digital pictures. In some aspects, facial recognition techniques and/or tools involve identifying and/or analyzing facial features such as the relative position, size, and/or shape of the eyes, nose, cheekbones, jaw, etc., which may then be used to search for pictures with matching features. For example, FaceR API can detect a person's face in one or more digital pictures from Picture Renderer 91 or stored in an electronic repository, which can then be utilized in ACAAO Unit 100, Artificial Intelligence Unit 110, and/or other elements.

It should be noted that Picture Renderer 91 and Picture Recognizer 92 can optionally be used to detect objects and/or their properties that cannot not be obtained from Application Program 18 or from an engine, environment, or system used to implement Application Program 18. Picture Renderer 91 and Picture Recognizer 92 can also optionally be used where Picture Renderer 91 and Picture Recognizer 92 offer superior performance in detecting objects and/or their properties. Picture Renderer 91 and Picture Recognizer 92 can also optionally be used to confirm objects and/or their properties obtained or detected by other means. For example, identity of an object, type of an object, and/or action of an object, if needed, can be recognized or confirmed through picture processing of Picture Renderer 91 and Picture Recognizer 92. Picture Renderer 91 and Picture Recognizer 92 can be omitted depending on implementation.

Figure 4:
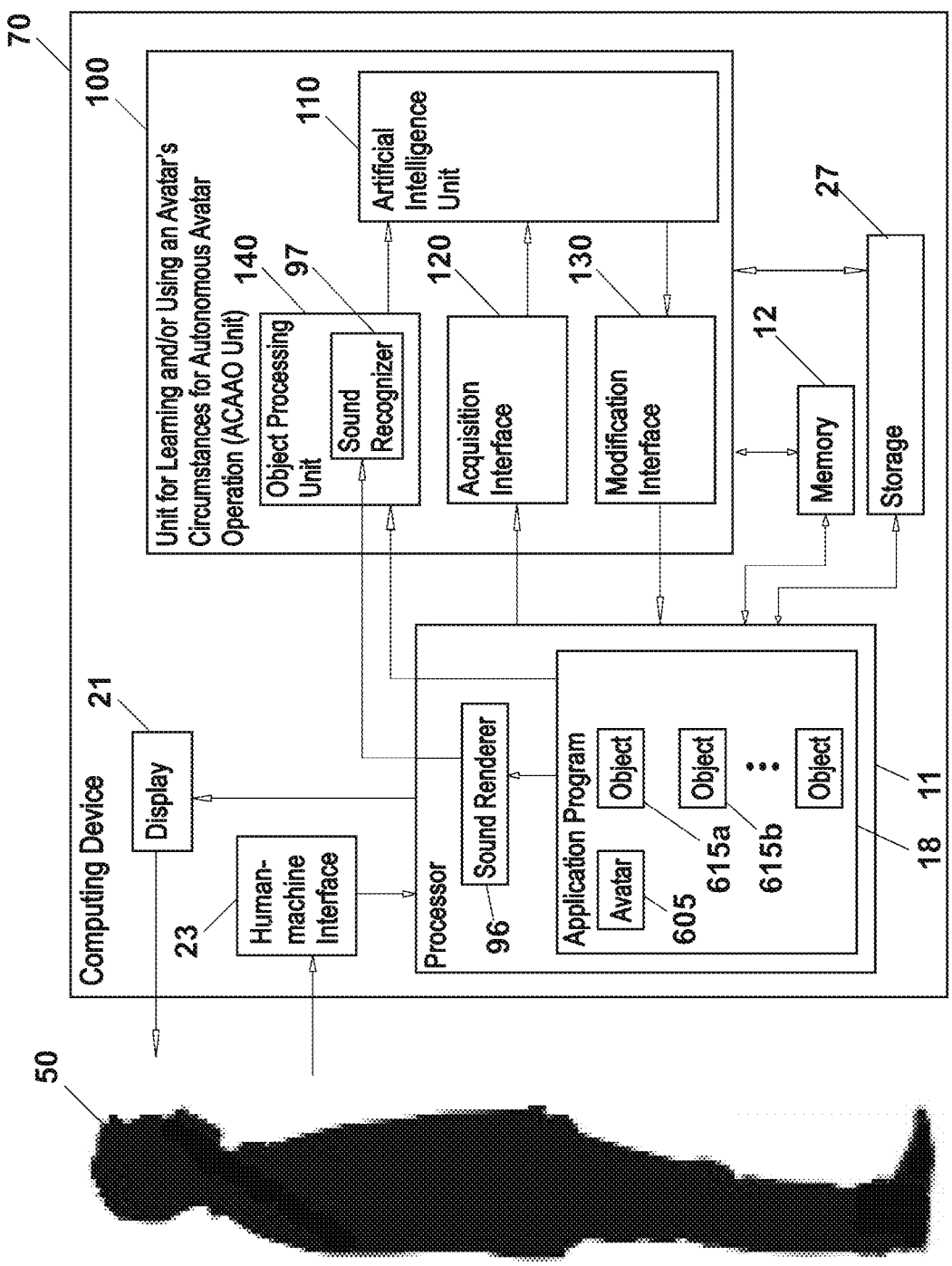
FIG. 4 illustrates an embodiment of utilizing Sound Renderer 96 and Sound Recognizer 97.

Referring to FIG. 4, an embodiment of utilizing Sound Renderer 96 and Sound Recognizer 97 is illustrated.

Sound Renderer 96 comprises the functionality for rendering or generating digital sound, and/or other functionalities. Sound Renderer 96 comprises the functionality for rendering or generating digital sound of Application Program 18. In some aspects, as a microphone is used to capture sound of a physical environment, Sound Renderer 96 can be used to render or generate sound of a computer modeled or represented environment. As such, Sound Renderer 96 can be used to render or generate sound of Application Program 18. In some designs, Sound Renderer 96 can be used to render or generate digital sound from Avatar's 605 surrounding in a 3D Application Program 18 (i.e. 3D computer game, virtual world application, CAD application, etc.). For example, emission of a sound from a sound source may be simulated/modeled in a virtual space of a 3D Application Program 18, propagation of the sound may be simulated/modeled through the virtual space including any scattering, reflections, refractions, diffractions, and/or other effects, and the sound may be rendered or generated as perceived by a listener (i.e. Avatar 605, etc.). In other designs, Sound Renderer 96 can be used to render or generate digital sound of a 2D Application Program 18 which may include any of the aforementioned and/or other sound simulation/modeling as applicable to 2D spaces. In further designs, Sound Renderer 96 can be optionally omitted in a simple Application Program 18 where no sound simulation/modeling is needed or where sounds may simply be played. In some implementations, Sound Renderer 96 may include any sound processing device, apparatus, system, or application that can render or generate digital sound. In some aspects, rendering, when used casually, may refer to rendering or generating digital sound from a computer model or representation, providing digital sound to a speaker or headphones, and/or producing the sound by a speaker or headphones. In some embodiments, Sound Renderer 96 can be a program executing or operating on Processor 11. In one example, Sound Renderer 96 can be provided in a rendering engine such as SoundScape Renderer, SLAB Spatial Audio Renderer, Uni-Verse Sound Renderer, Crepo Sound Renderer, and/or other programs or systems for rendering or processing sound. In another example, various engines or environments such as Unity 3D Engine, Unreal Engine, Torque 3D Engine, and/or others provide built-in sound renderers. In other embodiments, Sound Renderer 96 can be part of, embedded into, or built into Processor 11. In further embodiments, Sound Renderer 96 can be a hardware element coupled to Processor 11 and/or other elements. In further embodiments, Sound Renderer 96 can be a program or hardware element that is part of or embedded into another element. In one example, a sound card and/or its processing unit may include Sound Renderer 96. In another example, ACAAO Unit 100 may include Sound Renderer 96. In a further example, Application Program 18 may include Sound Renderer 96. In general, Sound Renderer 96 can be implemented in any suitable configuration to provide its functionalities. Sound Renderer 96 may render or generate digital sound in various formats examples of which include WAV, WMA, AIFF, MP3, RA, OGG, and/or others. In some designs, Sound Renderer 96 can render or generate different digital sound of an Application Program 18 for production on a speaker or headphones and for facilitating object recognition functionalities herein. For example, sound of Avatar's 605 shooting may be produced by a speaker or headphones for User 50 to hear and sound of various objects in Avatar's 605 surrounding may be used to facilitate object recognition functionalities herein. In some implementations of non-acoustic Application Programs 18 such as simulations, calculations, and/or others, Sound Renderer 96 may render or generate digital sound as perceived by Avatar 605 to facilitate object recognition functionalities herein where the sound is never produced on a speaker or headphones. In some aspects, instead of or in addition to Sound Renderer 96, digital sound perceived by Avatar 605 can be obtained from any element of a computing device or system that can provide such digital sound. Examples of such elements include an audio circuit, an audio system, an audio driver, an audio interface, and/or others.

Sound Recognizer 97 comprises the functionality for detecting or recognizing objects and/or their properties in audio data, and/or other disclosed functionalities. Audio data includes digital sound, and/or other audio data. Examples of file formats that can be utilized to store audio data include WAV, WMA, AIFF, MP3, RA, OGG, and/or other file formats. In some designs, Sound Recognizer 97 can be used for detecting or recognizing objects and/or their properties in digital sound from Sound Renderer 96. In the case of a person, Sound Recognizer 97 may detect or recognize human voice. For example, Sound Recognizer 97 can be utilized in detecting or recognizing existence of an object, type of an object, identity of an object, activity of an object, and/or other properties of an object. In general, Sound Recognizer 97 can be used for any operation supported by Sound Recognizer 97. In some aspects, Sound Recognizer 97 may detect or recognize an object and/or its properties from a digital sound by comparing collections of sound samples from the digital sound with collections of sound samples of known objects and/or their properties. The collections of sound samples of known objects and/or their properties can be learned, or manually, programmatically, or otherwise defined. The collections of sound samples of known objects and/or their properties can be stored in any data structure or repository (i.e. one or more files, database, etc.) that resides locally on Computing Device 70, or remotely on a remote computing device (i.e. server, cloud, etc.) accessible over a network or an interface. In other aspects, Sound Recognizer 97 may detect or recognize an object and/or its properties from a digital sound by comparing features from the digital sound with features of sounds of known objects and/or their properties. The features of sounds of known objects and/or their properties can be learned, or manually, programmatically, or otherwise defined. The features of sounds of known objects and/or their properties can be stored in any data structure or repository (i.e. neural network, one or more files, database, etc.) that resides locally on Computing Device 70, or remotely on a remote computing device (i.e. server, cloud, etc.) accessible over a network or an interface. Typical steps or elements in a feature oriented sound recognition include pre-processing, feature extraction, acoustic modeling, language modeling, and/or others, or a combination thereof, each of which may include its own sub-steps or sub-elements depending on the application. In further aspects, Sound Recognizer 97 may detect or recognize a variety of sounds from digital sound using the aforementioned sound sample or feature comparisons, and/or other detection or recognition techniques. For example, sound of a person, animal, vehicle, and/or other sounds can be detected by Sound Recognizer 97. In further aspects, Sound Recognizer 97 may detect or recognize sounds using Hidden Markov Models (HMM), Artificial Neural Networks, Dynamic Time Warping (DTW), Gaussian Mixture Models (GMM), and/or other models or techniques, or a combination thereof. Some or all of these models or techniques may include statistical techniques. Examples of artificial neural networks that can be used in Sound Recognizer 97 include recurrent neural networks, time delay neural networks (TDNNs), deep neural networks, convolutional neural networks, and/or others. In general, Sound Recognizer 97 may include any machine learning, deep learning, and/or other artificial intelligence techniques. Any other techniques known in art can be utilized in Sound Recognizer 97. For example, thresholds for similarity, statistical techniques, and/or optimization techniques can be utilized to determine a match in any of the above-described detection or recognition techniques.

In some exemplary embodiments, operating system's sound recognition functionalities such as iOS's Voice Services, Siri, and/or others can be utilized in Sound Recognizer 97. For example, iOS Voice Services can detect an object (i.e. person, etc.) and/or its properties in digital sound from Sound Renderer 96 or stored in an electronic repository, which can then be utilized in ACAAO Unit 100, Artificial Intelligence Unit 110, and/or other elements. In other exemplary embodiments, Java Speech API (JSAPI) implementation such as The Cloud Garden, Sphinx, and/or others can be utilized in Sound Recognizer 97. For example, Cloud Garden JSAPI can detect an object (i.e. person, animal, vehicle, etc.) and/or its properties in digital sound from Sound Renderer 96 or stored in an electronic repository, which can then be utilized in ACAAO Unit 100, Artificial Intelligence Unit 110, and/or other elements. Any other programming language's or platform's speech or sound processing API can similarly be utilized. In further exemplary embodiments, applications or engines providing Sound recognition functionalities such as HTK (Hidden Markov Model Toolkit), Kaldi, OpenEars, Dragon Mobile, Julius, iSpeech, CeedVocal, and/or others can be utilized in Sound Recognizer 97. For example, Kaldi SDK can detect an object (i.e. person, animal, vehicle, etc.) and/or its properties in digital sound from Sound Renderer 96 or stored in an electronic repository, which can then be utilized in ACAAO Unit 100, Artificial Intelligence Unit 110, and/or other elements.

It should be noted that Sound Renderer 96 and Sound Recognizer 97 can optionally be used to detect objects and/or their properties that cannot not be obtained from Application Program 18 or from an engine, environment, or system used to implement Application Program 18. Sound Renderer 96 and Sound Recognizer 97 can also optionally be used where Sound Renderer 96 and Sound Recognizer 97 offer superior performance in detecting objects and/or their properties. Sound Renderer 96 and Sound Recognizer 97 can also optionally be used to confirm objects and/or their properties obtained or detected by other means. For example, identity of an object, type of an object, and/or activity of an object, if needed, can be recognized or confirmed through sound processing of Sound Renderer 96 and Sound Recognizer 97. Sound Renderer 96 and Sound Recognizer 97 can be omitted depending on implementation.

One of ordinary skill in art will understand that the aforementioned techniques for detecting or recognizing objects and/or their properties using pictures and sounds are described merely as examples of a variety of possible implementations, and that while all possible techniques for detecting or recognizing objects and/or their properties are too voluminous to describe, other techniques for detecting or recognizing objects and/or their properties known in art are within the scope of this disclosure. Also, any signal processing technique known in art that can facilitate the disclosed functionalities can be utilized in various embodiments. Any combination of the aforementioned and/or other renderers, object detecting or recognizing techniques, signal processing techniques, and/or other elements or techniques can be used in various embodiments.

Figure 5A:
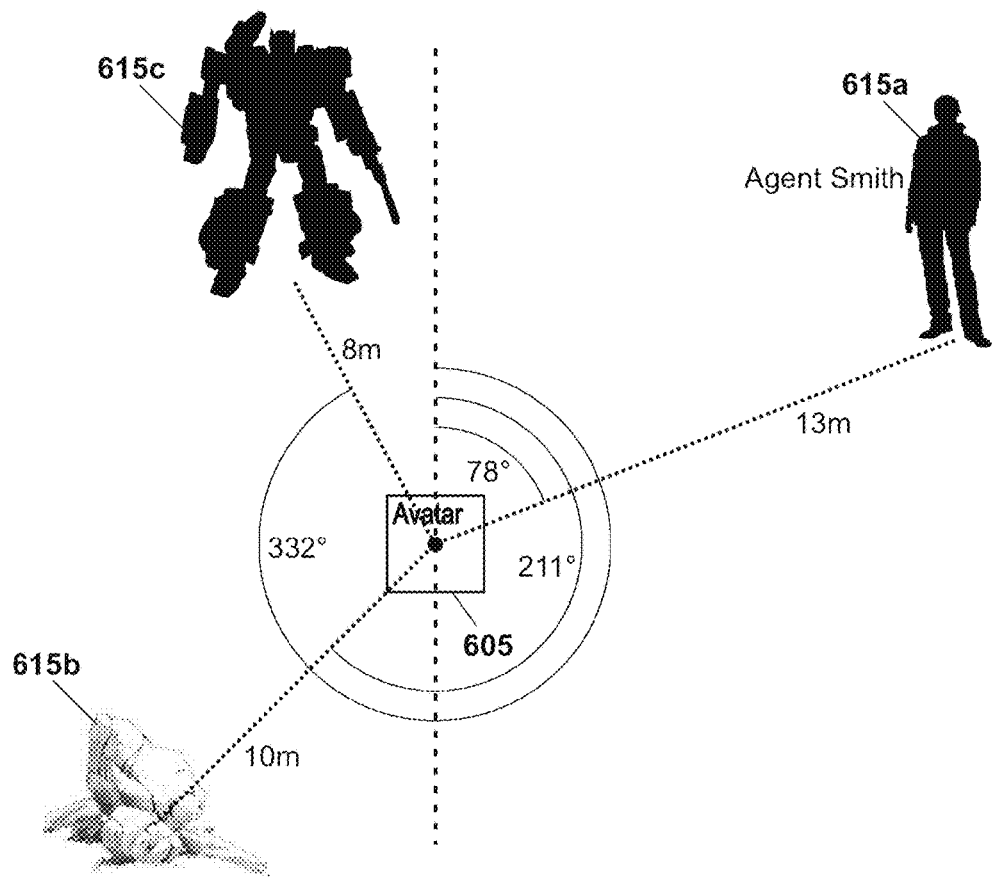
FIGS. 5A-5B, illustrate an exemplary embodiment of Objects 615 in Avatar's 605 surrounding, and resulting Collection of Object Representations 525
Figure 5B:
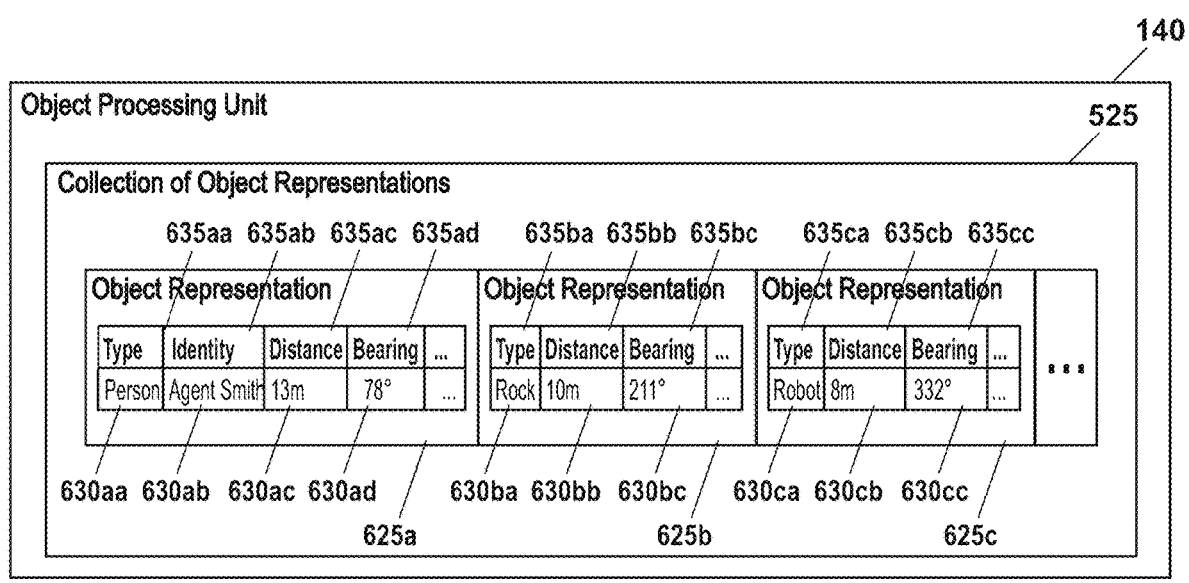

Referring to FIGS. 5A-5B, an exemplary embodiment of Objects 615 (also referred to simply as objects or other suitable name or reference) in Avatar's 605 surrounding, and resulting Collection of Object Representations 525 are illustrated.

As shown for example in FIG. 5A, Object 615a exists in Avatar's 605 surrounding. Object 615a may be recognized as a person. Object 615a may be located at a distance of 13 m from Avatar 605. Object 615a may be located at a bearing/angle of 780 from Avatar's 605 centerline. Object 615a may be identified as Agent Smith. Furthermore, Object 615b exists in Avatar's 605 surrounding. Object 615b may be recognized as a rock. Object 615b may be located at a distance of 10 m from Avatar 605. Object 615b may be located at a bearing/angle of 211° from Avatar's 605 centerline. Furthermore, Object 615c exists in Avatar's 605 surrounding. Object 615c may be recognized as a robot. Object 615c may be located at a distance of 8 m from Avatar 605. Object 615c may be located at a bearing/angle of 332° from Avatar's 605 centerline. Any Objects 615 instead of or in addition to Object 615a, Object 615b, and Object 615c may exist in Avatar's 605 surrounding, one or more of which can be obtained, learned, and/or used. In some designs, some Objects 615 can be omitted. Which Objects 615 or types of Objects 615 are obtained, learned, and/or used can be defined by a user, by ACAAO system administrator, or automatically by the system based on experience, testing, inquiry, analysis, synthesis, or other techniques, knowledge, or input. In further designs, a 3D Application Program 18 may include elevated Objects 615 such as flying objects (i.e. flying animals, aircraft, etc.), objects on hills or mountains, objects on buildings, and/or others in which case altitudinal information related to distance and bearing/angle of Objects 615 relative to Avatar 605 can be obtained, learned, and/or used. Any unit of distance and/or bearing/angle can be utilized instead of or in addition to meters and/or angular degrees.

As shown for example in FIG. 5B, Object Processing Unit 140 may create or generate Collection of Object Representations 525 including Object Representation 625a representing Object 615a, Object Representation 625b representing Object 615b, Object Representation 625c representing Object 615c, etc. For instance, Object Representation 625a may include Object Property 630aa "Person" in Category 635aa "Type", Object Property 630ab "Agent Smith" in Category 635ab "Identity", Object Property 630ac "13m" in Category 635ac "Distance", Object Property 630ad "78°" in Category 635ad "Bearing", etc. Also, Object Representation 625b may include Object Property 630ba "Rock" in Category 635ba "Type", Object Property 630bb "10 m" in Category 635bb "Distance", Object Property 630bc "211°" in Category 635bc "Bearing", etc. Also, Object Representation 625c may include Object Property 630ca "Robot" in Category 635ca "Type", Object Property 630cb "8 m" in Category 635cb "Distance", Object Property 630cc "332°" in Category 635cc "Bearing", etc. Any number of Object Representations 625, and/or other elements or information can be included in Collection of Object Representations 525. Any number of Object Properties 630 (also referred to simply as object properties or other suitable name or reference), and/or other elements or information can be included in an Object Representation 625. In some aspects, a reference to Collection of Object Representations 525 comprises a reference to a collection of Object Properties 630 and/or other elements or information related to one or more Objects 615. Other additional Object Representations 625, Object Properties 630, elements, and/or information can be included as needed, or some of the disclosed ones can be excluded, or a combination thereof can be utilized in alternate embodiments of Collection of Object Representations 525.

Referring now to ACAAO Unit 100, ACAAO Unit 100 comprises any hardware, programs, or a combination thereof. ACAAO Unit 100 comprises the functionality for learning the operation of Avatar 605 in circumstances including objects with various properties. ACAAO Unit 100 comprises the functionality for structuring and/or storing this knowledge in a knowledgebase (i.e. neural network, graph, sequences, other repository, etc.). ACAAO Unit 100 comprises the functionality for enabling autonomous operation of Avatar 605 in circumstances including objects with various properties. In some embodiments of Application Programs 18 that do not comprise Avatar 605 or rely on Avatar 605 for their operation, ACAAO Unit 100 comprises the functionality for learning the operation of Application Program 18 in circumstances including objects with various properties similar to the learning functionalities described with respect to Avatar 605. Also, in such embodiments, ACAAO Unit 100 comprises the functionality for enabling autonomous operation of Application Program 18 in circumstances including objects with various properties similar to the autonomous operation functionalities described with respect to Avatar 605. ACAAO Unit 100 comprises the functionality for interfacing with or attaching to Avatar 605, Application Program 18, Processor 11, and/or other processing element. ACAAO Unit 100 comprises the functionality for obtaining instruction sets, data, and/or other information used, implemented, and/or executed by Avatar 605, Application Program 18, Processor 11, and/or other processing element. ACAAO Unit 100 comprises the functionality for modifying instruction sets, data, and/or other information used, implemented, and/or executed by Avatar 605, Application Program 18, Processor 11, and/or other processing element. ACAAO Unit 100 comprises learning, anticipating, decision making, automation, and/or other functionalities disclosed herein. Statistical, artificial intelligence, machine learning, and/or other models or techniques are utilized to implement the disclosed devices, systems, and methods. In some designs, ACAAO Unit 100 and/or elements thereof may be or include a hardware element embedded or built into Processor 11, and/or other processing element. In other designs, ACAAO Unit 100 and/or elements thereof may be or include a hardware element coupled to or interfaced with Avatar 605, Application Program 18, Processor 11, and/or other processing element. In other designs, ACAAO Unit 100 and/or elements thereof may be or include a program operating on Processor 11, and/or other processing element. In further designs, ACAAO Unit 100 and/or elements thereof may be or include a program coupled to or interfaced with Avatar 605, Application Program 18, Processor 11, and/or other processing element. In further designs, ACAAO Unit 100 and/or elements thereof may be or include a program embedded or built into Avatar 605, Application Program 18, and/or other processing element. ACAAO Unit 100 can be provided in a combination of the aforementioned or other suitable configurations in alternate designs.

When ACAAO Unit 100 functionalities are applied to Avatar 605, Application Program 18, Processor 11, and/or other processing element, Avatar 605, Application Program 18, Processor 11, and/or other processing element may become autonomous. ACAAO Unit 100 may take control from, share control with, and/or release control to Avatar 605, Application Program 18, Processor 11, and/or other processing element to implement autonomous operation of Avatar 605, Application Program 18, Processor 11, and/or other processing element. ACAAO Unit 100 may take control from, share control with, and/or release control to Avatar 605, Application Program 18, Processor 11, and/or other processing element automatically or after prompting User 50 to allow it. In some aspects, Avatar 605, Application Program 18, Processor 11, and/or other processing element may include or be provided with anticipatory (also referred to as alternate or other suitable name or reference) instructions or instruction sets that User 50 did not issue or cause to be executed. Such anticipatory instructions or instruction sets include instruction sets that User 50 may want or is likely to issue or cause to be executed. Anticipatory instructions or instruction sets can be generated by ACAAO Unit 100 or elements thereof based on circumstances including objects with various properties. As such, Avatar 605, Application Program 18, Processor 11, and/or other processing element may include or be provided with some or all original instructions or instruction sets and/or any anticipatory instructions or instruction sets generated by ACAAO Unit 100. Therefore, autonomous operating of Avatar 605, Application Program 18, Processor 11, and/or other processing element may include executing some or all original instructions or instruction sets and/or any anticipatory instructions or instruction sets generated by ACAAO Unit 100. In one example, ACAAO Unit 100 can overwrite or rewrite the original instructions or instruction sets with ACAAO Unit 100-generated instructions or instruction sets. In another example, ACAAO Unit 100 can insert or embed ACAAO Unit 100-generated instructions or instruction sets among the original instructions or instruction sets. In a further example, ACAAO Unit 100 can branch, redirect, or jump to ACAAO Unit 100-generated instructions or instruction sets from the original instructions or instruction sets.

In some embodiments, autonomous Avatar 605 operating comprises determining, by ACAAO Unit 100, a next instruction or instruction set to be executed based on Avatar's 605 circumstances including objects with various properties prior to the user issuing or causing to be executed the next instruction or instruction set. In other embodiments, autonomous Avatar 605 operating comprises determining, by ACAAO Unit 100, a next instruction or instruction set to be executed based on Avatar's 605 circumstances including objects with various properties prior to the system receiving the next instruction or instruction set.

In some embodiments, autonomous Avatar 605 operating includes a partially or fully autonomous operating.

In an example involving partially autonomous Avatar 605 operating, a user confirms ACAAO Unit 100-generated instructions or instruction sets prior to their execution. In an example involving fully autonomous application operating, ACAAO Unit 100-generated instructions or instruction sets are executed without user or other system confirmation (i.e. automatically, etc.).

In some embodiments, a combination of ACAAO Unit 100 and other systems and/or techniques can be utilized to implement Avatar's 605 operation. In one example, ACAAO Unit 100 may be a primary or preferred system for implementing Avatar's 605 operation. While operating autonomously under the control of ACAAO Unit 100, Avatar 605 may encounter a circumstance including objects with various properties that has not been encountered or learned before. In such situations, User 50 and/or non-ACAAO system may take control of Avatar's 605 operation. ACAAO Unit 100 may take control again when Avatar 605 encounters a previously learned circumstance including objects with various properties. Naturally, ACAAO Unit 100 can learn Avatar's 605 operation in circumstances while User 50 and/or non-ACAAO system is in control of Avatar 605, thereby reducing or eliminating the need for future involvement of User 50 and/or non-ACAAO system. In another example, User 50 and/or non-ACAAO system may be a primary or preferred system for implementing Avatar's 605 operation. While operating under the control of User 50 and/or non-ACAAO system, User 50 and/or non-ACAAO system may release control to ACAAO Unit 100 for any reason (i.e. User 50 gets tired or distracted, non-ACAAO system gets stuck or cannot make a decision, etc.), at which point Avatar 605 can be controlled by ACAAO Unit 100. In some designs, ACAAO Unit 100 may take control in certain special circumstances including objects with various properties where ACAAO Unit 100 may offer superior performance even though User 50 and/or non-ACAAO system may generally be preferred. Once Avatar 605 leaves such special circumstances, ACAAO Unit 100 may release control to User 50 and/or non-ACAAO system. In general, ACAAO Unit 100 can take control from, share control with, or release control to User 50, non-ACAAO system, and/or other system or process at any time, in any circumstances, and remain in control for any period of time as needed.

In some embodiments, ACAAO Unit 100 may control one or more elements of Avatar 605 while User 50 and/or non-ACAAO system may control other one or more elements of Avatar 605. For example, ACAAO Unit 100 may control Avatar's 605 movement, while User 50 and/or non-ACAAO system may control Avatar's 605 aiming and shooting. Any other combination of controlling various elements or functions of Avatar 605 by ACAAO Unit 100, User 50, and/or non-ACAAO system can be implemented.

In some embodiments, ACAAO Unit 100 enables learning of a particular User's 50 knowledge, methodology, or style of operating Avatar 605. In some aspects, learning of a particular User's 50 knowledge, methodology, or style of operating Avatar 605 includes learning the User's 50 directing or operating Avatar 605 in circumstances including objects with various properties. In one example, one User 50 may shoot an opponent while another User 50 may strike the opponent with a sword in a computer game. In another example, one User 50 may jump over an obstacle while another User 50 may move around the obstacle in a virtual world application. In a further example, one User 50 may drive fast while another User 50 may drive cautiously in a racing game, and so on. The knowledge of User's 50 methodology or style of operating Avatar 605 can be used to enable personalized autonomous operation of Avatar 605 specific to a particular User 50. Therefore, ACAAO-enabled Avatar 605 may exemplify User's 50 knowledge, methodology, or style of operating Avatar 605 as learned from User 50. In some designs, this functionality enables one or more ACAAO-enabled Avatars 605 to be utilized in Application Program 18 (i.e. computer game, virtual world, etc.) to assist User 50 in defeating an opponent or achieving another goal. For example, User 50 can utilize a team of ACAAO-enabled Avatars 605 each of which may exemplify User's 50 knowledge, methodology, or style of operating Avatar 605. In other designs, ACAAO Unit 100 enables a professional or other experienced Application Program 18 operator (i.e. game player, etc.) to record his/her knowledge, methodology, or style of operating Avatar 605 into Knowledgebase 530 (i.e. Neural Network 530*a*, Graph 530*b*, Collection of Sequences 530*c*, Sequence 533, Collection of Knowledge Cells 530*d*, etc.) and/or other repository. User 50 can then sell or make available his/her knowledge, methodology, or style of operating Avatar 605 to other users who may want to implement User's 50 knowledge, methodology, or style of operating Avatar 605. Knowledgebase 530 and/or other repository comprising User's 50 knowledge, methodology, or style of operating Avatar 605 can be available to other users via a storage medium, via a network, or via other means. In some implementations, User's 50 knowledge, methodology, or style of operating Avatar 605 can be applied to or implemented on any Object 615 of Application Program 18 as applicable, thereby enabling any Object 615 to exemplify User's 50 knowledge, methodology, or style of operating as learned from User 50. For example, a computer game developer may associate Knowledgebase 530 comprising User's 50 knowledge, methodology, or style of operating Avatar 605 with an Object 615 (i.e. tank, robot, aircraft, etc.), thereby enabling the Object 615 to operate based on the knowledge in the Knowledgebase 530.

Referring now to Acquisition Interface 120, Acquisition Interface 120 comprises the functionality for obtaining and/or receiving instruction sets, data, and/or other information. Acquisition Interface 120 comprises the functionality for obtaining and/or receiving instruction sets, data, and/or other information related to the operation of Avatar 605, Application Program 18, Processor 11, and/or other processing element. Acquisition Interface 120 comprises the functionality for obtaining and/or receiving instruction sets, data, and/or other information from Avatar 605, Application Program 18, Processor 11, and/or other processing element. Acquisition Interface 120 comprises the functionality for obtaining and/or receiving instruction sets, data, and/or other information at runtime. In one example, Acquisition Interface 120 can obtain Instruction Sets 526 used or executed in operating Avatar 605 operation, and transmit the Instruction Sets 526 to Artificial Intelligence Unit 110 for learning Avatar's 605 operation in circumstances including objects with various properties. In another example, in Application Programs 18 that do not comprise Avatar 605 or do not rely on Avatar 605 for their operation, Acquisition Interface 120 can obtain Instruction Sets 526 used or executed in operating Application Program 18, and transmit the Instruction Sets 526 to Artificial Intelligence Unit 110 for learning Application Program's 18 operation in circumstances including objects with various properties. Acquisition Interface 120 also comprises the functionality for tracing or profiling of Avatar 605, Application Program 18, Processor 11, and/or other processing element. Tracing or profiling may include adding trace code or instrumentation to Avatar 605 (i.e. Avatar's 605 object code, etc.) or Application Program 18, and/or outputting trace information (i.e. instruction sets, data, and/or other information, etc.) to a receiving target. Acquisition Interface 120 further comprises the functionality for attaching to or interfacing with Avatar 605, Application Program 18, Processor 11, and/or other processing element. In some aspects, Acquisition Interface 120 can access and/or read runtime engine/environment, virtual machine, operating system, compiler, interpreter, translator, execution stack, file, object, data structure, and/or other computing system elements. In other aspects, Acquisition Interface 120 can access and/or read memory, storage, and/or other repository. In further aspects, Acquisition Interface 120 can access and/or read Processor 11 registers and/or other Processor 11 elements. In further aspects, Acquisition Interface 120 can access and/or read inputs and/or outputs of Avatar 605, Application Program 18, Processor 11, and/or other processing element. In further aspects, Acquisition Interface 120 can access and/or read functions, methods, procedures, routines, subroutines, and/or other elements of Avatar 605 and/or Application Program 18. In further aspects, Acquisition Interface 120 can access and/or read source code, bytecode, compiled, interpreted code, translated code, machine code, and/or other code. In further aspects, Acquisition Interface 120 can access and/or read values, variables, parameters, and/or other data or information. Acquisition Interface 120 also comprises the functionality for transmitting the obtained instruction sets, data, and/or other information to Artificial Intelligence Unit 110 and/or other elements. As such, Acquisition Interface 120 provides input into Artificial Intelligence Unit 110 for knowledge structuring, anticipating, decision making, and/or other functionalities later in the process. Acquisition Interface 120 also comprises other disclosed functionalities.

Acquisition Interface 120 can employ various techniques for obtaining instruction sets, data, and/or other information. In one example, Acquisition Interface 120 can attach to and/or obtain Avatar's 605, Application Program's 18, Processor's 11, and/or other processing element's instruction sets, data, and/or other information through tracing or profiling techniques. Tracing or profiling may be used for outputting Avatar's 605, Application Program's 18, Processor's 11, and/or other processing element's instruction sets, data, and/or other information at runtime. For instance, tracing or profiling may include adding trace code (i.e. instrumentation, etc.) to Avatar 605 (i.e. Avatar's 605 object code, etc.) or Application Program 18, and/or outputting trace information to a specific target. The outputted trace information (i.e. instruction sets, data, and/or other information, etc.) can then be provided to or recorded into a file, data structure, repository, application, and/or other system or target that may receive such trace information. As such, Acquisition Interface 120 can utilize tracing or profiling to obtain instruction sets, data, and/or other information and provide them as input into Artificial Intelligence Unit 110. In some aspects, instrumentation can be performed in source code, bytecode, compiled code, interpreted code, translated code, machine code, and/or other code. In other aspects, instrumentation can be performed in various elements of a computing system such as memory, virtual machine, runtime engine/environment, operating system, compiler, interpreter, translator, processor registers, and/or other elements. In yet other aspects, instrumentation can be performed in various abstraction layers of a computing system such as in software layer (i.e. Application Program 18, etc.), in virtual machine (if VM is used), in operating system, in Processor 11, and/or in other layers or areas that may exist in a particular computing system implementation. In yet other aspects, instrumentation can be performed at various times in Avatar's 605 or Application Program's 18 execution such as source code write time, compile time, interpretation time, translation time, linking time, loading time, runtime, and/or others. In yet other aspects, instrumentation can be performed at various granularities or code segments such as some or all lines of code, some or all statements, some or all instructions or instruction sets, some or all basic blocks, some or all functions/routines/subroutines, and/or some or all other code segments.

In some embodiments, Avatar 605 (i.e. Avatar's 605 object code, etc.) or Application Program 18 can be automatically instrumented. For example, Acquisition Interface 120 can access Avatar's 605 or Application Program's 18 source code, bytecode, or machine code and select instrumentation points of interest. Selecting instrumentation points may include finding locations in the source code, bytecode, or machine code corresponding to function calls, function entries, function exits, object creations, object destructions, event handler calls, new lines (i.e. to instrument all lines of code, etc.), thread creations, throws, and/or other points of interest. Instrumentation code can then be inserted at the instrumentation points of interest to output Avatar's 605 or Application Program's 18 instruction sets, data, and/or other information. In response to executing instrumentation code, Avatar's 605 or Application Program's 18 instruction sets, data, and/or other information may be received by Acquisition Interface 120. In some aspects, Avatar's 605 or Application Program's 18 source code, bytecode, or machine code can be dynamically instrumented. For example, instrumentation code can be dynamically inserted into Avatar 605 (i.e. Avatar's 605 object code, etc.) or Application Program 18 at runtime.

In other embodiments, Avatar 605 or Application Program 18 can be manually instrumented. In one example, a programmer can instrument a function call by placing an instrumenting function such as traceAvatar( ), traceApplication( ), etc. immediately after the function call as in the following example.

Avatar.moveForward(12);
traceAvatar('Avatar.moveForward(12);');

In another example, an instrumenting function can be placed immediately before the function call, or at the beginning, end, or anywhere within the function itself. A programmer may instrument all function calls or only function calls of interest. In a further example, a programmer can instrument all lines of code or only code lines of interest. In a further example, a programmer can instrument other elements utilized or implemented within Avatar 605 or Application Program 18 such as objects and/or any of their functions, data structures and/or any of their functions, event handlers and/or any of their functions, threads and/or any of their functions, and/or other elements or functions. Similar instrumentation as in the preceding examples can be performed automatically or dynamically. In some designs where manual code instrumentation is utilized, Acquisition Interface 120 can optionally be omitted and Avatar's 605 or Application Program's 18 instruction sets, data, and/or other information may be transmitted directly to Artificial Intelligence Unit 110.

In some embodiments, ACAAO Unit 100 can be selective in learning instruction sets, data, and/or other information to those implemented, utilized, or related to an object, data structure, repository, thread, function, and/or other element of Application Program 18. In some aspects, Acquisition Interface 120 can obtain Application Program's 18 instruction sets, data, and/or other information implemented, utilized, or related to a certain object in an object oriented Application Program 18. For example, Acquisition Interface 120 can obtain Application Program's 18 instruction sets, data, and/or other information implemented, utilized, or related to Avatar 605.

In some embodiments, various computing systems and/or platforms may provide native tools for obtaining instruction sets, data, and/or other information. Also, independent vendors may provide portable tools with similar functionalities that can be utilized across different computing systems and/or platforms. These native and portable tools may provide a wide range of functionalities such as instrumentation, tracing or profiling, logging application or system messages, outputting custom text messages, outputting objects or data structures, outputting functions/routines/subroutines or their invocations, outputting variable or parameter values, outputting thread or process behaviors, outputting call or other stacks, outputting processor registers, providing runtime memory access, providing inputs and/or outputs, performing live application monitoring, and/or other capabilities. One of ordinary skill in art will understand that, while all possible variations of the techniques to obtain instruction sets, data, and/or other information are too voluminous to describe, these techniques are within the scope of this disclosure.

In one example, obtaining Avatar's 605 and/or Application Program's 18 instruction sets, data, and/or other information can be implemented through the .NET platform's native tools for application tracing or profiling such as System.Diagnostics.Trace, System.Diagnostics.Debug, or System.Diagnostics.TraceSource classes for tracing execution flow, and/or System.Diagnostics.Process, System.Diagnostics.EventLog, or System.Diagnostics.PerformanceCounter classes for profiling code, accessing local and remote processes, starting and stopping system processes, and interacting with Windows event logs, etc. For instance, a set of trace switches can be created that output an application's information. The switches can be configured using the config file. For a web application, this may typically be web.config file associated with the project. In a Windows application, this file may typically be named applicationName.exe.config. Trace code can be added to application code automatically or manually as previously described. Appropriate listener can be created where the trace output is received. Trace code can output trace messages to a specific target such as a file, a log, a database, an object, a data structure, and/or other repository or system. Acquisition Interface 120 or Artificial Intelligence Unit 110 can then read or obtain the trace information from these targets. In some aspects, trace code can output trace messages directly to Acquisition Interface 120. In other aspects, trace code can output trace messages directly to Artificial Intelligence Unit 110. In the case of outputting trace messages to Acquisition Interface 120 or directly to Artificial Intelligence Unit 110, custom listeners can be built to accommodate these specific targets. Other platforms, tools, and/or techniques can provide equivalent or similar functionalities as the above described ones.

In another example, obtaining Avatar's 605 and/or Application Program's 18 instruction sets, data, and/or other information can be implemented through the .NET platform's Profiling API that can be used to create a custom profiler application for tracing, monitoring, interfacing with, and/or managing a profiled application. The Profiling API provides an interface that includes methods to notify the profiler of events in the profiled application. The Profiling API may also provide an interface to enable the profiler to call back into the profiled application to obtain information about the state of the profiled application. The Profiling API may further provide call stack profiling functionalities. Call stack (also referred to as execution stack, control stack, runtime stack, machine stack, the stack, etc.) includes a data structure that can store information about active subroutines of an application. The Profiling API may provide a stack snapshot method, which enables a trace of the stack at a particular point in time. The Profiling API may also provide a shadow stack method, which tracks the call stack at every instant. A shadow stack can obtain function arguments, return values, and information about generic instantiations. A function such as FunctionEnter can be utilized to notify the profiler that control is being passed to a function and can provide information about the stack frame and function arguments. A function such as FunctionLeave can be utilized to notify the profiler that a function is about to return to the caller and can provide information about the stack frame and function return value. An alternative to call stack profiling includes call stack sampling in which the profiler can periodically examine the stack. In some aspects, the Profiling API enables the profiler to change the in-memory code stream for a routine before it is just-in-time (JIT) compiled where the profiler can dynamically add instrumentation code to all or particular routines of interest. Other platforms, tools, and/or techniques may provide equivalent or similar functionalities as the above described ones.

In a further example, obtaining Avatar's 605 and/or Application Program's 18 instruction sets, data, and/or other information can be implemented through Java platform's APIs for application tracing or profiling such as Java Virtual Machine Profiling Interface (JVMPI), Java Virtual Machine Tool Interface (JVMTI), and/or other APIs or tools. These APIs can be used for instrumentation of an application, for notification of Java Virtual Machine (VM) events, and/or other functionalities. One of the tracing or profiling techniques that can be utilized includes bytecode instrumentation. The profiler can insert bytecodes into all or some of the classes. In application execution profiling, for example, these bytecodes may include methodEntry and methodExit calls. In memory profiling, for example, the bytecodes may be inserted after each new or after each constructor. In some aspects, insertion of instrumentation bytecode can be performed either by a post-compiler or a custom class loader. An alternative to bytecode instrumentation includes monitoring events generated by the JVMPI or JVMTI interfaces. Both APIs can generate events for method entry/exit, object allocation, and/or other events. In some aspects, JVMTI can be utilized for dynamic bytecode instrumentation where insertion of instrumentation bytecodes is performed at runtime. The profiler may insert the necessary instrumentation when a selected class is invoked in an application. This can be accomplished using the JVMTI's redefineClasses method, for example. This approach also enables changing of the level of profiling as the application is running. If needed, these changes can be made adaptively without restarting the application. Other platforms, tools, and/or techniques may provide equivalent or similar functionalities as the above described ones.

In a further example, obtaining Avatar's 605 and/or Application Program's 18 instruction sets, data, and/or other information can be implemented through JVMTI's programming interface that enables creation of software agents that can monitor and control a Java application. An agent may use the functionality of the interface to register for notification of events as they occur in the application, and to query and control the application. A JVMTI agent may use JVMTI functions to extract information from a Java application. A JVMTI agent can be utilized to obtain an application's runtime information such as method calls, memory allocation, CPU utilization, and/or other information. JVMTI may include functions to obtain information about variables, fields, methods, classes, and/or other information. JVMTI may also provide notification for numerous events such as method entry and exit, exception, field access and modification, thread start and end, and/or other events. Examples of JVMTI built-in methods include GetMethodName to obtain the name of an invoked method, GetThreadInfo to obtain information for a specific thread, GetClassSignature to obtain information about the class of an object, GetStackTrace to obtain information about the stack including information about stack frames, and/or other methods. Other platforms, tools, and/or techniques may provide equivalent or similar functionalities as the above described ones.

In a further example, obtaining Avatar's 605 and/or Application Program's 18 instruction sets, data, and/or other information can be implemented through java.lang.Runtime class that provides an interface for application tracing or profiling. Examples of methods provided in java.lang.Runtime that can be used to obtain an application's instruction sets, data, and/or other information include tracemethodcalls, traceinstructions, and/or other methods. These methods prompt the Java Virtual Machine to output trace information for a method or instruction in the virtual machine as it is executed. The destination of trace output may be system dependent and include a file, a listener, and/or other destinations where Acquisition Interface 120, Artificial Intelligence Unit 110, and/or other disclosed elements can access needed information. In addition to tracing or profiling tools native to their respective computing systems and/or platforms, many independent tools exist that provide tracing or profiling functionalities on more than one computing system and/or platform. Examples of these tools include Pin, DynamoRIO, Kernlnst, DynInst, Kprobes, OpenPAT, DTrace, SystemTap, and/or others. Other platforms, tools, and/or techniques may provide equivalent or similar functionalities as the above described ones.

In a further example, obtaining Avatar's 605 and/or Application Program's 18 instruction sets, data, and/or other information can be implemented through logging tools of the platform and/or operating system on which an application runs. Some logging tools may include nearly full feature sets of the tracing or profiling tools previously described. In one example, Visual Basic enables logging of runtime messages through its Microsoft.VisualBasic.Logging namespace that provides a log listener where the log listener may direct logging output to a file and/or other target. In another example, Java enables logging through its java.util.logging class. In some aspects, obtaining an application's instruction sets, data, and/or other information can be implemented through logging capabilities of the operating system on which an application runs. For example, Windows NT features centralized log service that applications and operating-system components can utilize to report their events including any messages. Windows NT provides functionalities for system, application, security, and/or other logging. An application log may include events logged by applications. Windows NT, for example, may include support for defining an event source (i.e. application that created the event, etc.). Windows Vista, for example, supports a structured XML log-format and designated log types to allow applications to more precisely log events and to help interpret the events. Examples of different types of event logs include administrative, operational, analytic, debug, and/or other log types including any of their subcategories. Examples of event attributes that can be utilized include eventID, level, task, opcode, keywords, and/or other event attributes. Windows wevtutil tool enables access to events, their structures, registered event publishers, and/or their configuration even before the events are fired. Wevtutil supports capabilities such as retrieval of the names of all logs on a computing device; retrieval of configuration information for a specific log; retrieval of event publishers on a computing device; reading events from an event log, from a log file, or using a structured query; exporting events from an event log, from a log file, or using a structured query to a specific target; and/or other capabilities. Operating system logs can be utilized solely if they contain sufficient information on an application's instruction sets, data, and/or other information. Alternatively, operating system logs can be utilized in combination with another source of information (i.e. trace information, call stack, processor registers, memory, etc.) to reconstruct the application's instruction sets, data, and/or other information needed for Artificial Intelligence Unit 110 and/or other elements. In addition to logging capabilities native to their respective platforms and/or operating systems, many independent tools exist that provide logging on different platforms and/or operating systems. Examples of these tools include Log4j, Logback, SmartInspect, NLog, log 4net, Microsoft Enterprise Library, ObjectGuy Framework, and/or others. Other platforms, tools, and/or techniques may provide equivalent or similar functionalities as the above described ones.

In a further example, obtaining Avatar's 605 and/or Application Program's 18 instruction sets, data, and/or other information can be implemented through tracing or profiling the operating system on which an application runs. As in tracing or profiling an application, one of the techniques that can be utilized includes adding instrumentation code to the operating system's source code. Such instrumentation code can be added to the operating system's source code before kernel compilation or recompilation, for instance. This type of instrumentation may involve defining or finding locations in the operating system's source code where instrumentation code may be inserted. Kernel instrumentation can also be performed without the need for kernel recompilation or rebooting. In some aspects, instrumentation code can be added at locations of interest through binary rewriting of compiled kernel code. In other aspects, kernel instrumentation can be performed dynamically where instrumentation code is added and/or removed where needed at runtime. For instance, dynamic instrumentation may overwrite kernel code with a branch instruction that redirects execution to instrumentation code or instrumentation routine. In yet other aspects, kernel instrumentation can be performed using just-in-time (JIT) dynamic instrumentation where execution may be redirected to a copy of kernel's code segment that includes instrumentation code. This type of instrumentation may include a JIT compiler and creation of a copy of the original code segment having instrumentation code or calls to instrumentation routines embedded into the original code segment. Instrumentation of the operating system may enable total system visibility including visibility into an application's behavior by enabling generation of low level trace information. Other platforms, tools, and/or techniques may provide equivalent or similar functionalities as the above described ones.

In a further example, obtaining Avatar's 605 and/or Application Program's 18 instruction sets, data, and/or other information can be implemented through tracing or profiling the processor on which an application runs. For example, some Intel processors provide Intel Processor Trace (i.e. Intel PT, etc.), a low-level tracing feature that enables recording executed instruction sets, and/or other data or information of one or more applications. Intel PT is facilitated by the Processor Trace Decoder Library along with its related tools. Intel PT is a low-overhead execution tracing feature that records information about application execution on each hardware thread using dedicated hardware facilities. The recorded execution/trace information is collected in data packets that can be buffered internally before being sent to a memory subsystem or another system or element (i.e. Acquisition Interface 120, Artificial Intelligence Unit 110, etc.). Intel PT also enables navigating the recorded execution/trace information via reverse stepping commands. Intel PT can be included in an operating system's core files and provided as a feature of the operating system. Intel PT can trace globally some or all applications running on an operating system. Acquisition Interface 120 or Artificial Intelligence Unit 110 can read or obtain the recorded execution/trace information from Intel PT. Other platforms, tools, and/or techniques may provide equivalent or similar functionalities as the above described ones.

In a further example, obtaining Avatar's 605 and/or Application Program's 18 instruction sets, data, and/or other information can be implemented through branch tracing or profiling. Branch tracing may include an abbreviated instruction trace in which only the successful branch instruction sets are traced or recorded. Branch tracing can be implemented through utilizing dedicated processor commands, for example. Executed branches may be saved into special branch trace store area of memory. With the availability and reference to a compiler listing of the application together with branch trace information, a full path of executed instruction sets can be reconstructed. The full path can also be reconstructed with a memory dump (containing the program storage) and branch trace information. In some aspects, branch tracing can be utilized for pre-learning or automated learning of an application's instruction sets, data, and/or other information where a number of application simulations (i.e. simulations of likely/common operations, etc.) are performed. As such, the application's operation can be learned automatically saving the time that would be needed to learn the application's operation directed by a user. Other platforms, tools, and/or techniques may provide equivalent or similar functionalities as the above described ones.

In a further example, obtaining Avatar's 605 and/or Application Program's 18 instruction sets, data, and/or other information can be implemented through assembly language. Assembly language is a low-level programming language for a computer or other programmable device in which there is a strong correlation between the language and the architecture's machine instruction sets. Syntax, addressing modes, operands, and/or other elements of an assembly language instruction set may translate directly into numeric (i.e. binary, etc.) representations of that particular instruction set. Because of this direct relationship with the architecture's machine instruction sets, assembly language can be a powerful tool for tracing or profiling an application's execution in processor registers, memory, and/or other computing system components. For example, using assembly language, memory locations of a loaded application can be accessed, instrumented, and/or otherwise manipulated. In some aspects, assembly language can be used to rewrite or overwrite original in-memory instruction sets of an application with instrumentation instruction sets. In other aspects, assembly language can be used to redirect application's execution to instrumentation routine/subroutine or other code segment elsewhere in memory by inserting a jump into the application's in-memory code, by redirecting program counter, or by other techniques. Some operating systems may implement protection from changes to applications loaded into memory. Operating system, processor, or other low level commands such as Linux mprotect command or similar commands in other operating systems may be used to unprotect the protected locations in memory before the change. In yet other aspects, assembly language can be used to obtain instruction sets, data, and/or other information through accessing and/or reading instruction register, program counter, other processor registers, memory locations, and/or other components of a computing system. In yet other aspects, high-level programming languages may call or execute an external assembly language program to facilitate obtaining instruction sets, data, and/or other information as previously described. In yet other aspects, relatively low-level programming languages such as C may allow embedding assembly language directly in their source code such as, for example, using asm keyword of C. Other platforms, tools, and/or techniques may provide equivalent or similar functionalities as the above described ones.

In a further example, it may be sufficient to obtain user or other inputs, variables, parameters, and/or other data in some procedural, simple object oriented, or other applications. In one instance, a simple procedural application executes a sequence of instruction sets until the end of the program. During its execution, the application may receive user or other input, store the input in a variable, and perform calculations using the variable to reach a result. The value of the variable can be obtained or traced. In another instance, a more complex procedural application comprises one or more functions/routines/subroutines each of which may include a sequence of instruction sets. The application may execute a main sequence of instruction sets with a branch to a function/routine/subroutine. During its execution, the application may receive user or other input, store the input in a variable, and pass the variable as a parameter to the function/routine/subroutine. The function/routine/subroutine may perform calculations using the parameter and return a value that the rest of the application can use to reach a result. The value of the variable or parameter passed to the function/routine/subroutine, and/or return value can be obtained or traced. Values of user or other inputs, variables, parameters, and/or other items of interest can be obtained through previously described tracing, instrumentation, and/or other techniques. Other platforms, tools, and/or techniques may provide equivalent or similar functionalities as the above described ones.

Figure 6:
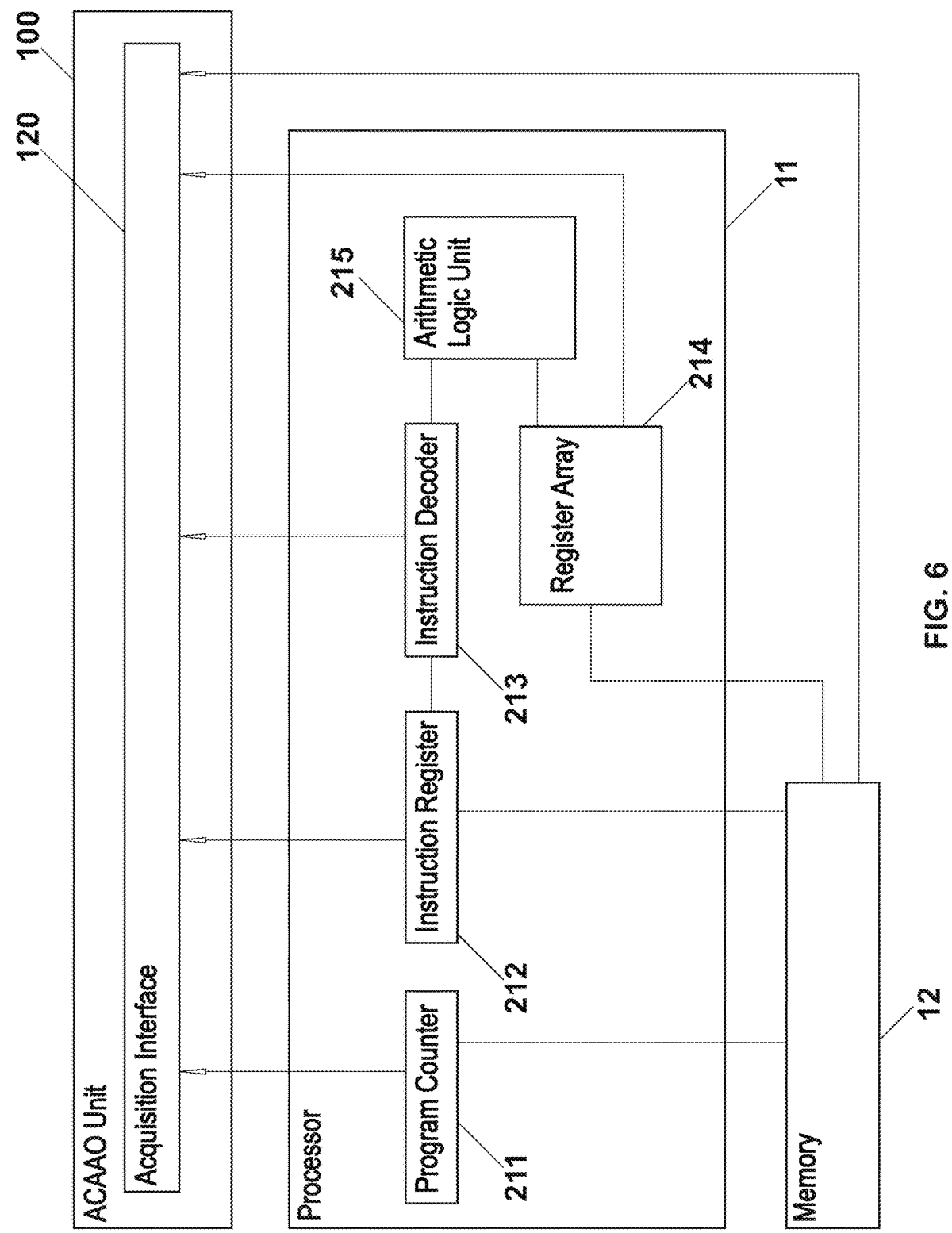
FIG. 6 illustrates some embodiments of obtaining instruction sets, data, and/or other information through tracing, profiling, or sampling of Processor 11 registers, memory, or other computing system components.

Referring to FIG. 6, in yet another example, obtaining Avatar's 605 and/or Application Program's 18 instruction sets, data, and/or other information may be implemented through tracing, profiling, or sampling of instruction sets or data in processor registers, memory, or other computing system components where instruction sets, data, and/or other information may be stored or utilized. For example, Instruction Register 212 may be part of Processor 11 and it may store the instruction set currently being executed or decoded. In some processors, Program Counter 211 (also referred to as instruction pointer, instruction address register, instruction counter, or part of instruction sequencer, etc.) may be incremented after fetching an instruction set, and it may hold or point to the memory address of the next instruction set to be executed. In a processor where the incrementation precedes the fetch, Program Counter 211 may point to the current instruction set being executed. In the instruction cycle, an instruction set may be loaded into Instruction Register 212 after Processor 11 fetches it from location in Memory 12 pointed to by Program Counter 211. Instruction Register 212 may hold the instruction set while it is decoded by Instruction Decoder 213, prepared, and executed. In some aspects, data (i.e. operands, etc.) needed for instruction set execution may be loaded from Memory 12 into a register within Register Array 214. In other aspects, the data may be loaded directly into Arithmetic Logic Unit 215. For instance, as instruction sets pass through Instruction Register 212 during application execution, they may be transmitted to Acquisition Interface 120 as shown. Examples of the steps in execution of a machine instruction set may include decoding the opcode (i.e. portion of a machine instruction set that may specify the operation to be performed), determining where the operands may be located (depending on architecture, operands may be in registers, the stack, memory, I/O ports, etc.), retrieving the operands, allocating processor resources to execute the instruction set (needed in some types of processors), performing the operation indicated by the instruction set, saving the results of execution, and/or other execution steps. Examples of the types of machine instruction sets that can be utilized include arithmetic, data handling, logical, program control, as well as special and/or other instruction set types. In addition to the ones described or shown, examples of other computing system or processor components that can be used during an instruction cycle include memory address register (MAR) that may hold the address of a memory block to be read from or written to; memory data register (MDR) that may hold data fetched from memory or data waiting to be stored in memory; data registers that may hold numeric values, characters, small bit arrays, or other data; address registers that may hold addresses used by instruction sets that indirectly access memory; general purpose registers (GPRs) that may store both data and addresses; conditional registers that may hold truth values often used to determine whether some instruction set should or should not be executed; floating point registers (FPRs) that may store floating point numbers; constant registers that may hold read-only values such as zero, one, or pi; special purpose registers (SPRs) such as status register, program counter, or stack pointer that may hold information on program state; machine-specific registers that may store data and settings related to a particular processor; Register Array 214 that may include an array of any number of processor registers; Arithmetic Logic Unit 215 that may perform arithmetic and logic operations; control unit that may direct processor's operation; and/or other circuits or components. Tracing, profiling, or sampling of processor registers, memory, or other computing system components can be implemented in a program, combination of hardware and program, or purely hardware system. Dedicated hardware may be built to perform tracing, profiling, or sampling of processor registers or any computing system components with marginal or no impact to computing overhead.

One of ordinary skill in art will recognize that FIG. 6 depicts one of many implementations of processor or computing system components, and that various additional components can be included, or some of the disclosed ones can be excluded, or a combination thereof can be utilized in alternate implementations. Processor or computing system components may be arranged or connected differently in alternate implementations. Processor or computing system components may also be connected with external elements using various connections. For instance, the connection between Instruction Register 212 and Acquisition Interface 120 may include any number or types of connections such as, for example, a dedicated connection for each bit of Instruction Register 212 (i.e. 32 connections for a 32 bit Instruction Register 212, etc.). Any of the described or other connections or interfaces may be implemented among any processor or computing system components and Acquisition Interface 120 or other elements.

Other additional techniques or elements can be utilized as needed for obtaining instruction sets, data, and/or other information, or some of the disclosed techniques or elements can be excluded, or a combination thereof can be utilized in alternate embodiments. As an avatar (i.e. Avatar 605, etc.) may be part of an application (i.e. Application Program 18, etc.), it should be noted that obtaining an avatar's instruction sets, data, and/or other information may include same or similar techniques as the aforementioned obtaining an application's instruction sets, data, and/or other information, and vice versa.

Referring to FIGS. 7A-7E, some embodiments of Instruction Sets 526 are illustrated. In some aspects, Instruction Set 526 includes one or more instructions or commands related to Avatar 605. For example, Instruction Set 526 may include one or more instructions or commands for operating Avatar 605. In other aspects, Instruction Set 526 includes one or more instructions or commands of Application Program 18. For example, Instruction Set 526 may include one or more instructions or commands for operating Application Program 18. In further aspects, Instruction Set 526 includes one or more inputs into and/or outputs from Avatar 605, Application Program 18, Processor 11, and/or other processing element. In further aspects, Instruction Set 526 includes one or more values or states of registers and/or other components of Processor 11 and/or other processing element. In general, Instruction Set 526 may include one or more instructions, commands, keywords, symbols (i.e. parentheses, brackets, commas, semicolons, etc.), operators (i.e. =, <, >, etc.), variables, values, objects, data structures, functions (i.e. Function1( ), FIRST( ), MIN( ), SQRT( ), etc.), parameters, states, signals, inputs, outputs, characters, digits, references thereto, and/or other components. Therefore, the terms instruction set, command, instruction, signal, or other such terms may be used interchangeably herein depending on context.

Figure 7A:
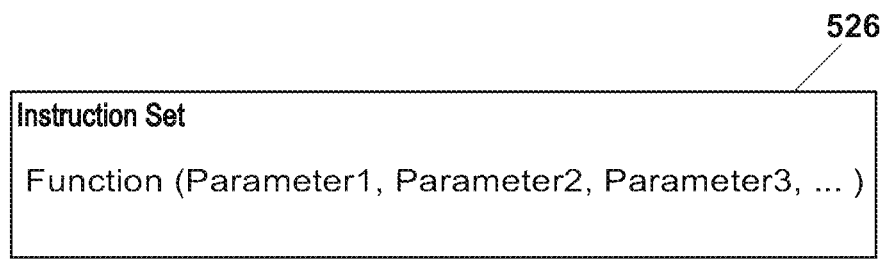
FIGS. 7A-7E illustrate some embodiments of Instruction Sets 526.
Figure 7B:
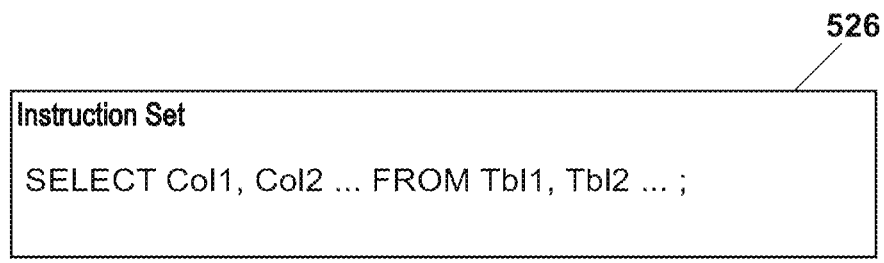
Figure 7C:
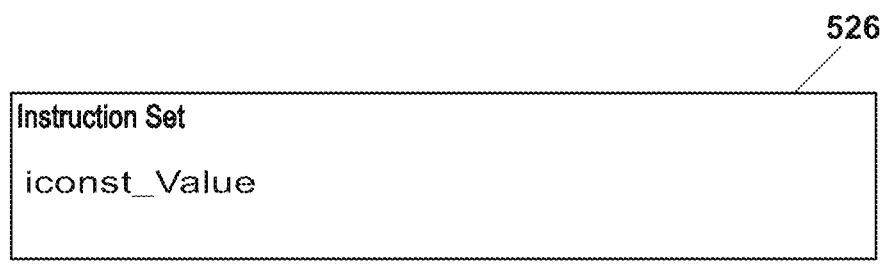
Figure 7D:
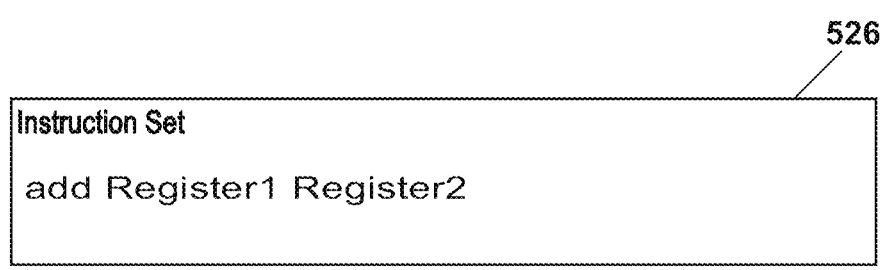
Figure 7E:
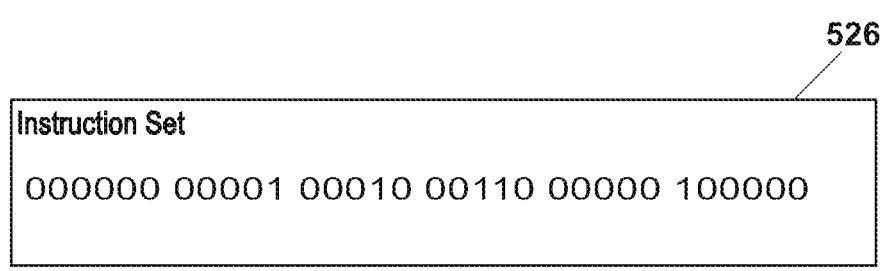

In an embodiment shown in FIG. 7A, Instruction Set 526 includes code of a high-level programming language (i.e. Java, C++, etc.) comprising the following function call construct: Function1 (Parameter1, Parameter2, Parameter3, . . . ). An example of a function call applying the above construct includes the following Instruction Set 526: moveTo(Avatar, 11, 23). The function or reference thereto "moveTo(Avatar, 11, 23)" may be an Instruction Set 526 directing Avatar 605 to move to a location with coordinates 11 and 23, for example. In another embodiment shown in FIG. 7B, Instruction Set 526 includes structured query language (SQL). In a further embodiment shown in FIG. 7C, Instruction Set 526 includes bytecode (i.e. Java bytecode, Python bytecode, CLR bytecode, etc.). In a further embodiment shown in FIG. 7D, Instruction Set 526 includes assembly code. In a further embodiment shown in FIG. 7E, Instruction Set 526 includes machine code. Instruction Set 526 may include any other language or construct in alternate embodiments.

Figure 8A:
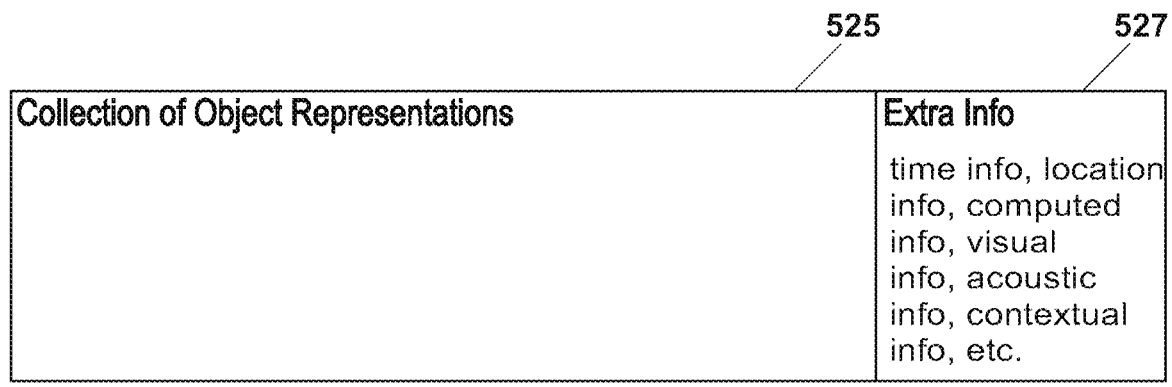
FIGS. 8A-8B illustrate some embodiments of Extra Information 527.
Figure 8B:
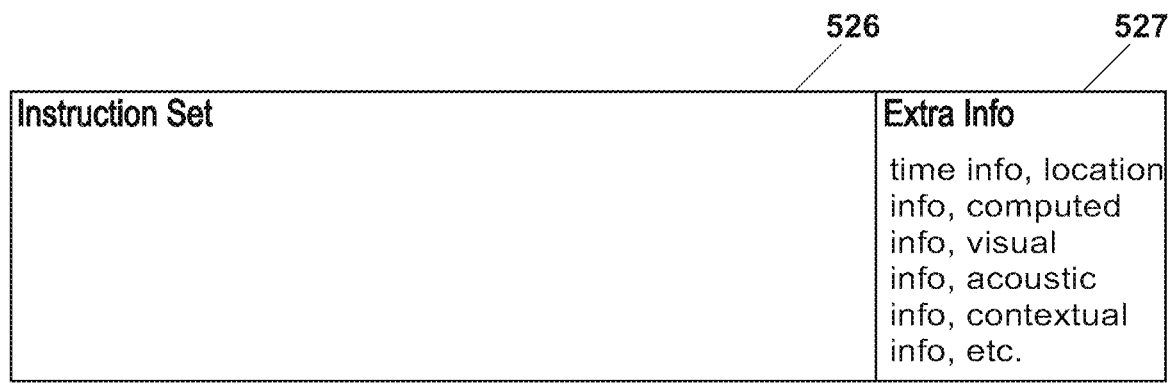

Referring to FIGS. 8A-8B, some embodiments of Extra Information 527 (also referred to as Extra Info 527) are illustrated. In an embodiment shown in FIG. 8A, Collection of Object Representations 525 may include or be associated with Extra Info 527. In an embodiment shown in FIG. 8B, Instruction Set 526 may include or be associated with Extra Info 527.

Extra Info 527 comprises the functionality for storing any information useful in comparisons or decision making performed in autonomous Avatar 605 operation, and/or other functionalities. One or more Extra Infos 527 can be stored in, appended to, or associated with a Collection of Object Representations 525, Instruction Set 526, and/or other element. In some embodiments, the system can obtain Extra Info 527 at a time of creating or generating Collection of Object Representations 525. In other embodiments, the system can obtain Extra Info 527 at a time of acquiring Instruction Set 526. In general, Extra Info 527 can be obtained at any time. Examples of Extra Info 527 include time information, location information, computed information, visual information, acoustic information, contextual information, and/or other information. Any information can be utilized that can provide information for enhanced comparisons or decision making performed in autonomous Avatar 605 operation. Which information is utilized and/or stored in Extra Info 527 can be set by a user, by ACAAO system administrator, or automatically by the system. Extra Info 527 may include or be referred to as contextual information, and vice versa. Therefore, these terms may be used interchangeably herein depending on context.

In some aspects, time information (i.e. time stamp, etc.) can be utilized and/or stored in Extra Info 527. Time information can be useful in comparisons or decision making performed in autonomous Avatar 605 operation related to a specific time period. For example, Extra Info 527 may include time information related to when Avatar 605 performed an operation. Time information can be obtained from the system clock, online clock, oscillator, or other time source. In other aspects, location information (i.e. coordinates, etc.) can be utilized and/or stored in Extra Info 527. Location information can be useful in comparisons or decision making performed in autonomous Avatar 605 operation related to a specific place. For example, Extra Info 527 may include location information related to where Avatar 605 performed an operation. Location information can be obtained from Application Program's 18 engine (i.e. game engine in which the game is implemented, etc.), runtime environment, functions for providing location information on objects, and/or others as previously described. In further aspects, computed information can be utilized and/or stored in Extra Info 527. Computed information can be useful in comparisons or decision making performed in autonomous Avatar 605 operation where information can be calculated, inferred, or estimated from other available information. ACAAO Unit 100 may include computational functionalities to create Extra Info 527 by performing calculations, inferences, or estimations using other information. In one example, Avatar's 605 direction of movement can be computed or estimated using Avatar's 605 location information. In another example, Avatar's 605 speed can be computed or estimated using Avatar's 605 location and/or time information. In a further example, speeds, directions of movement, trajectories, distances, and/or other properties of objects around Avatar 605 can similarly be computed or estimated, thereby providing geo-spatial and situational awareness and/or capabilities to Avatar 605. ACAAO Unit 100 can utilize geometry, trigonometry, Pythagorean theorem, and/or other theorems, formulas, or disciplines in its calculations, inferences, or estimations. In further aspects, visual information can be utilized and/or stored in Extra Info 527. Visual information can be useful in comparisons or decision making performed in autonomous Avatar 605 operation related to an object or environment that can be recognized from visual information. For example, an object or environment can be recognized by processing one or more digital pictures from Picture Renderer 91, visual processor, visual program, or other visual provider. Any features, functionalities, and embodiments of Picture Recognizer 92 can be utilized for such recognizing as previously described. For instance, trees recognized in the background of one or more digital pictures from Picture Renderer 91 may indicate a park or forest. In further aspects, acoustic information can be utilized and/or stored in Extra Info 527. Acoustic information can be useful in comparisons or decision making performed in autonomous Avatar 605 operation related to a sound or accosting environment. For example, an object or environment can be recognized by processing digital sound from Sound Renderer 96, sound processor, sound program, or other sound provider. Any features, functionalities, and embodiments of Artificial Sound Recognizer 97 can be utilized for such recognizing as previously described. For instance, sound of a horn recognized in digital sound from Sound Renderer 96 may indicate a proximal vehicle. In further aspects, other information can be utilized and/or stored in Extra Info 527. Examples of such other information include user specific information (i.e. skill level, age, gender, etc.), group user information (i.e. access level, etc.), version of Application Program 18, type of Application Program 18, type of Avatar 605, name of Avatar 605, allegiance of Avatar 605, type of Processor 11, type of Computing Device 70, and/or other information all of which can be obtained from various devices, systems, repositories, functions, or elements of Computing Device 70, Processor 11, Application Program 18, Avatar 605, and/or other processing elements.

Figure 9:
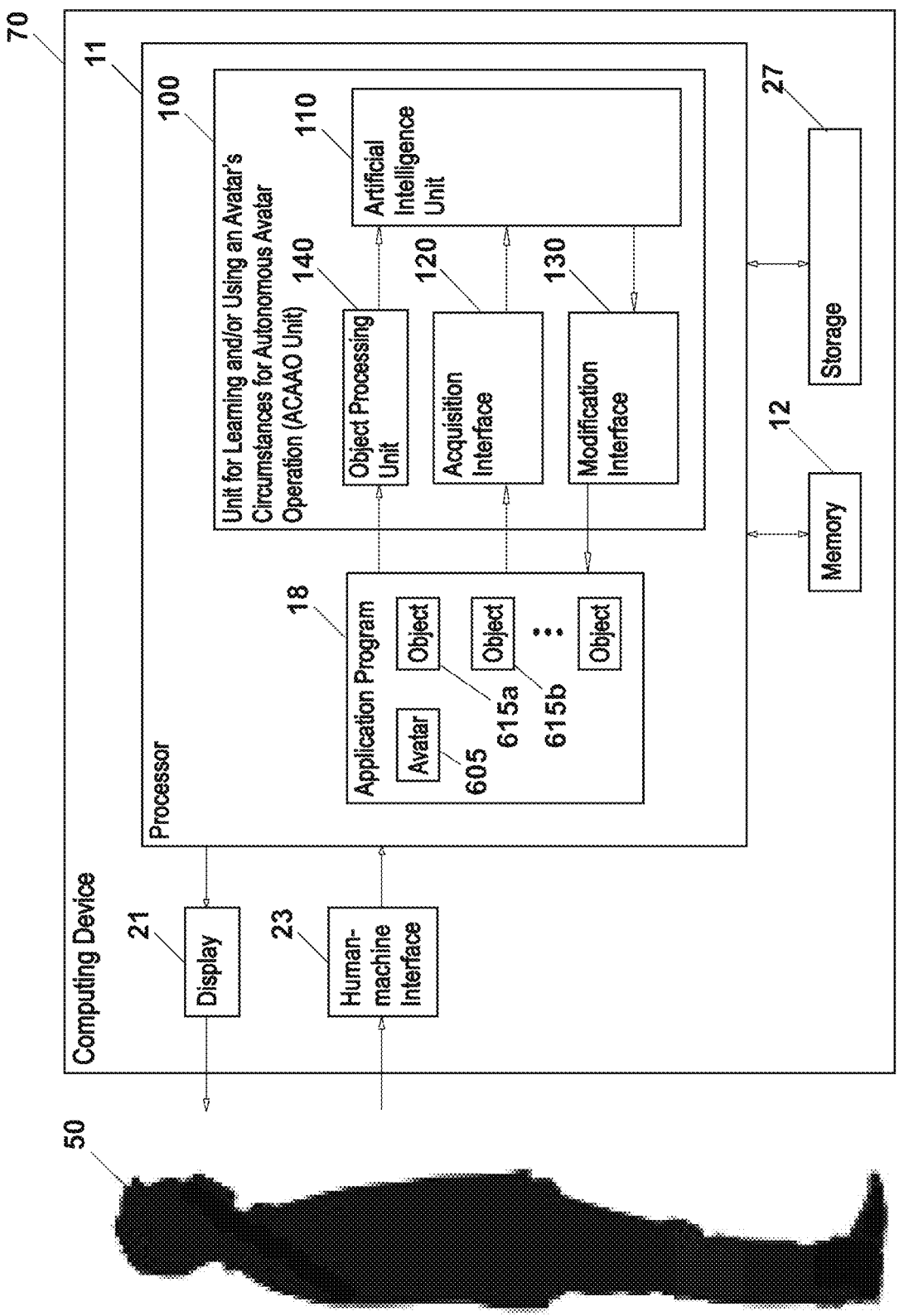
FIG. 9 illustrates an embodiment where ACAAO Unit 100 is part of or operating on Processor 11.

Referring to FIG. 9, an embodiment where ACAAO Unit 100 is part of or operating on Processor 11 is illustrated. In one example, ACAAO Unit 100 may be a hardware element or circuit embedded or built into Processor 11. In another example, ACAAO Unit 100 may be a program operating on Processor 11.

Figure 10:
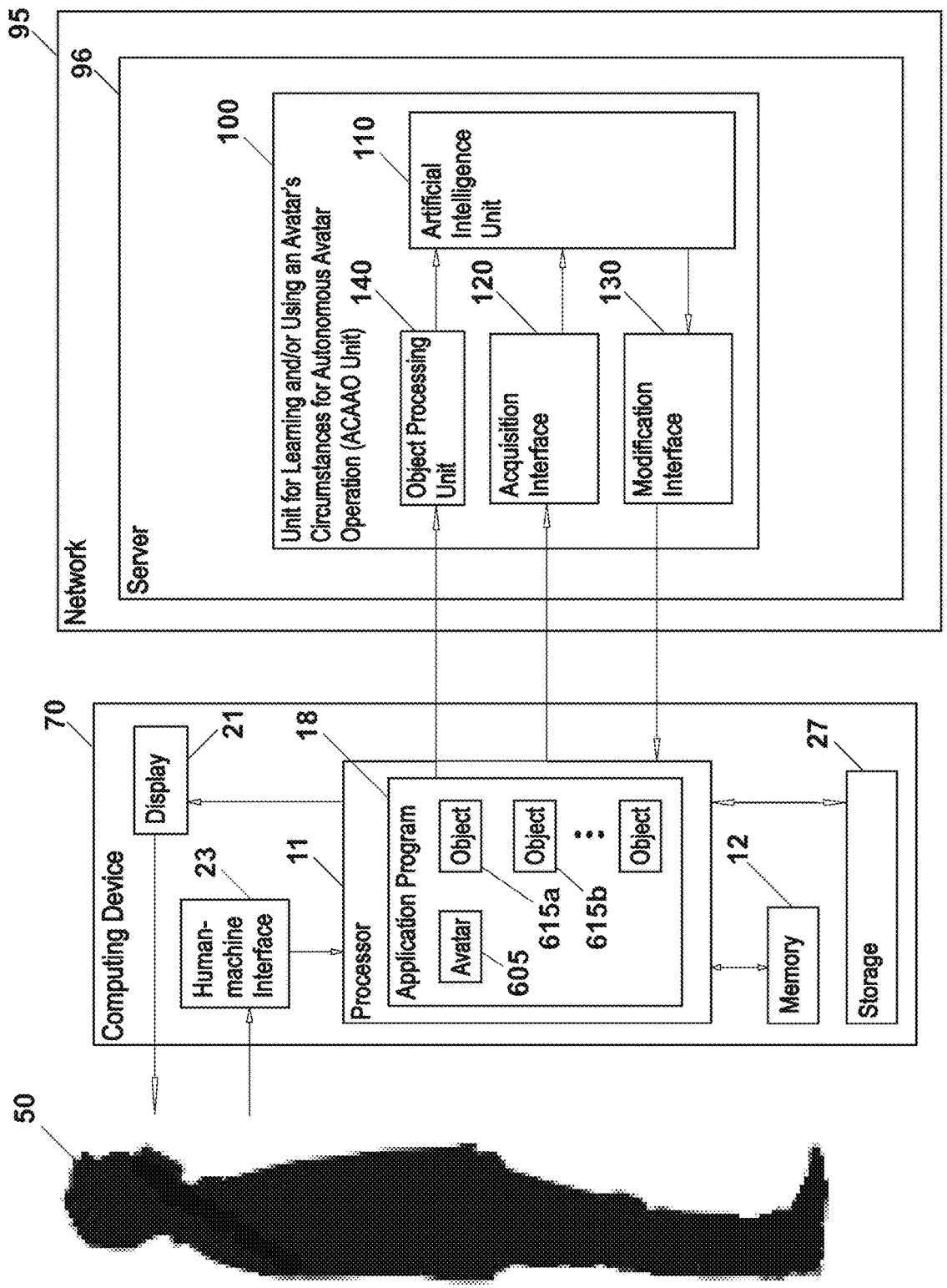
FIG. 10 illustrates an embodiment where ACAAO Unit 100 resides on Server 96 accessible over Network 95.

Referring to FIG. 10, an embodiment where ACAAO Unit 100 resides on Server 96 accessible over Network 95 is illustrated. Any number of Computing Devices 70, Processors 11, Application Programs 18, and/or other elements may connect to such remote ACAAO Unit 100 and the remote ACAAO Unit 100 may learn operations of their Avatars 605 in circumstances including objects with various properties. In turn, any number of Computing Devices 70, Processors 11, Application Programs 18, and/or other elements can utilize the remote ACAAO Unit 100 for autonomous operation of their Avatars 605. A remote ACAAO Unit 100 can be offered as a network service (i.e. online application, etc.). In some aspects, a remote ACAAO Unit 100 (i.e. global ACAAO Unit 100, etc.) may reside on the Internet and be available to all the world's Computing Devices 70, Processors 11, Application Programs 18, and/or other elements configured to transmit operations of their Avatars 605 in circumstances including objects with various properties and/or configured to utilize the remote ACAAO Unit 100 for autonomous operation of their Avatars 605. For example, multiple players (i.e. Users 50, etc.) may operate their Avatars 605 in a computer game (i.e. Application Program 18, etc.) running on their respective Computing Devices 70 where the Computing Devices 70 and/or elements thereof may be configured to transmit Avatar's 605 operations in circumstances including objects with various properties to a remote ACAAO Unit 100. Such remote ACAAO Unit 100 enables learning of the players' collective knowledge of operating Avatar 605 in circumstances including objects with various properties. Server 96 may be or include any type or form of a remote computing device such as an application server, a network service server, a cloud server, a cloud, and/or other remote computing device. Server 96 may include any features, functionalities, and embodiments of Computing Device 70. It should be understood that Server 96 does not have to be a separate computing device and that Server 96, its elements, or its functionalities can be implemented on Computing Device 70. Network 95 may include various networks, connection types, protocols, interfaces, APIs, and/or other elements or techniques known in art all of which are within the scope of this disclosure. Any of the previously described networks, network or connection types, networking interfaces, and/or other networking elements or techniques can similarly be utilized. Any of the disclosed elements can reside on Server 96 in alternate implementations. In one example, Artificial Intelligence Unit 110 can reside on Server 96 and Acquisition Interface 120, Modification Interface 130, and/or Object Processing Unit 140 can reside on Computing Device 70. In another example, Knowledgebase 530 (later described) can reside on Server 96 and the rest of the elements of ACAAO Unit 100 can reside on Computing Device 70. Any other combination of local and remote elements can be implemented.

Figure 11:
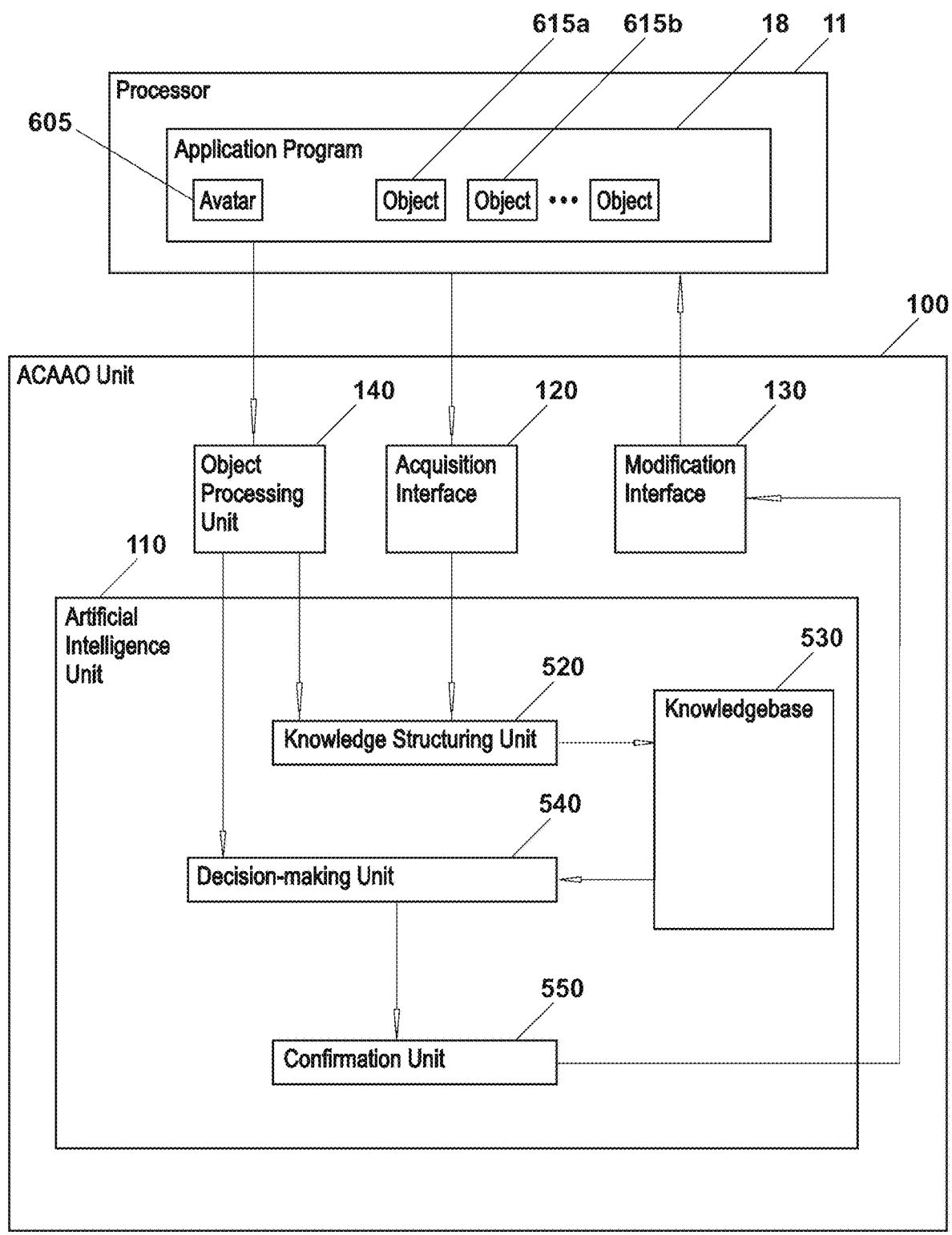
FIG. 11 illustrates an embodiment of Artificial Intelligence Unit 110.

Referring to FIG. 11, an embodiment of Artificial Intelligence Unit 110 is illustrated. Artificial Intelligence Unit 110 comprises interconnected Knowledge Structuring Unit 520, Knowledgebase 530, Decision-making Unit 540, and Confirmation Unit 550. Other additional elements can be included as needed, or some of the disclosed ones can be excluded, or a combination thereof can be utilized in alternate embodiments.

Artificial Intelligence Unit 110 comprises the functionality for learning Avatar's 605 operation in circumstances including objects with various properties. Artificial Intelligence Unit 110 comprises the functionality for learning one or more collections of object representations correlated with any instruction sets, data, and/or other information. In some aspects, Artificial Intelligence Unit 110 comprises the functionality for learning one or more Collections of Object Representations 525 representing Objects 615 in Avatar's 605 surrounding correlated with any Instruction Sets 526 and/or Extra Info 527. The Instruction Sets 526 may be used or executed in operating Avatar 605. In other aspects, Artificial Intelligence Unit 110 comprises the functionality for learning one or more Collections of Object Representations 525 representing Objects 615 in Avatar's 605 surrounding some of which may not be correlated with any Instruction Sets 526 and/or Extra Info 527. Further, Artificial Intelligence Unit 110 comprises the functionality for anticipating Avatar's 605 operation in circumstances including objects with various properties. Artificial Intelligence Unit 110 comprises the functionality for anticipating one or more instruction sets, data, and/or other information. Artificial Intelligence Unit 110 comprises the functionality for anticipating one or more Instruction Sets 526 (i.e. anticipatory Instruction Sets 526, etc.) based on one or more incoming Collections of Object Representations 525 representing Objects 615 in Avatar's 605 surrounding. The one or more Instruction Sets 526 (i.e. anticipatory Instruction Sets 526, etc.) may be used or executed in Avatar's 605 autonomous operation. In some embodiments of Application Programs 18 that do not comprise Avatar 605 or rely on Avatar 605 for their operation, Artificial Intelligence Unit 110 comprises the functionality for learning Application Program's 18 operation in circumstances including objects with various properties similar to the learning functionalities described with respect to Avatar 605. Also, in such embodiments, Artificial Intelligence Unit 110 comprises the functionality for anticipating Application Program's 18 operation in circumstances including objects with various properties similar to the anticipating functionalities described with respect to Avatar 605. Artificial Intelligence Unit 110 also comprises other disclosed functionalities.

Knowledge Structuring Unit 520, Knowledgebase 530, and Decision-making Unit 540 are described later.

Confirmation Unit 550 comprises the functionality for confirming, modifying, evaluating (i.e. rating, etc.), and/or canceling one or more anticipatory Instruction Sets 526, and/or other functionalities. Confirmation Unit 550 is an optional element that can be omitted depending on implementation. In some embodiments, Confirmation Unit 550 can serve as a means of confirming anticipatory Instruction Sets 526. For example, Decision-making Unit 540 may determine one or more anticipatory Instruction Sets 526 and provide them to User 50 for confirmation. User 50 may be provided with an interface (i.e. graphical user interface, selectable list of anticipatory Instruction Sets 526, etc.) to approve or confirm execution of the anticipatory Instruction Sets 526. In some aspects, Confirmation Unit 550 can automate User 50 confirmation. In one example, if one or more incoming Collections of Object Representations 525 from Object Processing Unit 140 and one or more Collections of Object Representations 525 from a Knowledge Cell 800 were found to be a perfect or highly similar match, anticipatory Instruction Sets 526 correlated with the one or more Collections of Object Representations 525 from the Knowledge Cell 800 can be automatically executed without User's 50 confirmation. Conversely, if one or more incoming Collections of Object Representations 525 from Object Processing Unit 140 and one or more Collections of Object Representations 525 from a Knowledge Cell 800 were found to be less than a highly similar match, anticipatory Instruction Sets 526 correlated with the one or more Collections of Object Representations 525 from the Knowledge Cell 800 can be presented to User 50 for confirmation and/or modifying. Any features, functionalities, and/or embodiments of Similarity Comparison 125 (later described) can be utilized for such similarity determination. In other embodiments, Confirmation Unit 550 can serve as a means of modifying or editing anticipatory Instruction Sets 526. For example, Decision-making Unit 540 may determine one or more anticipatory Instruction Sets 526 and provide them to User 50 for modification. User 50 may be provided with an interface (i.e. graphical user interface, etc.) to modify the anticipatory Instruction Sets 526 before their execution. In further embodiments, Confirmation Unit 550 can serve as a means of evaluating or rating anticipatory Instruction Sets 526 if they matched User's 50 intended operation. For example, Decision-making Unit 540 may determine one or more anticipatory Instruction Sets 526, which the system may automatically execute. User 50 may be provided with an interface (i.e. graphical user interface, etc.) to rate (i.e. on a scale from 0 to 1, etc.) how well Decision-making Unit 540 predicted the executed anticipatory Instruction Sets 526. In some aspects, rating can be automatic and based on a particular function or method that rates how well the anticipatory Instruction Sets 526 matched the desired operation. In one example, a rating function or method can assign a higher rating to anticipatory Instruction Sets 526 that were least modified in the confirmation process. In another example, a rating function or method can assign a higher rating to anticipatory Instruction Sets 526 that were canceled least number of times by User 50. Any other automatic rating function or method can be utilized. In yet other embodiments, Confirmation Unit 550 can serve as a means of canceling anticipatory Instruction Sets 526 if they did not match User's 50 intended operation. For example, Decision-making Unit 540 may determine one or more anticipatory Instruction Sets 526, which the system may automatically execute. The system may save the state of Computing Device 70, Processor 11 (save its register values, etc.), Application Program 18 (i.e. save its variables, data structures, objects, location of its current instruction, etc.), Avatar 605, and/or other processing elements before executing anticipatory Instruction Sets 526. User 50 may be provided with an interface (i.e. graphical user interface, selectable list of prior executed anticipatory Instruction Sets 526, etc.) to cancel one or more of the prior executed anticipatory Instruction Sets 526, and restore Computing Device 70, Processor 11, Application Program 18, Avatar 605, and/or other processing elements to a prior state. In some aspects, Confirmation Unit 550 can optionally be disabled or omitted in order to provide an uninterrupted operation of Avatar 605, Processor 11, and/or Application Program 18. For example, a form based application may be suitable for implementing the user confirmation step, whereas, a game application may be less suitable for implementing such interrupting step due to the real time nature of game application's operation.

Figure 12:
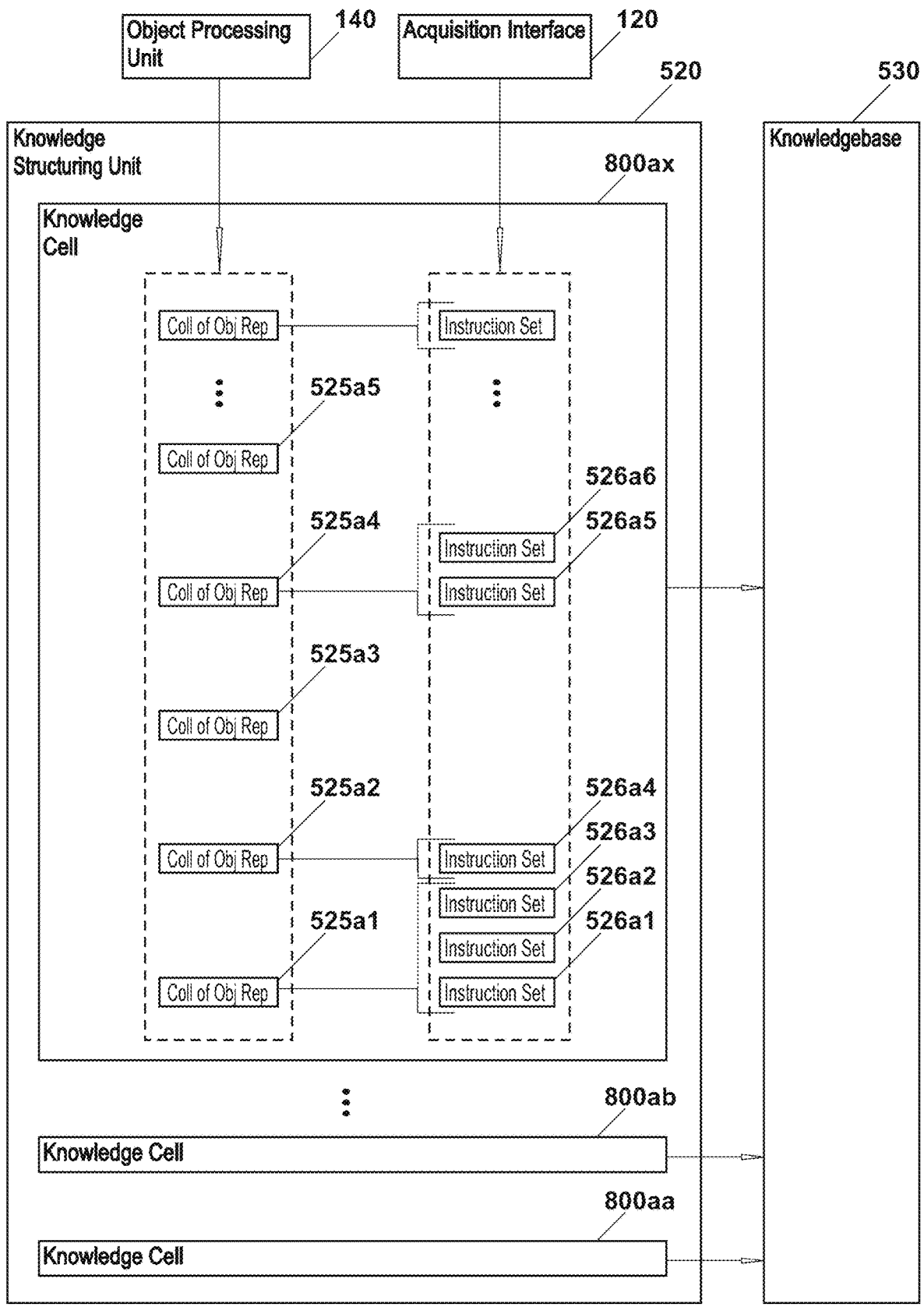
FIG. 12 illustrates an embodiment of Knowledge Structuring Unit 520 correlating individual Collections of Object Representations 525 with any Instruction Sets 526 and/or Extra Info 527.

Referring to FIG. 12, an embodiment of Knowledge Structuring Unit 520 correlating individual Collections of Object Representations 525 with any Instruction Sets 526 and/or Extra Info 527 is illustrated. Knowledge Structuring Unit 520 comprises the functionality for structuring the knowledge of Avatar's 605 operation in circumstances including objects with various properties, and/or other functionalities. Knowledge Structuring Unit 520 comprises the functionality for correlating one or more Collections of Object Representations 525 representing Objects 615 in Avatar's 605 surrounding with any Instruction Sets 526 and/or Extra Info 527. The Instruction Sets 526 may be used or executed in operating Avatar 605. Knowledge Structuring Unit 520 comprises the functionality for creating or generating Knowledge Cell 800 and storing one or more Collections of Object Representations 525 correlated with any Instruction Sets 526 and/or Extra Info 527 into the Knowledge Cell 800. As such, Knowledge Cell 800 comprises the functionality for storing one or more Collections of Object Representations 525 correlated with any Instruction Sets 526 and/or Extra Info 527. Knowledge Cell 800 includes knowledge (i.e. unit of knowledge, etc.) of how Avatar 605 operated in a circumstance including objects with various properties. Once created or generated, Knowledge Cells 800 can be used in/as neurons, nodes, vertices, or other elements in any of the data structures or arrangements (i.e. neural networks, graphs, sequences, etc.) used for storing the knowledge of Avatar's 605 operation in circumstances including objects with various properties, thereby facilitating learning functionalities herein. It should be noted that Extra Info 527 may be optionally used in some implementations to enable enhanced comparisons or decision making in autonomous Avatar 605 operation where applicable, and that Extra Info 527 can be omitted in alternate implementations.

In some embodiments, Knowledge Structuring Unit 520 receives one or more Collections of Object Representations 525 from Object Processing Unit 140. Knowledge Structuring Unit 520 may also receive one or more Instruction Sets 526 from Acquisition Interface 120. Knowledge Structuring Unit 520 may further receive any Extra Info 527. Although, Extra Info 527 is not shown in this and/or other figures for clarity of illustration, it should be noted that any Collection of Object Representations 525, Instruction Set 526, and/or other element may include or be associated with Extra Info 527. Knowledge Structuring Unit 520 may correlate one or more Collections of Object Representations 525 with any Instruction Sets 526 and/or Extra Info 527. Knowledge Structuring Unit 520 may then create Knowledge Cell 800 and store the one or more Collections of Object Representations 525 correlated with Instruction Sets 526 and/or Extra Info 527 into the Knowledge Cell 800. Knowledge Cell 800 may include any data structure or arrangement that can facilitate such storing. For example, Knowledge Structuring Unit 520 may create Knowledge Cell 800$ax$ and structure within it Collection of Object Representations 525$a1$ correlated with Instruction Sets 526$a1$-526$a3$ and/or any Extra Info 527 (not shown). Knowledge Structuring Unit 520 may further structure within Knowledge Cell 800$ax$ a Collection of Object Representations 525$a2$ correlated with Instruction Set 526$a4$ and/or any Extra Info 527 (not shown). Knowledge Structuring Unit 520 may further structure within Knowledge Cell 800$ax$ a Collection of Object Representations 525$a3$ without a correlated Instruction Set 526 and/or Extra Info 527. Knowledge Structuring Unit 520 may further structure within Knowledge Cell 800$ax$ a Collection of Object Representations 525$a4$ correlated with Instruction Sets 526$a5$-526$a6$ and/or any Extra Info 527 (not shown). Knowledge Structuring Unit 520 may further structure within Knowledge Cell 800$ax$ a Collection of Object Representations 525$a5$ without a correlated Instruction Set 526 and/or Extra Info 527. Knowledge Structuring Unit 520 may structure within Knowledge Cell 800$ax$ additional Collections of Object Representations 525 correlated with any number (including zero [i.e. uncorrelated]) of Instruction Sets 526 and/or Extra Info 527 by following similar logic as described above.

In some embodiments, Knowledge Structuring Unit 520 may correlate a Collection of Object Representations 525 with one or more temporally corresponding Instruction Sets 526 and/or Extra Info 527. This way, Knowledge Structuring Unit 520 can structure the knowledge of Avatar's 605 operation at or around the time of generating Collections of Object Representations 525. Such functionality enables spontaneous or seamless learning of Avatar's 605 operation in circumstances including objects with various properties as Avatar 605 is operated in real time. In some designs, Knowledge Structuring Unit 520 may receive a stream of Instruction Sets 526 used or executed to effect Avatar's 605 operations as well as a stream of Collections of Object Representations 525 representing Objects 615 in Avatar's 605 surrounding as the operations are performed. Knowledge Structuring Unit 520 can then correlate Collections of Object Representations 525 from the stream of Collections of Object Representations 525 with temporally corresponding Instruction Sets 526 from the stream of Instruction Sets 526 and/or any Extra Info 527. Collections of Object Representations 525 without a temporally corresponding Instruction Set 526 may be uncorrelated, for instance. In some aspects, Instruction Sets 526 and/or Extra Info 527 that temporally correspond to a Collection of Object Representations 525 may include Instruction Sets 526 used and/or Extra Info 527 obtained at the time of generating the Collection of Object Representations 525. In other aspects, Instruction Sets 526 and/or Extra Info 527 that temporally correspond to a Collection of Object Representations 525 may include Instruction Sets 526 used and/or Extra Info 527 obtained within a certain time period before and/or after generating the Collection of Object Representations 525. For example, Instruction Sets 526 and/or Extra Info 527 that temporally correspond to a Collection of Object Representations 525 may include Instruction Sets 526 used and/or Extra Info 527 obtained within 50 milliseconds, 1 second, 3 seconds, 20 seconds, 1 minute, 41 minutes, 2 hours, or any other time period before and/or after generating the Collection of Object Representations 525. Such time periods can be defined by a user, by ACAAO system administrator, or automatically by the system based on experience, testing, inquiry, analysis, synthesis, or other techniques, knowledge, or input. In other aspects, Instruction Sets 526 and/or Extra Info 527 that temporally correspond to a Collection of Object Representations 525 may include Instruction Sets 526 used and/or Extra Info 527 obtained from the time of generating the Collection of Object Representations 525 to the time of generating a next Collection of Object Representations 525. In further aspects, Instruction Sets 526 and/or Extra Info 527 that temporally correspond to a Collection of Object Representations 525 may include Instruction Sets 526 used and/or Extra Info 527 obtained from the time of generating a previous Collection of Object Representations 525 to the time of generating the Collection of Object Representations 525. Any other temporal relationship or correspondence between Collections of Object Representations 525 and correlated Instruction Sets 526 and/or Extra Info 527 can be implemented.

In some embodiments, Knowledge Structuring Unit 520 can structure the knowledge of Avatar's 605 operation in a circumstance including objects with various properties into any number of Knowledge Cells 800. In some aspects, Knowledge Structuring Unit 520 can structure into a Knowledge Cell 800 a single Collection of Object Representations 525 correlated with any Instruction Sets 526 and/or Extra Info 527. In other aspects, Knowledge Structuring Unit 520 can structure into a Knowledge Cell 800 any number (i.e. 2, 3, 6, 9, 21, 98, 3210, 13592, 513299, 9147224, etc.) of Collections of Object Representations 525 correlated with any Instruction Sets 526 and/or Extra Info 527. In a special case, Knowledge Structuring Unit 520 can structure all Collections of Object Representations 525 correlated with any Instruction Sets 526 and/or Extra Info 527 into a single long Knowledge Cell 800. In further aspects, Knowledge Structuring Unit 520 can structure Collections of Object Representations 525 correlated with any Instruction Sets 526 and/or Extra Info 527 into a plurality of Knowledge Cells 800. In a special case, Knowledge Structuring Unit 520 can store periodic streams of Collections of Object Representations 525 correlated with any Instruction Sets 526 and/or Extra Info 527 into a plurality of Knowledge Cells 800 such as hourly, daily, weekly, monthly, yearly, or other periodic Knowledge Cells 800.

Figure 13:
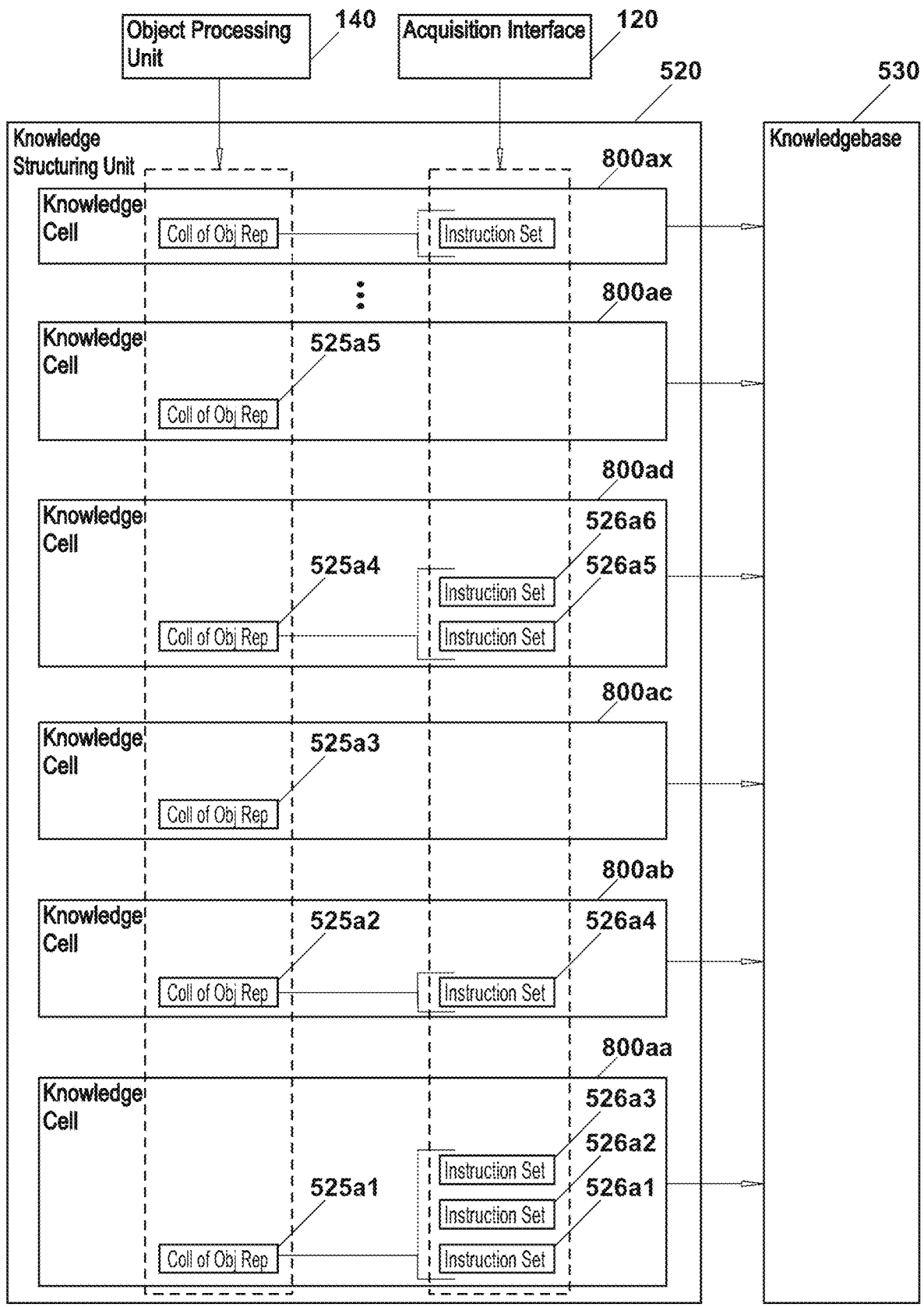
FIG. 13 illustrates another embodiment of Knowledge Structuring Unit 520 correlating individual Collections of Object Representations 525 with any Instruction Sets 526 and/or Extra Info 527.

Referring to FIG. 13, another embodiment of Knowledge Structuring Unit 520 correlating individual Collections of Object Representations 525 with any Instruction Sets 526 and/or Extra Info 527 is illustrated. In such embodiments, Knowledge Structuring Unit 520 may generate Knowledge Cells 800 each comprising a single Collection of Object Representations 525 correlated with any Instruction Sets 526 and/or Extra Info 527.

Figure 14:
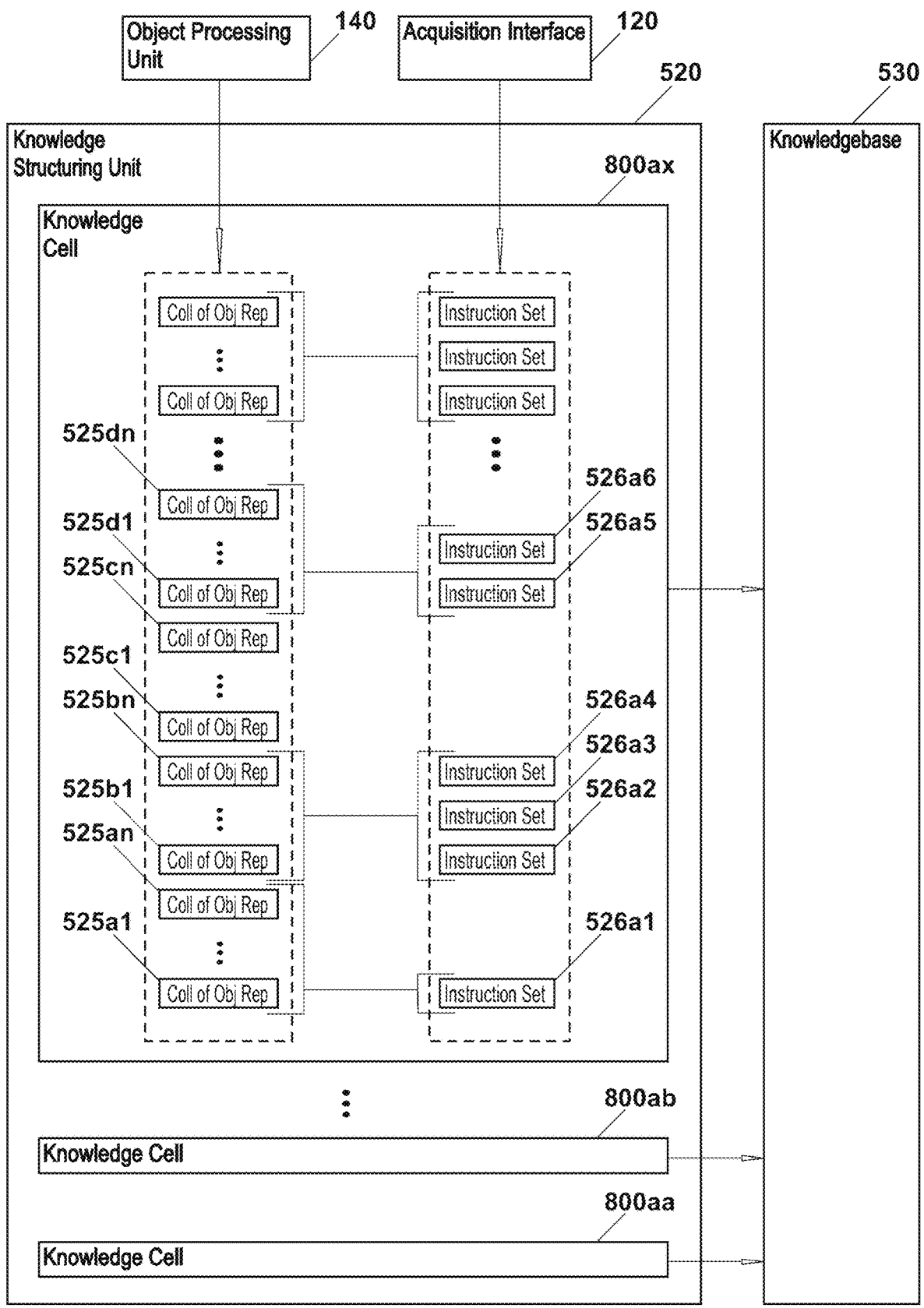
FIG. 14 illustrates an embodiment of Knowledge Structuring Unit 520 correlating streams of Collections of Object Representations 525 with any Instruction Sets 526 and/or Extra Info 527.

Referring to FIG. 14, an embodiment of Knowledge Structuring Unit 520 correlating streams of Collections of Object Representations 525 with any Instruction Sets 526 and/or Extra Info 527 is illustrated. For example, Knowledge Structuring Unit 520 may create Knowledge Cell 800ax and structure within it a stream of Collections of Object Representations 525a1-525an correlated with Instruction Set 526a1 and/or any Extra Info 527 (not shown). Knowledge Structuring Unit 520 may further structure within Knowledge Cell 800ax a stream of Collections of Object Representations 525b1-525bn correlated with Instruction Sets 526a2-526a4 and/or any Extra Info 527 (not shown). Knowledge Structuring Unit 520 may further structure within Knowledge Cell 800ax a stream of Collections of Object Representations 525c1-525cn without correlated Instruction Sets 526 and/or Extra Info 527. Knowledge Structuring Unit 520 may further structure within Knowledge Cell 800ax a stream of Collections of Object Representations 525d1-525dn correlated with Instruction Sets 526a5-526a6 and/or any Extra Info 527 (not shown). Knowledge Structuring Unit 520 may further structure within Knowledge Cell 800ax additional streams of Collections of Object Representations 525 correlated with any number (including zero [i.e. uncorrelated]) of Instruction Sets 526 and/or Extra Info 527 by following similar logic as described above. The number of Collections of Object Representations 525 in some or all streams of Collections of Object Representations 525a1-525an, 525b1-525bn, 525c1-525cn, 525d1-525dn, etc. may be equal or different. It should be noted that n or other such letters or indicia may follow the sequence and/or context where they are indicated. Also, a same letter or indicia such as n may represent a different number in different sequences or elements of a drawing.

Figure 15:
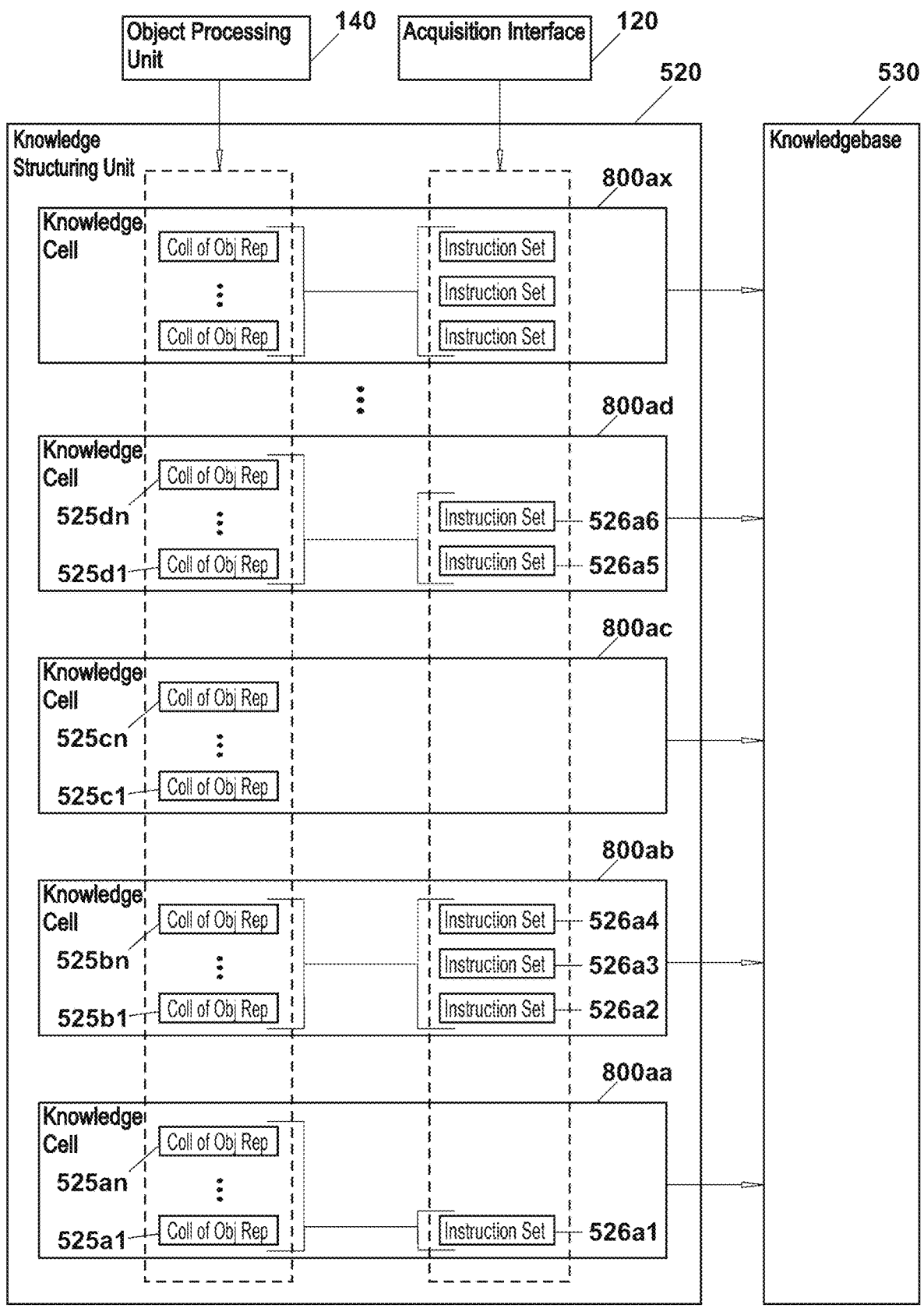
FIG. 15 illustrates another embodiment of Knowledge Structuring Unit 520 correlating streams of Collections of Object Representations 525 with any Instruction Sets 526 and/or Extra Info 527.

Referring to FIG. 15, another embodiment of Knowledge Structuring Unit 520 correlating streams of Collections of Object Representations 525 with any Instruction Sets 526 and/or Extra Info 527 is illustrated. In such embodiments, Knowledge Structuring Unit 520 may generate Knowledge Cells 800 each comprising a single stream of Collections of Object Representations 525 correlated with any Instruction Sets 526 and/or Extra Info 527.

Knowledgebase 530 comprises the functionality for storing knowledge of Avatar's 605 operation in circumstances including objects with various properties, and/or other functionalities. Knowledgebase 530 comprises the functionality for storing one or more Collections of Object Representations 525 representing Objects 615 in Avatar's 605 surrounding correlated with any Instruction Sets 526 and/or Extra Info 527. The Instruction Sets 526 may be used or executed in operating Avatar 605. Knowledgebase 530 comprises the functionality for storing one or more Knowledge Cells 800 each including one or more Collections of Object Representations 525 correlated with any Instruction Sets 526 and/or Extra Info 527. In some aspects, Collections of Object Representations 525 correlated with Instruction Sets 526 and/or Extra Info 527 can be stored directly within Knowledgebase 530 without using Knowledge Cells 800 as the intermediary data structures. In some embodiments, Knowledgebase 530 may be or include Neural Network 530a (later described). In other embodiments, Knowledgebase 530 may be or include Graph 530b (later described). In further embodiments, Knowledgebase 530 may be or include Collection of Sequences 530c (later described). In further embodiments, Knowledgebase 530 may be or include Sequence 533 (later described). In further embodiments, Knowledgebase 530 may be or include Collection of Knowledge Cells 530d (later described). In general, Knowledgebase 530 may be or include any data structure or arrangement capable of storing knowledge of Avatar's 605 operation in circumstances including objects with various properties. Knowledgebase 530 may reside locally on Computing Device 70, or remotely (i.e. remote Knowledgebase 530, etc.) on a remote computing device (i.e. server, cloud, etc.) accessible over a network or an interface.

In some embodiments, Knowledgebase 530 from one Computing Device 70 or ACAAO Unit 100 can be transferred to one or more other Computing Devices 70 or ACAAO Units 100. Therefore, the knowledge of Avatar's 605 operation in circumstances including objects with various properties learned and/or stored on one Computing Device 70 or ACAAO Unit 100 can be transferred to one or more other Computing Devices 70 or ACAAO Units 100.

In one example, Knowledgebase 530 can be copied or downloaded to a file or other repository from one Computing Device 70 or ACAAO Unit 100 and loaded or inserted into another Computing Device 70 or ACAAO Unit 100. In another example, Knowledgebase 530 from one Computing Device 70 or ACAAO Unit 100 can be available on a server accessible by other Computing Devices 70 or ACAAO Units 100 over a network or an interface. Once loaded into or accessed by a receiving Computing Device 70 or ACAAO Unit 100, the receiving Computing Device 70 or ACAAO Unit 100 can then implement the knowledge of Avatar's 605 operation in circumstances including objects with various properties learned or stored on the originating Computing Device 70 or ACAAO Unit 100.

In some embodiments, multiple Knowledgebases 530 (i.e. Knowledgebases 530 from different Computing Devices 70 or ACAAO Units 100, etc.) can be combined to accumulate collective knowledge of operating Avatar 605 in circumstances including objects with various properties. In one example, one Knowledgebase 530 can be appended to another Knowledgebase 530 such as appending one Collection of Sequences 530c (later described) to another Collection of Sequences 530c, appending one Sequence 533 (later described) to another Sequence 533, appending one Collection of Knowledge Cells 530d (later described) to another Collection of Knowledge Cells 530d, and/or appending other data structures or elements thereof. In another example, one Knowledgebase 530 can be copied into another Knowledgebase 530 such as copying one Collection of Sequences 530c into another Collection of Sequences 530c, copying one Collection of Knowledge Cells 530d into another Collection of Knowledge Cells 530d, and/or copying other data structures or elements thereof. In a further example, in the case of Knowledgebase 530 being or including Graph 530b or graph-like data structure (i.e. Neural Network 530a, tree, etc.), a union can be utilized to combine two or more Graphs 530b or graph-like data structures. For instance, a union of two Graphs 530b or graph-like data structures may include a union of their vertex (i.e. node, etc.) sets and their edge (i.e. connection, etc.) sets. Any other operations or combination thereof on graphs or graph-like data structures can be utilized to combine Graphs 530b or graph-like data structures. In a further example, one Knowledgebase 530 can be combined with another Knowledgebase 530 through later described learning processes where Knowledge Cells 800 may be applied one at a time and connected with prior and/or subsequent Knowledge Cells 800 such as in Graph 530b or Neural Network 530a. In such embodiments, instead of Knowledge Cells 800 generated by Knowledge Structuring Unit 520, the learning process may utilize Knowledge Cells 800 from one Knowledgebase 530 to apply them onto another Knowledgebase 530. Any other techniques known in art including custom techniques for combining data structures can be utilized for combining Knowledgebases 530 in alternate implementations. In any of the aforementioned and/or other combining techniques, similarity of elements (i.e. nodes/vertices, edges/connections, etc.) can be utilized in determining whether an element from one Knowledgebase 530 matches an element from another Knowledgebase 530, and substantially or otherwise similar elements may be considered a match for combining purposes in some designs. Any features, functionalities, and embodiments of Similarity Comparison 125 (later described) can be used in such similarity determinations. A combined Knowledgebase 530 can be offered as a network service (i.e. online application, etc.), downloadable file, or other repository to all ACAAO Units 100 configured to utilize the combined Knowledgebase 530. For example, a computer game (i.e. Application Program 18, etc.) including or interfaced with ACAAO Unit 100 having access to a combined Knowledgebase 530 can use a collective knowledge for Avatar's 605 operation in circumstances including objects with various properties learned from multiple players (i.e. Users 50, etc.) for Avatar's 605 autonomous operation.

Referring to FIG. 16, the disclosed artificially intelligent devices, systems, and methods for learning and/or using an avatar's circumstances for autonomous avatar operation may include various artificial intelligence models and/or techniques. The disclosed devices, systems, and methods are independent of the artificial intelligence model and/or technique used and any model and/or technique can be utilized to facilitate the functionalities described herein. Examples of these models and/or techniques include deep learning, supervised learning, unsupervised learning, neural networks (i.e. convolutional neural network, recurrent neural network, deep neural network, etc.), search-based, logic and/or fuzzy logic-based, optimization-based, tree/graph/other data structure-based, hierarchical, symbolic and/or sub-symbolic, evolutionary, genetic, multi-agent, deterministic, probabilistic, statistical, and/or other models and/or techniques.

In one example shown in Model A, the disclosed artificially intelligent devices, systems, and methods for learning and/or using an avatar's circumstances for autonomous avatar operation may include a neural network (also referred to as artificial neural network, etc.). As such, machine learning, knowledge structuring or representation, decision making, pattern recognition, and/or other artificial intelligence functionalities may include a network of Nodes 852 (also referred to as neurons, etc.) and Connections 853 similar to that of a brain. Node 852 can store any data, object, data structure, and/or other item, or reference thereto. Node 852 may also include a function for transforming or manipulating any data, object, data structure, and/or other item. Examples of such transformation functions include mathematical functions (i.e. addition, subtraction, multiplication, division, sin, cos, log, derivative, integral, etc.), object manipulation functions (i.e. creating an object, modifying an object, deleting an object, appending objects, etc.), data structure manipulation functions (i.e. creating a data structure, modifying a data structure, deleting a data structure, creating a data field, modifying a data field, deleting a data field, etc.), and/or other transformation functions. Connection 853 may include or be associated with a value such as a symbolic label or numeric attribute (i.e. weight, cost, capacity, length, etc.). A computational model can be utilized to compute values from inputs based on a pre-programmed or learned function or method. For example, a neural network may include one or more input neurons that can be activated by inputs. Activations of these neurons can then be passed on, weighted, and transformed by a function to other neurons. Neural networks may range from those with only one layer of single direction logic to multi-layer of multi-directional feedback loops. A neural network can use weights to change the parameters of the network's throughput. A neural network can learn by input from its environment or from self-teaching using written-in rules. A neural network can be utilized as a predictive modeling approach in machine learning. An exemplary embodiment of a neural network (i.e. Neural Network 530*a*, etc.) is described later.

In another example shown in Model B, the disclosed artificially intelligent devices, systems, and methods for learning and/or using an avatar's circumstances for autonomous avatar operation may include a graph or graph-like data structure. As such, machine learning, knowledge structuring or representation, decision making, pattern recognition, and/or other artificial intelligence functionalities may include Nodes 852 (also referred to as vertices or points, etc.) and Connections 853 (also referred to as edges, arrows, lines, arcs, etc.) organized as a graph. In general, any Node 852 in a graph can be connected to any other Node 852. A Connection 853 may include unordered pair of Nodes 852 in an undirected graph or ordered pair of Nodes 852 in a directed graph. Nodes 852 can be part of the graph structure or external entities represented by indices or references. A graph can be utilized as a predictive modeling approach in machine learning. Nodes 852, Connections 853, and/or other elements or operations of a graph may include any features, functionalities, and embodiments of the aforementioned Nodes 852, Connections 853, and/or other elements or operations of a neural network, and vice versa. An exemplary embodiment of a graph (i.e. Graph 530*b*, etc.) is described later.

In a further example shown in Model C, the disclosed artificially intelligent devices, systems, and methods for learning and/or using an avatar's circumstances for autonomous avatar operation may include a tree or tree-like data structure. As such, machine learning, knowledge structuring or representation, decision making, pattern recognition, and/or other artificial intelligence functionalities may include Nodes 852 and Connections 853 (also referred to as references, edges, etc.) organized as a tree. In general, a Node 852 in a tree can be connected to any number (i.e. including zero, etc.) of children Nodes 852. A tree can be utilized as a predictive modeling approach in machine learning. Nodes 852, Connections 853, and/or other elements or operations of a tree may include any features, functionalities, and embodiments of the aforementioned Nodes 852, Connections 853, and/or other elements or operations of a neural network and/or graph, and vice versa.

In a further example shown in Model D, the disclosed artificially intelligent devices, systems, and methods for learning and/or using an avatar's circumstances for autonomous avatar operation may include a sequence or sequence-like data structure. As such, machine learning, knowledge structuring or representation, decision making, pattern recognition, and/or other artificial intelligence functionalities may include a structure of Nodes 852 and/or Connections 853 organized as a sequence. In some aspects, Connections 853 may be optionally omitted from a sequence as the sequential order of Nodes 852 in a sequence may be implied in the structure. A sequence can be utilized as a predictive modeling approach in machine learning. Nodes 852, Connections 853, and/or other elements or operations of a sequence may include any features, functionalities, and embodiments of the aforementioned Nodes 852, Connections 853, and/or other elements or operations of a neural network, graph, and/or tree, and vice versa. An exemplary embodiment of a sequence (i.e. Collection of Sequences 530*c*, Sequence 533, etc.) is described later.

In yet another example, the disclosed artificially intelligent devices, systems, and methods for learning and/or using an avatar's circumstances for autonomous avatar operation may include a search-based model and/or technique. As such, machine learning, knowledge structuring or representation, decision making, pattern recognition, and/or other artificial intelligence functionalities may include searching through a collection of possible solutions. For example, a search method can search through a neural network, graph, tree, sequence, or other data structure that includes data elements of interest. A search may use heuristics to limit the search for solutions by eliminating choices that are unlikely to lead to the goal. Heuristic techniques may provide a best guess solution. A search can also include optimization. For example, a search may begin with a guess and then refine the guess incrementally until no more refinements can be made. In a further example, the disclosed systems, devices, and methods may include logic-based model and/or technique. As such, machine learning, knowledge structuring or representation, decision making, pattern recognition, and/or other artificial intelligence functionalities can use formal or other type of logic. Logic based models may involve making inferences or deriving conclusions from a set of premises. As such, a logic based system can extend existing knowledge or create new knowledge automatically using inferences. Examples of the types of logic that can be utilized include propositional or sentential logic that comprises logic of statements which can be true or false; first-order logic that allows the use of quantifiers and predicates and that can express facts about objects, their properties, and their relations with each other; fuzzy logic that allows degrees of truth to be represented as a value between 0 and 1 rather than simply 0 (false) or 1 (true), which can be used for uncertain reasoning; subjective logic that comprises a type of probabilistic logic that may take uncertainty and belief into account, which can be suitable for modeling and analyzing situations involving uncertainty, incomplete knowledge, and different world views; and/or other types of logic. In a further example, the disclosed systems, devices, and methods may include a probabilistic model and/or technique. As such, machine learning, knowledge structuring or representation, decision making, pattern recognition, and/or other artificial intelligence functionalities can be implemented to operate with incomplete or uncertain information where probabilities may affect outcomes. Bayesian network, among other models, is an example of a probabilistic tool used for purposes such as reasoning, learning, planning, perception, and/or others. One of ordinary skill in art will understand that the aforementioned artificial intelligence models and/or techniques are described merely as examples of a variety of possible implementations, and that while all possible artificial intelligence models and/or techniques are too voluminous to describe, other artificial intelligence models and/or techniques known in art are within the scope of this disclosure. One of ordinary skill in art will also recognize that an intelligent system may solve a specific problem by using any model and/or technique that works such as, for example, some systems can be symbolic and logical, some can be sub-symbolic neural networks, some can be deterministic or probabilistic, some can be hierarchical, some may include searching techniques, some may include optimization techniques, while others may use other or a combination of models and/or techniques. In general, any artificial intelligence model and/or technique can be utilized that can facilitate the functionalities described herein.

Figure 17A:
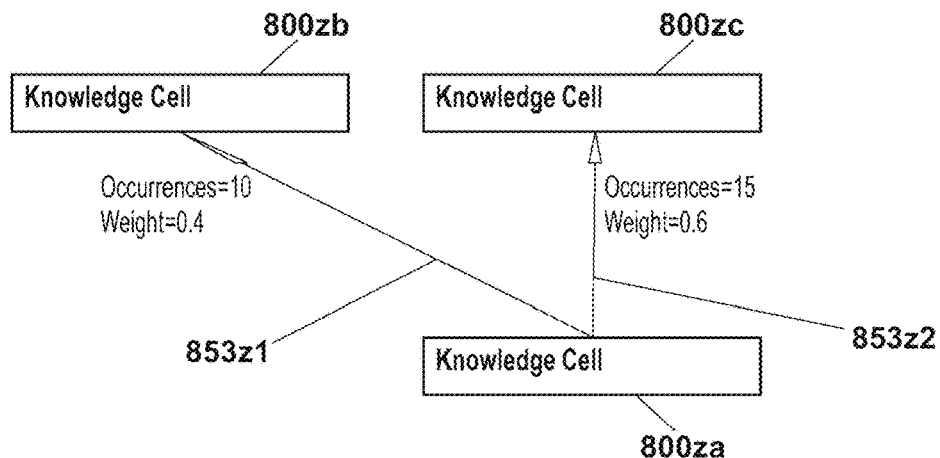
FIGS. 17A-17C illustrate embodiments of interconnected Knowledge Cells 800 and updating weights of Connections 853.
Figure 17B:
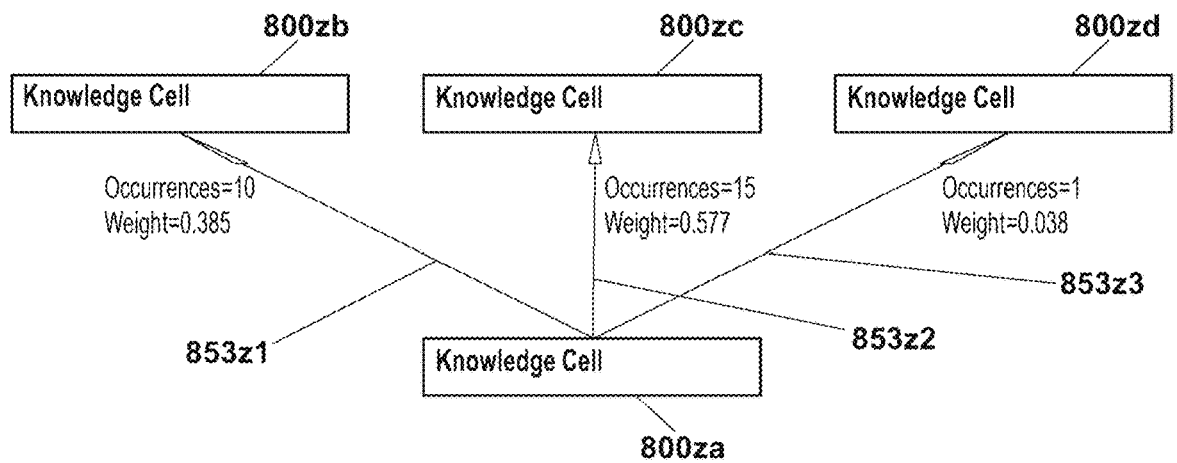
Figure 17C:
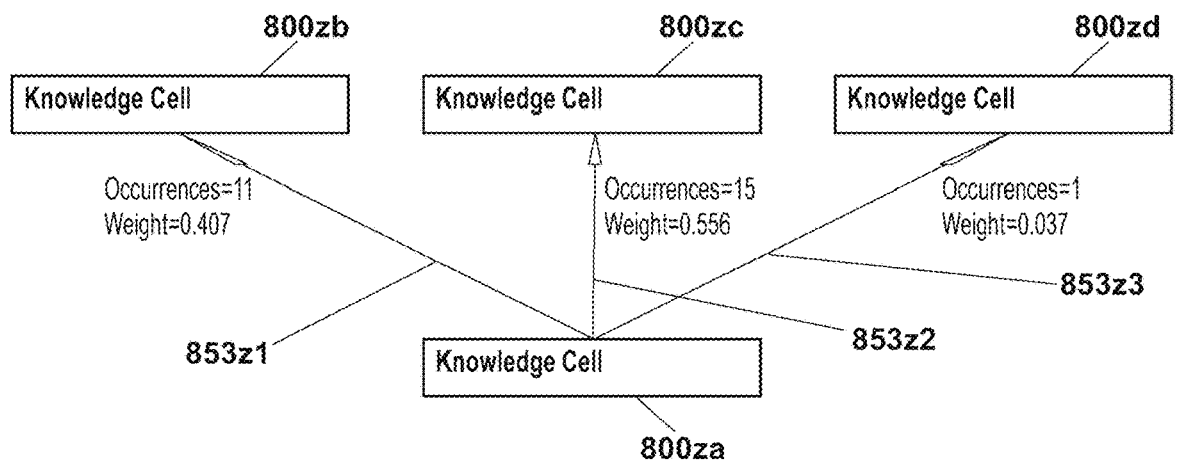

Referring to FIGS. 17A-17C, embodiments of interconnected Knowledge Cells 800 and updating weights of Connections 853 are illustrated. As shown for example in FIG. 17A, Knowledge Cell 800*za* is connected to Knowledge Cell 800*zb* and Knowledge Cell 800*zc* by Connection 853*z*1 and Connection 853*z*2, respectively. Each of Connection 853*z*1 and Connection 853*z*2 may include or be associated with occurrence count, weight, and/or other parameters or data. The number of occurrences may track or store the number of observations that a Knowledge Cell 800 was followed by another Knowledge Cell 800 indicating a connection or relationship between them. For example, Knowledge Cell 800*za* was followed by Knowledge Cell 800*zb* 10 times as indicated by the number of occurrences of Connection 853*z*1. Also, Knowledge Cell 800*za* was followed by Knowledge Cell 800*zc* 15 times as indicated by the number of occurrences of Connection 853*z*2. The weight of Connection 853*z*1 can be calculated or determined as the number of occurrences of Connection 853*z*1 divided by the sum of occurrences of all connections (i.e. Connection 853*z*1 and Connection 853*z*2, etc.) originating from Knowledge Cell 800*za*. Therefore, the weight of Connection 853*z*1 can be calculated or determined as $10/(10+15)=0.4$, for example. Also, the weight of Connection 853*z*2 can be calculated or determined as $15/(10+15)=0.6$, for example. Therefore, the sum of weights of Connection 853*z*1, Connection 853*z*2, and/or any other Connections 853 originating from Knowledge Cell 800*za* may equal to 1 or 100%. As shown for example in FIG. 17B, in the case that Knowledge Cell 800*zd* is inserted and an observation is made that Knowledge Cell 800*zd* follows Knowledge Cell 800*za*, Connection 853*z*3 can be created between Knowledge Cell 800*za* and Knowledge Cell 800*zd*. The occurrence count of Connection 853*z*3 can be set to 1 and weight determined as $1/(10+15+1)=0.038$. The weights of all other connections (i.e. Connection 853*z*1, Connection 853*z*2, etc.) originating from Knowledge Cell 800*za* may be updated to account for the creation of Connection 853*z*3. Therefore, the weight of Connection 853*z*1 can be updated as $10/(10+15+1)=0.385$. The weight of Connection 853*z*2 can also be updated as $15/(10+15+1)=0.577$. As shown for example in FIG. 17C, in the case that an additional occurrence of Connection 853*z*1 is observed (i.e. Knowledge Cell 800*zb* followed Knowledge Cell 800*za*, etc.), occurrence count of Connection 853*z*1 and weights of all connections (i.e. Connection 853*z*1, Connection 853*z*2, and Connection 853*z*3, etc.) originating from Knowledge Cell 800*za* may be updated to account for this observation. The occurrence count of Connection 853*z*1 can be increased by 1 and its weight updated as $11/(11+15+1)=0.407$. The weight of Connection 853*z*2 can also be updated as $15/(11+15+1)=0.556$. The weight of Connection 853*z*3 can also be updated as $1/(11+15+1)=0.037$.

Figure 18:
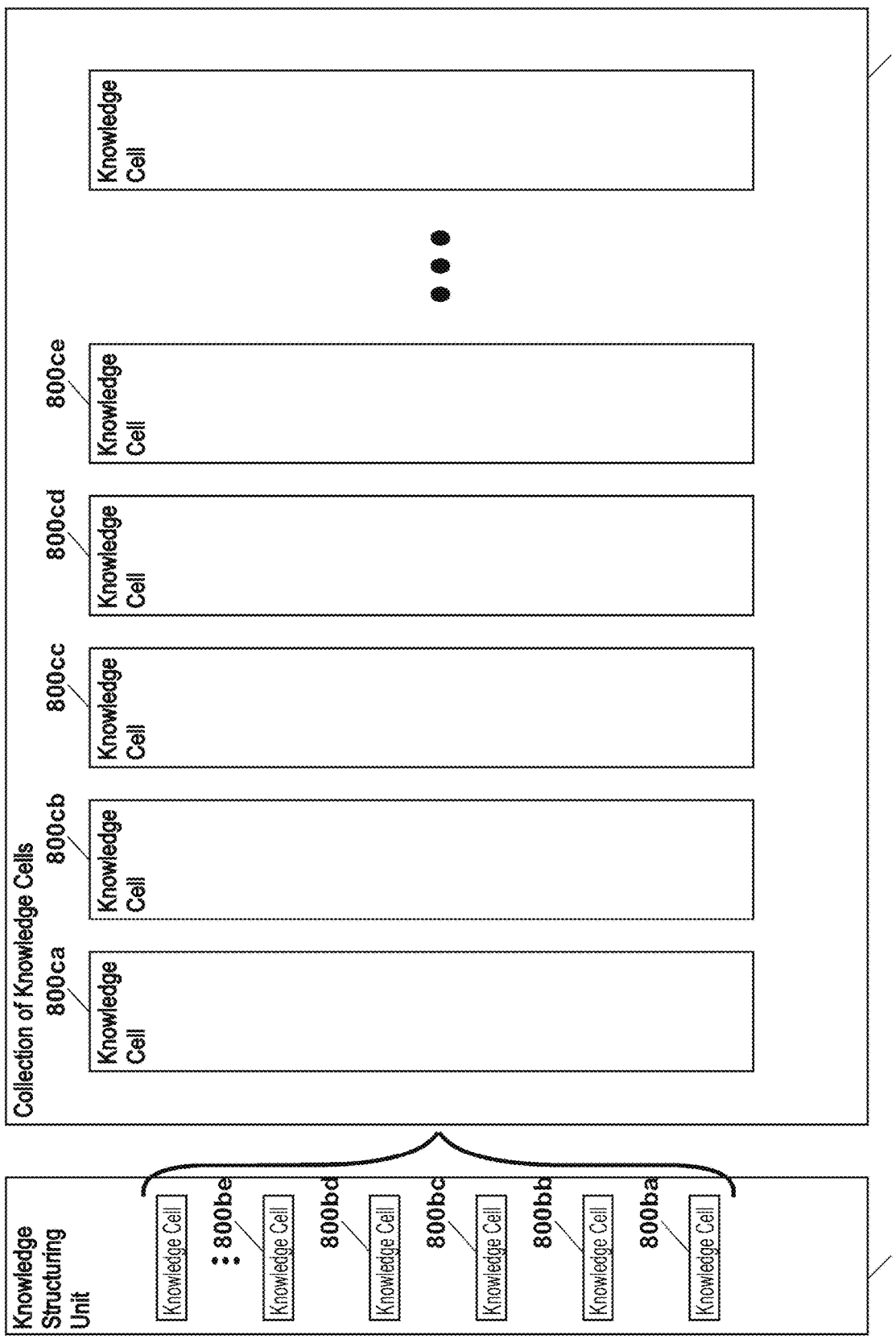
FIG. 18 illustrates an embodiment of learning Knowledge Cells 800 comprising one or more Collections of Object Representations 525 correlated with any Instruction Sets 526 and/or Extra Info 527 using Collection of Knowledge Cells 530*d*.

Referring to FIG. 18, an embodiment of learning Knowledge Cells 800 comprising one or more Collections of Object Representations 525 correlated with any Instruction Sets 526 and/or Extra Info 527 using Collection of Knowledge Cells 530*d* is illustrated. Collection of Knowledge Cells 530*d* comprises the functionality for storing any number of Knowledge Cells 800. In some aspects, Knowledge Cells 800 may be stored into or applied onto Collection of Knowledge Cells 530*d* in a learning or training process. In effect, Collection of Knowledge Cells 530*d* may store Knowledge Cells 800 that can later be used to enable autonomous Avatar 605 operation. In some embodiments, Knowledge Structuring Unit 520 structures or generates Knowledge Cells 800 as previously described and the system applies them onto Collection of Knowledge Cells 530*d*, thereby implementing learning Avatar's 605 operation in circumstances including objects with various properties. The term apply or applying may refer to storing, copying, inserting, updating, or other similar action, therefore, these terms may be used interchangeably herein depending on context. The system can perform Similarity Comparisons 125 (later described) of a newly structured Knowledge Cell 800 from Knowledge Structuring Unit 520 with Knowledge Cells 800 in Collection of Knowledge Cells 530*d*. If a substantially similar Knowledge Cell 800 is not found in Collection of Knowledge Cells 530*d*, the system may insert (i.e. copy, store, etc.) the Knowledge Cell 800 from Knowledge Structuring Unit 520 into Collection of Knowledge Cells 530*d*, for example. On the other hand, if a substantially similar Knowledge Cell 800 is found in Collection of Knowledge Cells 530*d*, the system may optionally omit inserting the Knowledge Cell 800 from Knowledge Structuring Unit 520 as inserting a substantially similar Knowledge Cell 800 may not add much or any additional knowledge to the Collection of Knowledge Cells 530*d*, for example. Also, inserting a substantially similar Knowledge Cell 800 can optionally be omitted to save storage resources and limit the number of Knowledge Cells 800 that may later need to be processed or compared. Any features, functionalities, and embodiments of Similarity Comparison 125, importance index (later described), similarity index (later described), and/or other disclosed elements can be utilized to facilitate determination of substantial or other similarity and whether to insert a newly structured Knowledge Cell 800 into Collection of Knowledge Cells 530*d*.

For example, the system can perform Similarity Comparisons 125 (later described) of Knowledge Cell 800*ba* from Knowledge Structuring Unit 520 with Knowledge Cells 800 in Collection of Knowledge Cells 530*d*. In the case that a substantially similar match is found between Knowledge Cell 800*ba* and any of the Knowledge Cells 800 in Collection of Knowledge Cells 530*d*, the system may perform no action. The system can then perform Similarity Comparisons 125 of Knowledge Cell 800*bb* from Knowledge Structuring Unit 520 with Knowledge Cells 800 in Collection of Knowledge Cells 530*d*. In the case that a substantially similar match is not found, the system may insert a new Knowledge Cell 800 into Collection of Knowledge Cells 530*d* and copy Knowledge Cell 800*bb* into the inserted new Knowledge Cell 800. The system can then perform Similarity Comparisons 125 of Knowledge Cell 800*bc* from Knowledge Structuring Unit 520 with Knowledge Cells 800 in Collection of Knowledge Cells 530*d*. In the case that a substantially similar match is found between Knowledge Cell 800*bc* and any of the Knowledge Cells 800 in Collection of Knowledge Cells 530*d*, the system may perform no action. The system can then perform Similarity Comparisons 125 of Knowledge Cell 800*bd* from Knowledge Structuring Unit 520 with Knowledge Cells 800 in Collection of Knowledge Cells 530*d*. In the case that a substantially similar match is not found, the system may insert a new Knowledge Cell 800 into Collection of Knowledge Cells 530*d* and copy Knowledge Cell 800*bd* into the inserted new Knowledge Cell 800. The system can then perform Similarity Comparisons 125 of Knowledge Cell 800*be* from Knowledge Structuring Unit 520 with Knowledge Cells 800 in Collection of Knowledge Cells 530*d*. In the case that a substantially similar match is not found, the system may insert a new Knowledge Cell 800 into Collection of Knowledge Cells 530*d* and copy Knowledge Cell 800*be* into the inserted new Knowledge Cell 800. Applying any additional Knowledge Cells 800 from Knowledge Structuring Unit 520 onto Collection of Knowledge Cells 530*d* follows similar logic or process as the above-described.

Figure 19:
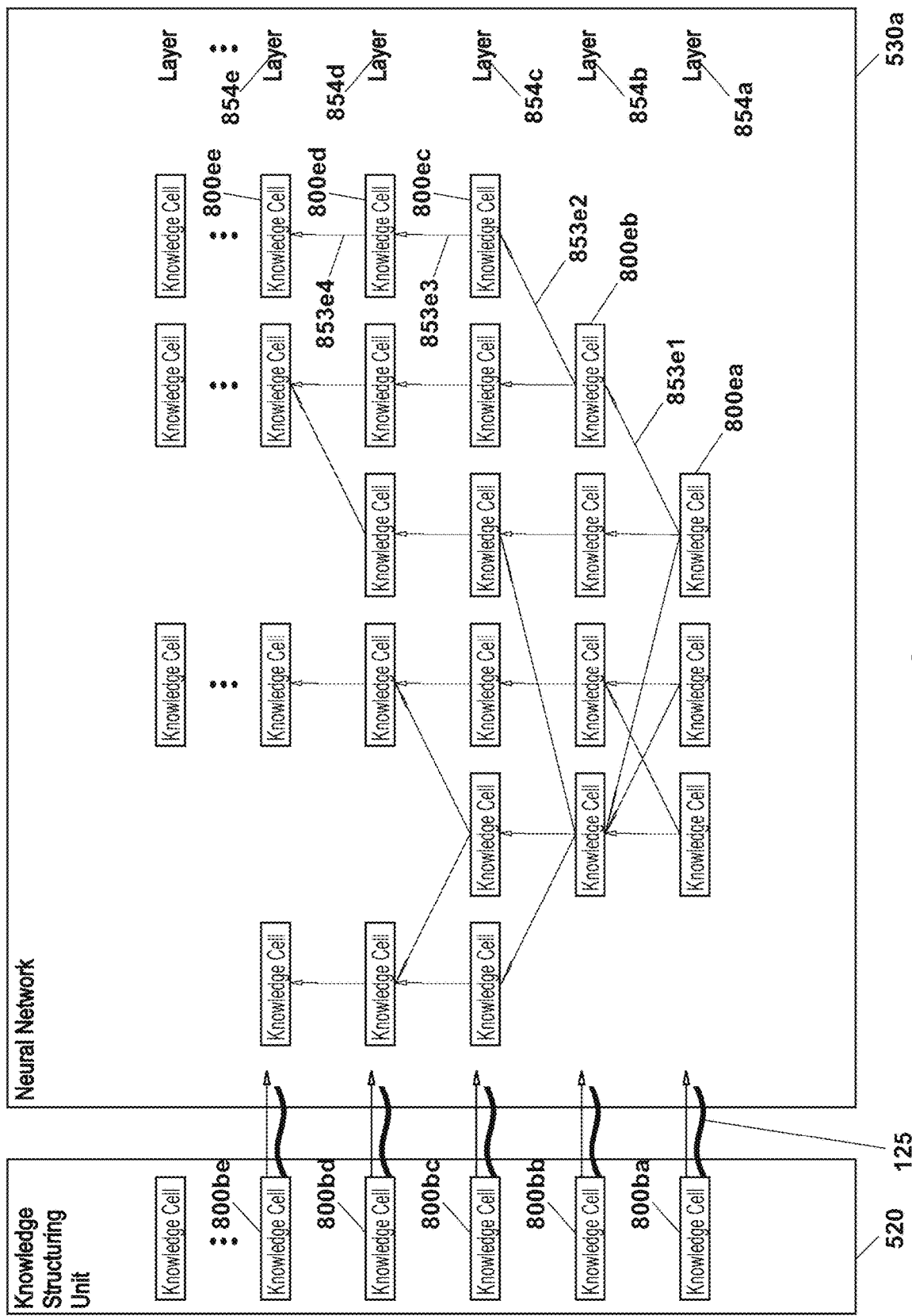
FIG. 19 illustrates an embodiment of learning Knowledge Cells 800 comprising one or more Collections of Object Representations 525 correlated with any Instruction Sets 526 and/or Extra Info 527 using Neural Network 530*a*.

Referring to FIG. 19, an embodiment of learning Knowledge Cells 800 comprising one or more Collections of Object Representations 525 correlated with any Instruction Sets 526 and/or Extra Info 527 using Neural Network 530*a* is illustrated. Neural Network 530*a* includes a number of neurons or Nodes 852 interconnected by Connections 853 as previously described. Knowledge Cells 800 are shown instead of Nodes 852 to simplify the illustration as Node 852 includes a Knowledge Cell 800, for example. Therefore, Knowledge Cells 800 and Nodes 852 can be used interchangeably herein depending on context. It should be noted that Node 852 may include other elements and/or functionalities instead of or in addition to Knowledge Cell 800. In some aspects, Knowledge Cells 800 may be stored into or applied onto Neural Network 530*a* individually or collectively in a learning or training process. In some designs, Neural Network 530*a* comprises a number of Layers 854 each of which may include one or more Knowledge Cells 800. Knowledge Cells 800 in successive Layers 854 can be connected by Connections 853. Connection 853 may include or be associated with occurrence count, weight, and/or other parameter or data as previously described. Neural Network 530*a* may include any number of Layers 854 comprising any number of Knowledge Cells 800. In some aspects, Neural Network 530*a* may store Knowledge Cells 800 interconnected by Connections 853 where following a path through the Neural Network 530*a* can later be used to enable autonomous Avatar 605 operation. It should be understood that, in some embodiments, Knowledge Cells 800 in one Layer 854 of Neural Network 530*a* need not be connected only with Knowledge Cells 800 in a successive Layer 854, but also in any other Layer 854, thereby creating shortcuts (i.e. shortcut Connections 853, etc.) through Neural Network 530*a*. A Knowledge Cell 800 can also be connected to itself such as, for example, in recurrent neural networks. In general, any Knowledge Cell 800 can be connected with any other Knowledge Cell 800 anywhere else in Neural Network 530*a*. In further embodiments, back-propagation of any data or information can be implemented. In one example, back-propagation of similarity (i.e. similarity index, etc.) of compared Knowledge Cells 800 in a path through Neural Network 530*a* can be implemented.

In another example, back-propagation of errors can be implemented. Such back-propagations can then be used to adjust occurrence counts and/or weights of Connections 853 for better future predictions, for example. Any other back-propagation can be implemented for other purposes. Any combination of Nodes 852 (i.e. Nodes 852 comprising Knowledge Cells 800, etc.), Connections 853, Layers 854, and/or other elements or techniques can be implemented in alternate embodiments. Neural Network 530*a* may include any type or form of a neural network known in art such as a feed-forward neural network, a back-propagating neural network, a recurrent neural network, a convolutional neural network, deep neural network, and/or others including a custom neural network.

In some embodiments, Knowledge Structuring Unit 520 structures or generates Knowledge Cells 800 and the system applies them onto Neural Network 530a, thereby implementing learning Avatar's 605 operation in circumstances including objects with various properties. The system can perform Similarity Comparisons 125 (later described) of a Knowledge Cell 800 from Knowledge Structuring Unit 520 with Knowledge Cells 800 in a Layer 854 of Neural Network 530a. If a substantially similar Knowledge Cell 800 is not found in the Layer 854 of Neural Network 530a, the system may insert (i.e. copy, store, etc.) the Knowledge Cell 800 from Knowledge Structuring Unit 520 into the Layer 854 of Neural Network 530a, and create a Connection 853 to the inserted Knowledge Cell 800 from a Knowledge Cell 800 in a prior Layer 854 including assigning an occurrence count to the new Connection 853, calculating a weight of the new Connection 853, and updating any other Connections 853 originating from the Knowledge Cell 800 in the prior Layer 854. On the other hand, if a substantially similar Knowledge Cell 800 is found in the Layer 854 of Neural Network 530a, the system may update occurrence count and weight of Connection 853 to that Knowledge Cell 800 from a Knowledge Cell 800 in a prior Layer 854, and update any other Connections 853 originating from the Knowledge Cell 800 in the prior Layer 854.

For example, the system can perform Similarity Comparisons 125 (later described) of Knowledge Cell 800ba from Knowledge Structuring Unit 520 with Knowledge Cells 800 in Layer 854a of Neural Network 530a. In the case that a substantially similar match is found between Knowledge Cell 800ba and Knowledge Cell 800ea, the system may perform no action since Knowledge Cell 800ea is the initial Knowledge Cell 800. The system can then perform Similarity Comparisons 125 of Knowledge Cell 800bb from Knowledge Structuring Unit 520 with Knowledge Cells 800 in Layer 854b of Neural Network 530a. In the case that a substantially similar match is found between Knowledge Cell 800bb and Knowledge Cell 800eb, the system may update occurrence count and weight of Connection 853e1 between Knowledge Cell 800ea and Knowledge Cell 800eb, and update weights of other Connections 853 originating from Knowledge Cell 800ea as previously described. The system can then perform Similarity Comparisons 125 of Knowledge Cell 800bc from Knowledge Structuring Unit 520 with Knowledge Cells 800 in Layer 854c of Neural Network 530a. In the case that a substantially similar match is not found, the system may insert Knowledge Cell 800ec into Layer 854c and copy Knowledge Cell 800bc into the inserted Knowledge Cell 800ec. The system may also create Connection 853e2 between Knowledge Cell 800eb and Knowledge Cell 800ec with occurrence count of 1 and weight calculated based on the occurrence count as previously described. The system may also update weights of other Connections 853 (one in this example) originating from Knowledge Cell 800eb as previously described. The system can then perform Similarity Comparisons 125 of Knowledge Cell 800bd from Knowledge Structuring Unit 520 with Knowledge Cells 800 in Layer 854d of Neural Network 530a. In the case that a substantially similar match is not found, the system may insert Knowledge Cell 800ed into Layer 854d and copy Knowledge Cell 800bd into the inserted Knowledge Cell 800ed. The system may also create Connection 853e3 between Knowledge Cell 800ec and Knowledge Cell 800ed with occurrence count of 1 and weight of 1. The system can then perform Similarity Comparisons 125 of Knowledge Cell 800be from Knowledge Structuring Unit 520 with Knowledge Cells 800 in Layer 854e of Neural Network 530a. In the case that a substantially similar match is not found, the system may insert Knowledge Cell 800ee into Layer 854e and copy Knowledge Cell 800be into the inserted Knowledge Cell 800ee. The system may also create Connection 853e4 between Knowledge Cell 800ed and Knowledge Cell 800ee with occurrence count of 1 and weight of 1. Applying any additional Knowledge Cells 800 from Knowledge Structuring Unit 520 onto Neural Network 530a follows similar logic or process as the above-described.

Referring now to Similarity Comparison 125, Similarity Comparison 125 comprises the functionality for comparing or matching Knowledge Cells 800 or portions thereof, and/or other functionalities. Similarity Comparison 125 comprises the functionality for comparing or matching Collections of Object Representations 525 or portions thereof. Similarity Comparison 125 comprises the functionality for comparing or matching streams of Collections of Object Representations 525 or portions thereof. Similarity Comparison 125 comprises the functionality for comparing or matching Object Representations 625 or portions thereof. Similarity Comparison 125 comprises the functionality for comparing or matching Object Properties 630 or portions thereof. Similarity Comparison 125 comprises the functionality for comparing or matching Instruction Sets 526, Extra Info 527, text (i.e. characters, words, phrases, etc.), numbers, and/or other elements or portions thereof. Similarity Comparison 125 may include functions, rules, and/or logic for performing matching or comparisons and for determining that while a perfect match is not found, a partial or similar match has been found. In some aspects, a partial match may include a substantially or otherwise similar match, and vice versa. Therefore, these terms may be used interchangeably herein depending on context. As such, Similarity Comparison 125 may include determining substantial similarity or substantial match of compared elements. Although, substantial similarity or substantial match is frequently used herein, it should be understood that any level of similarity, however high or low, may be utilized as defined by the rules (i.e. thresholds, etc.) for similarity. The rules for similarity or similar match can be defined by a user, by ACAAO system administrator, or automatically by the system based on experience, testing, inquiry, analysis, synthesis, or other techniques, knowledge, or input. In some designs, Similarity Comparison 125 comprises the functionality to automatically define appropriately strict rules for determining similarity of the compared elements. Similarity Comparison 125 can therefore set, reset, and/or adjust the strictness of the rules for finding or determining similarity of the compared elements, thereby fine tuning Similarity Comparison 125 so that the rules for determining similarity are appropriately strict. In some aspects, the rules for determining similarity may include a similarity threshold. As such, Similarity Comparison 125 can determine similarity of compared elements if their similarity exceeds a similarity threshold. In other aspects, the rules for determining similarity may include a difference threshold. As such, Similarity Comparison 125 can determine similarity of compared elements if their difference is lower than a difference threshold. In further aspects, the rules for determining similarity may include other thresholds. Similarity Comparison 125 enables comparing circumstances including objects with various properties and determining their similarity or match. In one example, a circumstance including an object located at a distance of 9 m and an angle/bearing of 970 relative to Avatar 605 may be found similar or matching by Similarity Comparison 125 to a circumstance including the same or similar object located at a distance of 8.7 m and an angle/bearing of 101° relative to Avatar 605. In another example, a circumstance including an object detected as a female person may be found similar or matching by Similarity Comparison 125 to a circumstance including an object detected as a male person. In general, any one or more properties (i.e. existence, type, identity, distance, bearing/ angle, location, shape/size, activity, etc.) of one or more objects can be utilized for determining similarity or match of circumstances including objects with various properties. Therefore, Similarity Comparison 125 provides flexibility in comparing and determining similarity of a variety of possible circumstances of Avatar 605.

In some embodiments where compared Knowledge Cells 800 include a single Collection of Object Representations 525, in determining similarity of Knowledge Cells 800, Similarity Comparison 125 can perform comparison of individual Collections of Object Representations 525 or portions (i.e. Object Representations 625, Object Properties 630, etc.) thereof such as comparison of Collection of Object Representations 525 or portions thereof from one Knowledge Cell 800 with Collection of Object Representations 525 or portions thereof from another Knowledge Cell 800. In some aspects, total equivalence is achieved when Collection of Object Representations 525 or portions thereof from one Knowledge Cell 800 matches Collection of Object Representations 525 or portions thereof from another Knowledge Cell 800. If total equivalence is not found, Similarity Comparison 125 may attempt to determine substantial or other similarity of compared Knowledge Cells 800.

In some embodiments, in determining substantial similarity of individually compared Collections of Object Representations 525 (i.e. Collections of Object Representations 525 from the compared Knowledge Cells 800, etc.), Similarity Comparison 125 can compare one or more Object Representations 625 or portions (i.e. Object Properties 630, etc.) thereof from one Collection of Object Representations 525 with one or more Object Representations 625 or portions thereof from another Collection of Object Representations 525. In some aspects, total equivalence is found when all Object Representations 625 or portions thereof from one Collection of Object Representations 525 match all Object Representations 625 or portions thereof from another Collection of Object Representations 525. In other aspects, if total equivalence is not found, Similarity Comparison 125 may attempt to determine substantial similarity of compared Collections of Object Representations 525. In one example, substantial similarity can be achieved when most of the Object Representations 625 or portions thereof from the compared Collections of Object Representations 525 match or substantially match. In another example, substantial similarity can be achieved when at least a threshold number (i.e. 1, 2, 4, 7, 18, etc.) or percentage (i.e. 41%, 62%, 79%, 85%, 93%, etc.) of Object Representations 625 or portions thereof from the compared Collections of Object Representations 525 match or substantially match. Similarly, substantial similarity can be achieved when the number or percentage of matching or substantially matching Object Representations 625 or portions thereof from the compared Collections of Object Representations 525 exceeds a threshold number (i.e. 1, 2, 4, 7, 18, etc.) or a threshold percentage (i.e. 41%, 62%, 79%, 85%, 93%, etc.). In a further example, substantial similarity can be achieved when all but a threshold number or percentage of Object Representations 625 or portions thereof from the compared Collections of Object Representations 525 match or substantially match. Such thresholds can be defined by a user, by ACAAO system administrator, or automatically by the system based on experience, testing, inquiry, analysis, synthesis, and/or other techniques, knowledge, or input. In some aspects, Similarity Comparison 125 can utilize the importance (i.e. as indicated by importance index [later described], etc.) of Object Representations 625 or portions thereof for determining substantial similarity of Collections of Object Representations 525. For example, substantial similarity can be achieved when matches or substantial matches are found with respect to more important Object Representations 625 or portions thereof such as Object Representations 625 representing near Objects 615, Object Representations 625 representing large Objects 615, etc., thereby tolerating mismatches in less important Object Representations 625 or portions thereof such as Object Representations 625 representing distant Objects 615, Object Representations 625 representing small Objects 615, etc. In general, any Object Representation 625 or portion thereof can be assigned higher or lower importance. In further aspects, Similarity Comparison 125 can omit some of the Object Representations 625 or portions thereof from the comparison in determining substantial similarity of Collections of Object Representations 525. In one example, Object Representations 625 representing distant Objects 615 can be omitted from comparison. In another example, Object Representations 625 representing small Objects 615 can be omitted from comparison. In general, any Object Representation 625 or portion thereof can be omitted from comparison depending on implementation.

Similarity Comparison 125 can automatically adjust (i.e. increase or decrease) the strictness of the rules for determining substantial similarity of Collections of Object Representations 525. In some aspects, such adjustment in strictness can be done by Similarity Comparison 125 in response to determining that total equivalence of compared Collections of Object Representations 525 had not been found. Similarity Comparison 125 can keep adjusting the strictness rules until a substantial similarity is found. All the rules or settings of substantial similarity can be set, reset, or adjusted by Similarity Comparison 125 in response to another strictness level determination. For example, Similarity Comparison 125 may attempt to find a match or substantial match in a certain percentage (i.e. 83%, etc.) of Object Representations 625 or portions thereof from the compared Collections of Object Representations 525. If the comparison does not determine substantial similarity of compared Collections of Object Representations 525, Similarity Comparison 125 may decide to decrease the strictness of the rules. In response, Similarity Comparison 125 may attempt to find fewer matching or substantially matching Object Representations 625 or portions thereof than in the previous attempt using stricter rules. If the comparison still does not determine substantial similarity of compared Collections of Object Representations 525, Similarity Comparison 125 may further decrease the strictness (i.e. down to a certain minimum strictness or threshold, etc.) by requiring fewer Object Representations 625 or portions thereof to match or substantially match, thereby further increasing a chance of finding substantial similarity in compared Collections of Object Representations 525.

Where a reference to Object Representation 625 is used herein it should be understood that a portion of Object Representation 625 (i.e. Object Property 630, etc.) or a plurality of Object Representations 625 can be used instead of or in addition to the Object Representation 625. In one example, instead of or in addition to Object Representation 625, Object Properties 630 and/or other portions that constitute an Object Representation 625 can be compared. In another example, instead of or in addition to Object Representation 625, plurality of Object Representations 625 can be compared. As such, any operations, rules, logic, and/or functions operating on Object Representation 625 may similarly apply to any portion of Object Representation 625 and/or a plurality of Object Representations 625 as applicable. In general, whole Object Representations 625, portions of Object Representations 625, and/or pluralities of Object Representations 625, including any operations thereon, can be combined to arrive at desired results. Some or all of the above-described rules, logic, and/or techniques can be utilized alone or in combination with each other or with other rules, logic, and/or techniques. One of ordinary skill in art will recognize that other techniques known in art for determining similarity of Object Representations 625 and/or other data that would be too voluminous to describe are within the scope of this disclosure.

In some embodiments, in determining substantial similarity of Object Representations 625 (i.e. Object Representations 625 from the compared Collections of Object Representations 525, etc.), Similarity Comparison 125 can compare Object Properties 630 or portions (i.e. characters, words, numbers, etc.) thereof from one Object Representation 625 with Object Properties 630 or portions thereof from another Object Representation 625. In some aspects, total equivalence is found when all Object Properties 630 or portions thereof of one Object Representation 625 match all Object Properties 630 or portions thereof of another Object Representation 625. In other aspects, if total equivalence is not found, Similarity Comparison 125 may attempt to determine substantial similarity of compared Object Representations 625. In one example, substantial similarity can be achieved when most of the Object Properties 630 or portions thereof from the compared Object Representations 625 match or substantially match. In another example, substantial similarity can be achieved when at least a threshold number (i.e. 1, 2, 3, 6, 11, etc.) or percentage (i.e. 55%, 61%, 78%, 82%, 99%, etc.) of Object Properties 630 or portions thereof from the compared Object Representations 625 match or substantially match. Similarly, substantial similarity can be achieved when the number or percentage of matching or substantially matching Object Properties 630 or portions thereof from the compared Object Representations 625 exceeds a threshold number (i.e. 1, 2, 3, 6, 11, etc.) or a threshold percentage (i.e. 55%, 61%, 78%, 82%, 99%, etc.). In a further example, substantial similarity can be achieved when all but a threshold number or percentage of Object Properties 630 or portions thereof from the compared Object Representations 625 match or substantially match. Such thresholds can be defined by a user, by ACAAO system administrator, or automatically by the system based on experience, testing, inquiry, analysis, synthesis, and/or other techniques, knowledge, or input. In further aspects, Similarity Comparison 125 can utilize Categories 635 associated with Object Properties 630 for determining substantial similarity of Object Representations 625. In one example, Object Properties 630 or portions thereof from the compared Object Representations 625 in a same Category 635 may be compared. This way, Object Properties 630 or portions thereof can be compared with their own peers. In one instance, Object Properties 630 or portions thereof from the compared Object Representations 625 in Category 635 "Type" may be compared. Any text comparison technique can be utilized in such comparing. In another instance, Object Properties 630 or portions thereof from the compared Object Representations 625 in Category 635 "Distance" or "Bearing" may be compared. Any number comparison technique can be utilized in such comparing. In a further instance, Object Properties 630 or portions thereof from the compared Object Representations 625 in Category 635 "Shape" may be compared. Any model or other computer construct comparison technique can be utilized in such comparing. In further aspects, Similarity Comparison 125 can utilize the importance (i.e. as indicated by importance index [later described], etc.) of Object Properties 630 or portions thereof for determining substantial similarity of Object Representations 625. For example, substantial similarity can be achieved when matches or substantial matches are found with respect to more important Object Properties 630 or portions thereof such as Object Properties 630 or portions thereof in Categories 635 "Type", "Distance", "Bearing", etc., thereby tolerating mismatches in less important Object Properties 630 or portions thereof such as Object Properties 630 or portions thereof in Categories 635 "Identity", "Shape", etc. In general, any Object Property 630 or portion thereof can be assigned higher or lower importance. In further aspects, Similarity Comparison 125 can omit some of the Object Properties 630 or portions thereof from the comparison in determining substantial similarity of Object Representations 625. In one example, Object Properties 630 or portions thereof in Category 635 "Identity" can be omitted from comparison. In another example, Object Properties 630 or portions thereof in Category 635 "Shape" can be omitted from comparison. In general, any Object Property 630 or portion thereof can be omitted from comparison depending on implementation.

Similarity Comparison 125 can automatically adjust (i.e. increase or decrease) the strictness of the rules for determining substantial similarity of Object Representations 625. In some aspects, such adjustment in strictness can be done by Similarity Comparison 125 in response to determining that total equivalence of compared Object Representations 625 had not been found. Similarity Comparison 125 can keep adjusting the strictness rules until a substantial similarity is found. All the rules or settings of substantial similarity can be set, reset, or adjusted by Similarity Comparison 125 in response to another strictness level determination. For example, Similarity Comparison 125 may attempt to find a match or substantial match in a certain percentage (i.e. 90%, etc.) of Object Properties 630 or portions thereof from the compared Object Representations 625. If the comparison does not determine substantial similarity of compared Object Representations 625, Similarity Comparison 125 may decide to decrease the strictness of the rules. In response, Similarity Comparison 125 may attempt to find fewer matching or substantially matching Object Properties 630 or portions thereof than in the previous attempt using stricter rules. If the comparison still does not determine substantial similarity of compared Object Representations 625, Similarity Comparison 125 may further decrease the strictness (i.e. down to a certain minimum strictness or threshold, etc.) by requiring fewer Object Properties 630 or portions thereof to match or substantially match, thereby further increasing a chance of finding substantial similarity in compared Object Representations 625. In further aspects, an adjustment in strictness can be done by Similarity Comparison 125 in response to determining that multiple substantially similar Object Representations 625 had been found. Similarity Comparison 125 can keep adjusting the strictness of the rules until a best of the substantially similar Object Representations 625 is found. For example, Similarity Comparison 125 may attempt to find a match or substantial match in a certain percentage (i.e. 67%, etc.) of Object Properties 630 or portions thereof from the compared Object Representations 625. If the comparison determines a number of substantially similar Object Representations 625, Similarity Comparison 125 may decide to increase the strictness of the rules to decrease the number of substantially similar Object Representations 625. In response, Similarity Comparison 125 may attempt to find more matching or substantially matching Object Properties 630 or portions thereof in addition to the earlier found Object Properties 630 or portions thereof to limit the number of substantially similar Object Representations 625. If the comparison still provides more than one substantially similar Object Representation 625, Similarity Comparison 125 may further increase the strictness by requiring additional Object Properties 630 or portions thereof to match or substantially match, thereby further narrowing the number of substantially similar Object Representations 625 until a best substantially similar Object Representation 625 is found.

Where a reference to Object Property 630 is used herein it should be understood that a portion of Object Property 630 or a plurality of Object Properties 630 can be used instead of or in addition to the Object Property 630. In one example, instead of or in addition to Object Property 630, characters, words, numbers, and/or other portions that constitute an Object Property 630 can be compared. In another example, instead of or in addition to Object Property 630, a plurality of Object Properties 630 can be compared. As such, any operations, rules, logic, and/or functions operating on Object Property 630 may similarly apply to any portion of Object Property 630 and/or a plurality of Object Properties 630 as applicable. In general, whole Object Properties 630, portions of Object Properties 630, and/or pluralities of Object Properties 630, including any operations thereon, can be combined to arrive at desired results. Some or all of the above-described rules, logic, and/or techniques can be utilized alone or in combination with each other or with other rules, logic, and/or techniques. One of ordinary skill in art will recognize that other techniques known in art for determining similarity of Object Properties 630 and/or other data that would be too voluminous to describe are within the scope of this disclosure.

In some embodiments where compared Knowledge Cells 800 include a stream of Collections of Object Representations 525, in determining similarity of Knowledge Cells 800, Similarity Comparison 125 can perform collective comparison of Collections of Object Representations 525 or portions (i.e. Object Representations 625, Object Properties 630, etc.) thereof such as comparison of a stream of Collections of Object Representations 525 or portions thereof from one Knowledge Cell 800 with a stream of Collections of Object Representations 525 or portions thereof from another Knowledge Cell 800. Similarity Comparison 125 of collectively compared Collections of Object Representations 525 or portions thereof may include any features, functionalities, and embodiments of the previously described Similarity Comparison 125 of individually compared Collections of Object Representations 525 or portions thereof. In some aspects, total equivalence is found when all Collections of Object Representations 525 or portions thereof from one Knowledge Cell 800 match all Collections of Object Representations 525 or portions thereof from another Knowledge Cell 800. If total equivalence is not found, Similarity Comparison 125 may attempt to determine substantial or other similarity of compared Knowledge Cells 800. In one example, substantial similarity can be achieved when most of the Collections of Object Representations 525 or portions thereof from the compared Knowledge Cells 800 match or substantially match. In another example, substantial similarity can be achieved when at least a threshold number (i.e. 1, 2, 4, 9, 33, 138, etc.) or percentage (i.e. 39%, 58%, 77%, 88%, 94%, etc.) of Collections of Object Representations 525 or portions thereof from the compared Knowledge Cells 800 match or substantially match. Similarly, substantial similarity can be achieved when the number or percentage of matching or substantially matching Collections of Object Representations 525 or portions thereof from the compared Knowledge Cells 800 exceeds a threshold number (i.e. 1, 2, 4, 9, 33, 138, etc.) or a threshold percentage (i.e. 39%, 58%, 77%, 88%, 94%, etc.). In a further example, substantial similarity can be achieved when all but a threshold number or percentage of Collections of Object Representations 525 or portions thereof from the compared Knowledge Cells 800 match or substantially match. Such thresholds can be defined by a user, by ACAAO system administrator, or automatically by the system based on experience, testing, inquiry, analysis, synthesis, and/or other techniques, knowledge, or input. In some aspects, Similarity Comparison 125 can utilize the importance (i.e. as indicated by importance index [later described], etc.) of Collections of Object Representations 525 or portions thereof for determining substantial similarity of Knowledge Cells 800. In one example, substantial similarity can be achieved when matches or substantial matches are found with respect to more important Collections of Object Representations 525 or portions thereof such as more substantive or larger Collections of Object Representations 525 (i.e. Collections of Object Representations 525 comprising a higher number of Object Representations 625, etc.) or portions thereof, etc., thereby tolerating mismatches in less important Collections of Object Representations 525 or portions thereof such as less substantive or smaller Collections of Object Representations 525 (i.e. Collections of Object Representations 525 comprising a lower number of Object Representations 625, etc.) or portions thereof, etc. In general, any Collection of Object Representations 525 or portion thereof can be assigned higher or lower importance. In other aspects, Similarity Comparison 125 can utilize the order of Collections of Object Representations 525 or portions thereof for determining substantial similarity of Knowledge Cells 800. In one example, substantial similarity can be achieved when matches or substantial matches are found in earlier Collections of Object Representations 525 or portions thereof from the compared Knowledge Cells 800, thereby tolerating mismatches in later Collections of Object Representations 525 or portions thereof. In another example, substantial similarity can be achieved when matches or substantial matches are found in corresponding (i.e. similarly ordered, temporally related, etc.) Collections of Object Representations 525 or portions thereof from the compared Knowledge Cells 800. In one instance, a $86^{th}$ Collection of Object Representations 525 or portions thereof from one Knowledge Cell 800 can be compared with a $86^{th}$ Collection of Object Representations 525 or portions thereof from another Knowledge Cell 800. In another instance, a $86^{th}$ Collection of Object Representations 525 or portions thereof from one Knowledge Cell 800 can be compared with a number of Collections of Object Representations 525 or portions thereof around (i.e. preceding and/or following) a $86^{th}$ Collection of Object Representations 525 from another Knowledge Cell 800. This way, flexibility can be implemented in finding a substantially similar Collection of Object Representations 525 or portions thereof if the Collections of Object Representations 525 or portions thereof in the compared Knowledge Cells 800 are not perfectly aligned. In a further instance, Similarity Comparison 125 can utilize Dynamic Time Warping (DTW) and/or other techniques known in art for comparing and/or aligning temporal sequences (i.e. streams of Collections of Object Representations 525 or portions thereof, etc.) that may vary in time or speed. In further aspects, Similarity Comparison 125 can omit some of the Collections of Object Representations 525 or portions thereof from the comparison in determining substantial similarity of Knowledge Cells 800. In one example, less substantive or smaller Collections of Object Representations 525 or portions thereof can be omitted from comparison. In another example, some or all Collections of Object Representations 525 or portions thereof related to a specific time period can be omitted from comparison. In general, any Collection of Object Representations 525 or portion thereof can be omitted from comparison depending on implementation.

Similarity Comparison 125 can automatically adjust (i.e. increase or decrease) the strictness of the rules for determining substantial similarity of Knowledge Cells 800. In some aspects, such adjustment in strictness can be done by Similarity Comparison 125 in response to determining that total equivalence of compared Knowledge Cells 800 had not been found. Similarity Comparison 125 can keep adjusting the strictness of the rules until substantial similarity is found. All the rules or settings of substantial similarity can be set, reset, or adjusted by Similarity Comparison 125 in response to another strictness level determination. For example, Similarity Comparison 125 may attempt to find a match or substantial match in a certain percentage (i.e. 89%, etc.) of Collections of Object Representations 525 or portions thereof from the compared Knowledge Cells 800. If the comparison does not determine substantial similarity of compared Knowledge Cells 800, Similarity Comparison 125 may decide to decrease the strictness of the rules. In response, Similarity Comparison 125 may attempt to find fewer matching or substantially matching Collections of Object Representations 525 or portions thereof than in the previous attempt using stricter rules. If the comparison still does not determine substantial similarity of compared Knowledge Cells 800, Similarity Comparison 125 may further decrease (i.e. down to a certain minimum strictness or threshold, etc.) the strictness by requiring fewer Collections of Object Representations 525 or portions thereof to match or substantially match, thereby further increasing a chance of finding substantial similarity in compared Knowledge Cells 800. In further aspects, an adjustment in strictness can be done by Similarity Comparison 125 in response to determining that multiple substantially similar Knowledge Cells 800 had been found. Similarity Comparison 125 can keep adjusting the strictness of the rules until a best of the substantially similar Knowledge Cells 800 is found. For example, Similarity Comparison 125 may attempt to find a match or substantial match in a certain percentage (i.e. 69%, etc.) of Collections of Object Representations 525 or portions thereof from the compared Knowledge Cells 800. If the comparison determines a number of substantially similar Knowledge Cells 800, Similarity Comparison 125 may decide to increase the strictness of the rules to decrease the number of substantially similar Knowledge Cells 800. In response, Similarity Comparison 125 may attempt to find more matching or substantially matching Collections of Object Representations 525 or portions thereof in addition to the earlier found Collections of Object Representations 525 or portions thereof to limit the number of substantially similar Knowledge Cells 800. If the comparison still provides more than one substantially similar Knowledge Cell 800, Similarity Comparison 125 may further increase the strictness by requiring additional Collections of Object Representations 525 or portions thereof to match or substantially match, thereby further narrowing the number of substantially similar Knowledge Cells 800 until a best substantially similar Knowledge Cell 800 is found.

Some or all of the aforementioned rules, logic, and/or techniques for determining substantial similarity of Knowledge Cells 800 can be utilized alone or in combination with each other or with other rules, logic, and/or techniques. One of ordinary skill in art will recognize that other techniques known in art for determining similarity of Knowledge Cells 800 and/or other data that would be too voluminous to describe are within the scope of this disclosure.

In any of the comparisons involving numbers such as, for example, Object Properties 630 including numbers (i.e. distances, bearings/angles, etc.), Similarity Comparison 125 can compare a number from one Object Property 630 with a number from another Object Property 630. In some aspects, total equivalence is found when the number from one Object Property 630 equals the number from another Object Property 630. In other aspects, if total equality is not found, Similarity Comparison 125 may attempt to determine substantial similarity of the compared numbers using a tolerance or threshold for determining a match. In some aspects, Similarity Comparison 125 can utilize a threshold for acceptable number difference in determining a match of compared numbers. For example, a threshold for acceptable number difference (i.e. absolute difference, etc.) can be set at 10. Therefore, 130 matches or is sufficiently similar to 135 because the number difference (i.e. 5 in this example) is lower than the threshold for acceptable number difference (i.e. 10 in this example, etc.). Furthermore, 130 does not match or is not sufficiently similar to 143 because the number difference (i.e. 13 in this example) is greater than the threshold for acceptable number difference. Any other threshold for acceptable number difference can be used such as 0.024, 1, 8, 15, 77, 197, 2438, 728322, and/or others. In other aspects, Similarity Comparison 125 can utilize a threshold for acceptable percentage difference in determining a match of compared numbers. For example, a threshold for acceptable percentage difference can be set at 10%. Therefore, 100 matches or is sufficiently similar to 106 because the percentage difference (i.e. 6% in this example) is lower than the threshold for acceptable percentage difference (i.e. 10% in this example). Furthermore, 100 does not match or is not sufficiently similar to 84 because the percentage difference (i.e. 16% in this example) is higher than the threshold for acceptable percentage difference. Any other threshold for acceptable percentage difference can be used such as 0.68%, 1%, 3%, 11%, 33%, 69%, 87%, and/or others. The aforementioned thresholds can be defined by a user, by ACAAO system administrator, or automatically by the system based on experience, testing, inquiry, analysis, synthesis, or other techniques, knowledge, or input. Other techniques known in art for comparing numbers can be utilized herein.

In any of the comparisons involving text such as, for example, Object Properties 630 including text (i.e. types, identities, etc.), Similarity Comparison 125 can compare words, characters, and/or other text from one Object Property 630 with words, characters, and/or other text from another Object Property 630. In some aspects, total equivalence is found when all words, characters, and/or other text from one Object Property 630 match all words, characters, and/or other text from another Object Property 630. In other aspects, if total equivalence is not found, Similarity Comparison 125 may attempt to determine substantial similarity of compared Object Properties 630. In one example, substantial similarity can be achieved when most of the words, characters, and/or other text from the compared Object Properties 630 match or substantially match. In another example, substantial similarity can be achieved when at least a threshold number (i.e. 1, 2, 3, 4, 7, 11, etc.) or percentage (i.e. 38%, 63%, 77%, 84%, 98%, etc.) of words, characters, and/or other text from the compared Object Properties 630 match or substantially match. Similarly, substantial similarity can be achieved when the number or percentage of matching or substantially matching words, characters, and/or other text from the compared Object Properties 630 exceeds a threshold number (i.e. 1, 2, 3, 4, 7, 11, etc.) or a threshold percentage (i.e. 48%, 63%, 77%, 84%, 98%, etc.). In a further example, substantial similarity can be achieved when all but a threshold number or percentage of words, characters, and/or other text from the compared Object Properties 630 match or substantially match. Such thresholds can be defined by a user, by ACAAO system administrator, or automatically by the system based on experience, testing, inquiry, analysis, synthesis, and/or other techniques, knowledge, or input. In further aspects, Similarity Comparison 125 can utilize the importance (i.e. as indicated by importance index [later described], etc.) of words, characters, and/or other text for determining substantial similarity of Object Properties 630. For example, substantial similarity can be achieved when matches or substantial matches are found with respect to more important words, characters, and/or other text such as longer words and/or other text, thereby tolerating mismatches in less important words, characters, and/or other text such as shorter words and/or other text. In general, any word, character, and/or other text can be assigned higher or lower importance. In further aspects, Similarity Comparison 125 can utilize the order of words, characters, and/or other text for determining substantial similarity of Object Properties 630. For example, substantial similarity can be achieved when matches or substantial matches are found with respect to front-most words, characters, and/or other text, thereby tolerating mismatches in later words, characters, and/or other text. In further aspects, Similarity Comparison 125 can utilize semantic conversion to account for variations of words and/or other text. In one example, Object Property 630 may include a word "house". In addition to searching for the exact word in a compared Object Property 630, Similarity Comparison 125 can employ semantic conversion and attempt to match "home", "residence", "dwelling", "place", or other semantically similar variations of the word with a meaning "house". In another example, Object Property 630 may include a word "buy". In addition to searching for the exact word in a compared Object Property 630, Similarity Comparison 125 can employ semantic conversion and attempt to match "buying", "bought", or other semantically similar variations of the word with a meaning "buy" in different tenses. Any other grammatical analysis or transformation can be utilized to cover the full scope of word and/or other text variations. In some designs, semantic conversion can be implemented using a thesaurus or dictionary. In another example, semantic conversion can be implemented using a table where each row comprises semantically similar variations of a word and/or other text. In further aspects, Similarity Comparison 125 can utilize a language model for understanding or interpreting the concepts contained in the words and/or other text and compare the concepts instead of or in addition to the words and/or other text. Examples of language models include unigram model, n-gram model, neural network language model, bag of words model, and/or others. Any of the techniques for matching of words can similarly be used for matching of concepts. In further aspects, Similarity Comparison 125 can omit some of the words, characters, and/or other text from the comparison in determining substantial similarity of Object Properties 630. In one example, rear-most words, characters, and/or other text can be omitted from comparison. In another example, shorter words and/or other text can be omitted from comparison. In general, any word, character, and/or other text can be omitted from comparison depending on implementation. Other techniques known in art for comparing words, characters, and/or other text can be utilized herein.

In some embodiments, Similarity Comparison 125 can compare one or more Extra Info 527 (i.e. time information, location information, computed information, visual information, acoustic information, contextual information, and/or other information, etc.) in addition to or instead of comparing Collections of Object Representations 525 or portions thereof in determining substantial similarity of Knowledge Cells 800. Extra Info 527 can be set to be less, equally, or more important (i.e. as indicated by importance index [later described], etc.) than Collections of Object Representations 525, Object Representations 625, Object Properties 630, and/or other elements in the comparison. Since Extra Info 527 may include any contextual or other information that can be useful in determining similarity of any compared elements, Extra Info 527 can be used to enhance any of the aforementioned similarity determinations as applicable.

In some embodiments, Similarity Comparison 125 can also compare one or more Instruction Sets 526 in addition to or instead of comparing Collections of Object Representations 525 or portions thereof in determining substantial similarity of Knowledge Cells 800. In some aspects, Similarity Comparison 125 can compare portions of Instruction Sets 526 to determine substantial or other similarity of Instruction Sets 526. Similar to the above-described thresholds, thresholds for the number or percentage of matching portions of the compared Instruction Sets 526 can be utilized in determining substantial or other similarity of the compared Instruction Sets 526. Such thresholds can be defined by a user, by ACAAO system administrator, or automatically by the system based on experience, testing, inquiry, analysis, synthesis, and/or other techniques, knowledge, or input. In other aspects, Similarity Comparison 125 can compare text (i.e. characters, words, phrases, etc.), numbers, or other data (i.e. bits, etc.) to determine substantial or other similarity of Instruction Sets 526. Any other comparison technique can be utilized in comparing Instruction Sets 526 in alternate implementations. Instruction Sets 526 can be set to be less, equally, or more important (i.e. as indicated by importance index [later described], etc.) than Collections of Object Representations 525, Object Representations 625, Object Properties 630, Extra Info 527, and/or other elements in the comparison.

In some embodiments, an importance index (not shown) or other importance ranking technique can be used in any of the previously described comparisons or other processing involving elements of different importance. Importance index indicates importance of the element to or with which the index is assigned or associated. For example, importance index may indicate importance of a Knowledge Cell 800, Collection of Object Representations 525, Object Representation 625, Object Property 630, Instruction Set 526, Extra Info 527, and/or other element to or with which the index is assigned or associated. In some aspects, importance index on a scale from 0 to 1 can be utilized, although, any other range can also be utilized. Importance index can be stored in or associated with the element to which the index pertains. Importance indexes of various elements can be defined by a user, by ACAAO system administrator, or automatically by the system based on experience, testing, inquiry, analysis, synthesis, or other techniques, knowledge, or input. In one example, a higher Importance index can be assigned to more substantive or larger Collections of Object Representations 525 (i.e. Collections of Object Representations 525 comprising a higher number of Object Representations 625, etc.). In another example, a higher importance index can be assigned to Object Representations 625 representing closer, larger, and/or other Objects 615. Any importance index can be assigned to or associated with any element described herein depending on implementation. Any importance ranking technique can be utilized as or instead of importance index in alternate embodiments.

In some embodiments, Similarity Comparison 125 may generate a similarity index (not shown) for any of the compared elements. Similarity index indicates how well an element is matched with another element. For example, similarity index indicates how well a Knowledge Cell 800, Collection of Object Representations 525, Object Representation 625, Object Property 630, Instruction Set 526, Extra Info 527, and/or other element is matched with a compared element. In some aspects, similarity index on a scale from 0 to 1 can be utilized, although, any other range can also be utilized. Similarity index can be generated by Similarity Comparison 125 whether substantial or other similarity between the compared elements is achieved or not. In one example, similarity index can be determined for a Knowledge Cell 800 based on a ratio/percentage of matched or substantially matched Collections of Object Representations 525 relative to the number of Collections of Object Representations 525 in the compared Knowledge Cell 800. Specifically, similarity index of 0.89 is determined if 89% of Collections of Object Representations 525 of one Knowledge Cell 800 match or substantially match Collections of Object Representations 525 of another Knowledge Cell 800. In some designs, importance (i.e. as indicated by importance index, etc.) of one or more Collections of Object Representations 525 can be included in the calculation of a weighted similarity index. Similar determination of similarity index can be implemented with Collections of Object Representations 525, Object Representations 625, Object Properties 630, Instruction Sets 526, Extra Info 527, and/or other elements or portions thereof. Any combination of the aforementioned similarity index determinations or calculations can be utilized in alternate embodiments. Any similarity ranking technique can be utilized to determine or calculate similarity index in alternate embodiments.

Figure 20:
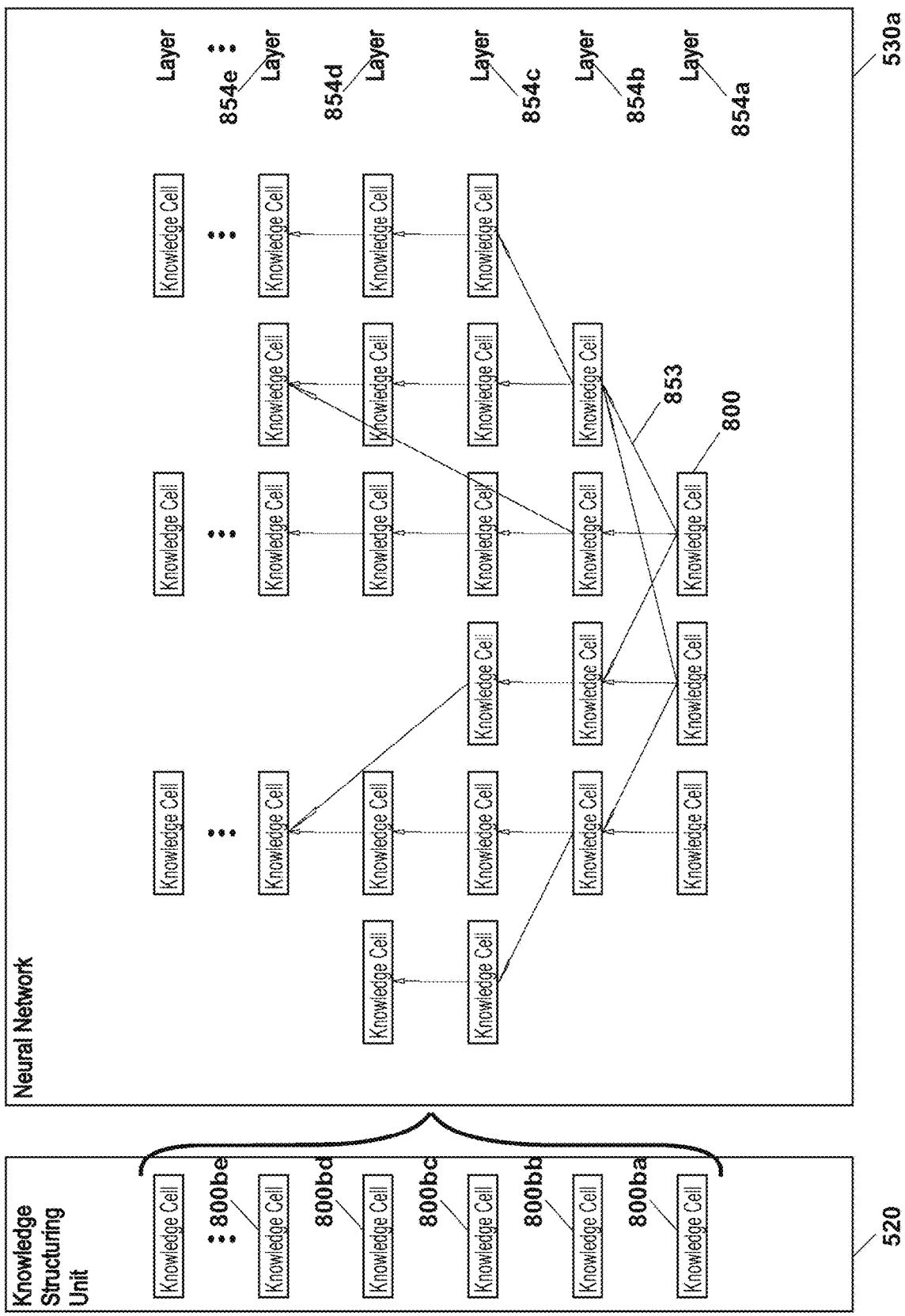
FIG. 20 illustrates an embodiment of learning Knowledge Cells 800 comprising one or more Collections of Object Representations 525 correlated with any Instruction Sets 526 and/or Extra Info 527 using Neural Network 530*a* comprising shortcut Connections 853.

Referring to FIG. 20, an embodiment of learning Knowledge Cells 800 comprising one or more Collections of Object Representations 525 correlated with any Instruction Sets 526 and/or Extra Info 527 using Neural Network 530a comprising shortcut Connections 853 is illustrated. In some designs, Knowledge Cells 800 in one Layer 854 of Neural Network 530a can be connected with Knowledge Cells 800 in any Layer 854, not only in a successive Layer 854, thereby creating shortcuts (i.e. shortcut Connections 853, etc.) through Neural Network 530a. In some aspects, creating a shortcut Connection 853 can be implemented by performing Similarity Comparisons 125 of a Knowledge Cell 800 from Knowledge Structuring Unit 520 with Knowledge Cells 800 in any Layer 854 when applying (i.e. storing, copying, etc.) the Knowledge Cell 800 from Knowledge Structuring Unit 520 onto Neural Network 530a. Once created, shortcut Connections 853 enable a wider variety of Knowledge Cells 800 to be considered when selecting a path through Neural Network 530a. In some embodiments, Knowledge Structuring Unit 520 structures or generates Knowledge Cells 800 and the system applies them onto Neural Network 530a, thereby implementing learning Avatar's 605 operation in circumstances including objects with various properties. The system can perform Similarity Comparisons 125 of a Knowledge Cell 800 from Knowledge Structuring Unit 520 with Knowledge Cells 800 in one or more Layers 854 of Neural Network 530a. If a substantially similar Knowledge Cell 800 is not found in the one or more Layers 854 of Neural Network 530a, the system may insert (i.e. copy, store, etc.) the Knowledge Cell 800 from Knowledge Structuring Unit 520 into a Layer 854 of Neural Network 530a, and create a Connection 853 to the inserted Knowledge Cell 800 from a prior Knowledge Cell 800 including assigning an occurrence count to the new Connection 853, calculating a weight of the new Connection 853, and updating any other Connections 853 originating from the prior Knowledge Cell 800. On the other hand, if a substantially similar Knowledge Cell 800 is found in the one or more Layers 854 of Neural Network 530a, the system may update occurrence count and weight of Connection 853 to that Knowledge Cell 800 from a prior Knowledge Cell 800, and update any other Connections 853 originating from the prior Knowledge Cell 800. Any of the previously described and/or other techniques for comparing, inserting, updating, and/or other operations on Knowledge Cells 800, Connections 853, Layers 854, and/or other elements can similarly be utilized in Neural Network 530a that comprises shortcut Connections 853.

Figure 21:
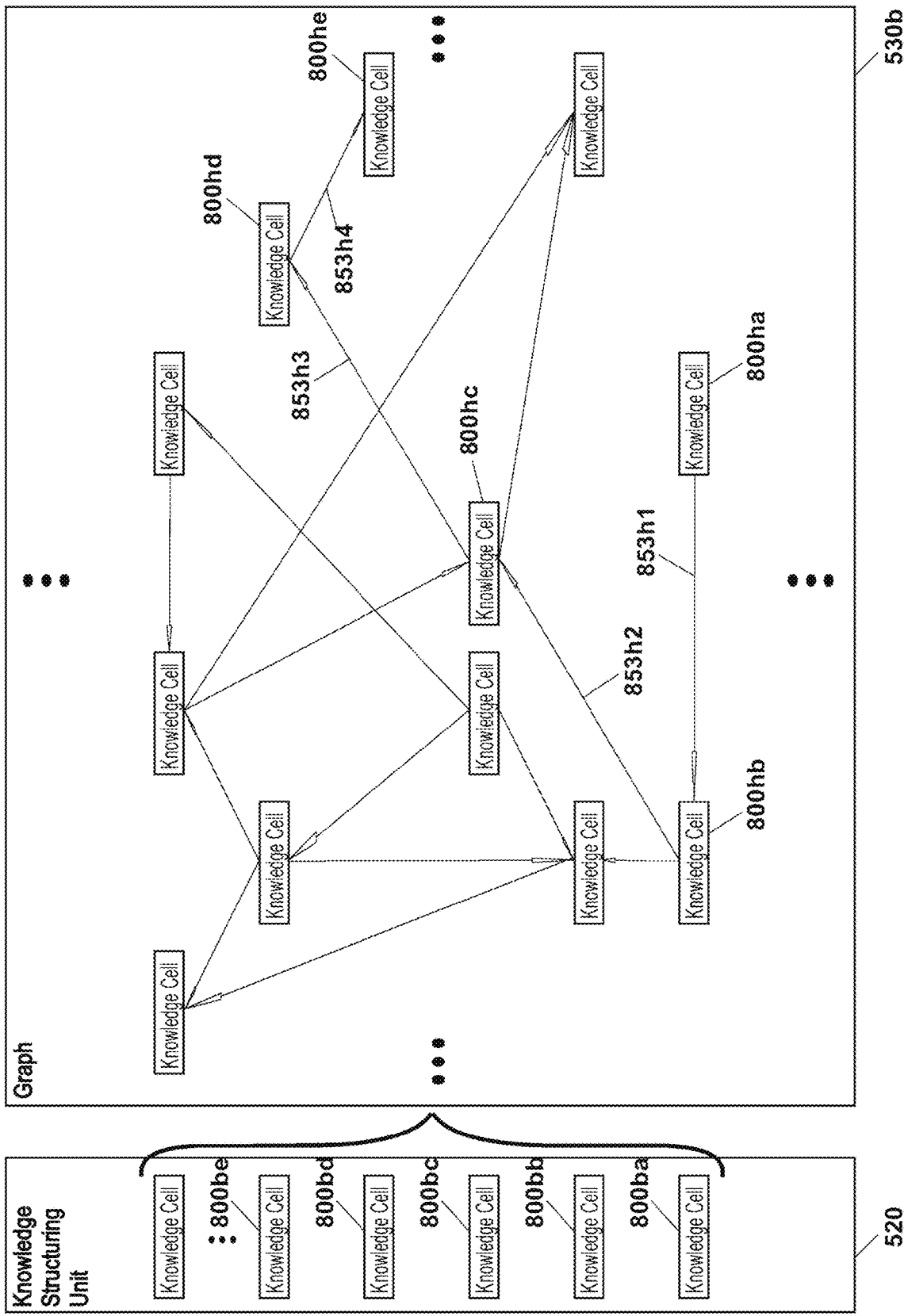
FIG. 21 illustrates an embodiment of learning Knowledge Cells 800 comprising one or more Collections of Object Representations 525 correlated with any Instruction Sets 526 and/or Extra Info 527 using Graph 530*b*.

Referring to FIG. 21, an embodiment of learning Knowledge Cells 800 comprising one or more Collections of Object Representations 525 correlated with any Instruction Sets 526 and/or Extra Info 527 using Graph 530b is illustrated. In some aspects, any Knowledge Cell 800 can be connected with any other Knowledge Cell 800 in Graph 530b. In other aspects, any Knowledge Cell 800 can be connected with itself and/or any other Knowledge Cell 800 in Graph 530b. In some embodiments, Knowledge Structuring Unit 520 structures or generates Knowledge Cells 800 and the system applies (i.e. store, copy, etc.) them onto Graph 530b, thereby implementing learning Avatar's 605 operation in circumstances including objects with various properties. The system can perform Similarity Comparisons 125 of a Knowledge Cell 800 from Knowledge Structuring Unit 520 with Knowledge Cells 800 in Graph 530b. If a substantially similar Knowledge Cell 800 is not found in Graph 530b, the system may insert (i.e. copy, store, etc.) the Knowledge Cell 800 from Knowledge Structuring Unit 520 into Graph 530b, and create a Connection 853 to the inserted Knowledge Cell 800 from a prior Knowledge Cell 800 including assigning an occurrence count to the new Connection 853, calculating a weight of the new Connection 853, and updating any other Connections 853 originating from the prior Knowledge Cell 800. On the other hand, if a substantially similar Knowledge Cell 800 is found in Graph 530b, the system may update occurrence count and weight of Connection 853 to that Knowledge Cell 800 from a prior Knowledge Cell 800, and update any other Connections 853 originating from the prior Knowledge Cell 800. Any of the previously described and/or other techniques for comparing, inserting, updating, and/or other operations on Knowledge Cells 800, Connections 853, and/or other elements can similarly be utilized in Graph 530b.

For example, the system can perform Similarity Comparisons 125 of Knowledge Cell 800ba from Knowledge Structuring Unit 520 with Knowledge Cells 800 in Graph 530b. In the case that a substantially similar match is not found, the system may insert Knowledge Cell 800*ha* into Graph 530*b* and copy Knowledge Cell 800*ba* into the inserted Knowledge Cell 800*ha*. The system can then perform Similarity Comparisons 125 of Knowledge Cell 800*bb* from Knowledge Structuring Unit 520 with Knowledge Cells 800 in Graph 530*b*. In the case that a substantially similar match is found between Knowledge Cell 800*bb* and Knowledge Cell 800*hb*, the system may create Connection 853*h*1 between Knowledge Cell 800*ha* and Knowledge Cell 800*hb* with occurrence count of 1 and weight of 1. The system can then perform Similarity Comparisons 125 of Knowledge Cell 800*bc* from Knowledge Structuring Unit 520 with Knowledge Cells 800 in Graph 530*b*. In the case that a substantially similar match is found between Knowledge Cell 800*bc* and Knowledge Cell 800*hc*, the system may update occurrence count and weight of Connection 853*h*2 between Knowledge Cell 800*hb* and Knowledge Cell 800*hc*, and update weights of other outgoing Connections 853 (one in this example) originating from Knowledge Cell 800*hb* as previously described. The system can then perform Similarity Comparisons 125 of Knowledge Cell 800*bd* from Knowledge Structuring Unit 520 with Knowledge Cells 800 in Graph 530*b*. In the case that a substantially similar match is not found, the system may insert Knowledge Cell 800*hd* into Graph 530*b* and copy Knowledge Cell 800*bd* into the inserted Knowledge Cell 800*hd*. The system may also create Connection 853*h*3 between Knowledge Cell 800*hc* and Knowledge Cell 800*hd* with occurrence count of 1 and weight calculated based on the occurrence count as previously described. The system may also update weights of other outgoing Connections 853 (one in this example) originating from Knowledge Cell 800*hc* as previously described. The system can then perform Similarity Comparisons 125 of Knowledge Cell 800*be* from Knowledge Structuring Unit 520 with Knowledge Cells 800 in Graph 530*b*. In the case that a substantially similar match is not found, the system may insert Knowledge Cell 800*he* into Graph 530*b* and copy Knowledge Cell 800*be* into the inserted Knowledge Cell 800*he*. The system may also create Connection 853*h*4 between Knowledge Cell 800*hd* and Knowledge Cell 800*he* with occurrence count of 1 and weight of 1. Applying any additional Knowledge Cells 800 from Knowledge Structuring Unit 520 onto Graph 530*b* follows similar logic or process as the above-described.

Figure 22:
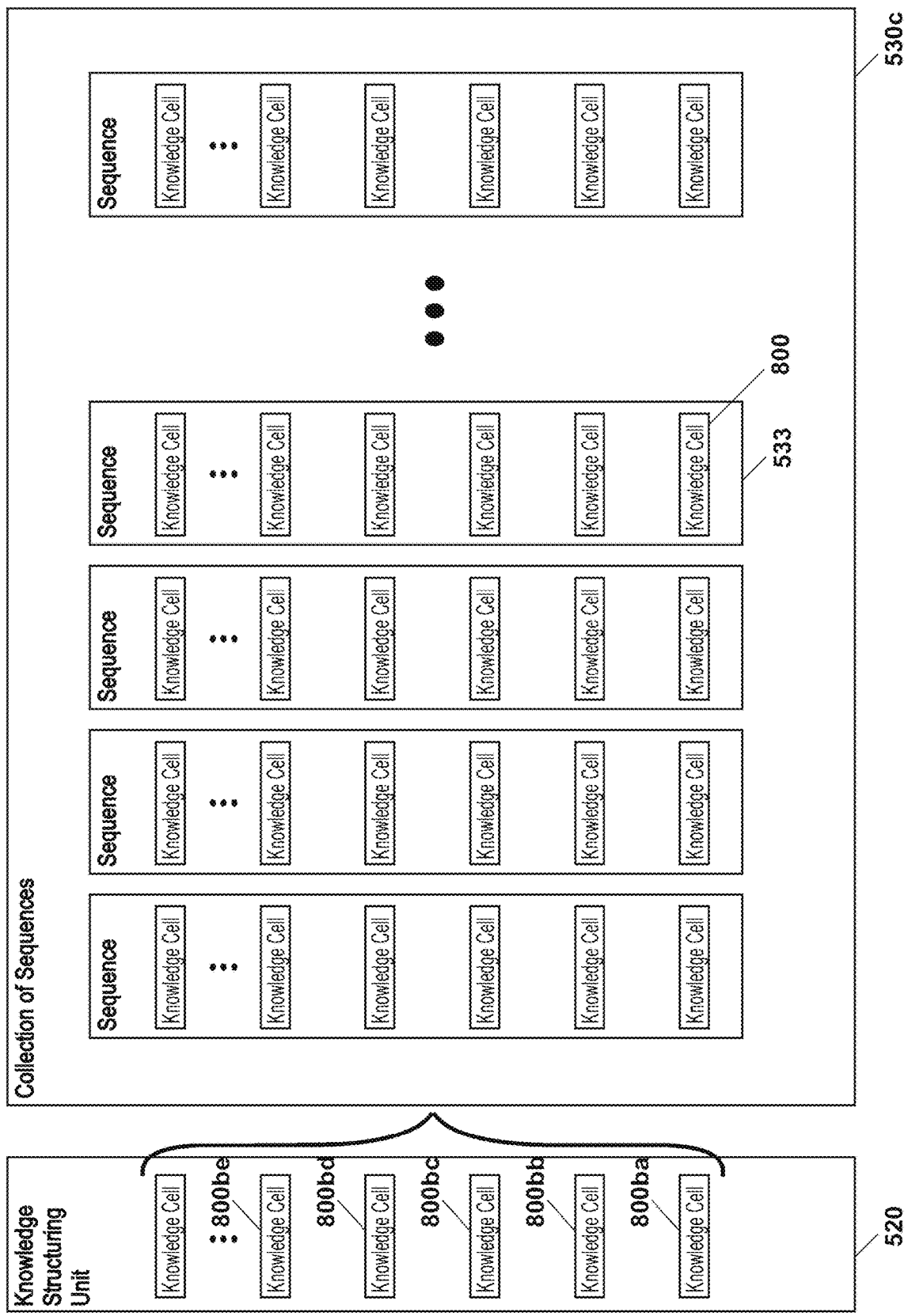
FIG. 22 illustrates an embodiment of learning Knowledge Cells 800 comprising one or more Collections of Object Representations 525 correlated with any Instruction Sets 526 and/or Extra Info 527 using Collection of Sequences 530*c*.

Referring to FIG. 22, an embodiment of learning Knowledge Cells 800 comprising one or more Collections of Object Representations 525 correlated with any Instruction Sets 526 and/or Extra Info 527 using Collection of Sequences 530*c* is illustrated. Collection of Sequences 530*c* comprises the functionality for storing one or more Sequences 533. Sequence 533 comprises the functionality for storing any number of Knowledge Cells 800. For example, Knowledge Structuring Unit 520 structures or generates Knowledge Cells 800 and the system applies them onto Collection of Sequences 530*c*, thereby implementing learning Avatar's 605 operation in circumstances including objects with various properties. The system can perform collective Similarity Comparisons 125 of Knowledge Cells 800 from Knowledge Structuring Unit 520 with Knowledge Cells 800 in Sequences 533 of Collection of Sequences 530*c* to find a Sequence 533 comprising Knowledge Cells 800 that are collectively substantially similar to the Knowledge Cells 800 from Knowledge Structuring Unit 520. If Sequence 533 comprising such collectively substantially similar Knowledge Cells 800 is not found in Collection of Sequences 530*c*, the system may create a new Sequence 533 comprising the Knowledge Cells 800 from Knowledge Structuring Unit 520 and insert (i.e. copy, store, etc.) the new Sequence 533 into Collection of Sequences 530*c*. On the other hand, if Sequence 533 comprising collectively substantially similar Knowledge Cells 800 is found in Collection of Sequences 530*c*, the system may optionally omit inserting the Knowledge Cells 800 from Knowledge Structuring Unit 520 into Collection of Sequences 530*c* as inserting a similar Sequence 533 may not add much or any additional knowledge. This approach can save storage resources and limit the number of Knowledge Cells 800 that may later need to be processed or compared. In some aspects, a Sequence 533 may include Knowledge Cells 800 relating to a single operation of Avatar 605. In other aspects, a Sequence 533 may include Knowledge Cells 800 relating to a part of an operation of Avatar 605. In further aspects, one or more long Sequences 533 each including Knowledge Cells 800 of multiple operations of Avatar 605 can be utilized. In one example, Knowledge Cells 800 of all operations can be stored in a single long Sequence 533 in which case Collection of Sequences 530*c* as a separate element can be omitted. In another example, Knowledge Cells 800 of multiple operations can be included in a plurality of long Sequences 533 such as hourly, daily, weekly, monthly, yearly, or other periodic or other Sequences 533. Similarity Comparisons 125 can be performed by traversing the one or more long Sequences 533 to find a match or substantially similar match. For instance, the system can perform collective Similarity Comparisons 125 of Knowledge Cells 800 from Knowledge Structuring Unit 520 with Knowledge Cells 800 in subsequences of a long Sequence 533 in incremental or other traversing pattern to find a subsequence comprising Knowledge Cells 800 that are collectively substantially similar to the Knowledge Cells 800 from Knowledge Structuring Unit 520. The incremental traversing pattern may start from one end of a long Sequence 533 and move the comparison subsequence up or down one or any number of incremental Knowledge Cells 800 at a time. Other traversing patterns or methods can be employed such as starting from the middle of the Sequence 533 and subdividing the resulting sub-sequences in a recursive pattern, or any other traversing pattern or method. If a subsequence comprising collectively substantially similar Knowledge Cells 800 is not found in the long Sequence 533, the system may concatenate or append the Knowledge Cells 800 from Knowledge Structuring Unit 520 to the long Sequence 533. In further aspects, Connections 853 can optionally be used in Sequence 533 to connect Knowledge Cells 800. For example, a Knowledge Cell 800 can be connected not only with a next Knowledge Cell 800 in the Sequence 533, but also with any other Knowledge Cell 800 in the Sequence 533, thereby creating alternate routes or shortcuts through the Sequence 533. Any number of Connections 853 connecting any Knowledge Cells 800 can be utilized. Any of the previously described and/or other techniques for comparing, inserting, updating, and/or other operations on Knowledge Cells 800, Connections 853, and/or other elements can similarly be utilized in Sequences 533 and/or Collection of Sequences 530*c*.

In some embodiments, various elements and/or techniques can be utilized in the aforementioned substantial similarity determinations with respect to collectively compared Knowledge Cells 800 and/or other elements. In some aspects, substantial similarity of collectively compared Knowledge Cells 800 can be determined based on similarities or similarity indexes of the individually compared Knowledge Cells 800. In one example, an average of similarities or similarity indexes of individually compared Knowledge Cells 800 can be used to determine similarity of collectively compared Knowledge Cells 800. In another example, a weighted average of similarities or similarity indexes of individually compared Knowledge Cells 800 can be used to determine similarity of collectively compared Knowledge Cells 800. For instance, to affect the weighting of collective similarity, a higher weight or importance (i.e. importance index, etc.) can be assigned to the similarities or similarity indexes of some Knowledge Cells 800 and lower for other Knowledge Cells 800. Any higher or lower weight or importance assignment can be implemented. In other aspects, any of the previously described or other thresholds for substantial similarity of individually compared elements can similarly be utilized for collectively compared elements. In one example, substantial similarity of collectively compared Knowledge Cells 800 can be achieved when their collective similarity or similarity index exceeds a similarity threshold. In another example, substantial similarity of collectively compared Knowledge Cells 800 can be achieved when at least a threshold number or percentage of Knowledge Cells 800 from the collectively compared Knowledge Cells 800 match or substantially match. Similarly, substantial similarity of collectively compared Knowledge Cells 800 can be achieved when a number or percentage of matching or substantially matching Knowledge Cells 800 from the collectively compared Knowledge Cells 800 exceeds a threshold. Such thresholds can be defined by a user, by ACAAO system administrator, or automatically by the system based on experience, testing, inquiry, analysis, synthesis, or other techniques, knowledge, or input. Similar elements and/or techniques as the aforementioned can be used for similarity determinations of other collectively compared elements such as Collections of Object Representations 525, Object Representations 625, Object Properties 630, Instruction Sets 526, Extra Info 527, and/or others. Similarity determinations of collectively compared elements may include any features, functionalities, and embodiments of Similarity Comparison 125, and vice versa.

Any of the previously described data structures or arrangements of Knowledge Cells 800 such as Neural Network 530a, Graph 530b, Collection of Sequences 530c, Sequence 533, Collection of Knowledge Cells 530d, and/or others can be used alone, or in combination with each other or with other elements, in alternate embodiments. In one example, a path in Neural Network 530a or Graph 530b may include its own separate sequence of Knowledge Cells 800 that are not interconnected with Knowledge Cells 800 in other paths. In another example, a part of a path in Neural Network 530a or Graph 530b may include a sequence of Knowledge Cells 800 interconnected with Knowledge Cells 800 in other paths, whereas, another part of the path may include its own separate sequence of Knowledge Cells 800 that are not interconnected with Knowledge Cells 800 in other paths. Any other combinations or arrangements of Knowledge Cells 800 can be implemented.

Figure 23:
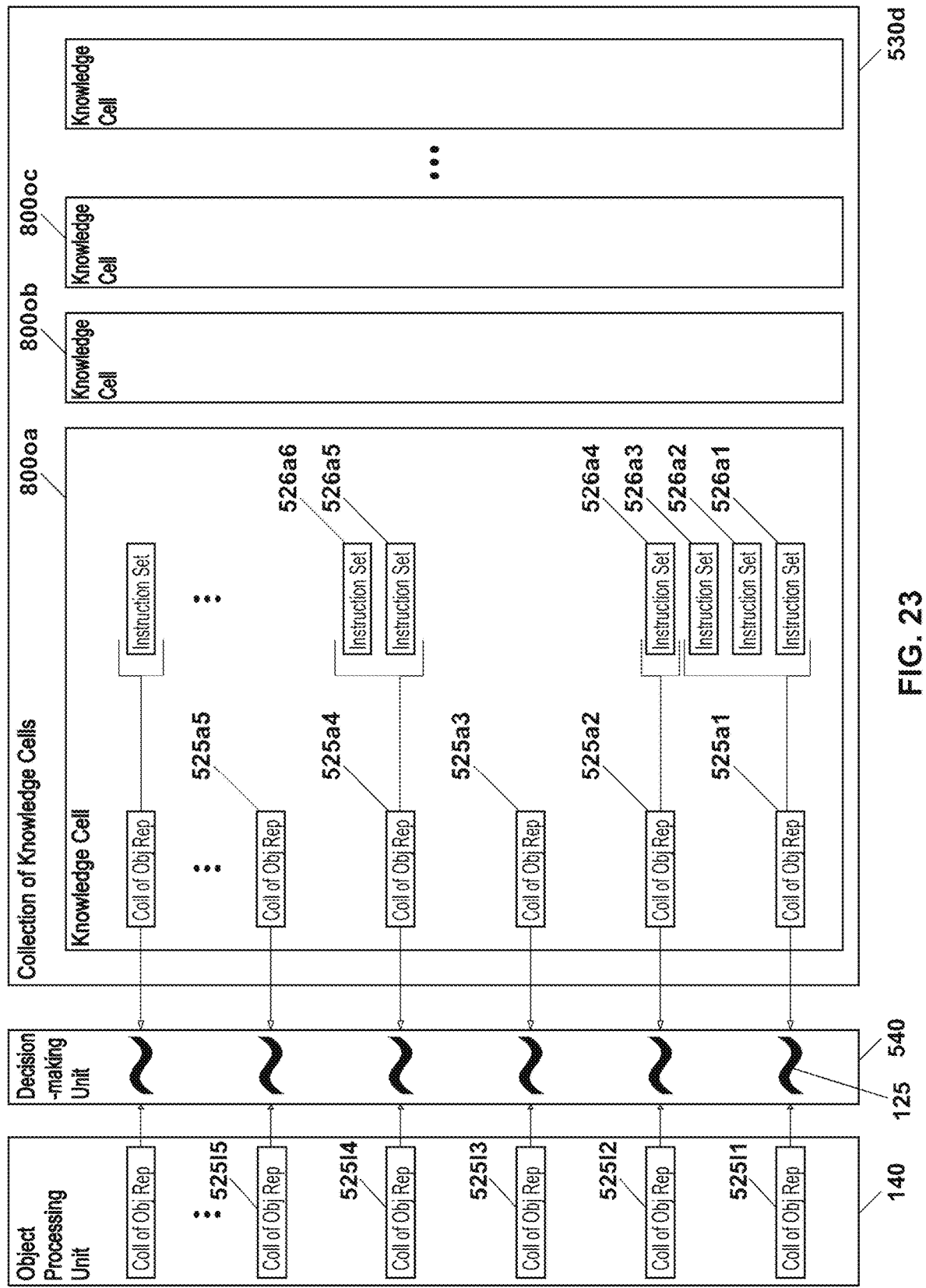
FIG. 23 illustrates an embodiment of determining anticipatory Instruction Sets 526 from a single Knowledge Cell 800.

Referring to FIG. 23, an embodiment of determining anticipatory Instruction Sets 526 from a single Knowledge Cell 800 is illustrated. Knowledge Cell 800 may be part of a Knowledgebase 530 (i.e. Neural Network 530a, Graph 530b, Collection of Sequences 530c, Sequence 533, Collection of Knowledge Cells 530d, etc.) such as Collection of Knowledge Cells 530d. Decision-making Unit 540 comprises the functionality for anticipating or determining Avatar's 605 operation in circumstances including objects with various properties. Decision-making Unit 540 comprises the functionality for anticipating or determining Instruction Sets 526 to be used or executed in Avatar's 605 autonomous operation. In some aspects, Instruction Sets 526 anticipated or determined to be used or executed in Avatar's 605 autonomous operation may be referred to as anticipatory Instruction Sets 526, alternate Instruction Sets 526, and/or other suitable name or reference. Therefore, these terms can be used interchangeably herein depending on context. Decision-making Unit 540 also comprises other disclosed functionalities.

In some aspects, Decision-making Unit 540 may anticipate or determine Instruction Sets 526 (i.e. anticipatory Instruction Sets 526, etc.) for autonomous Avatar 605 operation by performing Similarity Comparisons 125 of incoming Collections of Object Representations 525 or portions thereof from Object Processing Unit 140 with Collections of Object Representations 525 or portions thereof from Knowledge Cells 800 in Knowledgebase 530 (i.e. Neural Network 530a, Graph 530b, Collection of Sequences 530c, Sequence 533, Collection of Knowledge Cells 530d, etc.). A Knowledge Cell 800 includes knowledge (i.e. one or more Collections of Object Representations 525 correlated with any Instruction Sets 526 and/or Extra Info 527, etc.) of how Avatar 605 operated in a circumstance including objects with various properties as previously described. When one or more Collections of Object Representations 525 representing objects with similar properties are received in the future, Decision-making Unit 540 can anticipate the Instruction Sets 526 (i.e. anticipatory Instruction Sets 526, etc.) previously learned in a similar circumstance, thereby enabling autonomous Avatar 605 operation. In some aspects, Decision-making Unit 540 can perform Similarity Comparisons 125 of incoming Collections of Object Representations 525 from Object Processing Unit 140 with Collections of Object Representations 525 from Knowledge Cells 800 in Knowledgebase 530 (i.e. Neural Network 530a, Graph 530b, Collection of Sequences 530c, Sequence 533, Collection of Knowledge Cells 530d, etc.). If one or more substantially similar Collections of Object Representations 525 or portions thereof are found in a Knowledge Cell 800 from Knowledgebase 530, Instruction Sets 526 (i.e. anticipatory Instruction Sets 526, etc.) for autonomous Avatar 605 operation can be anticipated in Instruction Sets 526 correlated with the one or more Collections of Object Representations 525 from the Knowledge Cell 800. In some designs, subsequent one or more Instruction Sets 526 for autonomous Avatar 605 operation can be anticipated in Instruction Sets 526 correlated with subsequent Collections of Object Representations 525 from the Knowledge Cell 800 or other Knowledge Cells 800, thereby anticipating not only current, but also additional future Instruction Sets 526. Although, Extra Info 527 is not shown in this and/or other figures for clarity of illustration, it should be noted that any Collection of Object Representations 525, Instruction Set 526, and/or other element may include or be associated with Extra Info 527 and that Decision-making Unit 540 can utilize Extra Info 527 for enhanced decision making.

For example, Decision-making Unit 540 can perform Similarity Comparison 125 of Collection of Object Representations 525l1 or portions thereof from Object Processing Unit 140 with Collection of Object Representations 525a1 or portions thereof from Knowledge Cell 800oa. Collection of Object Representations 525a1 or portions thereof from Knowledge Cell 800oa may be found substantially similar. Decision-making Unit 540 can anticipate Instruction Sets 526a1-526a3 correlated with Collection of Object Representations 525a1, thereby enabling autonomous Avatar 605 operation. Decision-making Unit 540 can then perform Similarity Comparison 125 of Collection of Object Representations 52512 or portions thereof from Object Processing Unit 140 with Collection of Object Representations 525a2 or portions thereof from Knowledge Cell 800oa. Collection of Object Representations 525a2 or portions thereof from Knowledge Cell 800oa may be found substantially similar. Decision-making Unit 540 can anticipate Instruction Set 526a4 correlated with Collection of Object Representations 525a2, thereby enabling autonomous Avatar 605 operation. Decision-making Unit 540 can then perform Similarity Comparison 125 of Collection of Object Representations 52513 or portions thereof from Object Processing Unit 140 with Collection of Object Representations 525a3 or portions thereof from Knowledge Cell 800oa. Collection of Object Representations 525a3 or portions thereof from Knowledge Cell 800oa may be found substantially similar. Decision-making Unit 540 may not anticipate any Instruction Sets 526 since none are correlated with Collection of Object Representations 525a3. Decision-making Unit 540 can then perform Similarity Comparison 125 of Collection of Object Representations 52514 or portions thereof from Object Processing Unit 140 with Collection of Object Representations 525a4 or portions thereof from Knowledge Cell 800oa. Collection of Object Representations 525a4 or portions thereof from Knowledge Cell 800oa may not be found substantially similar. Decision-making Unit 540 can then perform Similarity Comparison 125 of Collection of Object Representations 52515 or portions thereof from Object Processing Unit 140 with Collection of Object Representations 525a5 or portions thereof from Knowledge Cell 800oa. Collection of Object Representations 525a5 or portions thereof from Knowledge Cell 800oa may not be found substantially similar. Decision-making Unit 540 can implement similar logic or process for any additional Collections of Object Representations 525 from Object Processing Unit 140, and so on.

It should be understood that any of the described elements and/or techniques in the foregoing example can be omitted, used in a different combination, or used in combination with other elements and/or techniques, in which case the selection of Knowledge Cells 800 or elements (i.e. Collections of Object Representations 525, Instruction Sets 526, etc.) thereof would be affected accordingly. In one example, Extra Info 527 can be included in the Similarity Comparisons 125 as previously described. In another example, as history of incoming Collections of Object Representations 525 becomes available, Decision-making Unit 540 can perform collective Similarity Comparisons 125 of the history of Collections of Object Representations 525 or portions thereof from Object Processing Unit 140 with subsequences of Collections of Object Representations 525 or portions thereof from Knowledge Cell 800. In a further example, the described comparisons in a single Knowledge Cell 800 may be performed on any number of Knowledge Cells 800 sequentially or in parallel. Parallel processors such as a plurality of Processors 11 or cores thereof can be utilized for such parallel processing. In a further example, various arrangements of Collections of Object Representations 525 and/or other elements in a Knowledge Cell 800 can be utilized as previously described. One of ordinary skill in art will understand that the foregoing exemplary embodiment is described merely as an example of a variety of possible implementations, and that while all of its variations are too voluminous to describe, they are within the scope of this disclosure.

Figure 24:
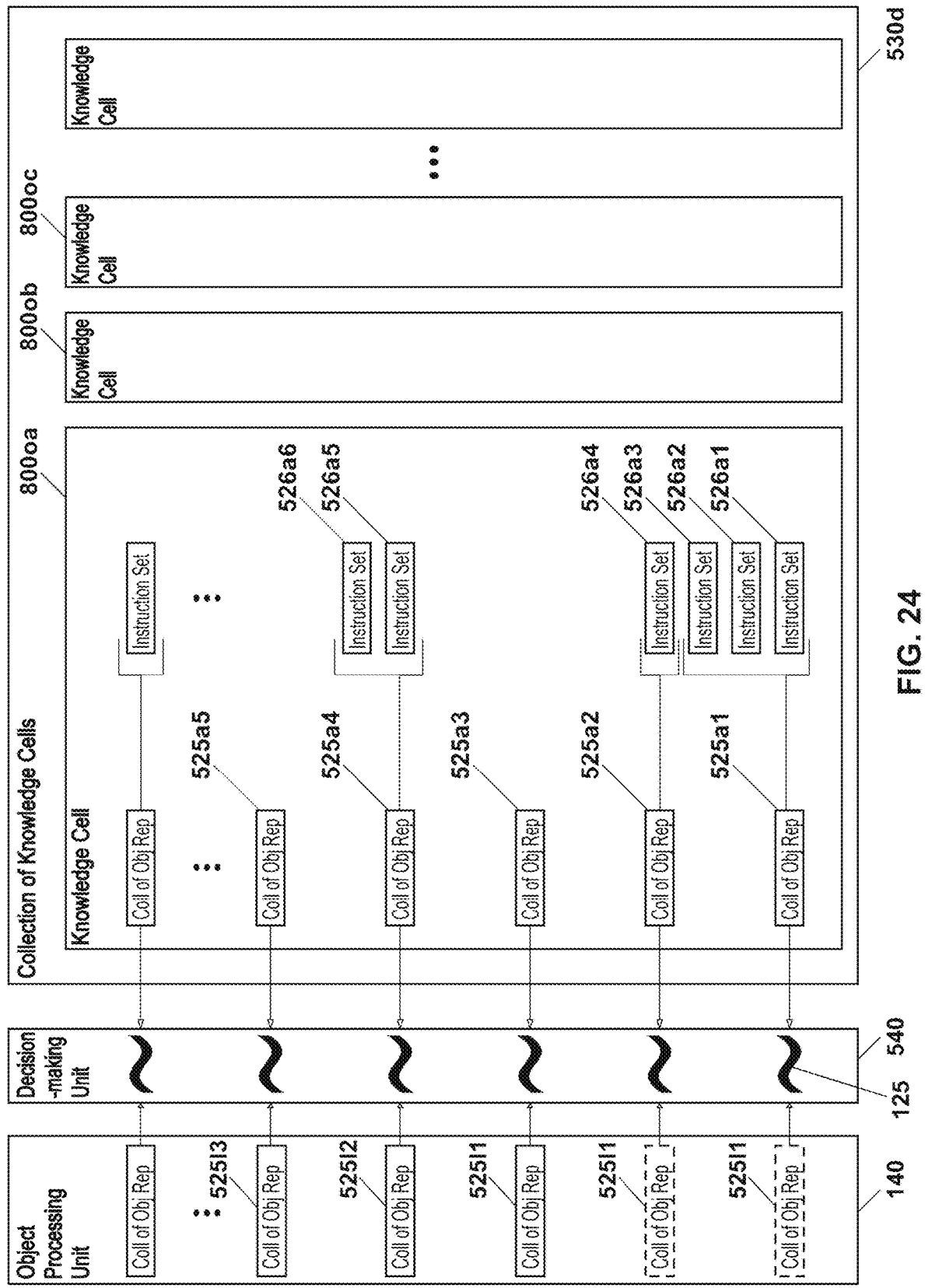
FIG. 24 illustrates an embodiment of determining anticipatory Instruction Sets 526 by traversing a single Knowledge Cell 800.

Referring to FIG. 24, an embodiment of determining anticipatory Instruction Sets 526 by traversing a single Knowledge Cell 800 is illustrated. Knowledge Cell 800 may be part of a Knowledgebase 530 (i.e. Neural Network 530a, Graph 530b, Collection of Sequences 530c, Sequence 533, Collection of Knowledge Cells 530d, etc.) such as Collection of Knowledge Cells 530d. For example, Decision-making Unit 540 can perform Similarity Comparison 125 of Collection of Object Representations 525l1 or portions thereof from Object Processing Unit 140 with Collection of Object Representations 525a1 or portions thereof from Knowledge Cell 800oa. Collection of Object Representations 525a1 or portions thereof from Knowledge Cell 800oa may not be found substantially similar. Decision-making Unit 540 can then perform Similarity Comparison 125 of Collection of Object Representations 525l1 or portions thereof from Object Processing Unit 140 with Collection of Object Representations 525a2 or portions thereof from Knowledge Cell 800oa. Collection of Object Representations 525a2 or portions thereof from Knowledge Cell 800oa may not be found substantially similar. Decision-making Unit 540 can then perform Similarity Comparison 125 of Collection of Object Representations 525l1 or portions thereof from Object Processing Unit 140 with Collection of Object Representations 525a3 or portions thereof from Knowledge Cell 800oa. Collection of Object Representations 525a3 or portions thereof from Knowledge Cell 800oa may be found substantially similar. Decision-making Unit 540 may not anticipate any Instruction Sets 526 since none are correlated with Collection of Object Representations 525a3. Decision-making Unit 540 can then perform Similarity Comparison 125 of Collection of Object Representations 52512 or portions thereof from Object Processing Unit 140 with Collection of Object Representations 525a4 or portions thereof from Knowledge Cell 800oa. Collection of Object Representations 525a4 or portions thereof from Knowledge Cell 800oa may be found substantially similar. Decision-making Unit 540 can anticipate Instruction Sets 526a5-526a6 correlated with Collection of Object Representations 525a4, thereby enabling autonomous Avatar 605 operation. Decision-making Unit 540 can then perform Similarity Comparison 125 of Collection of Object Representations 52513 or portions thereof from Object Processing Unit 140 with Collection of Object Representations 525a5 or portions thereof from Knowledge Cell 800oa. Collection of Object Representations 525a5 or portions thereof from Knowledge Cell 800oa may be found substantially similar. Decision-making Unit 540 may not anticipate any Instruction Sets 526 since none are correlated with Collection of Object Representations 525a5. Decision-making Unit 540 can implement similar logic or process for any additional Collections of Object Representations 525 from Object Processing Unit 140, and so on.

It should be understood that any of the described elements and/or techniques in the foregoing example can be omitted, used in a different combination, or used in combination with other elements and/or techniques, in which case the selection of Knowledge Cells 800 or elements (i.e. Collections of Object Representations 525, Instruction Sets 526, etc.) thereof would be affected accordingly. In one example, Extra Info 527 can be included in the Similarity Comparisons 125 as previously described. In another example, as history of incoming Collections of Object Representations 525 becomes available, Decision-making Unit 540 can perform collective Similarity Comparisons 125 of the history of Collections of Object Representations 525 or portions thereof from Object Processing Unit 140 with subsequences of Collections of Object Representations 525 or portions thereof from Knowledge Cell 800. In a further example, traversing may be performed in incremental traversing pattern such as starting from one end of Knowledge Cell 800 and moving the comparison subsequence up or down the list one or any number of incremental Collections of Object Representations 525 at a time. Other traversing patterns or methods can be employed such as starting from the middle of the Knowledge Cell 800 and subdividing the resulting subsequence in a recursive pattern, or any other traversing pattern or method. In a further example, the described traversing of a single Knowledge Cell 800 may be performed on any number of Knowledge Cells 800 sequentially or in parallel. Parallel processors such as a plurality of Processors 11 or cores thereof can be utilized for such parallel processing. In a further example, various arrangements of Collections of Object Representations 525 and/or other elements in a Knowledge Cell 800 can be utilized as previously described. One of ordinary skill in art will understand that the foregoing exemplary embodiment is described merely as an example of a variety of possible implementations, and that while all of its variations are too voluminous to describe, they are within the scope of this disclosure.

Figure 25:
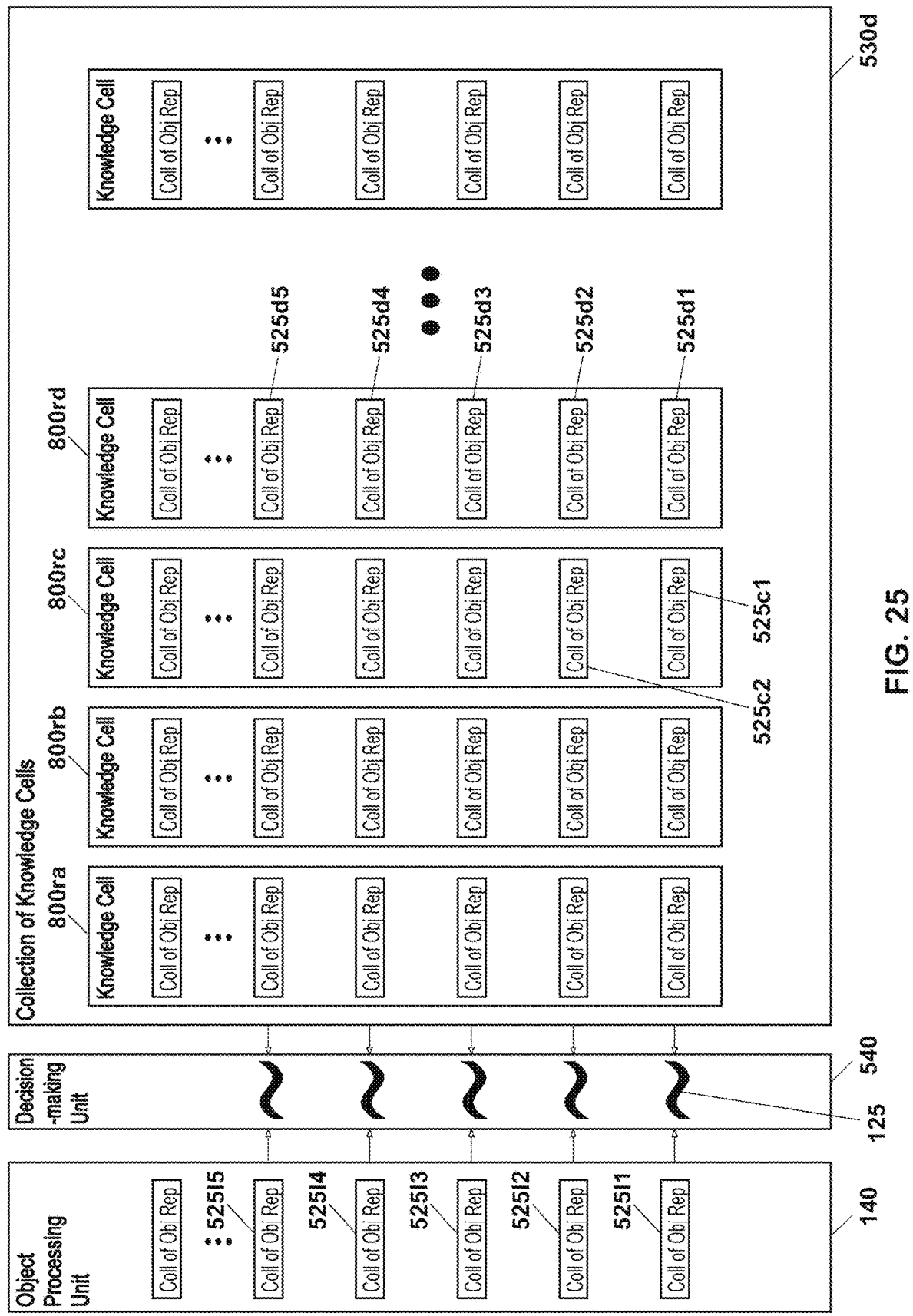
FIG. 25 illustrates an embodiment of determining anticipatory Instruction Sets 526 using collective similarity comparisons.

Referring to FIG. 25, an embodiment of determining anticipatory Instruction Sets 526 using collective similarity comparisons is illustrated. For example, Decision-making Unit 540 can perform Similarity Comparisons 125 of Collection of Object Representations 525l1 or portions thereof from Object Processing Unit 140 with Collections of Object Representations 525 or portions thereof from Knowledge Cells 800 in Collection of Knowledge Cells 530d. Collection of Object Representations 525c1 or portions thereof from Knowledge Cell 800rc may be found substantially similar with highest similarity. Decision-making Unit 540 can anticipate any Instruction Sets 526 (not shown) correlated with Collection of Object Representations 525c1, thereby enabling autonomous Avatar 605 operation. Decision-making Unit 540 can then perform collective Similarity Comparisons 125 of Collections of Object Representations 525l1-525l2 or portions thereof from Object Processing Unit 140 with Collections of Object Representations 525 or portions thereof from Knowledge Cells 800 in Collection of Knowledge Cells 530d. Collections of Object Representations 525c1-525c2 or portions thereof from Knowledge Cell 800rc may be found substantially similar with highest similarity. Decision-making Unit 540 can anticipate any Instruction Sets 526 (not shown) correlated with Collection of Object Representations 525c2, thereby enabling autonomous Avatar 605 operation. Decision-making Unit 540 can then perform collective Similarity Comparisons 125 of Collections of Object Representations 525l1-525l3 or portions thereof from Object Processing Unit 140 with Collections of Object Representations 525 or portions thereof from Knowledge Cells 800 in Collection of Knowledge Cells 530d. Collections of Object Representations 525d1-525d3 or portions thereof from Knowledge Cell 800rd may be found substantially similar with highest similarity. Decision-making Unit 540 can anticipate any Instruction Sets 526 (not shown) correlated with Collection of Object Representations 525d3, thereby enabling autonomous Avatar 605 operation. Decision-making Unit 540 can then perform collective Similarity Comparisons 125 of Collections of Object Representations 525l1-525l4 or portions thereof from Object Processing Unit 140 with Collections of Object Representations 525 or portions thereof from Knowledge Cells 800 in Collection of Knowledge Cells 530d. Collections of Object Representations 525d1-525d4 or portions thereof from Knowledge Cell 800rd may be found substantially similar with highest similarity. Decision-making Unit 540 can anticipate any Instruction Sets 526 (not shown) correlated with Collection of Object Representations 525d4, thereby enabling autonomous Avatar 605 operation. Decision-making Unit 540 can then perform collective Similarity Comparisons 125 of Collections of Object Representations 525l1-525l5 or portions thereof from Object Processing Unit 140 with Collections of Object Representations 525 or portions thereof from Knowledge Cells 800 in Collection of Knowledge Cells 530d. Collections of Object Representations 525d1-525d5 or portions thereof from Knowledge Cell 800rd may be found substantially similar with highest similarity. Decision-making Unit 540 can anticipate any Instruction Sets 526 (not shown) correlated with Collection of Object Representations 525d5, thereby enabling autonomous Avatar 605 operation. Decision-making Unit 540 can implement similar logic or process for any additional Collections of Object Representations 525 from Object Processing Unit 140, and so on.

In some embodiments, various elements and/or techniques can be utilized in the aforementioned similarity determinations with respect to collectively compared Collections of Object Representations 525 and/or other elements. In some aspects, similarity of collectively compared Collections of Object Representations 525 can be determined based on similarities or similarity indexes of the individually compared Collections of Object Representations 525. In one example, an average of similarities or similarity indexes of individually compared Collections of Object Representations 525 can be used to determine similarity of collectively compared Collections of Object Representations 525. In another example, a weighted average of similarities or similarity indexes of individually compared Collections of Object Representations 525 can be used to determine similarity of collectively compared Collections of Object Representations 525. For instance, to affect the weighting of collective similarity, a higher weight or importance (i.e. importance index, etc.) can be assigned to the similarities or similarity indexes of some (i.e. more substantive or larger, etc.) Collections of Object Representations 525 and lower for other (i.e. less substantive or smaller, etc.) Collections of Object Representations 525. Any other higher or lower weight or importance assignment can be implemented. In other aspects, any of the previously described or other thresholds for substantial similarity of individually compared elements can be similarly utilized for collectively compared elements. In one example, substantial similarity of collectively compared Collections of Object Representations 525 can be achieved when their collective similarity or similarity index exceeds a similarity threshold. In another example, substantial similarity of collectively compared Collections of Object Representations 525 can be achieved when at least a threshold number or percentage of Collections of Object Representations 525 or portions thereof from the collectively compared Collections of Object Representations 525 match or substantially match. Similarly, substantial similarity of collectively compared Collections of Object Representations 525 can be achieved when a number or percentage of matching or substantially matching Collections of Object Representations 525 or portions thereof from the collectively compared Collections of Object Representations 525 exceeds a threshold. Such thresholds can be defined by a user, by ACAAO system administrator, or automatically by the system based on experience, testing, inquiry, analysis, synthesis, or other techniques, knowledge, or input. Similar elements and/or techniques as the aforementioned can be used for similarity determinations of other collectively compared elements such as Object Representations 625, Object Properties 630, Instruction Sets 526, Extra Info 527, Knowledge Cells 800, and/or others. Similarity determinations of collectively compared elements may include any features, functionalities, and embodiments of Similarity Comparison 125, and vice versa.

It should be understood that any of the described elements and/or techniques in the foregoing example can be omitted, used in a different combination, or used in combination with other elements and/or techniques, in which case the selection of Knowledge Cells 800 or elements (i.e. Collections of Object Representations 525, Instruction Sets 526, etc.) thereof would be affected accordingly. Any of the elements and/or techniques utilized in other examples or embodiments described herein such as using Extra Info 527 in Similarity Comparisons 125, traversing of Knowledge Cells 800 or other elements, using history of Collections of Object Representations 525 or Knowledge Cells 800 for collective Similarity Comparisons 125, using various arrangements of Collections of Object Representations 525 and/or other elements in a Knowledge Cell 800, and/or others can similarly be utilized in this example. One of ordinary skill in art will understand that the foregoing exemplary embodiment is described merely as an example of a variety of possible implementations, and that while all of its variations are too voluminous to describe, they are within the scope of this disclosure.

Figure 26:
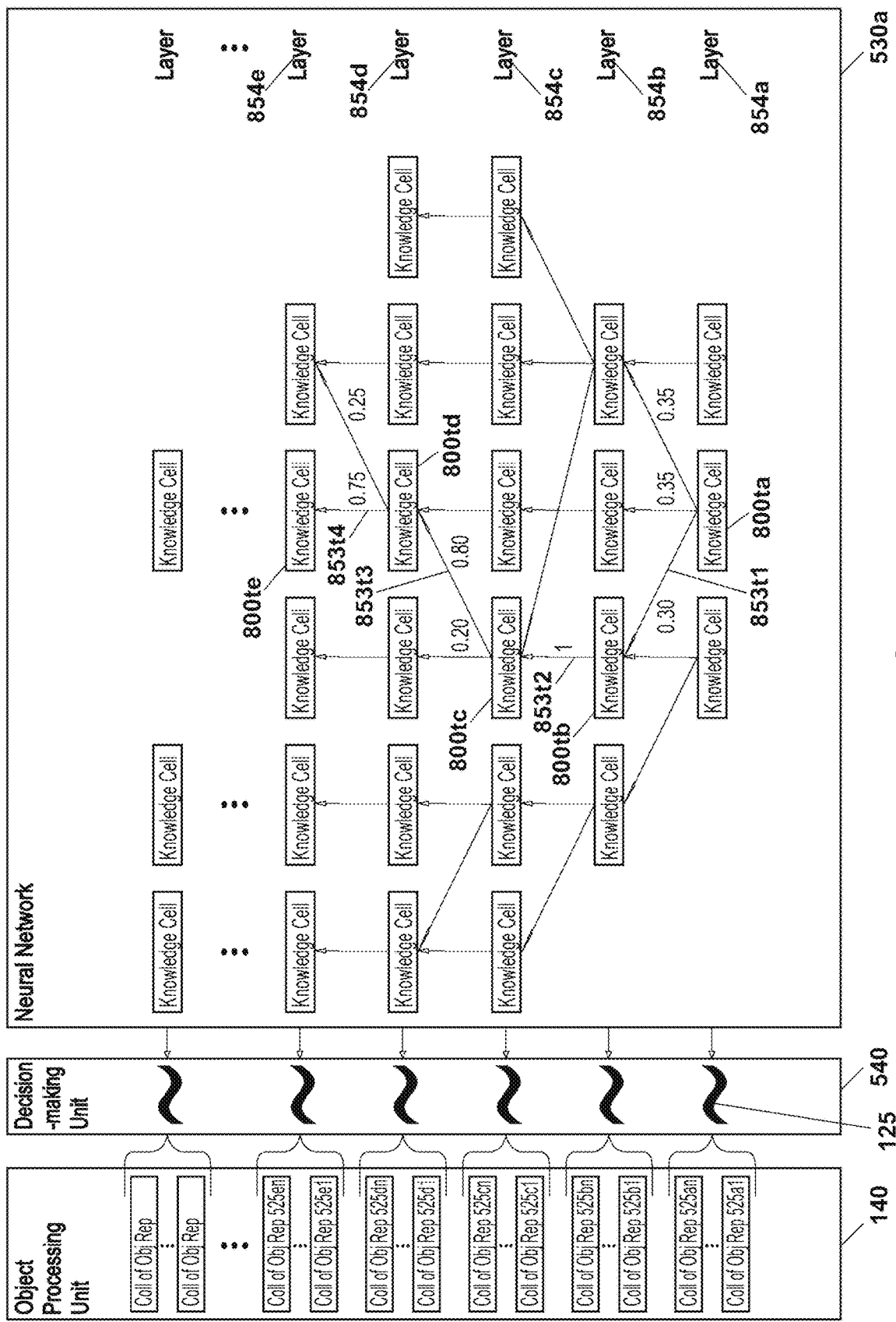
FIG. 26 illustrates an embodiment of determining anticipatory Instruction Sets 526 using Neural Network 530*a*.

Referring to FIG. 26, an embodiment of determining anticipatory Instruction Sets 526 using Neural Network 530a is illustrated. In some aspects, determining anticipatory Instruction Sets 526 using Neural Network 530a may include selecting a path of Knowledge Cells 800 or elements (i.e. Collections of Object Representations 525, Instruction Sets 526, etc.) thereof through Neural Network 530a. Decision-making Unit 540 can utilize various elements and/or techniques for selecting a path through Neural Network 530a. Although, these elements and/or techniques are described with respect to Neural Network 530a below, they can similarly be used in any Knowledgebase 530 (i.e. Graph 530b, Collection of Sequences 530c, Sequence 533, Collection of Knowledge Cells 530d, etc.) as applicable.

In some embodiments, Decision-making Unit 540 can utilize similarity index in selecting Knowledge Cells 800 or portions (i.e. Collections of Object Representations 525, Instruction Sets 526, etc.) thereof in a path through Neural Network 530a. For instance, similarity index may indicate how well one Knowledge Cell 800 or portions thereof are matched with another Knowledge Cell 800 or portions thereof as previously described. In one example, Decision-making Unit 540 may select a Knowledge Cell 800 comprising one or more Collections of Object Representations 525 with highest similarity index even if Connection 853 pointing to that Knowledge Cell 800 has less than the highest weight. Therefore, similarity index or other such element or parameter can override or disregard the weight of a Connection 853 or other element. In another example, Decision-making Unit 540 may select a Knowledge Cell 800 comprising one or more Collections of Object Representations 525 whose similarity index is higher than or equal to a weight of Connection 853 pointing to that Knowledge Cell 800. In a further example, Decision-making Unit 540 may select a Knowledge Cell 800 comprising one or more Collections of Object Representations 525 whose similarity index is lower than or equal to a weight of Connection 853 pointing to that Knowledge Cell 800. Similarity index can be set to be more, less, or equally important than a weight of a Connection 853.

In some embodiments, Decision-making Unit 540 can utilize Connections 853 in selecting Knowledge Cells 800 or portions (i.e. Collections of Object Representations 525, Instruction Sets 526, etc.) thereof in a path through Neural Network 530a. In some aspects, Decision-making Unit 540 can take into account weights of Connections 853 among the interconnected Knowledge Cells 800 in choosing from which Knowledge Cell 800 to compare one or more Collections of Object Representations 525 first, second, third, and so on. Specifically, for instance, Decision-making Unit 540 can perform Similarity Comparisons 125 with one or more Collections of Object Representations 525 from Knowledge Cell 800 pointed to by the highest weight Connection 853 first, Collections of Object Representations 525 from Knowledge Cell 800 pointed to by the second highest weight Connection 853 second, and so on. In other aspects, Decision-making Unit 540 can stop performing Similarity Comparisons 125 as soon as it finds one or more substantially similar Collections of Object Representations 525 in an interconnected Knowledge Cell 800. In further aspects, Decision-making Unit 540 may only follow the highest weight Connection 853 to arrive at a Knowledge Cell 800 comprising one or more Collections of Object Representations 525 to be compared, thereby disregarding Connections 853 with less than the highest weight. In further aspects, Decision-making Unit 540 may ignore weights and/or other parameters of Connections 853. In further aspects, Decision-making Unit 540 may ignore Connections 853.

In some embodiments, Decision-making Unit 540 can utilize a bias to adjust similarity index, weight of a Connection 853, and/or other element or parameter used in selecting Knowledge Cells 800 or portions (i.e. Collections of Object Representations 525, Instruction Sets 526, etc.) thereof in a path through Neural Network 530a. In one example, Decision-making Unit 540 may select a Knowledge Cell 800 comprising one or more Collections of Object Representations 525 whose similarity index multiplied by or adjusted for a bias is higher than or equal to a weight of Connection 853 pointing to that Knowledge Cell 800. In another example, Decision-making Unit 540 may select a Knowledge Cell 800 comprising one or more Collections of Object Representations 525 whose similarity index multiplied by or adjusted for a bias is lower than or equal to a weight of Connection 853 pointing to that Knowledge Cell 800. In a further example, bias can be used to resolve deadlock situations where similarity index is equal to a weight of a Connection 853. In some aspects, bias can be expressed in percentages such as 0.3 percent, 1.2 percent, 25.7 percent, 79.8 percent, 99.9 percent, 100.1 percent, 155.4 percent, 298.6 percent, 1105.5 percent, and so on. For example, a bias below 100 percent decreases an element or parameter to which it is applied, a bias equal to 100 percent does not change the element or parameter to which it is applied, and a bias higher than 100 percent increases the element or parameter to which it is applied. In general, any amount of bias can be utilized depending on implementation. Bias can be applied to one or more of a weight of a Connection 853, similarity index, any other element or parameter, and/or all or any combination of them. Also, different biases can be applied to each of a weight of a Connection 853, similarity index, or any other element or parameter. For example, 30 percent bias can be applied to similarity index and 15 percent bias can be applied to a weight of a Connection 853. Also, different biases can be applied to various Layers 854 of Neural Network 530a, and/or other disclosed elements. Bias can be defined by a user, by ACAAO system administrator, or automatically by the system based on experience, testing, inquiry, analysis, synthesis, or other techniques, knowledge, or input.

Any other element and/or technique can be utilized in selecting Knowledge Cells 800 or portions (i.e. Collections of Object Representations 525, Instruction Sets 526, etc.) thereof in a path through Neural Network 530a.

In some embodiments, Neural Network 530a may include knowledge (i.e. interconnected Knowledge Cells 800 comprising one or more Collections of Object Representations 525 correlated with any Instruction Sets 526 and/or Extra Info 527, etc.) of how Avatar 605 operated in circumstances including objects with various properties. In some aspects, determining anticipatory Instruction Sets 526 using Neural Network 530a may include selecting a path of Knowledge Cells 800 or portions (i.e. Collections of Object Representations 525, Instruction Sets 526, etc.) thereof through Neural Network 530a. Individual and/or collective Similarity Comparisons 125 can be used to determine substantial similarity of the individually and/or collectively compared Collections of Object Representations 525 or portions thereof. Substantial similarity may be used primarily for selecting a path through Neural Network 530a, whereas, weight of any Connection 853 may be used secondarily or not at all.

For example, Decision-making Unit 540 can perform Similarity Comparisons 125 of Collections of Object Representations 525a1-525an or portions thereof from Object Processing Unit 140 with Collections of Object Representations 525 or portions thereof from one or more Knowledge Cells 800 in Layer 854a (or any other one or more Layers 854, etc.). Collections of Object Representations 525 or portions thereof from Knowledge Cell 800ta may be found collectively substantially similar with highest similarity. As the comparisons of individual Collections of Object Representations 525 are performed to determine collective similarity, Decision-making Unit 540 can anticipate Instruction Sets 526 correlated with substantially similar individual Collections of Object Representations 525 as previously described, thereby enabling autonomous Avatar 605 operation. Decision-making Unit 540 can then perform Similarity Comparisons 125 of Collections of Object Representations 525b1-525bn or portions thereof from Object Processing Unit 140 with Collections of Object Representations 525 or portions thereof from one or more Knowledge Cells 800 in Layer 854b interconnected with Knowledge Cell 800ta. Collections of Object Representations 525 or portions thereof from Knowledge Cell 800tb may be found collectively substantially similar with highest similarity, thus, Decision-making Unit 540 may follow Connection 853t1 disregarding its less than highest weight. As the comparisons of individual Collections of Object Representations 525 are performed to determine collective similarity, Decision-making Unit 540 can anticipate Instruction Sets 526 correlated with substantially similar individual Collections of Object Representations 525 as previously described, thereby enabling autonomous Avatar 605 operation. Since Connection 853t2 is the only connection from Knowledge Cell 800tb, Decision-making Unit 540 may follow Connection 853t2 and perform Similarity Comparisons 125 of Collections of Object Representations 525c1-525cn or portions thereof from Object Processing Unit 140 with Collections of Object Representations 525 or portions thereof from Knowledge Cell 800tc in Layer 854c. Collections of Object Representations 525 or portions thereof from Knowledge Cell 800tc may be found collectively substantially similar. As the comparisons of individual Collections of Object Representations 525 are performed to determine collective similarity, Decision-making Unit 540 can anticipate Instruction Sets 526 correlated with substantially similar individual Collections of Object Representations 525 as previously described, thereby enabling autonomous Avatar 605 operation. Decision-making Unit 540 can then perform Similarity Comparisons 125 of Collections of Object Representations 525d1-525dn or portions thereof from Object Processing Unit 140 with Collections of Object Representations 525 or portions thereof from one or more Knowledge Cells 800 in Layer 854d interconnected with Knowledge Cell 800tc. Collections of Object Representations 525 or portions thereof from Knowledge Cell 800td may be found collectively substantially similar with highest similarity, thus, Decision-making Unit 540 may follow Connection 853t3. As the comparisons of individual Collections of Object Representations 525 are performed to determine collective similarity, Decision-making Unit 540 can anticipate Instruction Sets 526 correlated with substantially similar individual Collections of Object Representations 525 as previously described, thereby enabling autonomous Avatar 605 operation. Decision-making Unit 540 can then perform Similarity Comparisons 125 of Collections of Object Representations 525e1-525en or portions thereof from Object Processing Unit 140 with Collections of Object Representations 525 or portions thereof from one or more Knowledge Cells 800 in Layer 854e interconnected with Knowledge Cell 800td. Collections of Object Representations 525 or portions thereof from Knowledge Cell 800te may be found collectively substantially similar with highest similarity, thus, Decision-making Unit 540 may follow Connection 853t4. As the comparisons of individual Collections of Object Representations 525 are performed to determine collective similarity, Decision-making Unit 540 can anticipate Instruction Sets 526 correlated with substantially similar individual Collections of Object Representations 525 as previously described, thereby enabling autonomous Avatar 605 operation. Decision-making Unit 540 can implement similar logic or process for any additional Collections of Object Representations 525 from Object Processing Unit 140.

The foregoing exemplary embodiment provides an example of utilizing a combination of collective Similarity Comparisons 125, individual Similarity Comparisons 125, Connections 853, and/or other elements or techniques. It should be understood that any of these elements and/or techniques can be omitted, used in a different combination, or used in combination with other elements and/or techniques, in which case the selection of Knowledge Cells 800 or portions (i.e. Collections of Object Representations 525, Instruction Sets 526, etc.) thereof in a path through Neural Network 530a would be affected accordingly. Any of the elements and/or techniques utilized in other examples or embodiments described herein such as using Extra Info 527 in Similarity Comparisons 125, traversing of Knowledge Cells 800 or other elements, using history of Collections of Object Representations 525 or Knowledge Cells 800 for collective Similarity Comparisons 125, using various arrangements of Collections of Object Representations 525 and/or other elements in a Knowledge Cell 800, and/or others can similarly be utilized in this example. These elements and/or techniques can similarly be utilized in Graph 530b, Collection of Sequences 530c, Sequence 533, Collection of Knowledge Cells 530d, and/or other data structures or arrangements. In some aspects, instead of anticipating Instruction Sets 526 correlated with substantially similar individual Collections of Object Representations 525, Decision-making Unit 540 can anticipate instruction Sets 526 correlated with substantially similar streams of Collections of Object Representations 525. In other aspects, any time that substantial similarity or other similarity threshold is not achieved in compared Collections of Object Representations 525 or portions thereof from any of the Knowledge Cells 800, Decision-making Unit 540 can decide to look for a substantially or otherwise similar Collections of Object Representations 525 or portions thereof in Knowledge Cells 800 elsewhere in Neural Network 530a such as in any Layer 854 subsequent to a current Layer 854, in the first Layer 854, in the entire Neural Network 530a, and/or others, even if such Knowledge Cell 800 may be unconnected with a prior Knowledge Cell 800. It should be noted that any of Collections of Object Representations 525a1-525an, 525b1-525bn, 525c1-525cn, 525d1-525dn, 525e1-525en, etc. may include one Collection of Object Representations 525 or a stream of Collections of Object Representations 525. It should also be noted that any Knowledge Cell 800 may include one Collection of Object Representations 525 or a stream of Collections of Object Representations 525 as previously described. One of ordinary skill in art will understand that the foregoing exemplary embodiment is described merely as an example of a variety of possible implementations, and that while all of its variations are too voluminous to describe, they are within the scope of this disclosure.

Figure 27:
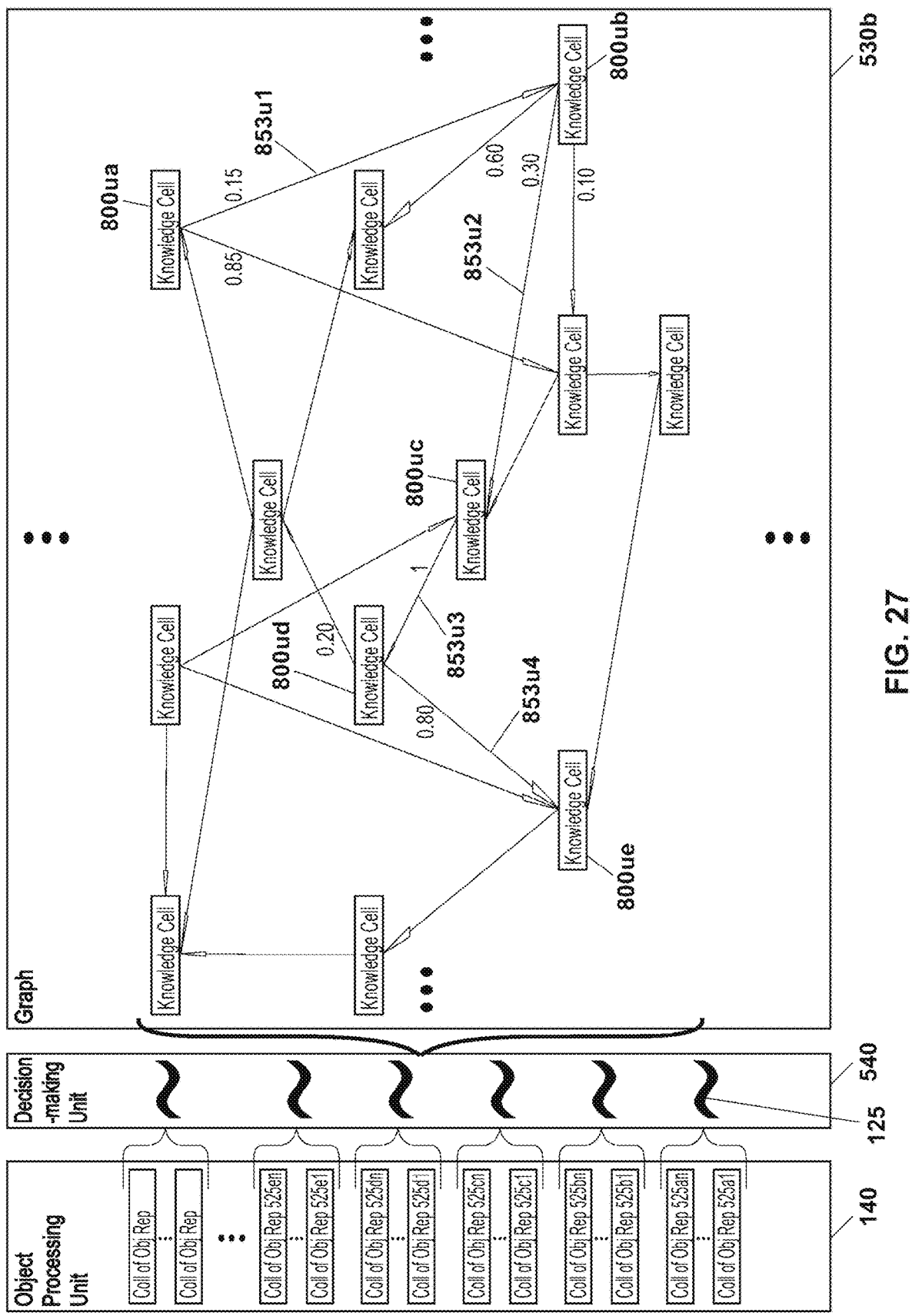
FIG. 27 illustrates an embodiment of determining anticipatory Instruction Sets 526 using Graph 530*b*.

Referring to FIG. 27, an embodiment of determining anticipatory Instruction Sets 526 using Graph 530b is illustrated. Graph 530b may include knowledge (i.e. interconnected Knowledge Cells 800 comprising one or more Collections of Object Representations 525 correlated with any Instruction Sets 526 and/or Extra Info 527, etc.) of how Avatar 605 operated in circumstances including objects with various properties. In some aspects, determining anticipatory Instruction Sets 526 using Graph 530b may include selecting a path of Knowledge Cells 800 or portions (i.e. Collections of Object Representations 525, Instruction Sets 526, etc.) thereof through Graph 530b. Individual and/or collective Similarity Comparisons 125 can be used to determine substantial similarity of the individually and/or collectively compared Collections of Object Representations 525 or portions thereof. Substantial similarity may be used primarily for selecting a path through Graph 530b, whereas, weight of any Connection 853 may be used secondarily or not at all.

For example, Decision-making Unit 540 can perform Similarity Comparisons 125 of Collections of Object Representations 525a1-525an or portions thereof from Object Processing Unit 140 with Collections of Object Representations 525 or portions thereof from one or more Knowledge Cells 800 in Graph 530b. Collections of Object Representations 525 or portions thereof from Knowledge Cell 800ua may be found collectively substantially similar with highest similarity. As the comparisons of individual Collections of Object Representations 525 are performed to determine collective similarity, Decision-making Unit 540 can anticipate Instruction Sets 526 correlated with substantially similar individual Collections of Object Representations 525 as previously described, thereby enabling autonomous Avatar 605 operation. Decision-making Unit 540 can then perform Similarity Comparisons 125 of Collections of Object Representations 525b1-525bn or portions thereof from Object Processing Unit 140 with Collections of Object Representations 525 or portions thereof from one or more Knowledge Cells 800 in Graph 530b interconnected with Knowledge Cell 800ua by outgoing Connections 853. Collections of Object Representations 525 or portions thereof from Knowledge Cell 800ub may be found collectively substantially similar with highest similarity, thus, Decision-making Unit 540 may follow Connection 853u1 disregarding its less than highest weight. As the comparisons of individual Collections of Object Representations 525 are performed to determine collective similarity, Decision-making Unit 540 can anticipate Instruction Sets 526 correlated with substantially similar individual Collections of Object Representations 525 as previously described, thereby enabling autonomous Avatar 605 operation. Decision-making Unit 540 can then perform Similarity Comparisons 125 of Collections of Object Representations 525c1-525cn or portions thereof from Object Processing Unit 140 with Collections of Object Representations 525 or portions thereof from one or more Knowledge Cells 800 in Graph 530b interconnected with Knowledge Cell 800ub by outgoing Connections 853. Collections of Object Representations 525 or portions thereof from Knowledge Cell 800uc may be found collectively substantially similar with highest similarity, thus, Decision-making Unit 540 may follow Connection 853u2 disregarding its less than highest weight. As the comparisons of individual Collections of Object Representations 525 are performed to determine collective similarity, Decision-making Unit 540 can anticipate Instruction Sets 526 correlated with substantially similar individual Collections of Object Representations 525 as previously described, thereby enabling autonomous Avatar 605 operation. Since Connection 853u3 is the only connection from Knowledge Cell 800uc, Decision-making Unit 540 may follow Connection 853u3 and perform Similarity Comparisons 125 of Collections of Object Representations 525d1-525dn or portions thereof from Object Processing Unit 140 with Collections of Object Representations 525 or portions thereof from Knowledge Cell 800ud in Graph 530b. Collections of Object Representations 525 or portions thereof from Knowledge Cell 800ud may be found collectively substantially similar. As the comparisons of individual Collections of Object Representations 525 are performed to determine collective similarity, Decision-making Unit 540 can anticipate Instruction Sets 526 correlated with substantially similar individual Collections of Object Representations 525 as previously described, thereby enabling autonomous Avatar 605 operation. Decision-making Unit 540 can then perform Similarity Comparisons 125 of Collections of Object Representations 525e1-525en or portions thereof from Object Processing Unit 140 with Collections of Object Representations 525 or portions thereof from one or more Knowledge Cells 800 in Graph 530b interconnected with Knowledge Cell 800ud by outgoing Connections 853. Collections of Object Representations 525 or portions thereof from Knowledge Cell 800ue may be found collectively substantially similar with highest similarity, thus, Decision-making Unit 540 may follow Connection 853u4. As the comparisons of individual Collections of Object Representations 525 are performed to determine collective similarity, Decision-making Unit 540 can anticipate Instruction Sets 526 correlated with substantially similar individual Collections of Object Representations 525 as previously described, thereby enabling autonomous Avatar 605 operation. Decision-making Unit 540 can implement similar logic or process for any additional Collections of Object Representations 525 from Object Processing Unit 140.

The foregoing exemplary embodiment provides an example of utilizing a combination of collective Similarity Comparisons 125, individual Similarity Comparisons 125, Connections 853, and/or other elements or techniques. It should be understood that any of these elements and/or techniques can be omitted, used in a different combination, or used in combination with other elements and/or techniques, in which case the selection of Knowledge Cells 800 or portions (i.e. Collections of Object Representations 525, Instruction Sets 526, etc.) thereof in a path through Graph 530b would be affected accordingly. Any of the elements and/or techniques utilized in other examples or embodiments described herein such as using Extra Info 527 in Similarity Comparisons 125, traversing of Knowledge Cells 800 or other elements, using history of Collections of Object Representations 525 or Knowledge Cells 800 in collective Similarity Comparisons 125, using various arrangements of Collections of Object Representations 525 and/or other elements in a Knowledge Cell 800, and/or others can similarly be utilized in this example. These elements and/or techniques can similarly be utilized in Neural Network 530a, Collection of Sequences 530c, Sequence 533, Collection of Knowledge Cells 530d, and/or other data structures or arrangements. In some aspects, instead of anticipating Instruction Sets 526 correlated with substantially similar individual Collections of Object Representations 525, Decision-making Unit 540 can anticipate Instruction Sets 526 correlated with substantially matching streams of Collections of Object Representations 525. In other aspects, any time that substantial similarity or other similarity threshold is not achieved in compared Collections of Object Representations 525 or portions thereof of any of the Knowledge Cells 800, Decision-making Unit 540 can decide to look for a substantially or otherwise similar Collections of Object Representations 525 or portions thereof in Knowledge Cells 800 elsewhere in Graph 530b even if such Knowledge Cell 800 may be unconnected with a prior Knowledge Cell 800. It should be noted that any of Collections of Object Representations 525a1-525an, 525b1-525bn, 525c1-525cn, 525d1-525dn, 525e1-525en, etc. may include one Collection of Object Representations 525 or a stream of Collections of Object Representations 525. It should also be noted that any Knowledge Cell 800 may include one Collection of Object Representations 525 or a stream of Collections of Object Representations 525 as previously described. One of ordinary skill in art will understand that the foregoing exemplary embodiment is described merely as an example of a variety of possible implementations, and that while all of its variations are too voluminous to describe, they are within the scope of this disclosure.

Figure 28:
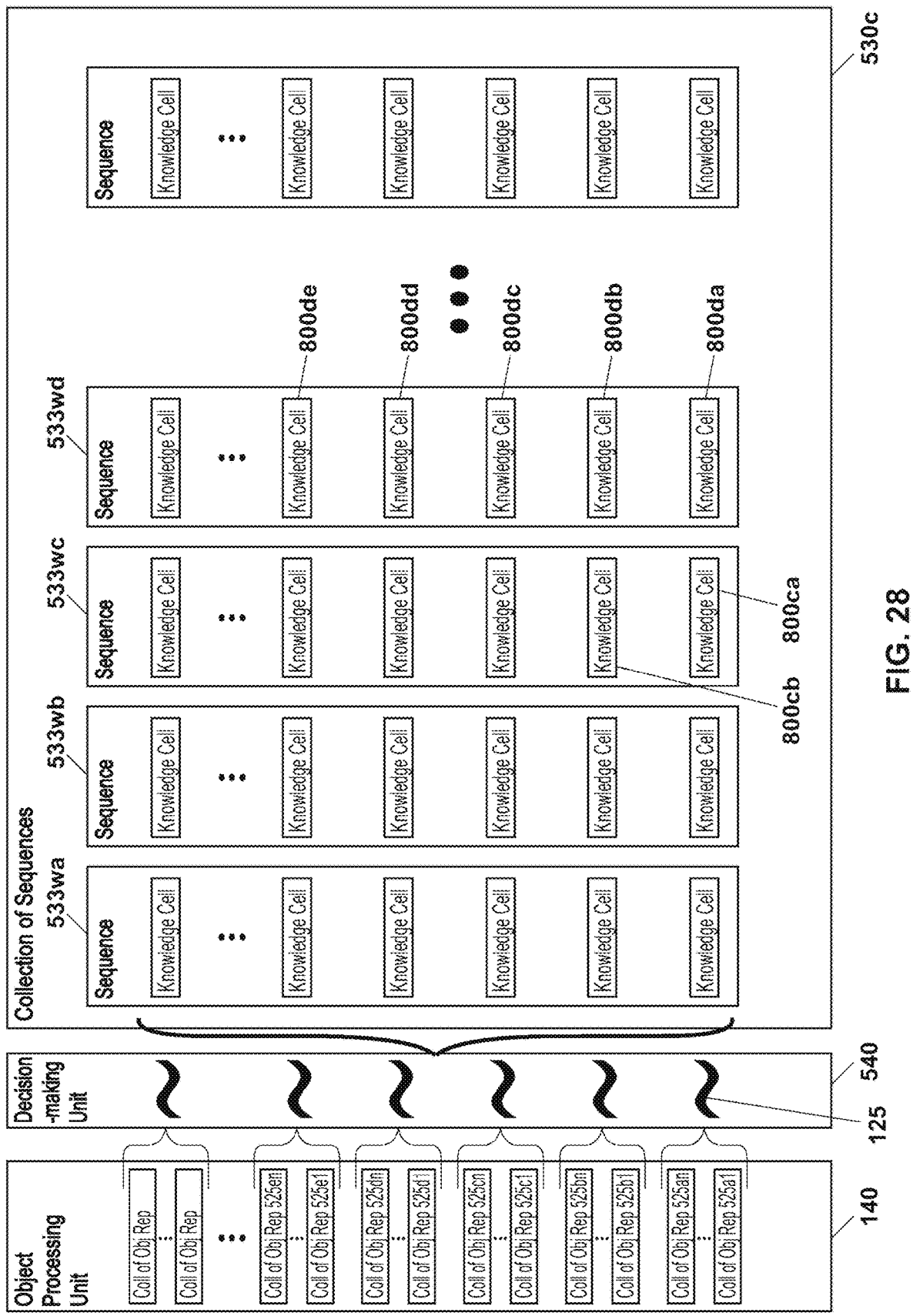
FIG. 28 illustrates an embodiment of determining anticipatory Instruction Sets 526 using Collection of Sequences 530*c*.

Referring to FIG. 28, an embodiment of determining anticipatory Instruction Sets 526 using Collection of Sequences 530c is illustrated. Collection of Sequences 530c may include knowledge (i.e. sequences of Knowledge Cells 800 comprising one or more Collections of Object Representations 525 correlated with any Instruction Sets 526 and/or Extra Info 527, etc.) of how Avatar 605 operated in circumstances including objects with various properties. In some aspects, determining anticipatory Instruction Sets 526 for autonomous Avatar 605 operation using Collection of Sequences 530c may include selecting a Sequence 533 of Knowledge Cells 800 or portions (i.e. Collections of Object Representations 525, Instruction Sets 526, etc.) thereof from Collection of Sequences 530c. Individual and/or collective Similarity Comparisons 125 can be used to determine substantial similarity of the individually and/or collectively compared Collections of Object Representations 525 or portions thereof.

For example, Decision-making Unit 540 can perform Similarity Comparisons 125 of Collections of Object Representations 525a1-525an or portions thereof from Object Processing Unit 140 with Collections of Object Representations 525 or portions thereof from Knowledge Cells 800 in one or more Sequences 533 of Collection of Sequences 530c. Collections of Object Representations 525 or portions thereof from Knowledge Cell 800ca in Sequence 533wc may be found collectively substantially similar with highest similarity. As the comparisons of individual Collections of Object Representations 525 are performed to determine collective similarity, Decision-making Unit 540 can anticipate Instruction Sets 526 correlated with substantially similar individual Collections of Object Representations 525 as previously described, thereby enabling autonomous Avatar 605 operation. Decision-making Unit 540 can then perform Similarity Comparisons 125 of Collections of Object Representations 525a1-525an and 525b1-525bn or portions thereof from Object Processing Unit 140 with Collections of Object Representations 525 or portions thereof from Knowledge Cells 800 in Sequences 533 of Collection of Sequences 530c. Collections of Object Representations 525 or portions thereof from Knowledge Cells 800ca-800cb in Sequence 533wc may be found collectively substantially similar with highest similarity. As the comparisons of individual Collections of Object Representations 525 are performed to determine collective similarity, Decision-making Unit 540 can anticipate Instruction Sets 526 correlated with substantially similar individual Collections of Object Representations 525 as previously described, thereby enabling autonomous Avatar 605 operation. Decision-making Unit 540 can then perform Similarity Comparisons 125 of Collections of Object Representations 525a1-525an, 525b1-525bn, and 525c1-525cn or portions thereof from Object Processing Unit 140 with Collections of Object Representations 525 or portions thereof from Knowledge Cells 800 in Sequences 533 of Collection of Sequences 530c. Collections of Object Representations 525 or portions thereof from Knowledge Cells 800da-800dc in Sequence 533wd may be found collectively substantially similar with highest similarity. As the comparisons of individual Collections of Object Representations 525 are performed to determine collective similarity, Decision-making Unit 540 can anticipate Instruction Sets 526 correlated with substantially similar individual Collections of Object Representations 525 as previously described, thereby enabling autonomous Avatar 605 operation. Decision-making Unit 540 can then perform Similarity Comparisons 125 of Collections of Object Representations 525a1-525an, 525b1-525bn, 525c1-525cn, and 525d1-525dn or portions thereof from Object Processing Unit 140 with Collections of Object Representations 525 or portions thereof from Knowledge Cells 800 in Sequences 533 of Collection of Sequences 530c. Collections of Object Representations 525 or portions thereof from Knowledge Cells 800da-800dd in Sequence 533wd may be found collectively substantially similar with highest similarity. As the comparisons of individual Collections of Object Representations 525 are performed to determine collective similarity, Decision-making Unit 540 can anticipate Instruction Sets 526 correlated with substantially similar individual Collections of Object Representations 525 as previously described, thereby enabling autonomous Avatar 605 operation. Decision-making Unit 540 can then perform Similarity Comparisons 125 of Collections of Object Representations 525a1-525an, 525b1-525bn, 525c1-525cn, 525d1-525dn, and 525e1-525en or portions thereof from Object Processing Unit 140 with Collections of Object Representations 525 or portions thereof from Knowledge Cells 800 in Sequences 533 of Collection of Sequences 530c. Collections of Object Representations 525 or portions thereof from Knowledge Cells 800da-800de in Sequence 533wd may be found collectively substantially similar with highest similarity. As the comparisons of individual Collections of Object Representations 525 are performed to determine collective similarity, Decision-making Unit 540 can anticipate Instruction Sets 526 correlated with substantially similar individual Collections of Object Representations 525 as previously described, thereby enabling autonomous Avatar 605 operation. Decision-making Unit 540 can implement similar logic or process for any additional Collections of Object Representations 525 from Object Processing Unit 140, and so on.

The foregoing exemplary embodiment provides an example of utilizing a combination of collective Similarity Comparisons 125, individual Similarity Comparisons 125, and/or other elements or techniques. It should be understood that any of these elements and/or techniques can be omitted, used in a different combination, or used in combination with other elements and/or techniques, in which case the selection of Sequence 533 of Knowledge Cells 800 or portions (i.e. Collections of Object Representations 525, Instruction Sets 526, etc.) thereof would be affected accordingly. Any of the elements and/or techniques utilized in other examples or embodiments described herein such as using Extra Info 527 in Similarity Comparisons 125, traversing of Knowledge Cells 800 or other elements, using history of Collections of Object Representations 525 or Knowledge Cells 800 in collective Similarity Comparisons 125, using various arrangements of Collections of Object Representations 525 and/or other elements in a Knowledge Cell 800, and/or others can similarly be utilized in this example. These elements and/or techniques can similarly be utilized in Neural Network 530a, Graph 530b, Collection of Knowledge Cells 530d, and/or other data structures or arrangements. In some aspects, instead of anticipating Instruction Sets 526 correlated with substantially similar individual Collections of Object Representations 525, Decision-making Unit 540 can anticipate Instruction Sets 526 correlated with substantially matching streams of Collections of Object Representations 525. In other aspects, any time that substantial similarity or other similarity threshold is not achieved in compared Collections of Object Representations 525 or portions thereof from any of the Knowledge Cells 800, Decision-making Unit 540 can decide to look for a substantially or otherwise similar Collections of Object Representations 525 or portions thereof in Knowledge Cells 800 elsewhere in Collection of Sequences 530c such as in different Sequences 533. It should be noted that any of Collections of Object Representations 525a1-525an, 525b1-525bn, 525c1-525cn, 525d1-525dn, 525e1-525en, etc. may include one Collection of Object Representations 525 or a stream of Collections of Object Representations 525. It should also be noted that any Knowledge Cell 800 may include one Collection of Object Representations 525 or a stream of Collections of Object Representations 525 as previously described. One of ordinary skill in art will understand that the foregoing exemplary embodiment is described merely as an example of a variety of possible implementations, and that while all of its variations are too voluminous to describe, they are within the scope of this disclosure.

Referring now to Modification Interface 130. Modification Interface 130 comprises the functionality for modifying execution and/or functionality of Avatar 605, Application Program 18, Processor 11, and/or other processing element. Modification Interface 130 comprises the functionality for modifying execution and/or functionality of Avatar 605, Application Program 18, Processor 11, and/or other processing element at runtime. Modification Interface 130 comprises the functionality for modifying execution and/or functionality of Avatar 605, Application Program 18, Processor 11, and/or other processing element based on anticipatory Instruction Sets 526. In one example, Artificial Intelligence Unit 110 may determine anticipatory Instruction Sets 526 to be used or executed in Avatar's 605 autonomous operation, and Modification Interface 130 may use the anticipatory Instruction Sets 526 to modify Avatar 605 to effect Avatar's 605 autonomous operation. In another example, in Application Programs 18 that do not comprise Avatar 605 or do not rely on Avatar 605 for their operation, Artificial Intelligence Unit 110 may determine anticipatory Instruction Sets 526 to be used or executed in Application Program's 18 autonomous operation, and Modification Interface 130 may use the anticipatory Instruction Sets 526 to modify Application Program 18 to effect Application Program's 18 autonomous operation. In some aspects, Modification Interface 130 can access, modify, and/or otherwise manipulate runtime engine/environment, virtual machine, operating system, compiler, interpreter, translator, execution stack, file, object, data structure, and/or other computing system elements. In other aspects, Modification Interface 130 can access, modify, and/or otherwise manipulate memory, storage, and/or other repositories. In further aspects, Modification Interface 130 can access, modify, and/or otherwise manipulate Processor 11 registers and/or other Processor 11 elements. In further aspects, Modification Interface 130 can access, modify, and/or otherwise manipulate inputs and/or outputs of Avatar 605, Application Program 18, Processor 11, and/or other processing element. In further aspects, Modification Interface 130 can access, create, delete, modify, and/or otherwise manipulate functions, methods, procedures, routines, subroutines, and/or other elements of Avatar 605 and/or Application Program 18. In further aspects, Modification Interface 130 can access, create, delete, modify, and/or otherwise manipulate source code, bytecode, compiled code, interpreted code, translated code, machine code, and/or other code. In further aspects, Modification Interface 130 can access, create, delete, modify, and/or otherwise manipulate values, variables, parameters, and/or other data or information. Modification Interface 130 comprises any features, functionalities, and embodiments of Acquisition Interface 120, and vice versa, as applicable. Modification Interface 130 also comprises other disclosed functionalities.

Modification Interface 130 can employ various techniques for modifying execution and/or functionality of Avatar 605, Application Program 18, Processor 11, and/or other processing element. In some aspects, some of the previously described techniques and/or tools can be utilized. Code instrumentation, for instance, may involve inserting additional code, overwriting or rewriting existing code, and/or branching to a separate segment of code from Application Program 18 as previously described. For example, instrumented code may include the following:

Statement1;
Statement2;
modifyAvatar( );
Statement3;
Statement4;

In the above sample code, instrumented call to Modification Interface's 130 function such as modifyAvatar( ), modifyApplication( ), etc. can be placed before or after any statement of Avatar 605 and/or Application Program 18 such as after Statement2. A similar call to Modification Interface's 130 function that modifies Avatar 605 and/or Application Program 18 can be placed before or after some or all functions/routines/subroutines, some or all lines of code, some or all statements, some or all instructions or instruction sets, some or all basic blocks, and/or some or all other code segments of Avatar 605 and/or Application Program 18. One or more calls to functions that modify Avatar 605 and/or Application Program 18 can be placed anywhere in Avatar's 605 and/or Application Program's 18 code and can be executed at any points in Avatar's 605 and/or Application Program's 18 execution. A function that modifies Avatar 605 and/or Application Program 18 may include Artificial Intelligence Unit 110-determined anticipatory Instruction Sets 526 to be used or executed in Avatar's 605 and/or Application Program's 18 autonomous operation. In some embodiments, the previously described obtaining Avatar's 605 and/or Application Program's 18 instruction sets, data, and/or other information as well as modifying execution and/or functionality of Avatar 605 and/or Application Program 18 can be implemented in a single function that performs both tasks such as traceAndModifyAvatar( ), traceAndModifyApplication( ), etc.

In some embodiments, various computing systems and/or platforms may provide native tools for modifying execution and/or functionality of Avatar 605, Application Program 18, Processor 11, and/or other processing element. Independent vendors may provide tools with similar functionalities that can be utilized across different platforms. These tools enable a wide range of techniques or capabilities such as instrumentation, self-modifying code capabilities, dynamic code capabilities, branching, code rewriting, code overwriting, hot swapping, accessing and/or modifying objects or data structures, accessing and/or modifying functions/routines/subroutines, accessing and/or modifying variable or parameter values, accessing and/or modifying processor registers, accessing and/or modifying inputs and/or outputs, providing runtime memory access, and/or other capabilities. One of ordinary skill in art will understand that, while all possible variations of the techniques for modifying execution and/or functionality of Avatar 605, Application Program 18, Processor 11, and/or other processing element are too voluminous to describe, these techniques are within the scope of this disclosure.

In one example, modifying execution and/or functionality of Avatar 605 and/or Application Program 18 can be implemented through utilizing metaprogramming techniques, which include applications that can self-modify or that can create, modify, and/or manipulate other applications. Self-modifying code, dynamic code, reflection, and/or other techniques can be used to facilitate metaprogramming. In some aspects, metaprogramming is facilitated through a programming language's ability to access and manipulate the internals of the runtime engine directly or via an API. In other aspects, metaprogramming is facilitated through dynamic execution of expressions (i.e. anticipatory Instruction Sets 526, etc.) that can be created and/or executed at runtime. In yet other aspects, metaprogramming is facilitated through application modification tools, which can perform modifications on an application regardless of whether the application's programming language enables metaprogramming capabilities. Some operating systems may protect an application loaded into memory by restricting access to the loaded application. This protection mechanism can be circumvented by utilizing operating system's, processor's, and/or other low level features or commands to unprotect the loaded application. For example, a self-modifying application may modify the in-memory image of itself. To do so, the application can obtain the in-memory address of its code. The application may then change the operating system's or platform's protection on this memory range allowing it to modify the code (i.e. insert anticipatory Instruction Sets 526, etc.). In addition to a self-modifying application, one application can utilize similar technique to modify another application. Linux mprotect command or similar commands of other operating systems can be used to change protection (i.e. unprotect, etc.) for a region of memory, for example. Other platforms, tools, and/or techniques may provide equivalent or similar functionalities as the above described ones.

In a further example, modifying execution and/or functionality of Avatar 605 and/or Application Program 18 can be implemented through native capabilities of dynamic, interpreted, and/or scripting programming languages and/or platforms. Most of these languages and/or platforms can perform functionalities at runtime that static programming languages may perform during compilation. Dynamic, interpreted, and/or scripting languages provide native functionalities such as self-modification of code, dynamic code, extending the application, adding new code, extending objects and definitions, and/or other functionalities that can modify an application's execution and/or functionality at runtime. Examples of dynamic, interpreted, and/or scripting languages include Lisp, Perl, PHP, JavaScript, Ruby, Python, Smalltalk, Tcl, VBScript, and/or others. Similar functionalities can also be provided in languages such as Java, C, and/or others using reflection. Reflection includes the ability of an application to examine and modify the structure and behavior of the application at runtime. For example, JavaScript can modify its own code as it runs by utilizing Function object constructor as follows:

myFunc=new Function(arg1, arg2, argN, functionBody);

The sample code above causes a new function object to be created with the specified arguments and body. The body and/or arguments of the new function object may include new instruction sets (i.e. anticipatory Instruction Sets 526, etc.). The new function can be invoked as any other function in the original code. In another example, JavaScript can utilize eval method that accepts a string of JavaScript statements (i.e. anticipatory Instruction Sets 526, etc.) and execute them as if they were within the original code. An example of how eval method can be used to modify an application includes the following JavaScript code:

anticipatoryInstr='Avatar.moveForward(14);';
if (anticipatoryInstr !=anticipatoryInstr !=null)
{
    eval(anticipatoryInstr);
}

In the sample code above, Artificial Intelligence Unit 110 may generate anticipatory Instruction Set 526 (i.e. 'Avatar.moveForward(14)' for moving Avatar 605 forward 14 units, etc.) and save it in anticipatoryInstr variable, which eval method can then execute. Lisp is another example of dynamic, interpreted, and/or scripting language that includes similar capabilities as the aforementioned JavaScript. For example, Lisp's compile command can create a function at runtime, eval command may parse and evaluate an expression at runtime, and exec command may execute a given instruction set (i.e. string, etc.) at runtime. In another example, dynamic as well as some non-dynamic languages may provide macros, which combine code introspection and/or eval capabilities. In some aspects, macros can access inner workings of the compiler, interpreter, virtual machine, runtime environment/engine, and/or other components of the computing platform enabling the definition of language-like constructs and/or generation of a complete program or sections thereof. Other platforms, tools, and/or techniques may provide equivalent or similar functionalities as the above described ones.

In a further example, modifying execution and/or functionality of Avatar 605 and/or Application Program 18 can be implemented through dynamic code, dynamic class loading, reflection, and/or other functionalities of a programming language or platform. In static applications or static programming, a class can be defined and/or loaded at compile time. Conversely, in dynamic applications or dynamic programming, a class can be loaded into a running environment at runtime. For example, Java Runtime Environment (JRE) may not require that all classes be loaded at compile time and class loading can occur when a class is first referenced at runtime. Dynamic class loading enables inclusion or injection of on-demand code and/or functionalities at runtime. System provided or custom class loaders may enable loading of classes into the running environment. Custom class loaders can be created to enable custom functionalities such as, for example, specifying a remote location from which a class can be loaded. In addition to dynamic loading of a pre-defined class, a class can also be created at runtime. In some aspects, a class source code can be created at runtime. A compiler such asjavac, com.sun.tools.javac. Main, javax.tools, javax.tools.JavaCompiler, and/or other packages can then be utilized to compile the source code. Javac, com.sun.tools.javac.Main, javax.tools, javax.tools.JavaCompiler, and/or other packages may include an interface to invoke Java compiler from within a running application. A Java compiler may accept source code in a file, string, object (i.e. Java String, StringBuffer, CharSequence, etc.) and/or other source, and may generate Java bytecode (i.e. class file, etc.). Once compiled, a class loader can then load the compiled class into the running environment. In other aspects, a tool such as Javaassist (i.e. Java programming assistant) can be utilized to enable an application to create or modify a class at runtime. Javassist may include a Java library that provides functionalities to create and/or manipulate Java bytecode of an application as well as reflection capabilities. Javassist may provide source-level and bytecode-level APIs. Using the source-level API, a class can be created and/or modified using only source code, which Javassist may compile seamlessly on the fly. Javassist source-level API can therefore be used without knowledge of Java bytecode specification. Bytecode-level API enables creating and/or editing a class bytecode directly. In yet other aspects, similar functionalities to the aforementioned ones may be provided in tools such as Apache Commons BCEL (Byte Code Engineering Library), ObjectWeb ASM, CGLIB (Byte Code Generation Library), and/or others. Once a dynamic code or class is created and loaded, reflection in high-level programming languages such as Java and/or others can be used to manipulate or change the runtime behavior of an application. Examples of reflective programming languages and/or platforms include Java, JavaScript, Smalltalk, Lisp, Python, .NET Common Language Runtime (CLR), Tcl, Ruby, Perl, PHP, Scheme, PL/SQL, and/or others. Reflection can be used in an application to access, examine, modify, and/or manipulate a loaded class and/or its elements. Reflection in Java can be implemented by utilizing a reflection API such as java.lang.Reflect package. The reflection API provides functionalities such as, for example, loading or reloading a class, instantiating a new instance of a class, determining class and instance methods, invoking class and instance methods, accessing and manipulating a class, fields, methods and constructors, determining the modifiers for fields, methods, classes, and interfaces, and/or other functionalities. The above described dynamic code, dynamic class loading, reflection, and/or other functionalities are similarly provided in the .NET platform through its tools such as, for example, System.CodeDom.Compiler namespace, System.Reflection.Emit namespace, and/or other native or other .NET tools. Other platforms in addition to Java and .NET may provide similar tools and/or functionalities. In some designs, dynamic code, dynamic class loading, reflection, and/or other functionalities can be used to facilitate modification of an application by inserting or injecting instruction sets (i.e. anticipatory Instruction Sets 526, etc.) into a running application. For example, an existing or dynamically created class comprising ACAAO Unit 100 functionalities can be loaded into a running application through manual, automatic, or dynamic instrumentation. Once the class is created and loaded, an instance of ACAAO Unit 100 class may be constructed. The instance of ACAAO Unit 100 can then take or exert control of the application and/or implement alternate instruction sets (i.e. anticipatory Instruction Sets 526, etc.) at any point in the application's execution. Other platforms, tools, and/or techniques may provide equivalent or similar functionalities as the above described ones.

In a further example, modifying execution and/or functionality of Avatar 605 and/or Application Program 18 can be implemented through independent tools that can be utilized across different platforms. Such tools provide instrumentation and/or other capabilities on more than one platform or computing system and may facilitate application modification or insertion of instruction sets (i.e. anticipatory Instruction Sets 526, etc.). Examples of these tools include Pin, DynamoRIO, DynInst, Kprobes, KernInst, OpenPAT, DTrace, SystemTap, and/or others. In some aspects, Pin and/or any of its elements, methods, and/or techniques can be utilized for dynamic instrumentation. Pin can perform instrumentation by taking control of an application after it loads into memory. Pin may insert itself into the address space of an executing application enabling it to take control. Pin JIT compiler can then compile and implement alternate code (i.e. anticipatory Instruction Sets 526, etc.). Pin provides an extensive API for instrumentation at several abstraction levels. Pin supports two modes of instrumentation, JIT mode and probe mode. JIT mode uses a just-in-time compiler to insert instrumentation and recompile program code while probe mode uses code trampolines for instrumentation. Pin was designed for architecture and operating system independence. In other aspects, KernInst and/or any of its elements, methods, and/or techniques can be utilized for dynamic instrumentation. KernInst includes an instrumentation framework designed for dynamically inserting code into a running kernel of an operating system. KernInst implements probe-based dynamic instrumentation where code can be inserted, changed, and/or removed at will. Kerninst API enables client tools to construct their own tools for dynamic kernel instrumentation to suit variety of purposes such as insertion of alternate instruction sets (i.e. anticipatory Instruction Sets 526, etc.). Client tools can communicate with KernInst over a network (i.e. internet, wireless network, LAW, WAN, etc). Other platforms, tools, and/or techniques may provide equivalent or similar functionalities as the above described ones.

In a further example, modifying execution and/or functionality of Avatar 605 and/or Application Program 18 can be implemented through utilizing operating system's native tools or capabilities such as Unix ptrace command. Ptrace includes a system call that may enable one process to control another allowing the controller to inspect and manipulate the internal state of its target. Ptrace can be used to modify a running application such as modify an application with alternate instruction sets (i.e. anticipatory Instruction Sets 526, etc.). By attaching to an application using the ptrace call, the controlling application can gain extensive control over the operation of its target. This may include manipulation of its instruction sets, execution path, file descriptors, memory, registers, and/or other components. Ptrace can single-step through the target's code, observe and intercept system calls and their results, manipulate the target's signal handlers, receive and send signals on the target's behalf, and/or perform other operations within the target application. Ptrace's ability to write into the target application's memory space enables the controller to modify the running code of the target application. Other platforms, tools, and/or techniques may provide equivalent or similar functionalities as the above described ones.

In a further example, modifying execution and/or functionality of Avatar 605 and/or Application Program 18 can be implemented through utilizing just-in-time (JIT) compiling. JIT compilation (also known as dynamic translation, dynamic compilation, etc.) includes compilation performed during an application's execution (i.e. runtime, etc.). A code can be compiled when it is about to be executed, and it may be cached and reused later without the need for additional compilation. In some aspects, a JIT compiler can convert source code or byte code into machine code. In other aspects, a JIT compiler can convert source code into byte code. JIT compiling may be performed directly in memory. For example, JIT compiler can output machine code directly into memory and immediately execute it. Platforms such as Java, .NET, and/or others may implement JIT compilation as their native functionality. Platform independent tools for custom system design may include JIT compilation functionalities as well. In some aspects, JIT compilation includes redirecting application's execution to a JIT compiler from a specific entry point. For example, Pin can insert its JIT compiler into the address space of an application. Once execution is redirected to it, JIT compiler may receive alternate instruction sets (i.e. anticipatory Instruction Sets 526, etc.) immediately before their compilation. The JIT compiled instruction sets may be stored in memory or another repository from where they can be retrieved and executed. Alternatively, for example, JIT compiler can create a copy of the original application code or a segment thereof and insert alternate code (i.e. anticipatory Instruction Sets 526, etc.) before compiling the modified code copy. In some aspects, JIT compiler may include a specialized memory such as fast cache memory dedicated to JIT compiler functionalities from which the modified code can be fetched rapidly. JIT compilation and/or any compilation in general may include compilation, interpretation, or other translation into machine code, bytecode, and/or other formats or types of code. Other platforms, tools, and/or techniques may provide equivalent or similar functionalities as the above described ones.

In a further example, modifying execution and/or functionality of Avatar 605 and/or Application Program 18 can be implemented through dynamic recompilation. Dynamic recompilation includes recompiling an application or part thereof during execution. An application can be modified with alternate features or instruction sets that may take effect after recompilation. Dynamic recompilation may be practical in various types of applications including object oriented, event driven, forms based, and/or other applications. In a typical windows-based application, most of the action after initial startup occurs in response to user or system events such as moving the mouse, selecting a menu option, typing text, running a scheduled task, making a network connection, and/or other events when an event handler is called to perform an operation appropriate for the event. Generally, when no events are being generated, the application is idle. For example, when an event occurs and an appropriate event handler is called, instrumentation can be implemented in the application's source code to insert alternate instruction sets (i.e. anticipatory Instruction Sets 526, etc.) at which point the modified source code can be recompiled and/or executed. In some aspects, the state of the application can be saved before recompiling its modified source code so that the application may continue from its prior state. Saving the application's state can be achieved by saving its variables, data structures, objects, location of its current instruction, and/or other necessary information in environmental variables, memory, or other repositories where they can be accessed once the application is recompiled. In other aspects, application's variables, data structures, objects, address of its current instruction, and/or other necessary information can be saved in a repository such as file, database, or other repository accessible to the application after recompilation of its source code. Other platforms, tools, and/or techniques may provide equivalent or similar functionalities as the above described ones.

In a further example, modifying execution and/or functionality of Avatar 605 and/or Application Program 18 can be implemented through modifying or redirecting application's execution path. Generally, an application can be loaded into memory and the flow of execution proceeds from one instruction set to the next until the end of the application. An application may include a branching mechanism that can be driven by keyboard or other input devices, system events, and/or other computing system components or events that may impact the execution path. The execution path can also be altered by an external application through acquiring control of execution and/or redirecting execution to a function, routine/subroutine, or an alternate code segment at any point in the application's execution. A branch, jump, or other mechanism can be utilized to implement the redirected execution. For example, a jump instruction can be inserted at a specific point in an application's execution to redirect execution to an alternate code segment. A jump instruction set may include, for example, an unconditional branch, which always results in branching, or a conditional branch, which may or may not result in branching depending on a condition. When executing an application, a computer may fetch and execute instruction sets in sequence until it encounters a branch instruction set. If the instruction set is an unconditional branch, or it is conditional and the condition is satisfied, the computer may fetch its next instruction set from a different instruction set sequence or code segment as specified by the branch instruction set. After the execution of the alternate code segment, control may be redirected back to the original jump point or to another point in the application. For example, modifying an application can be implemented by redirecting execution of an application to alternate instruction sets (i.e. anticipatory Instruction Sets 526, etc.). Alternate instruction sets can be pre-compiled, pre-interpreted, or otherwise pre-translated and ready for execution. Alternate instruction sets can also be JIT compiled, JIT interpreted, or otherwise JIT translated before execution. Other platforms, tools, and/or techniques may provide equivalent or similar functionalities as the above described ones.

In a further example, modifying execution and/or functionality of Avatar 605 and/or Application Program 18 can be implemented through assembly language. Assembly language instructions may be directly related with the architecture's machine instructions as previously described. Assembly language can, therefore, be a powerful tool for implementing direct hardware (i.e. processor registers, memory, etc.) access and manipulations as well as access and manipulations of specialized processor features or instructions. Assembly language can also be a powerful tool for implementing low-level embedded systems, real-time systems, interrupt handlers, self or dynamically modifying code, and/or other applications. Specifically, for instance, self or dynamically modifying code that can be used to facilitate modifying of an application can be seamlessly implemented using assembly language. For example, using assembly language, instruction sets can be dynamically created and loaded into memory similar to the ones that a compiler may generate. Furthermore, using assembly language, memory space of a loaded application can be accessed to modify (including rewrite, overwrite, etc.) original instruction sets or to insert jumps or branches to alternate code elsewhere in memory. Some operating systems may implement protection from changes to applications loaded into memory. Operating system's, processor's, or other low level features or commands can be used to unprotect the protected locations in memory before the change as previously described. Alternatively, a pointer that may reside in a memory location where it could be readily altered can be utilized where the pointer may reference alternate code. In one example, assembly language can be utilized to write alternate code (i.e. anticipatory Instruction Sets 526, etc.) into a location in memory outside a running application's memory space. Assembly language can then be utilized to redirect the application's execution to the alternate code by inserting a jump or branch into the application's in-memory code, by redirecting program counter, or by other technique. In another example, assembly language can be utilized to overwrite or rewrite the entire or part of an application's in-memory code with alternate code. In some aspects, high-level programming languages can call an external assembly language program to facilitate application modification as previously described. In yet other aspects, relatively low-level programming languages such as C may allow embedding assembly language directly in their source code such as, for example, using asm keyword of C. Other platforms, tools, and/or techniques may provide equivalent or similar functionalities as the above described ones.

In a further example, modifying execution and/or functionality of Avatar 605 and/or Application Program 18 can be implemented through binary rewriting. Binary rewriting tools and/or techniques may modify an application's executable. In some aspects, modification can be minor such as in the case of optimization where the original executable's functionality is kept. In other aspects, modification may change the application's functionality such as by inserting alternate code (i.e. anticipatory Instruction Sets 526, etc.). Examples of binary rewriting tools include SecondWrite, ATOM, DynamoRIO, Purify, Pin, EEL, DynInst, PLTO, and/or others. Binary rewriting may include disassembly, analysis, and/or modification of target application. Since binary rewriting works directly on machine code executable, it is independent of source language, compiler, virtual machine (if one is utilized), and/or other higher level abstraction layers. Also, binary rewriting tools can perform application modifications without access to original source code. Binary rewriting tools include static rewriters, dynamic rewriters, minimally-invasive rewriters, and/or others. Static binary rewriters can modify an executable when the executable is not in use (i.e. not running). The rewritten executable may then be executed including any new or modified functionality. Dynamic binary rewriters can modify an executable during its execution, thereby enabling modification of an application's functionality at runtime. In some aspects, dynamic rewriters can be used for instrumentation or selective modifications such as insertion of alternate code (i.e. anticipatory Instruction Sets 526, etc.), and/or for other runtime transformations or modifications. For example, some dynamic rewriters can be configured to intercept an application's execution at indirect control transfers and insert instrumentation or other application modifying code. Minimally-invasive rewriters may keep the original machine code to the greatest extent possible. They support limited modifications such as insertion of jumps into and out of instrumented code. Other platforms, tools, and/or techniques may provide equivalent or similar functionalities as the above described ones.

Figure 29:
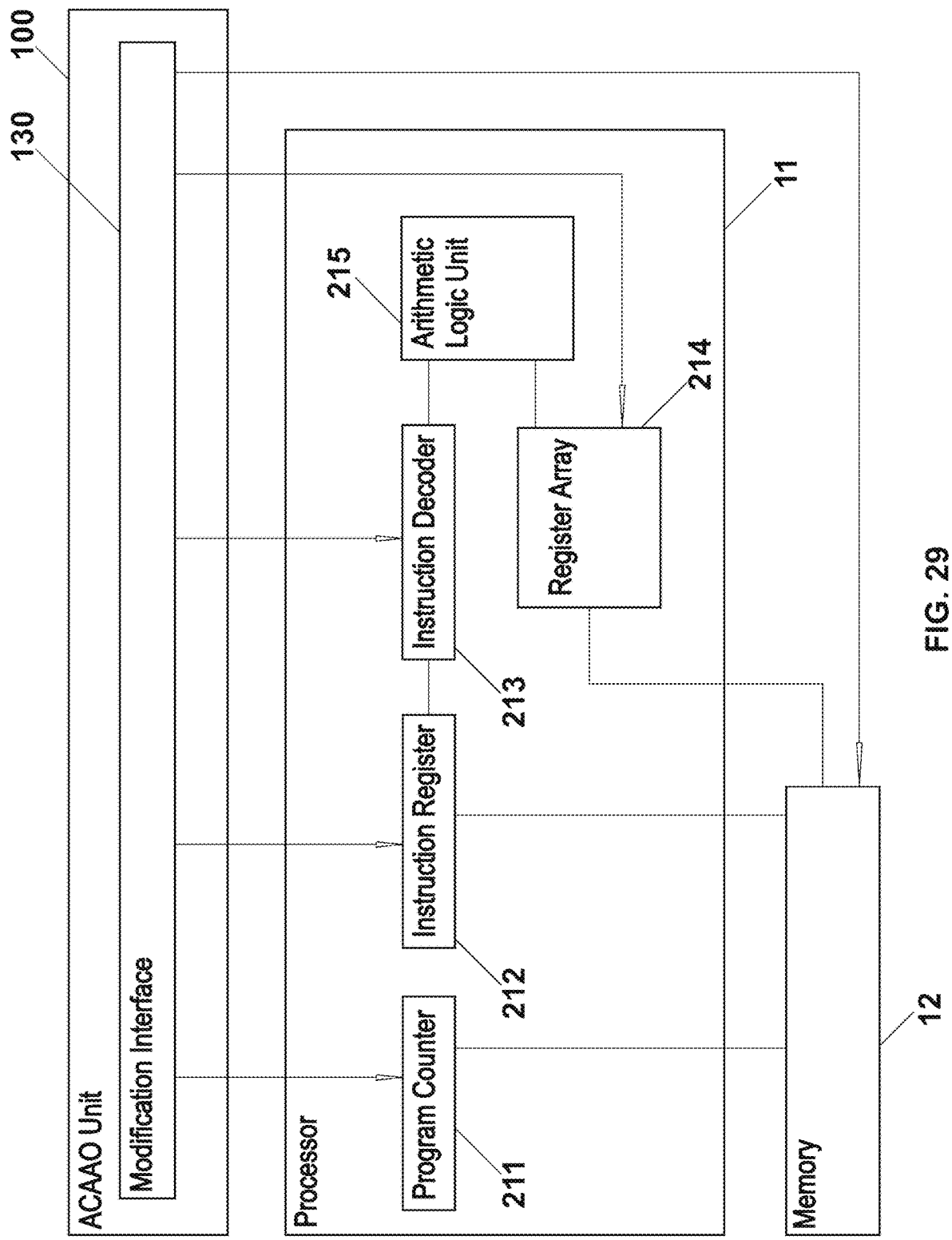
FIG. 29 illustrates some embodiments of modifying execution and/or functionality of Avatar 605 and/or Application Program 18 through modification of Processor 11 registers, memory, or other computing system components.

Referring to FIG. 29, in a further example, modifying execution and/or functionality of Avatar 605 and/or Application Program 18 can be implemented through modification of processor registers, memory, or other computing system components. In some aspects, modifying execution and/or functionality of Processor 11 can be implemented by redirecting Processor's 11 execution to alternate instruction sets (i.e. anticipatory Instruction Sets 526, etc.). In one example, Program Counter 211 may hold or point to a memory address of the next instruction set that will be executed by Processor 11. Artificial Intelligence Unit 110 may generate anticipatory Instruction Sets 526 and store them in Memory 12 as previously described. Modification Interface 130 may then change Program Counter 211 to point to the location in Memory 12 where anticipatory Instruction Sets 526 are stored. The anticipatory Instruction Sets 526 can then be fetched from the location in Memory 12 pointed to by the modified Program Counter 211 and loaded into Instruction Register 212 for decoding and execution. Once anticipatory Instruction Sets 526 are executed, Modification Interface 130 may change Program Counter 211 to point to the last instruction set before the redirection or to any other instruction set. In other aspects, anticipatory Instruction Sets 526 can be loaded directly into Instruction Register 212. As previously described, examples of other processor or computing system components that can be used during an instruction cycle include memory address register (MAR), memory data register (MDR), data registers, address registers, general purpose registers (GPRs), conditional registers, floating point registers (FPRs), constant registers, special purpose registers, machine-specific registers, Register Array 214, Arithmetic Logic Unit 215, control unit, and/or other circuits or components. Any of the aforementioned processor registers, memory, or other computing system components can be accessed and/or modified to facilitate the disclosed functionalities. In some embodiments, processor interrupt may be issued to facilitate such access and/or modification. In some designs, modifying execution and/or functionality of Processor 11 can be implemented in a program, combination of programs and hardware, or purely hardware system. Dedicated hardware may be built to perform modifying execution and/or functionality of Processor 11 with marginal or no impact to computing overhead. Other platforms, tools, and/or techniques may provide equivalent or similar functionalities as the above described ones.

Other additional techniques or elements can be utilized as needed for modifying execution and/or functionality of Avatar 605, Application Program 18, Processor 11, and/or other processing elements, or some of the disclosed techniques or elements can be excluded, or a combination thereof can be utilized in alternate embodiments. As an avatar (i.e. Avatar 605, etc.) may be part of an application (i.e. Application Program 18, etc.), it should be noted that modifying execution and/or functionality of an avatar may include same or similar techniques as the aforementioned modifying execution and/or functionality of an application, and vice versa.

Figure 30:
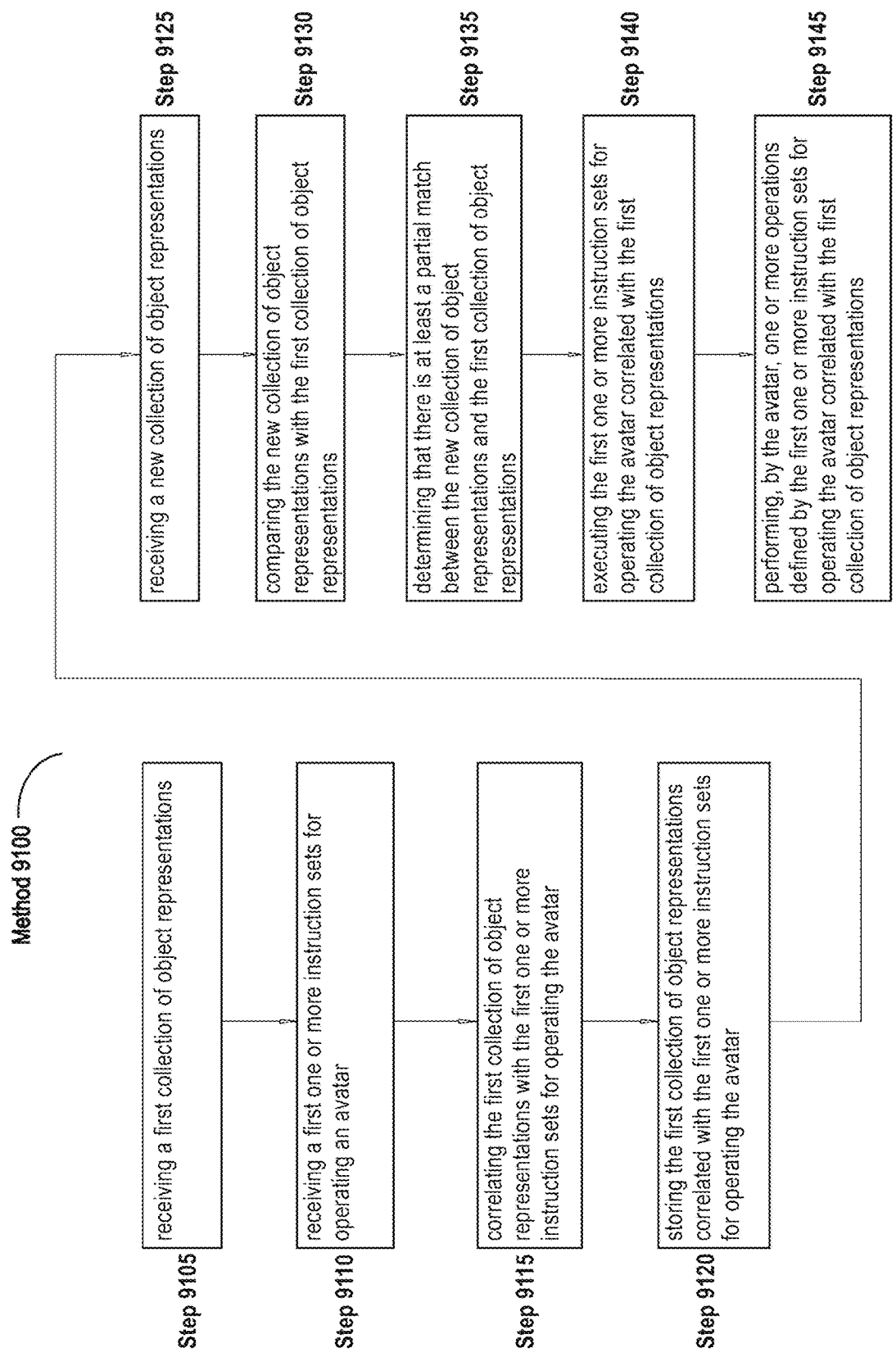
FIG. 30 illustrates a flow chart diagram of an embodiment of method 9100 for learning and/or using an avatar's circumstances for autonomous avatar operation.

Referring to FIG. 30, the illustration shows an embodiment of a method 9100 for learning and/or using an avatar's circumstances for autonomous avatar operation. In some aspects, the method can be used on a computing device or system to enable learning of an avatar's operation in circumstances including objects with various properties and enable autonomous avatar operation in similar circumstances. Method 9100 may include any action or operation of any of the disclosed methods such as method 9200, 9300, 9400, 9500, 9600, and/or others. Additional steps, actions, or operations can be included as needed, or some of the disclosed ones can be optionally omitted, or a different combination or order thereof can be implemented in alternate embodiments of method 9100.

At step 9105, a first collection of object representations is received. A collection of object representations (i.e. Collection of Object Representations 525, etc.) may include one or more object representations (i.e. Object Representations 625, etc.), object properties (i.e. Object Properties 630, etc.), and/or other elements or information. In some designs, an object representation includes a representation of an object (i.e. Object 615, etc.) in an avatar's (i.e. Avatar's 605, etc.) surrounding within an application (i.e. Application Program 18, etc.). In other designs, an object representation includes a representation of an object of an application. As such, an object representation may include any information related to an object. In further designs, an object representation may include or be replaced with an object itself, in which case the object representation as an element can be optionally omitted. In some embodiments, a collection of object representations may include one or more object representations, object properties, and/or other elements or information obtained in an avatar's surrounding at a particular time. A collection of object representations may, therefore, include knowledge (i.e. unit of knowledge, etc.) of an avatar's circumstances including objects with various properties at a particular time. In other embodiments, where an application does not comprise an avatar or rely on an avatar for its operation, a collection of object representations may include one or more object representations, object properties, and/or other elements or information obtained in an application or part thereof at a particular time. A collection of object representations may, therefore, include knowledge (i.e. unit of knowledge, etc.) of an application's circumstances including objects with various properties at a particular time. In some designs, a collection of object representations may include or be associated with a time stamp (not shown), order (not shown), or other time related information. In further embodiments, a collection of object representations may include or be substituted with a stream of collections of object representations, and vice versa. Therefore, the terms collection of object representations and stream of collections of object representations may be used interchangeably depending on context. A stream of collections of object representations may include one collection of object representations or a group, sequence, or other plurality of collections of object representations. In some aspects, a stream of collections of object representations may include one or more collections of object representations, and/or other elements or information obtained in an avatar's surrounding over time. A stream of collections of object representations may, therefore, include knowledge (i.e. unit of knowledge, etc.) of an avatar's circumstances including objects with various properties over time. As circumstances including objects with various properties in an avatar's surrounding change (i.e. objects and/or their properties change, move, act, transform, etc.) over time, this change may be captured in a stream of collections of object representations. In further embodiments, where an application does not comprise an avatar or rely on an avatar for its operation, a stream of collections of object representations may include one or more collections of object representations, and/or other elements or information obtained in an application or part thereof over time. A stream of collections of object representations may, therefore, include knowledge (i.e. unit of knowledge, etc.) of an application's circumstances including objects with various properties over time. In some designs, each collection of object representations in a stream may include or be associated with the aforementioned time stamp, order, or other time related information. Examples of objects include models of a person, animal, tree, rock, building, vehicle, and/or others in a context of a computer game, virtual world, 3D or 2D graphics application, and/or others. More generally, examples of objects include a 2D model, a 3D model, a 2D shape (i.e. point, line, square, rectangle, circle, triangle, etc.), a 3D shape (i.e. cube, sphere, etc.), a graphical user interface (GUI) element, a form element (i.e. text field, radio button, push button, check box, etc.), a data or database element, a spreadsheet element, a link, a picture, a text (i.e. character, word, etc.), a number, and/or others in a context of a web browser, a media application, a word processing application, a spreadsheet application, a database application, a forms-based application, an operating system, a device/system control application, and/or others. In some aspects, any part of an object can be identified as an object itself. For instance, instead of or in addition to identifying a building as an object, a window, door, roof, and/or other parts of the building can be identified as objects. In general, an object may include any object or part thereof that can be obtained or recognized. Examples of object properties include existence of an object, type of an object (i.e. person, animal, tree, rock, building, vehicle, etc.), identity of an object (i.e. name, identifier, etc.), distance of an object, bearing/angle of an object, location of an object (i.e. distance and bearing/angle from a known point, coordinates, etc.), shape/size of an object (i.e. scale, height, width, depth, computer model, etc.), activity of an object (i.e. motion, gestures, etc.), and/or other properties of an object. In general, an object property may include any attribute of an object (i.e. existence of an object, type of an object, identity of an object, shape/size of an object, etc.), any relationship of an object with an avatar, other objects, or the environment (i.e. distance of an object, bearing/angle of an object, friend/foe relationship, etc.), and/or other information related to an object. In some designs, objects and/or their properties can be obtained from an engine, environment, or other system used to implement an application. For instance, objects and/or their properties can be obtained by utilizing functions for providing properties or other information on objects of an engine, environment, or other system used to implement an application. Examples of such engines, environments, or other systems include Unity 3D Engine, Unreal Engine, Torque 3D Engine, and/or others. In other designs, objects and/or their properties can be obtained by accessing and/or reading a scene graph or other data structure used for organizing objects in a particular application, or in an engine, environment, or other system used to implement an application. In other designs, objects and/or their properties can be detected or recognized from one or more pictures depicting views of an avatar's surrounding or views of an application. Any picture recognition techniques (i.e. Picture Recognizer 92, etc.) can be used for such detection or recognizing. The one or more pictures depicting views of an avatar's surrounding or views of an application can be rendered or generated by a picture renderer (i.e. Picture Renderer 91, etc.). In further designs, objects and/or their properties can be detected or recognized from one or more sounds from an avatar's surrounding or one or more sounds of an application. Any sound recognition techniques (i.e. Sound Recognizer 97, etc.) can be used for such detection or recognizing. The one or more sounds from an avatar's surrounding or one or more sounds of an application can be rendered or generated by a sound renderer (i.e. Sound Renderer 96, etc.). Receiving comprises any action or operation by or for an Object 615, Collection of Object Representations 525, stream of Collections of Object Representations 525, Object Representation 625, Object Property 630, Object Processing Unit 140, Picture Renderer 91, Sound Renderer 96, Picture Recognizer 92, Sound Recognizer 97, and/or other disclosed elements.

At step 9110, a first one or more instruction sets for operating an avatar are received. In some aspects, an instruction set (i.e. Instruction Set 526, etc.) may be used or executed for operating an avatar (i.e. Avatar 605, etc.) of an application (i.e. Application Program 18, etc.). In other aspects, where an application does not comprise an avatar or rely on an avatar for its operation, an instruction set may be used or executed for operating the application. Therefore, a reference to an instruction set for operating an avatar includes or can be substituted with a reference to an instruction set for operating an application depending on context. In some embodiments, an instruction set can be used or executed by a processor (i.e. Processor 11, etc.) in operating an avatar and/or application. Operating an avatar and/or application includes performing or causing any operations on/by/with the avatar and/or application. In some designs, an instruction set can be received from an avatar, application, processor, and/or other processing element as the instruction set is being used or executed. In other designs, an instruction set can be received from an avatar, application, processor, and/or other processing element before or after the instruction set is used or executed. In further designs, an instruction set can be received from a running avatar, running application, running processor, and/or other running processing element. As such, an instruction set can be received at runtime. In some embodiments, receiving an instruction set includes tracing or profiling an avatar, application, processor, and/other processing elements. Tracing or profiling may include adding trace code or instrumentation to an avatar (i.e. avatar's object code, etc.) or application, and/or outputting trace information (i.e. instruction sets, etc.) to a receiving target. In some aspects, instrumentation can be performed in source code, bytecode, compiled code, interpreted code, translated code, machine code, and/or other code. In other aspects, instrumentation can be performed in various elements of a computing system such as memory, virtual machine, runtime engine/environment, operating system, compiler, interpreter, translator, processor registers, and/or other elements. In yet other aspects, instrumentation can be performed in various abstraction layers of a computing system such as in software layer (i.e. application, etc.), in virtual machine (if VM is used), in operating system, in processor, and/or in other layers or areas that may exist in a particular computing system implementation. In yet other aspects, instrumentation can be performed at various times in an avatar's or application's execution such as source code write time, compile time, interpretation time, translation time, linking time, loading time, runtime, and/or others. In yet other aspects, instrumentation can be performed at various granularities or code segments such as some or all lines of code, some or all statements, some or all instructions or instruction sets, some or all basic blocks, some or all functions/routines/subroutines, and/or some or all other code segments. In yet other aspects, instrumentation may include a manual, automatic, dynamic, or just-in-time (JIT) instrumentation. In general, any instrumentation technique can be utilized. In further embodiments, receiving an instruction set includes attaching to or interfacing with an avatar, application, processor, and/or other processing element. In further embodiments, receiving an instruction set includes accessing and/or reading runtime engine/environment, virtual machine, operating system, compiler, interpreter, translator, execution stack, file, object, data structure, and/or other computing system elements. In further embodiments, receiving an instruction set includes accessing and/or reading memory, storage, and/or other repository. In further embodiments, receiving an instruction set includes accessing and/or reading processor registers and/or other processor elements. In further embodiments, receiving an instruction set includes accessing and/or reading inputs and/or outputs of an avatar, application, processor, and/or other processing element. In further embodiments, receiving an instruction set includes accessing and/or reading functions, methods, procedures, routines, subroutines, and/or other elements of an avatar and/or application. In further embodiments, receiving an instruction set includes accessing and/or reading source code, bytecode, compiled code, interpreted code, translated code, machine code, and/or other code. In further embodiments, receiving an instruction set includes accessing and/or reading values, variables, parameters, and/or other data or information. One or more instruction sets may temporally correspond to a collection of object representations. In general, one or more instruction sets that temporally correspond to a collection of object representations enable structuring knowledge of an avatar's and/or application's operation at or around the time of generating the collection of object representations. Such functionality enables spontaneous or seamless learning of an avatar's and/or application's operation in circumstances including objects with various properties as the avatar and/or application are operated in real time. Receiving comprises any action or operation by or for an Acquisition Interface 120, Instruction Set 526, and/or other disclosed elements.

At step 9115, the first collection of object representations is correlated with the first one or more instruction sets for operating the avatar. In some aspects, individual collections of object representations can be correlated with one or more instruction sets. In other aspects, streams of collections of object representations can be correlated with one or more instruction sets. In further aspects, individual collections of object representations or streams of collections of object representations can be correlated with the aforementioned temporally corresponding instruction sets. In further aspects, a collection of object representations or stream of collections of object representations may not be correlated with any instruction sets. Correlating may include structuring or generating a knowledge cell (i.e. Knowledge Cell 800, etc.) and storing one or more collections of object representations correlated with any instruction sets into the knowledge cell. Therefore, a knowledge cell may include any data structure or arrangement that can facilitate such storing. A knowledge cell includes knowledge (i.e. unit of knowledge, etc.) of how an avatar and/or application operated in a circumstance including objects with various properties. In some designs, extra information (i.e. Extra Info 527, etc.) can optionally be used to facilitate enhanced comparisons or decision making in autonomous avatar and/or application operation where applicable. Therefore, any collection of object representations, instruction set, and/or other element may include or be correlated with extra information. Extra information may include any information useful in comparisons or decision making performed in autonomous avatar and/or application operation. Examples of extra information include time information, location information, computed information, visual information, acoustic information, contextual information, and/or other information. Correlating can be omitted where learning of an avatar's and/or application's operation in circumstances including objects with various properties is not implemented. Correlating comprises any action or operation by or for a Knowledge Structuring Unit 520, Knowledge Cell 800, and/or other disclosed elements.

At step 9120, the first collection of object representations correlated with the first one or more instruction sets for operating the avatar are stored. A collection of object representations correlated with one or more instruction sets may be part of a stored plurality of collections of object representations correlated with one or more instruction sets. Collections of object representations correlated with any instruction sets can be stored in a memory unit or other repository. The aforementioned knowledge cells comprising collections of object representations correlated with any instruction sets can be used in/as neurons, nodes, vertices, or other elements in any of the data structures or arrangements (i.e. neural network, graph, sequence, collection of knowledge cells, etc.) used for storing the knowledge of an avatar's and/or application's operation in circumstances including objects with various properties. Knowledge cells may be interconnected, interrelated, or interlinked into knowledge structures using statistical, artificial intelligence, machine learning, and/or other models or techniques. Such interconnected or interrelated knowledge cells can be used for enabling an avatar's and/or application's autonomous operation. The interconnected or interrelated knowledge cells may be stored or organized into a knowledgebase (i.e. Knowledgebase 530, etc.). In some embodiments, knowledgebase may be or include a neural network (i.e. Neural Network 530*a*, etc.). In other embodiments, knowledgebase may be or include a graph (i.e. Graph 530*b*, etc.). In further embodiments, knowledgebase may be or include a collection of sequences (i.e. Collection of Sequences 530*c*, etc.). In further embodiments, knowledgebase may be or include a sequence (i.e. Sequence 533, etc.). In further embodiments, knowledgebase may be or include a collection of knowledge cells (i.e. Collection of Knowledge Cells 530*d*, etc.). In general, knowledgebase may be or include any data structure or arrangement, and/or repository capable of storing the knowledge of an avatar's and/or application's operation in circumstances including objects with various properties. Knowledgebase may also include or be substituted with various artificial intelligence methods, systems, and/or models for knowledge structuring, storing, and/or representation such as deep learning, supervised learning, unsupervised learning, neural networks (i.e. convolutional neural network, recurrent neural network, deep neural network, etc.), search-based, logic and/or fuzzy logic-based, optimization-based, tree/graph/other data structure-based, hierarchical, symbolic and/or sub-symbolic, evolutionary, genetic, multi-agent, deterministic, probabilistic, statistical, and/or other methods, systems, and/or models. Storing can be omitted where learning of an avatar's and/or application's operation in circumstances including objects with various properties is not implemented. Storing comprises any action or operation by or for a Memory 12, Storage 27, Knowledgebase 530, Neural Network 530*a*, Graph 530*b*, Collection of Sequences 530*c*, Sequence 533, Collection of Knowledge Cells 530*d*, Knowledge Cell 800, Node 852, Connection 853, Layer 854, Similarity Comparison 125, and/or other disclosed elements.

At step 9125, a new collection of object representations is received. Step 9125 may include any action or operation described in Step 9105 as applicable.

At step 9130, the new collection of object representations is compared with the first collection of object representations. Comparing one collection of object representations with another collection of object representations may include comparing at least a portion of one collection of object representations with at least a portion of the other collection of object representations. In some embodiments, collections of object representations may be compared individually. In some aspects, comparing of individual collections of object representations may include comparing one or more object representations of one collection of object representations with one or more object representations of another collection of object representations. In other aspects, comparing of object representations may include comparing one or more object properties of one object representation with one or more object properties of another object representation. In some designs, one or more object properties in the same category (i.e. Category 635, etc.) can be compared. Comparing may include any techniques for comparing text, numbers, and/or other data. In further aspects, some object representations, object properties, and/or other elements of a collection of object representations can be omitted from comparison depending on implementation. In other embodiments, collections of object representations may be compared collectively as part of streams of collections of object representations. Collective comparing of collections of object representations may include any features, functionalities, and embodiments of the aforementioned individual comparing of collections of object representations. In some aspects, collective comparing of collections of object representations may include comparing one or more collections of object representations of one stream of collections of object representations with one or more collections of object representations of another stream of collections of object representations. In some designs, one or more corresponding (i.e. similarly ordered, temporally related, etc.) collections of object representations from the compared streams of collections of object representations can be compared. In other designs, Dynamic Time Warping (DTW) and/or other techniques can be utilized for comparison and/or aligning temporal sequences (i.e. streams of collections of object representations, etc.) that may vary in time or speed. In some aspects, some collections of object representations can be omitted from comparison depending on implementation. Any combination of the aforementioned and/or other elements or techniques can be utilized in alternate embodiments of the comparing. Comparing can be omitted where anticipating of an avatar's and/or application's operation in circumstances including objects with various properties is not implemented. Comparing comprises any action or operation by or for a Similarity Comparison 125, Decision-making Unit 540, and/or other disclosed elements.

At step 9135, a determination is made that there is at least a partial match between the new collection of object representations and the first collection of object representations. In some embodiments, determining at least a partial match between individually compared collections of object representations includes determining that a similarity between one or more portions of one collection of object representations and one or more portions of another collection of object representations exceeds a similarity threshold. In other embodiments, determining at least a partial match between individually compared collections of object representations includes determining at least a partial match between one or more portions of one collection of object representations and one or more portions of another collection of object representations. In further embodiments, determining at least a partial match between individually compared collections of object representations includes determining substantial similarity between one or more portions of one collection of object representations and one or more portions of another collection of object representations. A portion of a collection of object representations may include an object representation, an object property, and/or other portion or element of the collection of object representations. In further embodiments, determining at least a partial match between individually compared collections of object representations includes determining that the number or percentage of matching or substantially matching object representations of the compared collections of object representations exceeds a threshold number (i.e. 1, 2, 4, 7, 18, etc.) or threshold percentage (i.e. 41%, 62%, 79%, 85%, 93%, etc.). In some aspects, type of object representations, importance of object representations, and/or other elements or techniques relating to object representations can be utilized for determining similarity using object representations. In further aspects, some of the object representations can be omitted in determining similarity using object representations depending on implementation. In further embodiments, determining a match or substantial match between compared object representations includes determining that the number or percentage of matching or substantially matching object properties of the compared object representations exceeds a threshold number (i.e. 1, 2, 3, 6, 11, etc.) or a threshold percentage (i.e. 55%, 61%, 78%, 82%, 99%, etc.). In some aspects, categories of object properties, importance of object properties, and/or other elements or techniques relating to object properties can be utilized for determining similarity using object properties. In further aspects, some of the object properties can be omitted in determining similarity using object properties depending on implementation. In some designs, substantial similarity of individually compared collections of object representations can be achieved when a similarity between one or more portions of one collection of object representations and one or more portions of another collection of object representations exceeds a similarity threshold. In other designs, substantial similarity of individually compared collections of object representations can be achieved when the number or percentage of matching or substantially matching object representations of the compared collections of object representations exceeds a threshold number (i.e. 1, 2, 4, 7, 18, etc.) or threshold percentage (i.e. 41%, 62%, 79%, 85%, 93%, etc.). In further aspects, substantial similarity of compared object representations can be achieved when the number or percentage of matching or substantially matching object properties of the compared object representations exceeds a threshold number (i.e. 1, 2, 3, 6, 11, etc.) or a threshold percentage (i.e. 55%, 61%, 78%, 82%, 99%, etc.).

In some embodiments, determining at least a partial match between collectively compared collections of object representations (i.e. streams of collections of object representations, etc.) includes determining that the number or percentage of matching or substantially matching collections of object representations of the compared streams of collections of object representations exceeds a threshold number (i.e. 1, 2, 4, 9, 33, 138, etc.) or threshold percentage (i.e. 39%, 58%, 77%, 88%, 94%, etc.). In some aspects, importance of collections of object representations, order of collections of object representations, and/or other elements or techniques relating to collections of object representations can be utilized for determining similarity of collectively compared collections of object representations or streams of collections of object representations. In further aspects, some of the collections of object representations can be omitted in determining similarity of collectively compared collections of object representations or streams of collections of object representations depending on implementation. In some designs, a threshold for a number or percentage similarity can be used to determine a match or substantial match between any of the aforementioned elements. Any text, number, and/or other data similarity determination techniques can be used in any of the aforementioned similarity determinations. A partial match of any of the compared elements may include a substantially or otherwise similar match, and vice versa. Therefore, these terms may be used interchangeably herein depending on context. Although, substantial similarity or substantial match is frequently used herein, it should be understood that any level of similarity, however high or low, may be utilized as defined by the rules (i.e. thresholds, etc.) for similarity. Any combination of the aforementioned and/or other elements or techniques can be utilized in alternate embodiments. Determining can be omitted where anticipating of an avatar's and/or application's operation in circumstances including objects with various properties is not implemented. Determining comprises any action or operation by or for a Similarity Comparison 125, Decision-making Unit 540, and/or other disclosed elements.

At step 9140, the first one or more instruction sets for operating the avatar correlated with the first collection of object representations are executed. An instruction set can be executed by a processor and/or other processing element. Executing can be performed in response to the aforementioned determining. In some aspects, an instruction set anticipated or determined to be used for autonomous operating of an avatar of an application may be executed. In other aspects, where an application does not comprise an avatar or rely on an avatar for its operation, an instruction set anticipated or determined to be used for autonomous operating of an application may be executed. Therefore, a reference to an instruction set to be used or executed for autonomous operating of an avatar includes or can be substituted with a reference to an instruction set to be used or executed for autonomous operating of an application depending on context. In some aspects, instruction sets anticipated or determined to be used or executed in an avatar's and/or application's autonomous operation may be referred to as anticipatory instruction sets, alternate instruction sets, and/or other suitable name or reference. Therefore, these terms can be used interchangeably herein depending on context. Executing may include executing one or more alternate instruction sets (i.e. anticipatory instruction sets, etc.) instead of or prior to an instruction set that would have been executed in a regular course of execution. In some embodiments, executing may include modifying a register or other element of a processor with one or more alternate instruction sets. Executing may also include redirecting a processor to one or more alternate instruction sets. In further embodiments, a processor may run an application including instruction sets for operating an avatar and/or the application. In some aspects, executing includes executing one or more alternate instruction sets as part of the avatar and/or application. In other aspects, executing includes modifying the avatar and/or application with one or more alternate instruction sets. In further aspects, executing includes redirecting the avatar and/or application to one or more alternate instruction sets. In further aspects, executing includes modifying one or more instruction sets of the avatar and/or application. In further aspects, executing includes modifying the avatar's and/or application's source code, bytecode, intermediate code, compiled code, interpreted code, translated code, runtime code, assembly code, machine code, or other code. In further aspects, executing includes modifying memory, processor register, storage, repository, and/or other elements where the avatar's and/or application's instruction sets are stored or used. In further aspects, executing includes modifying the avatar and/or application at source code write time, compile time, interpretation time, translation time, linking time, loading time, runtime, or other time. In further aspects, executing includes modifying one or more of the avatar's and/or application's lines of code, statements, instructions, functions, routines, subroutines, basic blocks, or other code segments. In further aspects, executing includes a manual, automatic, dynamic, just in time (JIT), or other instrumentation of the avatar and/or application. In further aspects, executing includes utilizing a dynamic, interpreted, scripting, or other programming language. In further aspects, executing includes utilizing dynamic code, dynamic class loading, or reflection. In further aspects, executing includes utilizing assembly language. In further aspects, executing includes utilizing metaprogramming, self-modifying code, and/or a tool or technique for modifying the avatar and/or application. In further aspects, executing includes utilizing just in time (JIT) compiling, JIT interpretation, JIT translation, dynamic recompiling, or binary rewriting. In further aspects, executing includes utilizing dynamic expression creation, dynamic expression execution, dynamic function creation, or dynamic function execution. In further aspects, executing includes adding or inserting additional code into the avatar's and/or application's code. In further aspects, executing includes modifying, removing, rewriting, or overwriting the avatar's and/or application's code. In further aspects, executing includes branching, redirecting, extending, or hot swapping the avatar's and/or application's code. Branching or redirecting the avatar's and/or application's code may include inserting a branch, jump, or other means for redirecting the avatar's and/or application's execution. In further embodiments, executing includes modifying a virtual machine, a runtime engine, a compiler/interpreter/translator, an operating system, an execution stack, a storage, a memory, an input, and/or other elements of a computing system used in operating an avatar and/or application. Executing may be caused by ACAAO Unit 100, Artificial Intelligence Unit 110, Modification Interface 130, and/or other disclosed elements. Executing comprises any action or operation by or for a Processor 11, Application Program 18, Avatar 605, Modification Interface 130, and/or other disclosed elements.

At step 9145, one or more operations defined by the first one or more instruction sets for operating the avatar correlated with the first collection of object representations are performed by the avatar. The one or more operations may be performed in response to the aforementioned executing. In some aspects, an operation includes any operation that can be performed by/with/on an avatar. For example, an operation includes moving, maneuvering, jumping, running, shooting, selecting, and/or other operations in a context of a computer game, virtual world, 3D or 2D graphics application, and/or others. An operation of an avatar may include other operations in contexts of other applications. In further aspects, where an application does not comprise an avatar or rely on an avatar for its operation, an operation includes any operation that can be performed by/with/on an application and/or objects thereof. One of ordinary skill in art will recognize that, while all possible variations of operations by/with/on an avatar and/or application are too voluminous to list and limited only by the avatar's and/or application's design and/or user's utilization, other operations are within the scope of this disclosure.

Figure 31:
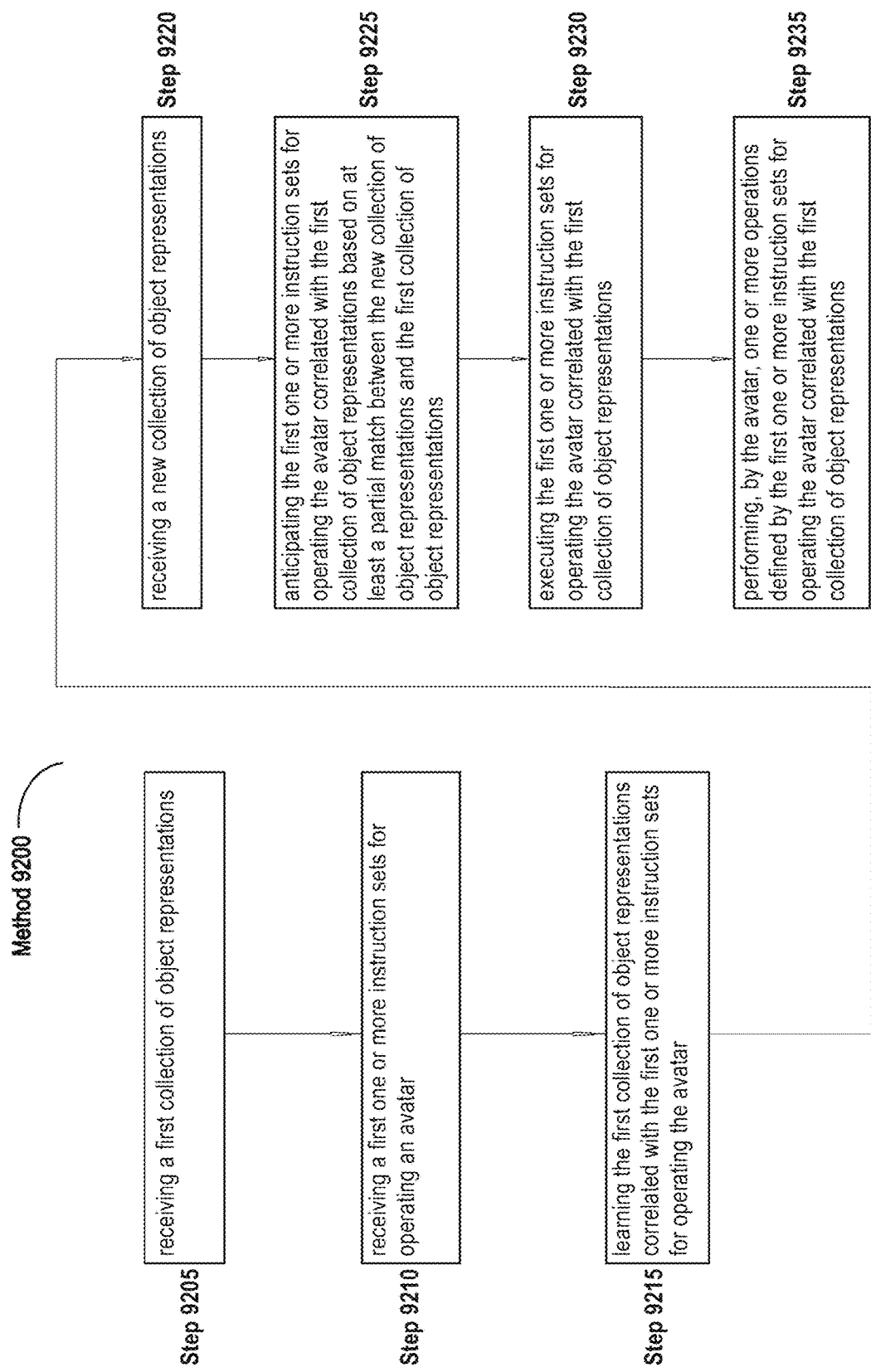
FIG. 31 illustrates a flow chart diagram of an embodiment of method 9200 for learning and/or using an avatar's circumstances for autonomous avatar operation.

Referring to FIG. 31, the illustration shows an embodiment of a method 9200 for learning and/or using an avatar's circumstances for autonomous avatar operation. In some aspects, the method can be used on a computing device or system to enable learning of an avatar's operation in circumstances including objects with various properties and enable autonomous avatar operation in similar circumstances. Method 9200 may include any action or operation of any of the disclosed methods such as method 9100, 9300, 9400, 9500, 9600, and/or others. Additional steps, actions, or operations can be included as needed, or some of the disclosed ones can be optionally omitted, or a different combination or order thereof can be implemented in alternate embodiments of method 9200.

At step 9205, a first collection of object representations is received. Step 9205 may include any action or operation described in Step 9105 of method 9100 as applicable.

At step 9210, a first one or more instruction sets for operating an avatar are received. Step 9210 may include any action or operation described in Step 9110 of method 9100 as applicable.

At step 9215, the first collection of object representations correlated with the first one or more instruction sets for operating the avatar are learned. Step 9215 may include any action or operation described in Step 9115 and/or Step 9120 of method 9100 as applicable.

At step 9220, a new collection of object representations is received. Step 9220 may include any action or operation described in Step 9125 of method 9100 as applicable.

At step 9225, the first one or more instruction sets for operating the avatar correlated with the first collection of object representations are anticipated based on at least a partial match between the new collection of object representations and the first collection of object representations. Step 9225 may include any action or operation described in Step 9130 and/or Step 9135 of method 9100 as applicable.

At step 9230, the first one or more instruction sets for operating the avatar correlated with the first collection of object representations are executed. Step 9230 may include any action or operation described in Step 9140 of method 9100 as applicable.

At step 9235, one or more operations defined by the first one or more instruction sets for operating the avatar correlated with the first collection of object representations are performed by the avatar. Step 9235 may include any action or operation described in Step 9145 of method 9100 as applicable.

Figure 32:
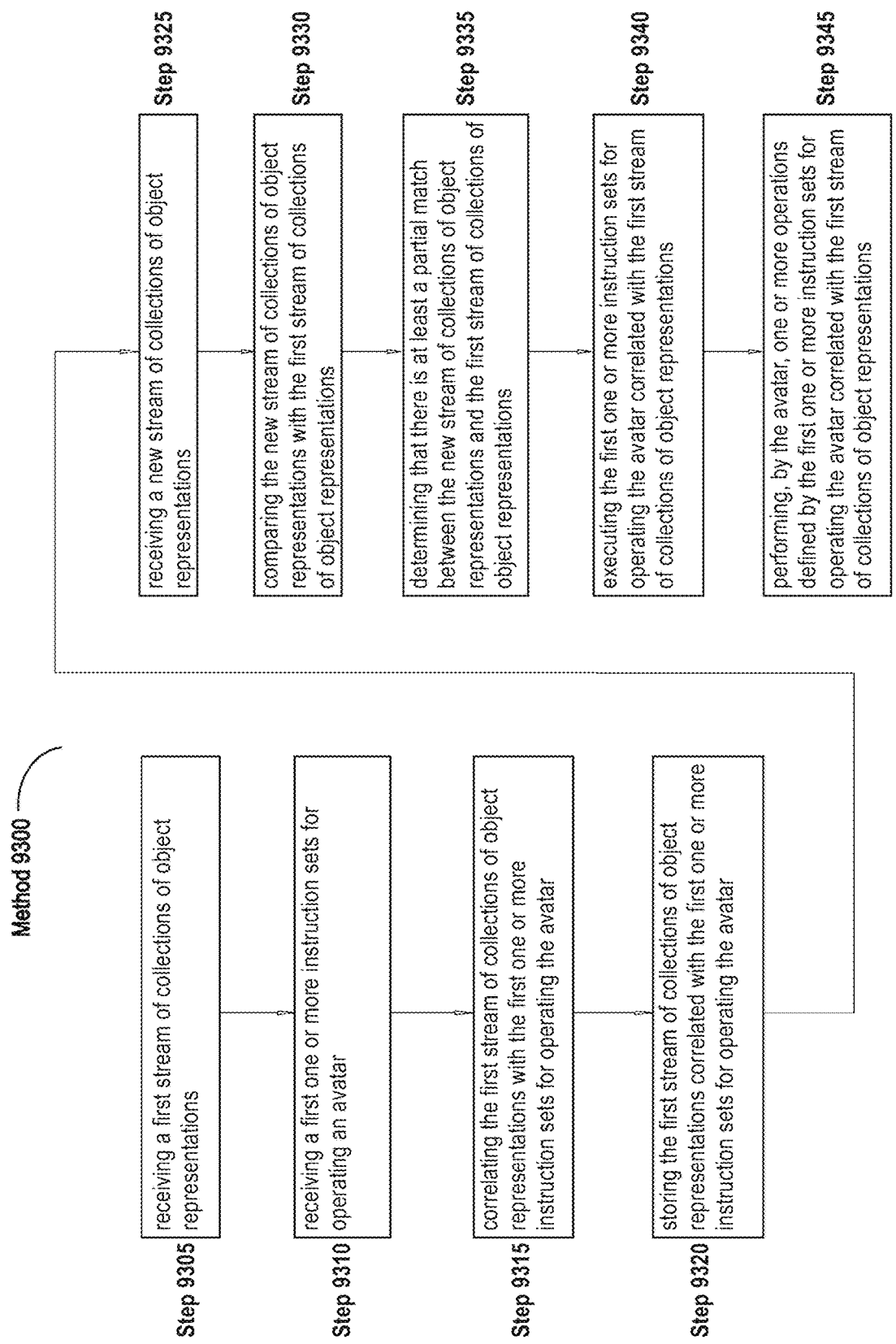
FIG. 32 illustrates a flow chart diagram of an embodiment of method 9300 for learning and/or using an avatar's circumstances for autonomous avatar operation.

Referring to FIG. 32, the illustration shows an embodiment of a method 9300 for learning and/or using an avatar's circumstances for autonomous avatar operation. In some aspects, the method can be used on a computing device or system to enable learning of an avatar's operation in circumstances including objects with various properties and enable autonomous avatar operation in similar circumstances. Method 9300 may include any action or operation of any of the disclosed methods such as method 9100, 9200, 9400, 9500, 9600, and/or others. Additional steps, actions, or operations can be included as needed, or some of the disclosed ones can be optionally omitted, or a different combination or order thereof can be implemented in alternate embodiments of method 9300.

At step 9305, a first stream of collections of object representations is received. Step 9305 may include any action or operation described in Step 9105 of method 9100 as applicable.

At step 9310, a first one or more instruction sets for operating an avatar are received. Step 9310 may include any action or operation described in Step 9110 of method 9100 as applicable.

At step 9315, the first stream of collections of object representations is correlated with the first one or more instruction sets for operating the avatar. Step 9315 may include any action or operation described in Step 9115 of method 9100 as applicable.

At step 9320, the first stream of collections of object representations correlated with the first one or more instruction sets for operating the avatar are stored. Step 9320 may include any action or operation described in Step 9120 of method 9100 as applicable.

At step 9325, a new stream of collections of object representations is received. Step 9325 may include any action or operation described in Step 9125 of method 9100 as applicable.

At step 9330, the new stream of collections of object representations is compared with the first stream of collections of object representations. Step 9330 may include any action or operation described in Step 9130 of method 9100 as applicable.

At step 9335, a determination is made that there is at least a partial match between the new stream of collections of object representations and the first stream of collections of object representations. Step 9335 may include any action or operation described in Step 9135 of method 9100 as applicable.

At step 9340, the first one or more instruction sets for operating the avatar correlated with the first stream of collections of object representations are executed. Step 9340 may include any action or operation described in Step 9140 of method 9100 as applicable.

At step 9345, one or more operations defined by the first one or more instruction sets for operating the avatar correlated with the first stream of collections of object representations are performed by the avatar. Step 9345 may include any action or operation described in Step 9145 of method 9100 as applicable.

Figure 33:
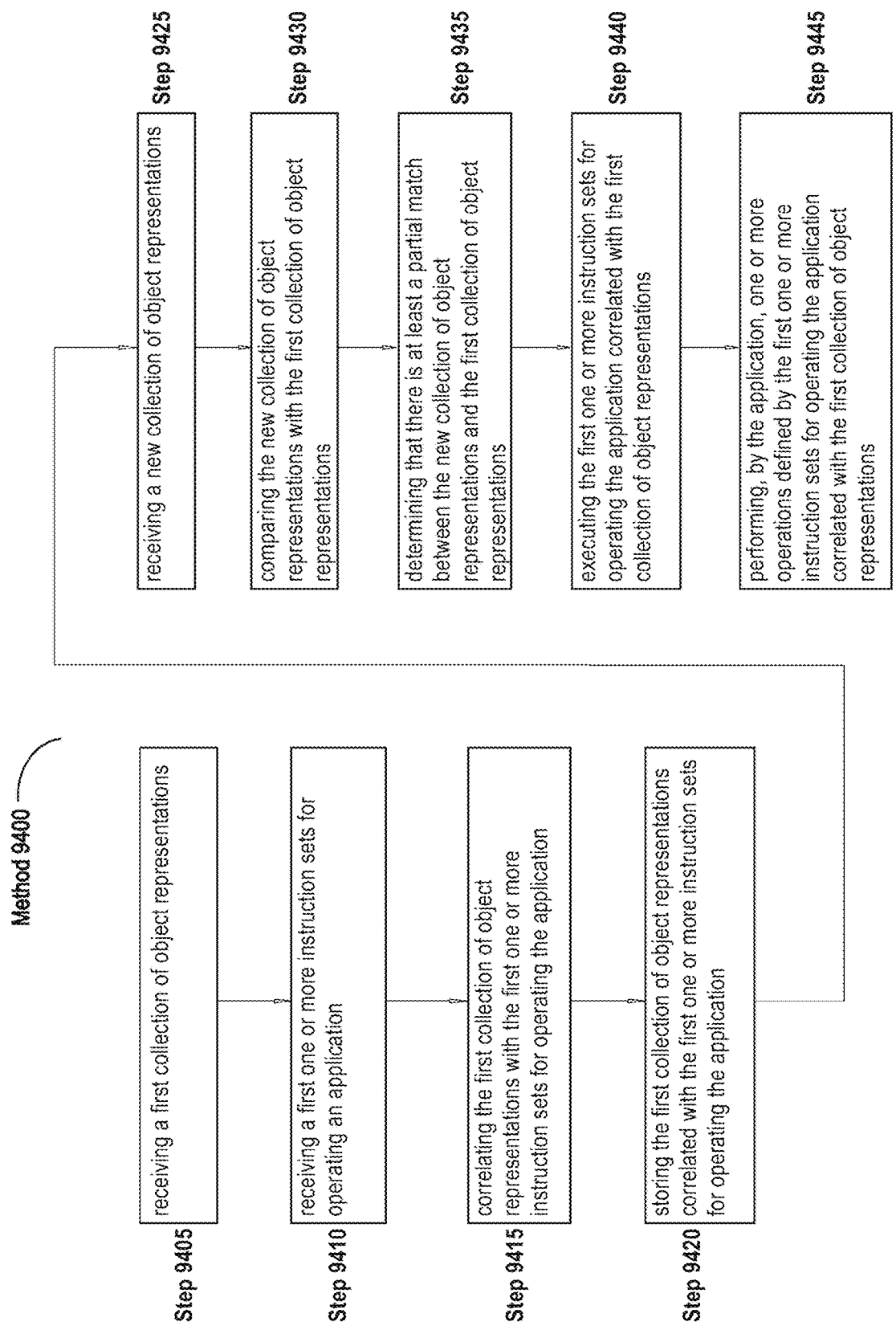
FIG. 33 illustrates a flow chart diagram of an embodiment of method 9400 for learning and/or using an application's circumstances for autonomous application operation.

Referring to FIG. 33, the illustration shows an embodiment of a method 9400 for learning and/or using an application's circumstances for autonomous application operation. In some aspects, the method can be used on a computing device or system to enable learning of an application's operation in circumstances including objects with various properties and enable autonomous application operation in similar circumstances. Method 9400 may include any action or operation of any of the disclosed methods such as method 9100, 9200, 9300, 9500, 9600, and/or others. Additional steps, actions, or operations can be included as needed, or some of the disclosed ones can be optionally omitted, or a different combination or order thereof can be implemented in alternate embodiments of method 9400.

At step 9405, a first collection of object representations is received. Step 9405 may include any action or operation described in Step 9105 of method 9100 as applicable.

At step 9410, a first one or more instruction sets for operating an application are received. Step 9410 may include any action or operation described in Step 9110 of method 9100 as applicable.

At step 9415, the first collection of object representations is correlated with the first one or more instruction sets for operating the application. Step 9415 may include any action or operation described in Step 9115 of method 9100 as applicable.

At step 9420, the first collection of object representations correlated with the first one or more instruction sets for operating the application are stored. Step 9420 may include any action or operation described in Step 9120 of method 9100 as applicable.

At step 9425, a new collection of object representations is received. Step 9425 may include any action or operation described in Step 9125 of method 9100 as applicable.

At step 9430, the new collection of object representations is compared with the first collection of object representations. Step 9430 may include any action or operation described in Step 9130 of method 9100 as applicable.

At step 9435, a determination is made that there is at least a partial match between the new collection of object representations and the first collection of object representations. Step 9435 may include any action or operation described in Step 9135 of method 9100 as applicable.

At step 9440, the first one or more instruction sets for operating the application correlated with the first collection of object representations are executed. Step 9440 may include any action or operation described in Step 9140 of method 9100 as applicable.

At step 9445, one or more operations defined by the first one or more instruction sets for operating the application correlated with the first collection of object representations are performed by the application. Step 9445 may include any action or operation described in Step 9145 of method 9100 as applicable.

Figure 34:
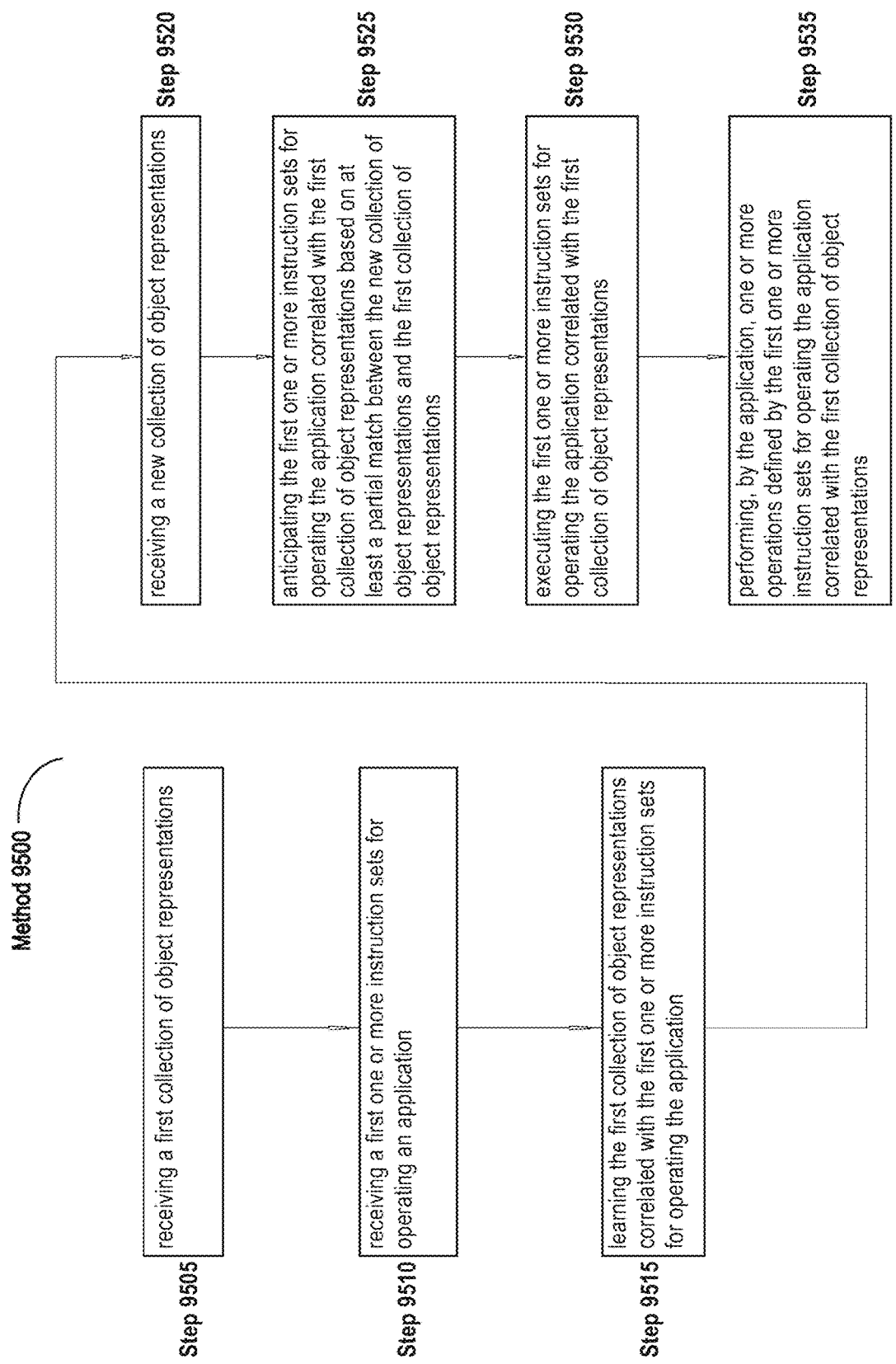
FIG. 34 illustrates a flow chart diagram of an embodiment of method 9500 for learning and/or using an application's circumstances for autonomous application operation.

Referring to FIG. 34, the illustration shows an embodiment of a method 9500 for learning and/or using an application's circumstances for autonomous application operation. In some aspects, the method can be used on a computing device or system to enable learning of an application's operation in circumstances including objects with various properties and enable autonomous application operation in similar circumstances. Method 9500 may include any action or operation of any of the disclosed methods such as method 9100, 9200, 9300, 9400, 9600, and/or others. Additional steps, actions, or operations can be included as needed, or some of the disclosed ones can be optionally omitted, or a different combination or order thereof can be implemented in alternate embodiments of method 9500.

At step 9505, a first collection of object representations is received. Step 9505 may include any action or operation described in Step 9105 of method 9100 as applicable.

At step 9510, a first one or more instruction sets for operating an application are received. Step 9510 may include any action or operation described in Step 9110 of method 9100 as applicable.

At step 9515, the first collection of object representations correlated with the first one or more instruction sets for operating the application are learned. Step 9515 may include any action or operation described in Step 9115 and/or Step 9120 of method 9100 as applicable.

At step 9520, a new collection of object representations is received. Step 9520 may include any action or operation described in Step 9125 of method 9100 as applicable.

At step 9525, the first one or more instruction sets for operating the application correlated with the first collection of object representations are anticipated based on at least a partial match between the new collection of object representations and the first collection of object representations. Step 9525 may include any action or operation described in Step 9130 and/or Step 9135 of method 9100 as applicable.

At step 9530, the first one or more instruction sets for operating the application correlated with the first collection of object representations are executed. Step 9530 may include any action or operation described in Step 9140 of method 9100 as applicable.

At step 9535, one or more operations defined by the first one or more instruction sets for operating the application correlated with the first collection of object representations are performed by the application. Step 9535 may include any action or operation described in Step 9145 of method 9100 as applicable.

Figure 35:
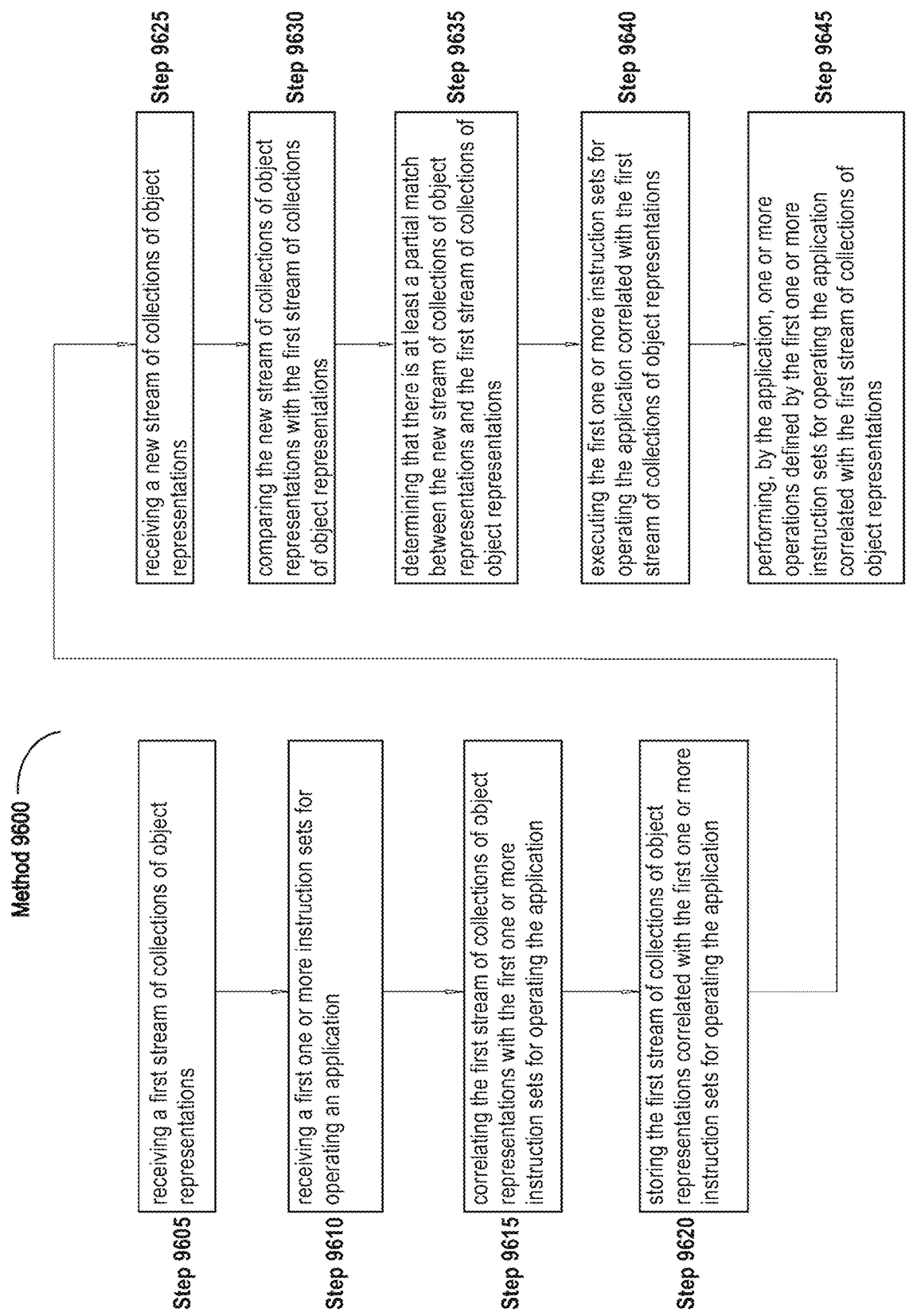
FIG. 35 illustrates a flow chart diagram of an embodiment of method 9600 for learning and/or using an application's circumstances for autonomous application operation.

Referring to FIG. 35, the illustration shows an embodiment of a method 9600 for learning and/or using an application's circumstances for autonomous application operation. In some aspects, the method can be used on a computing device or system to enable learning of an application's operation in circumstances including objects with various properties and enable autonomous application operation in similar circumstances. Method 9600 may include any action or operation of any of the disclosed methods such as method 9100, 9200, 9300, 9400, 9500, and/or others. Additional steps, actions, or operations can be included as needed, or some of the disclosed ones can be optionally omitted, or a different combination or order thereof can be implemented in alternate embodiments of method 9600.

At step 9605, a first stream of collections of object representations is received. Step 9605 may include any action or operation described in Step 9105 of method 9100 as applicable.

At step 9610, a first one or more instruction sets for operating an application are received. Step 9610 may include any action or operation described in Step 9110 of method 9100 as applicable.

At step 9615, the first stream of collections of object representations is correlated with the first one or more instruction sets for operating the application. Step 9615 may include any action or operation described in Step 9115 of method 9100 as applicable.

At step 9620, the first stream of collections of object representations correlated with the first one or more instruction sets for operating the application are stored. Step 9620 may include any action or operation described in Step 9120 of method 9100 as applicable.

At step 9625, a new stream of collections of object representations is received. Step 9625 may include any action or operation described in Step 9125 of method 9100 as applicable.

At step 9630, the new stream of collections of object representations is compared with the first stream of collections of object representations. Step 9630 may include any action or operation described in Step 9130 of method 9100 as applicable.

At step 9635, a determination is made that there is at least a partial match between the new stream of collections of object representations and the first stream of collections of object representations. Step 9635 may include any action or operation described in Step 9135 of method 9100 as applicable.

At step 9640, the first one or more instruction sets for operating the application correlated with the first stream of collections of object representations are executed. Step 9640 may include any action or operation described in Step 9140 of method 9100 as applicable.

At step 9645, one or more operations defined by the first one or more instruction sets for operating the application correlated with the first stream of collections of object representations are performed by the application. Step 9645 may include any action or operation described in Step 9145 of method 9100 as applicable.

Figure 36:
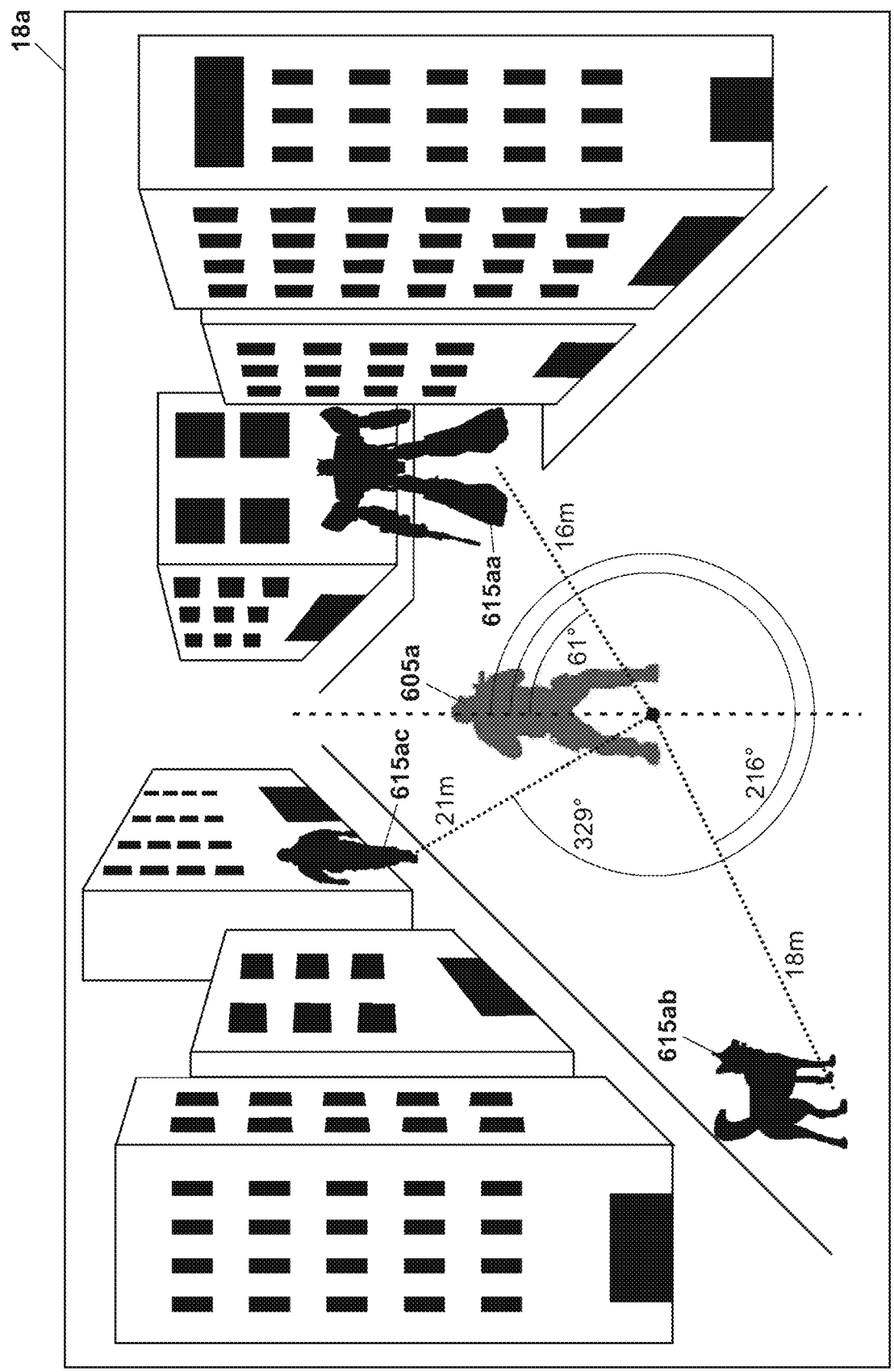
FIG. 36 illustrates an exemplary embodiment of Soldier 605*a* within 3D Computer Game 18*a*.

Referring to FIG. 36, in some exemplary embodiments, Application Program 18 may be or include a 3D Computer Game 18a. Examples of 3D Computer Game 18a include a first shooter game, a flight simulation, a driving simulation, and/or others. Avatar 605 may be or include Soldier 605a within 3D Computer Game 18a. Soldier 605a can be controlled by User 50 (i.e. game player, etc.) through inputting operating directions via Human-machine Interface 23 such as a game controller, keyboard, joystick, or other input device. For instance, responsive to User's 50 manipulating one or more game controller elements, Soldier 605a may be caused to move, maneuver, shoot, jump, and/or perform other operations. Computing Device 70 may include or be coupled to ACAAO Unit 100. ACAAO Unit 100 can obtain objects (i.e. Opponent 615aa, Dog 615ab, Pedestrian 615ac, etc.) and/or their properties in Soldier's 605a surrounding within 3D Computer Game 18a. ACAAO Unit 100 may create or generate one or more (i.e. stream, etc.) Collections of Object Representations 525 comprising Object Representations 625, Object Properties 630, and/or other elements or information representing Objects 615 in Soldier's 605a surrounding. ACAAO Unit 100 can also obtain Instruction Sets 526 used or executed in operating Soldier 605a. ACAAO Unit 100 can also optionally obtain any Extra Info 527 (i.e. time, location, computed, visual, acoustic, contextual, and/or other information, etc.) related to Soldier's 605a operation. As User 50 operates Soldier 605a in circumstances including objects with various properties as shown, ACAAO Unit 100 may learn Soldier's 605a operation in these circumstances by correlating Collections of Object Representations 525 representing Objects 615 in Soldier's 605a surrounding with one or more Instruction Sets 526 used or executed in operating Soldier 605a. Any Extra Info 527 related to Soldier's 605a operation may also optionally be correlated with Collections of Object Representations 525. ACAAO Unit 100 can store this knowledge into Knowledgebase 530 (i.e. Neural Network 530a, Graph 530b, Collection of Sequences 530c, Sequence 533, Collection of Knowledge Cells 530d, etc.). In the future, ACAAO Unit 110 may compare incoming Collections of Object Representations 525 representing Objects 615 in Soldier's 605a surrounding with previously learned Collections of Object Representations 525 including optionally using any Extra Info 527 for enhanced decision making. If substantially similar or at least a partial match is found or determined, ACAAO Unit 110 may cause the Instruction Sets 526 correlated with the previously learned Collections of Object Representations 525 to be executed, thereby enabling autonomous operation of Soldier 605a in similar circumstances as in previously learned ones. For instance, ACAAO Unit 100 may learn User 50-directed shooting at Opponent 615aa by Soldier 605a in a circumstance that includes Opponent 615aa, Dog 615ab, Pedestrian 615ac, and/or other Objects 615 among which Soldier 605a may need to maneuver and/or with which Soldier 605a may need to interact, as shown. In the future, when a circumstance that includes one or more Objects 615 with similar Object Properties 630 is encountered, ACAAO Unit 100 may implement the shooting at Opponent 615aa by Soldier 605a autonomously. In some designs, 3D Computer Game 18a may include elevated Objects 615 such as flying objects (i.e. flying animals, aircraft, etc.), objects on hills or mountains, objects on buildings, and/or others in which case altitudinal information related to distance and bearing/angle of Objects 615 relative to Soldier 605a can be obtained, learned, and used. In other designs, the street (not enumerated), parts thereof (i.e. curbs, sidewalks, etc.), and/or objects thereon (i.e. buildings, etc.) can be obtained as Objects 615 themselves, which may be learned and used.

In some embodiments, ACAAO Unit 100 may reside on Server 96 accessible over Network 95 as previously described. In such embodiments, any number of Computing Devices 70, Processors 11, 3D Computer Games 18a, and/or other elements may connect to such remote ACAAO Unit 100 and the remote ACAAO Unit 100 may learn operations of their Soldiers 605a in circumstances including objects with various properties. In turn, any number of Computing Devices 70, Processors 11, 3D Computer Games 18a, and/or other elements can utilize the remote ACAAO Unit 100 for autonomous operation of their Soldiers 605a. For example, multiple Users 50 (i.e. game players, etc.) may operate their Soldiers 605a in 3D Computer Game 18a running on their respective Computing Devices 70 where the Computing Devices 70 and/or elements thereof may be configured to transmit Soldiers' 605a operations in circumstances including objects with various properties to a remote ACAAO Unit 100. Such remote ACAAO Unit 100 enables learning of the game players' collective knowledge of operating Soldier 605a in circumstances including objects with various properties. Any of the disclosed elements such as Artificial Intelligence Unit 110, Knowledgebase 530, and/or others can reside on Server 96, and any combination of local and remote elements can be implemented in alternate embodiments.

In some embodiments, a combination of ACAAO Unit 100 and other systems and/or techniques can be utilized to implement Soldier's 605a operation. In one example, ACAAO Unit 100 can be a primary or preferred system for implementing Soldier's 605a operation. While operating autonomously under the control of ACAAO Unit 100, Soldier 605a may encounter a circumstance including objects with various properties that has not been encountered or learned before. In such situations, User 50 and/or non-ACAAO system may take control of Soldier's 605a operation. ACAAO Unit 100 may take control again when Soldier 605a encounters a previously learned circumstance including objects with various properties. Naturally, ACAAO Unit 100 can learn Soldier's 605a operation in circumstances while User 50 and/or non-ACAAO system is in control of Soldier 605a, thereby reducing or eliminating the need for future involvement of User 50 and/or non-ACAAO system. In another example, User 50 and/or non-ACAAO system can be a primary or preferred system for implementing Soldier's 605a operation. While operating under the control of User 50 and/or non-ACAAO system, User 50 and/or non-ACAAO system may release control to ACAAO Unit 100 for any reason (i.e. User 50 gets tired or distracted, non-ACAAO system gets stuck or cannot make a decision, etc.), at which point Soldier 605a can be controlled by ACAAO Unit 100. In some designs, ACAAO Unit 100 may take control in certain special circumstances including objects with various properties where ACAAO Unit 100 offers superior performance even though User 50 and/or non-ACAAO system may generally be preferred. Once Soldier 605a leaves such special circumstances, ACAAO Unit 100 may release control to User 50 and/or non-ACAAO system. In general, ACAAO Unit 100 can take control from, share control with, or release control to User 50, non-ACAAO system, and/or other system or process at any time, in any circumstances, and remain in control for any period of time as needed.

In some embodiments, ACAAO Unit 100 may control one or more elements of Soldier 605a while User 50 and/or non-ACAAO system may control other one or more elements of Soldier 605a. For example, ACAAO Unit 100 may control Soldier's 605a movement, while User 50 and/or non-ACAAO system may control Soldier's 605a aiming and shooting. Any other combination of controlling various elements or functions of Soldier 605a by ACAAO Unit 100, User 50, and/or non-ACAAO system can be implemented.

In some embodiments, ACAAO Unit 100 enables learning of a particular User's 50 (i.e. game player's, etc.) knowledge, methodology, or style of operating Soldier 605a within 3D Game Application 18a. In some aspects, learning of a particular User's 50 knowledge, methodology, or style of operating Soldier 605a includes learning the User's 50 directing or operating Soldier 605a in circumstances including objects with various properties. In one example, one User 50 may shoot an opponent while another User 50 may strike the opponent with a sword. In another example, one User 50 may jump over an obstacle while another User 50 may move around the obstacle, and so on. The knowledge of User's 50 methodology or style of operating Soldier 605a can be used to enable personalized autonomous operation of Soldier 605a specific to a particular User 50. Therefore, ACAAO-enabled Soldier 605a can exemplify User's 50 knowledge, methodology, or style of operating Soldier 605a as learned from User 50. In some aspects, this functionality enables one or more ACAAO-enabled Soldiers 605a to be utilized in 3D Computer Game 18a to assist User 50 in defeating an opponent or achieving other goals. In one example, User 50 can utilize a team of ACAAO-enabled Soldiers 605a each of which may exemplify User's 50 knowledge, methodology, or style of operating Soldier 605a. In one instance, ACAAO-enabled Soldiers 605a may be dispersed around a User 50-controlled Soldier 605a within a specific radius and follow User 50-controlled Soldier's 605a movement. In another instance, ACAAO-enabled Soldiers 605a may move autonomously toward a certain point or goal in 3D Computer Game 18a. In a further instance, ACAAO-enabled Soldiers 605a can be completely autonomous and rely solely on the knowledge learned from User's 50 methodology or style of operating Soldier 605a. In other aspects, ACAAO Unit 100 enables a professional or other experienced User 50 (i.e. game player, etc.) to record his/her knowledge, methodology, or style of operating Soldier 605a into Knowledgebase 530 (i.e. Neural Network 530a, Graph 530b, Collection of Sequences 530c, Sequence 533, Collection of Knowledge Cells 530d, etc.) and/or other repository. User 50 can then sell or make available his/her knowledge, methodology, or style of operating Soldier 605a to other users who may want to implement User's 50 knowledge, methodology, or style of operating Soldier 605a. Knowledgebase 530 and/or other repository comprising User's 50 knowledge, methodology, or style of operating Soldier 605*a* can be available to other users via a storage medium, via a network, or via other means.

One of ordinary skill in art will understand that the aforementioned features, functionalities, and embodiments described with respect to 3D Computer Game 18*a* can be implemented in any 3D Application Program 18 such as a 3D virtual world, 3D graphics application, computer aided design (CAD) application, and/or others. Similar features, functionalities, and embodiments can also be implemented in a 2D Application Program 18, and/or other application program as applicable, and vice versa.

Figure 37:
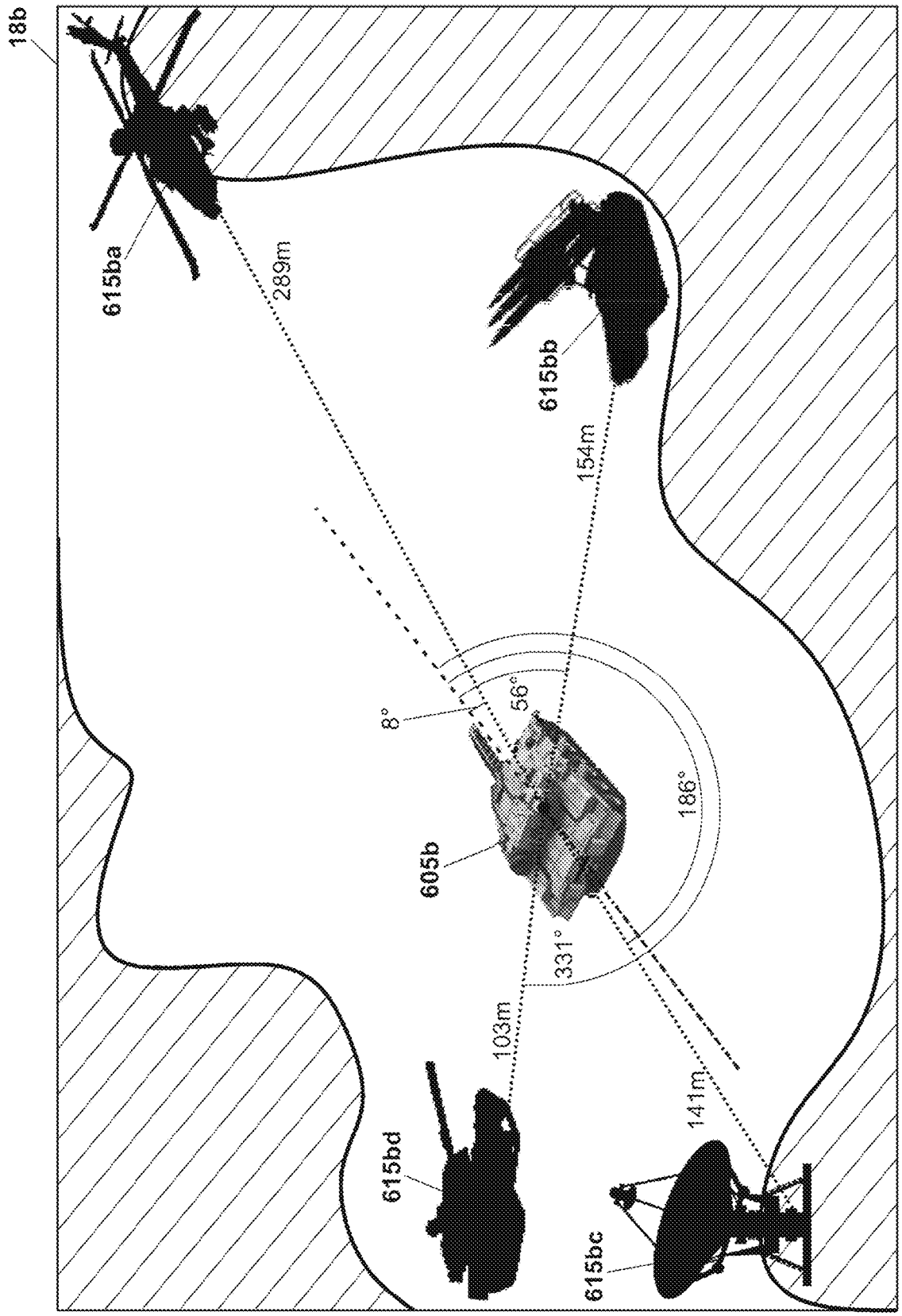
FIG. 37 illustrates an exemplary embodiment of Tank 605*b* within 2D Computer Game 18*b*.

Referring to FIG. 37, in some exemplary embodiments, Application Program 18 may be or include a 2D Computer Game 18*b*. Examples of 2D Computer Game 18*b* include a strategy game, a shooter game, a tile-matching game, a platform game, and/or others. Avatar 605 may be or include Tank 605*b* within 2D Computer Game 18*b*. Tank 605*b* can be controlled by User 50 (i.e. game player, etc.) through inputting operating directions via Human-machine Interface 23 such as a game controller, keyboard, joystick, or other input device. For instance, responsive to User's 50 manipulating one or more game controller elements, Tank 605*b* may be caused to move, maneuver, shoot, and/or perform other operations. Computing Device 70 may include or be coupled to ACAAO Unit 100. ACAAO Unit 100 can obtain objects (i.e. Helicopter 615*ba*, Rocket Launcher 615*bb*, Communication Center 615*bc*, Tank 615*bd*, etc.) and/or their properties in Tank's 605*b* surrounding within 2D Computer Game 18*b*. ACAAO Unit 100 may create or generate one or more (i.e. stream, etc.) Collections of Object Representations 525 comprising Object Representations 625, Object Properties 630, and/or other elements or information representing Objects 615 in Tank's 605*b* surrounding. ACAAO Unit 100 can also obtain Instruction Sets 526 used or executed in operating Tank 605*b*. ACAAO Unit 100 can also optionally obtain any Extra Info 527 (i.e. time, location, computed, visual, acoustic, contextual, and/or other information, etc.) related to Tank's 605*b* operation. As User 50 operates Tank 605*b* in circumstances including objects with various properties as shown, ACAAO Unit 100 may learn Tank's 605*b* operation in these circumstances by correlating Collections of Object Representations 525 representing Objects 615 in Tank's 605*b* surrounding with one or more Instruction Sets 526 used or executed in operating Tank 605*b*. Any Extra Info 527 related to Tank's 605*b* operation may also optionally be correlated with Collections of Object Representations 525. ACAAO Unit 100 can store this knowledge into Knowledgebase 530 (i.e. Neural Network 530*a*, Graph 530*b*, Collection of Sequences 530*c*, Sequence 533, Collection of Knowledge Cells 530*d*, etc.). In the future, ACAAO Unit 110 may compare incoming Collections of Object Representations 525 representing Objects 615 in Tank's 605*b* surrounding with previously learned Collections of Object Representations 525 including optionally using any Extra Info 527 for enhanced decision making. If substantially similar or at least a partial match is found or determined, ACAAO Unit 110 may cause the Instruction Sets 526 correlated with the previously learned Collections of Object Representations 525 to be executed, thereby enabling autonomous operation of Tank 605*b* in similar circumstances as in previously learned ones. For instance, ACAAO Unit 100 may learn User 50-directed maneuvering and shooting by Tank 605*b* in a circumstance that includes Helicopter 615*ba*, Rocket Launcher 615*bb*, Communication Center 615*bc*, Tank 615*bd*, and/or other Objects 615 among which Tank 605*b* may need to maneuver and/or with which Tank 605*b* may need to interact, as shown. In the future, when a circumstance that includes one or more Objects 615 with similar Object Properties 630 is encountered, ACAAO Unit 100 may implement the maneuvering and shooting by Tank 605*b* autonomously. In some designs, 2D Computer Game 18*b* may include 3D effects such as the effect of flying objects (i.e. flying animals, aircraft, Helicopter 615*ba*, etc.), objects on hills or mountains, objects on buildings, and/or other elevated objects in which case altitudinal information related to distance and bearing/angle of Objects 615 relative to Tank 605*b* can be obtained, learned, and used. In other designs, the canyon (not enumerated) and/or parts thereof (i.e. cliffs, ridges, etc.) can be obtained as Objects 615 themselves, which may be learned and used.

Figure 38:
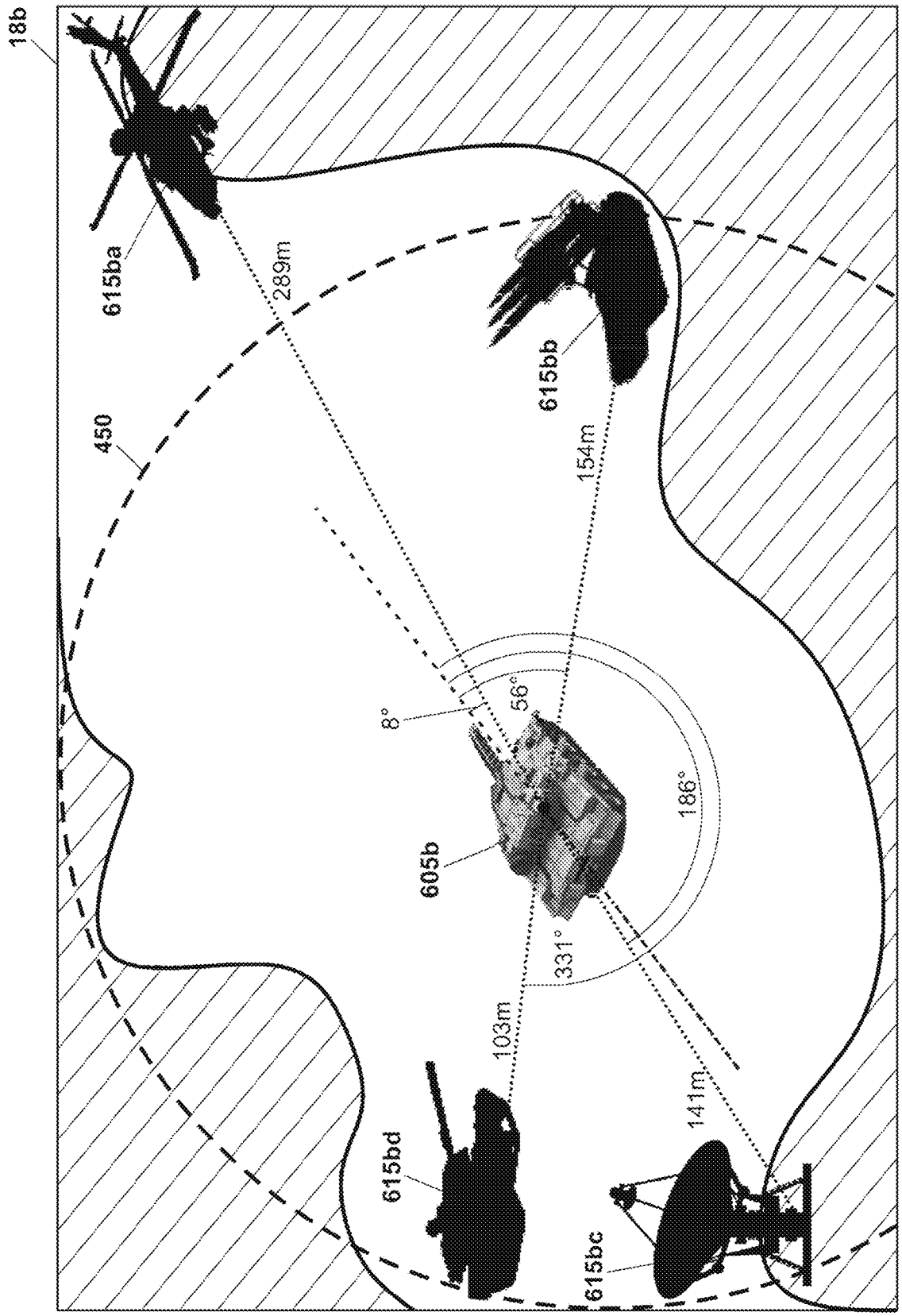
FIG. 38 illustrates an exemplary embodiment of utilizing Area of Interest 450 around Tank 605*b*.

Referring to FIG. 38, in some exemplary embodiments, an Area of Interest 450 can be utilized. In one example, Area of Interest 450 may include a radial, circular, elliptical, or other such area around Tank 605*b*. In another example, Area of Interest 450 may include a triangular, rectangular, octagonal, or other such area around Tank 605*b*. In a further example, Area of Interest 450 may include a spherical, cubical, pyramid-like, or other such area around Tank 605*b* as applicable to 3D space. Any other Area of Interest 450 shape can be utilized depending on implementation. The shape and/or size of Area of Interest 450 can be defined by a user, by ACAAO system administrator, or automatically by the system based on experience, testing, inquiry, analysis, synthesis, or other techniques, knowledge, or input. For instance, Area of Interest 450 may include or be defined by a circle around Tank 605*b* with a radius of 250 meters. Any other radiuses or sizes of Area of Interest 450 can be used such as 0.27 m, 1 m, 7 m, 19 m, 382 m, 7116 m, 49276 m, and so on. Utilizing Area of Interest 450 enables ACAAO Unit 100 to focus on Tank's 605*b* surrounding, thereby ignoring extraneous detail in the rest of the space. In some designs, Tank's 605*b* surrounding may include or be defined by Area of Interest 450. In some aspects, Area of Interest 450 can be subdivided into sub-areas (i.e. sub-circles, sub-rectangles, sub-spheres, etc.). Sub-areas can be used to classify the surrounding by distance from Tank 605*b*. For example, the surrounding closer to Tank 605*b* may be more important and may be assigned higher importance index or weight. As User 50 operates Tank 605*b* in circumstances including objects with various properties as shown, ACAAO Unit 100 may learn Tank's 605*b* operation in these circumstances by correlating Collections of Object Representations 525 representing Objects 615 in Area of Interest 450 around Tank 605*b* with one or more Instruction Sets 526 used or executed in operating Tank 605*b*. Any Extra Info 527 related to Tank's 605*b* operation may also optionally be correlated with Collections of Object Representations 525. ACAAO Unit 100 can store this knowledge into Knowledgebase 530 (i.e. Neural Network 530*a*, Graph 530*b*, Collection of Sequences 530*c*, Sequence 533, Collection of Knowledge Cells 530*d*, etc.). In the future, ACAAO Unit 110 may compare incoming Collections of Object Representations 525 representing Objects 615 in Area of Interest 450 around Tank 605*b* with previously learned Collections of Object Representations 525 including optionally using any Extra Info 527 for enhanced decision making. If substantially similar or at least a partial match is found or determined, ACAAO Unit 110 may cause the Instruction Sets 526 correlated with the previously learned Collections of Object Representations 525 to be executed, thereby enabling autonomous operation of Tank 605*b* in similar Areas of Interest 450 as in previously learned ones. For instance, ACAAO Unit 100 may learn User 50-directed maneuvering and shooting by Tank 605b in an Area of Interest 450 that includes Rocket Launcher 615bb, Communication Center 615bc, Tank 615bd, and/or other Objects 615 among which Tank 605b may need to maneuver and/or with which Tank 605b may need to interact, as shown. In the future, when an Area of Interest 450 that includes one or more Objects 615 with similar Object Properties 630 is encountered, ACAAO Unit 100 may implement the maneuvering and shooting by Tank 605b autonomously.

Figure 39:
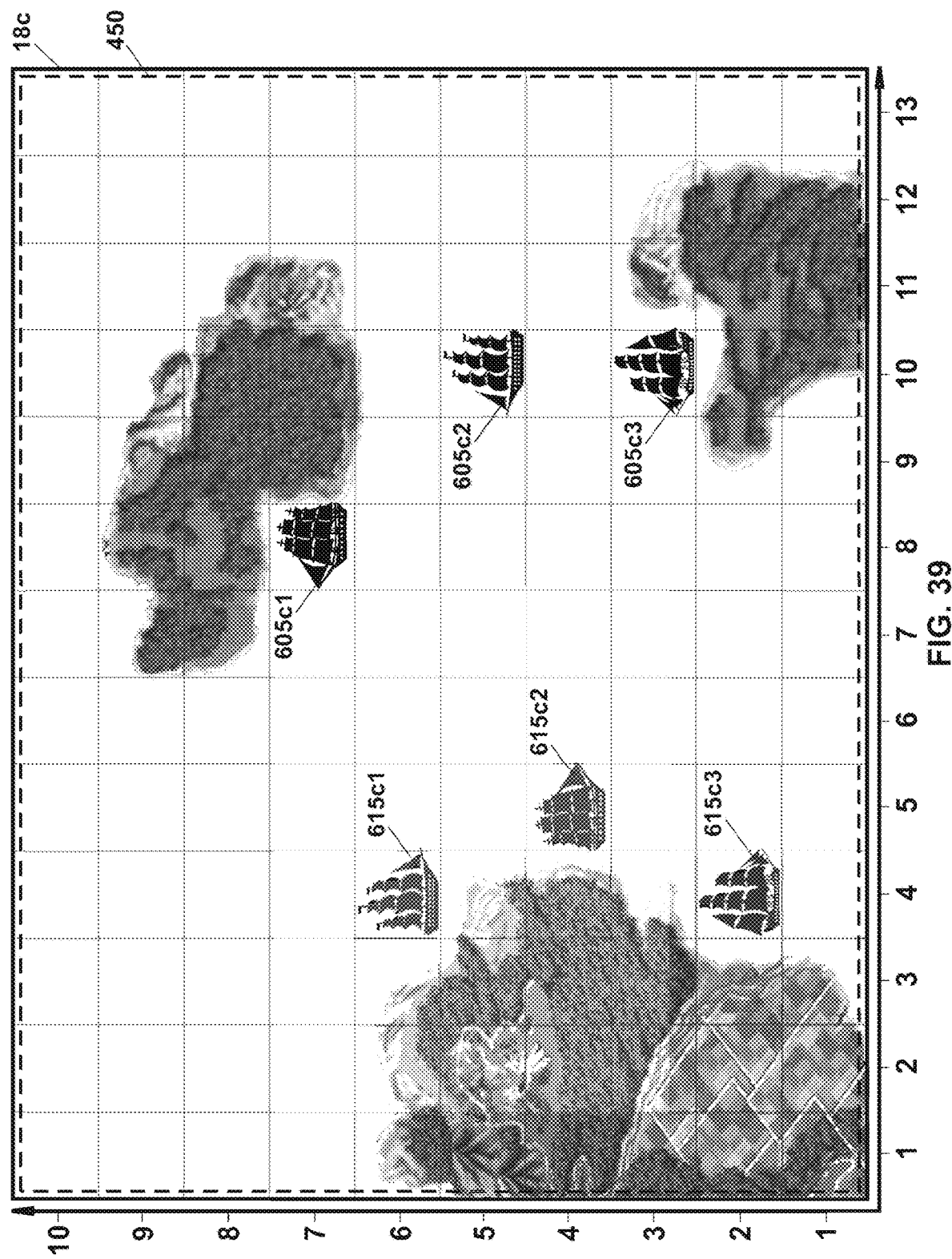
FIG. 39 illustrates an exemplary embodiment of multiple Avatars 605 within Computer Game 18*c*.

Referring to FIG. 39, in some exemplary embodiments, Application Program 18 may be or include a 2D Computer Game 18c comprising multiple Avatars 605 that User 50 can control or operate. As multiple Avatars 605 can perform operations in such 2D Computer Game 18c, Area of Interest 450 in 2D Computer Game 18c including multiple Avatars 605 and/or other Objects 615 may be more relevant than a particular Avatar's 605 surrounding or Area of Interest 450 for learning circumstances including objects with various properties. In some aspects, Area of Interest 450 in 2D Computer Game 18c may include the entire 2D Computer Game 18c, a part of 2D Computer Game 18c that is shown to User 50 (i.e. on a display, via a graphical user interface, etc.), or any part of 2D Computer Game 18c. Examples of 2D Computer Game 18c include a strategy game, a board game, a tile-matching game, and/or others. Avatars 605 may be or include Ships 605c1-605c3, etc. within 2D Computer Game 18c. Ships 605c1-605c3, etc. can be controlled by User 50 (i.e. game player, etc.) through inputting operating directions via Human-machine Interface 23 such as a game controller, keyboard, joystick, or other input device. For instance, responsive to User's 50 manipulating one or more game controller elements, Ships 605c1-605c3, etc. may be caused to move, maneuver, shoot, and/or perform other operations. Computing Device 70 may include or be coupled to ACAAO Unit 100. ACAAO Unit 100 can obtain objects and/or their properties in Area of Interest 450 in 2D Computer Game 18c. For instance, Area of Interest 450 in 2D Computer Game 18c may include Ships 605c1-605c3, etc., Ships 615c1-615c3, etc., and/or other objects. Properties of each of the objects may include a location defined by coordinates. ACAAO Unit 100 may create or generate one or more (i.e. stream, etc.) Collections of Object Representations 525 comprising Object Representations 625, Object Properties 630, and/or other elements or information representing Objects 615 in Area of Interest 450 in 2D Computer Game 18c. ACAAO Unit 100 can also obtain Instruction Sets 526 used or executed in operating Ships 605c1-605c3, etc. ACAAO Unit 100 can also optionally obtain any Extra Info 527 (i.e. time, location, computed, visual, acoustic, contextual, and/or other information, etc.) related to Ships' 605c1-605c3, etc. operation. As User 50 operates Ships 605c1-605c3, etc. in circumstances including objects with various properties as shown, ACAAO Unit 100 may learn Ships' 605c1-605c3, etc. operation in these circumstances by correlating Collections of Object Representations 525 representing Objects 615 in Area of Interest 450 in 2D Computer Game 18c with one or more Instruction Sets 526 used or executed in operating Ships 605c1-605c3, etc. Any Extra Info 527 related to Ships' 605c1-605c3, etc. operation may also optionally be correlated with Collections of Object Representations 525. ACAAO Unit 100 can store this knowledge into Knowledgebase 530 (i.e. Neural Network 530a, Graph 530b, Collection of Sequences 530c, Sequence 533, Collection of Knowledge Cells 530d, etc.). In the future, ACAAO Unit 110 may compare incoming Collections of Object Representations 525 representing Objects 615 in Area of Interest 450 in 2D Computer Game 18c with previously learned Collections of Object Representations 525 including optionally using any Extra Info 527 for enhanced decision making. If substantially similar or at least a partial match is found or determined, ACAAO Unit 110 may cause the Instruction Sets 526 correlated with the previously learned Collections of Object Representations 525 to be executed, thereby enabling autonomous operation of Ships 605c1-605c3, etc. in similar circumstances as in previously learned ones. For instance, ACAAO Unit 100 may learn User 50-directed maneuvering and shooting by Ships 605c1-605c3, etc. in a circumstance that includes Ships 615c1-615c3 and/or other Objects 615 among which Ships 605c1-605c3, etc. may need to maneuver and/or with which Ships 605c1-605c3, etc. may need to interact, as shown. In the future, when a circumstance that includes one or more Objects 615 with similar Object Properties 630 is encountered, ACAAO Unit 100 may implement the maneuvering and shooting by Ships 605c1-605c3, etc. autonomously. In some designs, the islands (not enumerated), parts thereof (i.e. cliffs, ridges, beaches, mountains, etc.), and/or objects thereon (i.e. buildings, etc.) can be obtained as Objects 615 themselves, which may be learned and used.

One of ordinary skill in art will understand that the features, functionalities, and embodiments described in the above exemplary embodiments with respect to Soldier 605a, Tank 605b, and Ships 605c1-605c3 can similarly be implemented by/with/on any Avatar 605 of Application Program 18 or by/with/on any Application Program 18.

In some exemplary embodiments (not depicted), Application Program 18 may not comprise an Avatar 605 and/or may not rely on Avatar 605 for its operation. Application Program 18 can be controlled by User 50 through inputting operating directions via Human-machine Interface 23 such as a mouse, keyboard, or other input device. For instance, responsive to User's 50 pressing one or more mouse buttons, moving the mouse, and/or pressing keyboard buttons, an Object 615 of Application Program 18 may be inserted, deleted, selected, moved, and/or subject to other operations. Computing Device 70 may include or be coupled to ACAAO Unit 100. ACAAO Unit 100 can obtain objects and/or their properties in Application Program 18. In some aspects, Area of Interest 450 in Application Program 18 can be utilized as previously described. Area of Interest 450 in Application Program 18 may include the entire Application Program 18, a part of Application Program 18 that is shown to User 50 (i.e. on a display, via a graphical user interface, etc.), or any part of Application Program 18. For instance, ACAAO Unit 100 can obtain Objects 615 in Application Program 18 shown to User 50 via a graphical user interface. ACAAO Unit 100 may create or generate one or more (i.e. stream, etc.) Collections of Object Representations 525 comprising Object Representations 625, Object Properties 630, and/or other elements or information representing Objects 615 in Application Program 18. ACAAO Unit 100 can also obtain Instruction Sets 526 used or executed in operating Application Program 18 and/or Objects 615 thereof. ACAAO Unit 100 can also optionally obtain any Extra Info 527 (i.e. time, location, computed, visual, acoustic, contextual, and/or other information, etc.) related to Application Program's 18 and/or Objects' 615 thereof operation. As User 50 operates Application Program 18 in circumstances including objects with various properties, ACAAO Unit 100 may learn Application Program's 18 operation in these circumstances by correlating Collections of Object Representations 525 representing Objects 615 in Application Program 18 with one or more Instruction Sets 526 used or executed in operating Application Program 18 and/or Objects 615 thereof. Any Extra Info 527 related to Application Program's 18 and/or Objects' 615 thereof operation may also optionally be correlated with Collections of Object Representations 525. ACAAO Unit 100 can store this knowledge into Knowledgebase 530 (i.e. Neural Network 530*a*, Graph 530*b*, Collection of Sequences 530*c*, Sequence 533, Collection of Knowledge Cells 530*d*, etc.). In the future, ACAAO Unit 110 may compare incoming Collections of Object Representations 525 representing Objects 615 in Application Program 18 with previously learned Collections of Object Representations 525 including optionally using any Extra Info 527 for enhanced decision making. If substantially similar or at least a partial match is found or determined, ACAAO Unit 110 may cause the Instruction Sets 526 correlated with the previously learned Collections of Object Representations 525 to be executed, thereby enabling autonomous operation of Application Program 18 and/or Objects 615 thereof in similar circumstances as in previously learned ones. For instance, ACAAO Unit 100 may learn User 50-directed selecting an Object 615, moving an Object 615, and/or deleting an Object 615 of Application Program 18 in a circumstance that includes various Objects 615. In the future, when a circumstance that includes one or more Objects 615 with similar Object Properties 630 is encountered, ACAAO Unit 100 may implement the selecting an Object 615, moving an Object 615, and/or deleting an Object 615 of Application Program 18 autonomously.

One of ordinary skill in art will understand that the functionalities described with respect to Application Program 18 and/or Objects 615 thereof can be implemented in any Application Program 18 such as a computer game, a virtual world, a 2D or 3D graphics application, a web browser, a media application, a word processing application, a spreadsheet application, a database application, a forms-based application, an operating system, a device/system control application, and/or others as applicable. In such Application Programs 18, examples of Objects 615 that can be utilized include a 2D model, a 3D model, a 2D shape (i.e. point, line, square, rectangle, circle, triangle, etc.), a 3D shape (i.e. cube, sphere, etc.), a graphical user interface (GUI) element, a form element (i.e. text field, radio button, push button, check box, etc.), a data or database element, a spreadsheet element, a link, a picture, a text (i.e. character, word, etc.), a number, and/or others as applicable. Application Program 18 may be or include any Application Program 18 that can benefit from the functionalities described herein.

It must be noted that as used herein and in the appended claims, the singular forms "a", "an", and "the" include plural referents unless the context clearly dictates otherwise.

A number of embodiments have been described herein. While this disclosure contains many specific implementation details, these should not be construed as limitations on the scope of the disclosure or of what may be claimed, but rather as descriptions of features specific to particular embodiments. It should be understood that various modifications can be made without departing from the spirit and scope of the disclosure. The logic flows depicted in the figures do not require the particular order shown, or sequential order, to achieve desirable results. Other or additional steps, elements, or connections can be included, or some of the steps, elements, or connections can be excluded, or a combination thereof can be utilized in the described flows, illustrations, or descriptions. Further, the various aspects of the disclosed devices, apparatuses, systems, and/or methods can be combined in whole or in part with each other to produce additional implementations. Moreover, separation of various components in the embodiments described herein should not be understood as requiring such separation in all embodiments, and it should be understood that the described components can generally be integrated together in a single product or packaged into multiple products. Accordingly, other embodiments are within the scope of the following claims.

The invention claimed is:

1. A system comprising:
one or more non-transitory machine readable media storing machine readable code that, when executed, causes at least:
accessing a knowledgebase that includes one or more inputs for inputting a collection of object representations, wherein the one or more inputs are correlated with one or more instruction sets for operating a first avatar of an application;
generating or receiving a stream of collections of object representations, wherein the stream includes: a first collection of object representations that represents multiple objects of the application, and a second collection of object representations that represents multiple objects of the application;
determining the one or more instruction sets for operating the first avatar of the application at least by: inputting the first collection of object representations of the stream into the one or more inputs, and using a correlation between the one or more inputs and the one or more instruction sets for operating the first avatar of the application; and
performing, by the first avatar of the application or by a second avatar of the application or by a first avatar of another application, one or more operations defined by the one or more instruction sets for operating the first avatar of the application, wherein the performing includes executing the one or more instruction sets for operating the first avatar of the application at least in response to the determining.

2. A system comprising:
one or more non-transitory machine readable media storing machine readable code that, when executed, causes at least:
accessing a knowledgebase that includes one or more inputs for inputting a collection of object representations that: (i) comprises multiple object representations that each includes: a label indicating object type, and coordinates indicating object location, and (ii) represents: multiple objects of an application, or multiple objects of another application, wherein the one or more inputs are correlated with one or more instruction sets for operating a first avatar of the application;
generating or receiving a stream of collections of object representations, wherein the stream includes:
a first collection of object representations that: (i) comprises multiple object representations that each includes: a label indicating object type, and coordinates indicating object location, and (ii) represents: multiple objects of the application at a first time, or multiple objects of the another application at a first time, and
a second collection of object representations that: (i) comprises multiple object representations that each includes: a label indicating object type, and coordinates indicating object location, and (ii) represents: multiple objects of the application at a second time, or multiple objects of the another application at a second time;

determining the one or more instruction sets for operating the first avatar of the application at least by: inputting the first collection of object representations of the stream into the one or more inputs, and using a correlation between the one or more inputs and the one or more instruction sets for operating the first avatar of the application; and autonomously performing, by the first avatar of the application or by a second avatar of the application or by a first avatar of the another application, one or more operations defined by the one or more instruction sets for operating the first avatar of the application, wherein the autonomously performing includes executing the one or more instruction sets for operating the first avatar of the application at least in response to the determining.

3. The system of claim 2, wherein the one or more inputs are further correlated with another one or more instruction sets for operating a first avatar of an additional application, wherein at least a portion of the one or more instruction sets for operating the first avatar of the application or at least an information related to the one or more instruction sets for operating the first avatar of the application is at least partially learned in a learning process that includes operating the first avatar of the application by a user, wherein at least a portion of the another one or more instruction sets for operating the first avatar of the additional application or at least an information related to the another one or more instruction sets for operating the first avatar of the additional application is at least partially learned in another learning process that includes operating the first avatar of the additional application by the user.

4. The system of claim 2, wherein the one or more inputs are further correlated with another one or more instruction sets for operating a first avatar of an additional application, wherein at least a portion of the one or more instruction sets for operating the first avatar of the application or at least an information related to the one or more instruction sets for operating the first avatar of the application is at least partially learned in a learning process that includes operating the first avatar of the application by a user, wherein at least a portion of the another one or more instruction sets for operating the first avatar of the additional application or at least an information related to the another one or more instruction sets for operating the first avatar of the additional application is at least partially learned in another learning process that includes operating the first avatar of the additional application by another user.

5. The system of claim 2, wherein the one or more inputs are further correlated with another one or more instruction sets for operating a third avatar of the application, wherein at least a portion of the one or more instruction sets for operating the first avatar of the application or at least an information related to the one or more instruction sets for operating the first avatar of the application is at least partially learned in a learning process that includes operating the first avatar of the application by a user, wherein at least a portion of the another one or more instruction sets for operating the third avatar of the application or at least an information related to the another one or more instruction sets for operating the third avatar of the application is at least partially learned in another learning process that includes operating the third avatar of the application by the user.

6. The system of claim 2, wherein the one or more inputs are further correlated with another one or more instruction sets for operating a third avatar of the application, wherein at least a portion of the one or more instruction sets for operating the first avatar of the application or at least an information related to the one or more instruction sets for operating the first avatar of the application is at least partially learned in a learning process that includes operating the first avatar of the application by a user, wherein at least a portion of the another one or more instruction sets for operating the third avatar of the application or at least an information related to the another one or more instruction sets for operating the third avatar of the application is at least partially learned in another learning process that includes operating the third avatar of the application by another user.

7. The system of claim 2, wherein the one or more inputs are further correlated with another one or more instruction sets for operating the first avatar of the application, wherein at least a portion of the one or more instruction sets for operating the first avatar of the application or at least an information related to the one or more instruction sets for operating the first avatar of the application is at least partially learned in a learning process that includes operating the first avatar of the application by a user, wherein at least a portion of the another one or more instruction sets for operating the first avatar of the application or at least an information related to the another one or more instruction sets for operating the first avatar of the application is at least partially learned in another learning process that includes operating the first avatar of the application by the user.

8. The system of claim 2, wherein the one or more inputs are further correlated with another one or more instruction sets for operating the first avatar of the application, wherein at least a portion of the one or more instruction sets for operating the first avatar of the application or at least an information related to the one or more instruction sets for operating the first avatar of the application is at least partially learned in a learning process that includes operating the first avatar of the application by a user, wherein at least a portion of the another one or more instruction sets for operating the first avatar of the application or at least an information related to the another one or more instruction sets for operating the first avatar of the application is at least partially learned in another learning process that includes operating the first avatar of the application by another user.

9. The system of claim 2, wherein the one or more inputs are further correlated with another one or more instruction sets for operating the first avatar of the application, wherein at least a portion of the one or more instruction sets for operating the first avatar of the application or at least an information related to the one or more instruction sets for operating the first avatar of the application is at least partially learned in a learning process that includes operating the first avatar of the application by a user, wherein at least a portion of the another one or more instruction sets for operating the first avatar of the application or at least an information related to the another one or more instruction sets for operating the first avatar of the application is at least partially learned in the learning process.

10. The system of claim 2, wherein at least a portion of the one or more instruction sets for operating the first avatar of the application or at least an information related to the one or more instruction sets for operating the first avatar of the application is at least partially learned in a learning process that includes operating the first avatar of the application by a non-human user.

11. The system of claim 2, wherein the one or more inputs are further correlated with another one or more instruction sets for operating a third avatar of the application.

12. The system of claim 2, wherein the one or more inputs are further correlated with another one or more instruction sets for operating a first avatar of an additional application.

13. The system of claim 2, wherein the first collection of object representations represents the multiple objects of the application at the first time in a first area of interest around the first avatar of the application, wherein the second collection of object representations represents the multiple objects of the application at the second time in a second area of interest around the first avatar of the application, wherein the one or more instruction sets for operating the first avatar of the application are applied to the first avatar of the application, wherein the first avatar of the application autonomously performs the one or more operations defined by the one or more instruction sets for operating the first avatar of the application.

14. The system of claim 2, wherein the first collection of object representations represents the multiple objects of the application at the first time in a first area of interest around the second avatar of the application, wherein the second collection of object representations represents the multiple objects of the application at the second time in a second area of interest around the second avatar of the application, wherein the one or more instruction sets for operating the first avatar of the application are applied to the second avatar of the application, wherein the second avatar of the application autonomously performs the one or more operations defined by the one or more instruction sets for operating the first avatar of the application.

15. The system of claim 2, wherein the first collection of object representations represents the multiple objects of the another application at the first time in a first area of interest around the first avatar of the another application, wherein the second collection of object representations represents the multiple objects of the another application at the second time in a second area of interest around the first avatar of the another application, wherein the one or more instruction sets for operating the first avatar of the application are applied to the first avatar of the another application, wherein the first avatar of the another application autonomously performs the one or more operations defined by the one or more instruction sets for operating the first avatar of the application.

16. The system of claim 2, wherein the first collection of object representations represents:
the multiple objects of the application at the first time in a part of the application within a radius from the first avatar of the application,
the multiple objects of the application at the first time in a part of the application within a radius from the second avatar of the application, or
the multiple objects of the another application at the first time in a part of the another application within a radius from the first avatar of the another application,
wherein the second collection of object representations represents:
the multiple objects of the application at the second time in a part of the application within a radius from the first avatar of the application,
the multiple objects of the application at the second time in a part of the application within a radius from the second avatar of the application, or
the multiple objects of the another application at the second time in a part of the another application within a radius from the first avatar of the another application.

17. The system of claim 2, wherein the machine readable code, when executed, further causes at least:

(a) generating or receiving another stream of collections of object representations, wherein the another stream includes:
a third collection of object representations that: (i) comprises multiple object representations that each includes: a label indicating object type, and coordinates indicating object location, and (ii) represents: multiple objects of the application at a third time, or multiple objects of the another application at a third time, and
a fourth collection of object representations that: (i) comprises multiple object representations that each includes: a label indicating object type, and coordinates indicating object location, and (ii) represents: multiple objects of the application at a fourth time, or multiple objects of the another application at a fourth time;

(b) determining the one or more instruction sets for operating the first avatar of the application at least by: inputting the third collection of object representations of the another stream into the one or more inputs, and using a correlation between the one or more inputs and the one or more instruction sets for operating the first avatar of the application; and (c) autonomously performing, by a third avatar of the application or by a second avatar of the another application, one or more operations defined by the one or more instruction sets for operating the first avatar of the application, wherein the autonomously performing of (c) includes executing the one or more instruction sets for operating the first avatar of the application at least in response to the determining of (b).

18. The system of claim 2, wherein the one or more inputs are further correlated with another one or more instruction sets for operating the first avatar of the application, wherein the machine readable code, when executed, further causes at least:

(a) determining the another one or more instruction sets for operating the first avatar of the application at least by: inputting the second collection of object representations of the stream into the one or more inputs, and using a correlation between the one or more inputs and the another one or more instruction sets for operating the first avatar of the application; and (b) autonomously performing, by the first avatar of the application or by the second avatar of the application or by the first avatar of the another application, one or more operations defined by the another one or more instruction sets for operating the first avatar of the application, wherein the autonomously performing of (b) includes executing the another one or more instruction sets for operating the first avatar of the application at least in response to the determining of (a).

19. The system of claim 2, wherein the one or more inputs are further correlated with another one or more instruction sets for operating a third avatar of the application, wherein the machine readable code, when executed, further causes at least:

(a) determining the another one or more instruction sets for operating the third avatar of the application at least by: inputting the second collection of object representations of the stream into the one or more inputs, and using a correlation between the one or more inputs and the another one or more instruction sets for operating the third avatar of the application; and (b) autonomously performing, by the first avatar of the application or by the second avatar of the application or by the first avatar of the another application, one or more operations defined by the another one or more instruction sets for operating the third avatar of the application, wherein the autonomously performing of (b) includes executing the another one or more instruction sets for operating the third avatar of the application at least in response to the determining of (a).

20. The system of claim 2, wherein the one or more inputs are further correlated with another one or more instruction sets for operating a first avatar of an additional application, wherein the machine readable code, when executed, further causes at least:
   (a) determining the another one or more instruction sets for operating the first avatar of the additional application at least by: inputting the second collection of object representations of the stream into the one or more inputs, and using a correlation between the one or more inputs and the another one or more instruction sets for operating the first avatar of the additional application; and
   (b) autonomously performing, by the first avatar of the application or by the second avatar of the application or by the first avatar of the another application, one or more operations defined by the another one or more instruction sets for operating the first avatar of the additional application, wherein the autonomously performing of (b) includes executing the another one or more instruction sets for operating the first avatar of the additional application at least in response to the determining of (a).

21. The system of claim 2, wherein the coordinates indicating object location of each of the multiple object representations of the first collection of object representations include:
   a value indicating object distance relative to: the first avatar of the application, the second avatar of the application, or the first avatar of the another application, and
   a value indicating object angle relative to: the first avatar of the application, the second avatar of the application, or the first avatar of the another application,
   wherein the coordinates indicating object location of each of the multiple object representations of the second collection of object representations include:
   a value indicating object distance relative to: the first avatar of the application, the second avatar of the application, or the first avatar of the another application, and
   a value indicating object angle relative to: the first avatar of the application, the second avatar of the application, or the first avatar of the another application.

22. The system of claim 2, wherein the multiple objects of the application at the first time include multiple three dimensional objects of the application at the first time, wherein the multiple objects of the another application at the first time include multiple three dimensional objects of the another application at the first time, wherein the multiple objects of the application at the second time include multiple three dimensional objects of the application at the second time, wherein the multiple objects of the another application at the second time include multiple three dimensional objects of the another application at the second time, wherein the first avatar of the application is a first three dimensional avatar of the application, wherein the second avatar of the application is a second three dimensional avatar of the application, wherein the first avatar of the another application is a first three dimensional avatar of the another application.

23. The system of claim 2, wherein the multiple object representations of the first collection of object representations further each includes: a computer model indicating object size, wherein the multiple object representations of the second collection of object representations further each includes: a computer model indicating object size.

24. The system of claim 2, wherein the machine readable code, when executed, further causes at least:
   modifying the one or more instruction sets for operating the first avatar of the application prior to the determining,
   wherein the determining the one or more instruction sets for operating the first avatar of the application at least by: the inputting the first collection of object representations of the stream into the one or more inputs, and the using the correlation between the one or more inputs and the one or more instruction sets for operating the first avatar of the application includes determining the modified one or more instruction sets for operating the first avatar of the application at least by: the inputting the first collection of object representations of the stream into the one or more inputs, and using a correlation between the one or more inputs and the modified one or more instruction sets for operating the first avatar of the application,
   wherein the autonomously performing, by the first avatar of the application or by the second avatar of the application or by the first avatar of the another application, the one or more operations defined by the one or more instruction sets for operating the first avatar of the application includes autonomously performing, by the first avatar of the application or by the second avatar of the application or by the first avatar of the another application, one or more operations defined by the modified one or more instruction sets for operating the first avatar of the application,
   wherein the executing the one or more instruction sets for operating the first avatar of the application includes executing the modified one or more instruction sets for operating the first avatar of the application.

25. The system of claim 2, wherein the machine readable code, when executed, further causes at least:
   modifying: the determined one or more instruction sets for operating the first avatar of the application, or a copy of the determined one or more instruction sets for operating the first avatar of the application,
   wherein the autonomously performing, by the first avatar of the application or by the second avatar of the application or by the first avatar of the another application, the one or more operations defined by the one or more instruction sets for operating the first avatar of the application includes:
      autonomously performing, by the first avatar of the application or by the second avatar of the application or by the first avatar of the another application, one or more operations defined by the modified the determined one or more instruction sets for operating the first avatar of the application, or
      autonomously performing, by the first avatar of the application or by the second avatar of the application or by the first avatar of the another application, one or more operations defined by the modified the copy of the determined one or more instruction sets for operating the first avatar of the application, wherein the executing the one or more instruction sets for operating the first avatar of the application includes: executing the modified the determined one or more instruction sets for operating the first avatar of the application, or executing the modified the copy of the determined one or more instruction sets for operating the first avatar of the application.

26. The system of claim 2, wherein the machine readable code, when executed, further causes at least:
modifying: the first collection of object representations of the stream, or a copy of the first collection of object representations of the stream,
wherein the inputting the first collection of object representations of the stream into the one or more inputs includes: inputting the modified the first collection of object representations of the stream into the one or more inputs, or inputting the modified the copy of the first collection of object representations of the stream into the one or more inputs.

27. The system of claim 2, wherein the one or more inputs are correlated with the one or more instruction sets for operating the first avatar of the application using at least one or more connections, wherein the using the correlation between the one or more inputs and the one or more instruction sets for operating the first avatar of the application includes using at least one connection of the one or more connections between the one or more inputs and the one or more instruction sets for operating the first avatar of the application.

28. The system of claim 2, wherein the knowledgebase further includes one or more outputs that comprise the one or more instruction sets for operating the first avatar of the application, wherein at least a portion of the correlation between the one or more inputs and the one or more instruction sets for operating the first avatar of the application or at least an information related to the correlation between the one or more inputs and the one or more instruction sets for operating the first avatar of the application is at least partially learned in a learning process that includes:
generating or receiving a third collection of object representations that: (i) comprises multiple object representations that each includes: a label indicating object type, and coordinates indicating object location, and (ii) represents multiple objects of the application;
obtaining or receiving the one or more instruction sets for operating the first avatar of the application;
inputting the third collection of object representations into the one or more inputs; and
applying the one or more instruction sets for operating the first avatar of the application to the one or more outputs.

29. The system of claim 2, wherein:
at least a portion of the correlation between the one or more inputs and the one or more instruction sets for operating the first avatar of the application is at least partially learned in a learning process that includes operating the first avatar of the application by a user, or
an information related to the correlation between the one or more inputs and the one or more instruction sets for operating the first avatar of the application is at least partially learned in a learning process that includes operating the first avatar of the application by a user.

30. The system of claim 2, wherein the multiple objects of the application at the first time include: the first avatar of the application at the first time, or the second avatar of the application at the first time, wherein the multiple objects of the another application at the first time include the first avatar of the another application at the first time, wherein the multiple objects of the application at the second time include: the first avatar of the application at the second time, or the second avatar of the application at the second time, wherein the multiple objects of the another application at the second time include the first avatar of the another application at the second time.

31. The system of claim 2, wherein the one or more instruction sets for operating the first avatar of the application include one or more information about one or more states of: the first avatar of the application, or a portion of the first avatar of the application.

32. The system of claim 2, wherein at least a portion of the one or more instruction sets for operating the first avatar of the application or at least an information related to the one or more instruction sets for operating the first avatar of the application is learned in a learning process that includes operating a device, wherein the one or more instruction sets for operating the first avatar of the application are further for operating the device, wherein the one or more instruction sets for operating the first avatar of the application and for operating the device are received from the device.

33. The system of claim 2, wherein the first collection of object representations is a first data structure, wherein each object representation of the multiple object representations of the first collection of object representations is a data structure comprised in the first data structure, wherein the second collection of object representations is a second data structure, wherein each object representation of the multiple object representations of the second collection of object representations is a data structure comprised in the second data structure.

34. The system of claim 2, wherein the generating or the receiving the stream of collections of object representations is the generating the stream of collections of object representations.

35. The system of claim 2, wherein the generating or the receiving the stream of collections of object representations is the receiving the stream of collections of object representations.

36. The system of claim 2, wherein the knowledgebase includes a neural network, wherein the one or more inputs are one or more input neurons of the neural network, wherein the determining the one or more instruction sets for operating the first avatar of the application at least by: the inputting the first collection of object representations of the stream into the one or more inputs, and the using the correlation between the one or more inputs and the one or more instruction sets for operating the first avatar of the application includes determining the one or more instruction sets for operating the first avatar of the application at least by: inputting the first collection of object representations of the stream into the one or more input neurons, and using a correlation between the one or more input neurons and the one or more instruction sets for operating the first avatar of the application.

37. The system of claim 2, wherein at least a portion of the knowledgebase is stored in or on at least one of: at least one non-transitory machine readable medium of the one or more non-transitory machine readable media, another one or more non-transitory machine readable media, one or more volatile memories, or one or more non-volatile memories, and wherein the system further comprising:
one or more processors, wherein the machine readable code is executed by the one or more processors, and wherein the one or more processors cause the accessing, the generating or the receiving, the determining, and the autonomously performing.

38. The system of claim 2, wherein the one or more inputs for inputting the collection of object representations include: one input for inputting the collection of object representations, multiple inputs for inputting the multiple object representations of the collection of object representations, or multiple inputs for inputting multiple portions of the multiple object representations of the collection of object representations, wherein the application includes: a video game, a computer game, a simulation program, a program including text processing, a program including number processing, a program including picture processing, a program including object processing, or an application program, wherein the knowledgebase includes a neural means, wherein the one or more inputs are one or more input neurons of the neural means, wherein the determining the one or more instruction sets for operating the first avatar of the application at least by: the inputting the first collection of object representations of the stream into the one or more inputs, and the using the correlation between the one or more inputs and the one or more instruction sets for operating the first avatar of the application includes determining the one or more instruction sets for operating the first avatar of the application at least by: inputting the first collection of object representations of the stream into the one or more input neurons, and using a correlation between the one or more input neurons and the one or more instruction sets for operating the first avatar of the application, wherein at least a portion of the one or more instruction sets for operating the first avatar of the application or at least an information related to the one or more instruction sets for operating the first avatar of the application is at least partially learned in a learning process that includes operating the first avatar of the application by a user.

39. A method comprising:
accessing a knowledgebase that includes one or more inputs for inputting a collection of object representations that: (i) comprises multiple object representations that each includes: a label indicating object type, and coordinates indicating object location, and (ii) represents: multiple objects of an application, or multiple objects of another application, wherein the one or more inputs are correlated with one or more instruction sets for operating a first avatar of the application;
generating or receiving a stream of collections of object representations, wherein the stream includes:
a first collection of object representations that: (i) comprises multiple object representations that each includes: a label indicating object type, and coordinates indicating object location, and (ii) represents: multiple objects of the application at a first time, or multiple objects of the another application at a first time, and
a second collection of object representations that: (i) comprises multiple object representations that each includes: a label indicating object type, and coordinates indicating object location, and (ii) represents: multiple objects of the application at a second time, or multiple objects of the another application at a second time;
determining the one or more instruction sets for operating the first avatar of the application at least by: inputting the first collection of object representations of the stream into the one or more inputs, and using a correlation between the one or more inputs and the one or more instruction sets for operating the first avatar of the application; and
autonomously performing, by the first avatar of the application or by a second avatar of the application or by a first avatar of the another application, one or more operations defined by the one or more instruction sets for operating the first avatar of the application, wherein the autonomously performing includes executing the one or more instruction sets for operating the first avatar of the application at least in response to the determining.

40. The method of claim 39, wherein the one or more inputs are further correlated with another one or more instruction sets for operating a first avatar of an additional application, wherein at least a portion of the one or more instruction sets for operating the first avatar of the application or at least an information related to the one or more instruction sets for operating the first avatar of the application is at least partially learned in a learning process that includes operating the first avatar of the application by a user, wherein at least a portion of the another one or more instruction sets for operating the first avatar of the additional application or at least an information related to the another one or more instruction sets for operating the first avatar of the additional application is at least partially learned in another learning process that includes operating the first avatar of the additional application by the user.

41. The method of claim 39, wherein the one or more inputs are further correlated with another one or more instruction sets for operating a first avatar of an additional application, wherein at least a portion of the one or more instruction sets for operating the first avatar of the application or at least an information related to the one or more instruction sets for operating the first avatar of the application is at least partially learned in a learning process that includes operating the first avatar of the application by a user, wherein at least a portion of the another one or more instruction sets for operating the first avatar of the additional application or at least an information related to the another one or more instruction sets for operating the first avatar of the additional application is at least partially learned in another learning process that includes operating the first avatar of the additional application by another user.

42. The method of claim 39, wherein the one or more inputs are further correlated with another one or more instruction sets for operating a third avatar of the application, wherein at least a portion of the one or more instruction sets for operating the first avatar of the application or at least an information related to the one or more instruction sets for operating the first avatar of the application is at least partially learned in a learning process that includes operating the first avatar of the application by a user, wherein at least a portion of the another one or more instruction sets for operating the third avatar of the application or at least an information related to the another one or more instruction sets for operating the third avatar of the application is at least partially learned in another learning process that includes operating the third avatar of the application by the user.

43. The method of claim 39, wherein the one or more inputs are further correlated with another one or more instruction sets for operating a third avatar of the application, wherein at least a portion of the one or more instruction sets for operating the first avatar of the application or at least an information related to the one or more instruction sets for operating the first avatar of the application is at least partially learned in a learning process that includes operating the first avatar of the application by a user, wherein at least a portion of the another one or more instruction sets for operating the third avatar of the application or at least an information related to the another one or more instruction sets for operating the third avatar of the application is at least partially learned in another learning process that includes operating the third avatar of the application by another user.

44. The method of claim 39, wherein the one or more inputs are further correlated with another one or more instruction sets for operating the first avatar of the application, wherein at least a portion of the one or more instruction sets for operating the first avatar of the application or at least an information related to the one or more instruction sets for operating the first avatar of the application is at least partially learned in a learning process that includes operating the first avatar of the application by a user, wherein at least a portion of the another one or more instruction sets for operating the first avatar of the application or at least an information related to the another one or more instruction sets for operating the first avatar of the application is at least partially learned in another learning process that includes operating the first avatar of the application by the user.

45. The method of claim 39, wherein the one or more inputs are further correlated with another one or more instruction sets for operating the first avatar of the application, wherein at least a portion of the one or more instruction sets for operating the first avatar of the application or at least an information related to the one or more instruction sets for operating the first avatar of the application is at least partially learned in a learning process that includes operating the first avatar of the application by a user, wherein at least a portion of the another one or more instruction sets for operating the first avatar of the application or at least an information related to the another one or more instruction sets for operating the first avatar of the application is at least partially learned in another learning process that includes operating the first avatar of the application by another user.

46. The method of claim 39, wherein the one or more inputs are further correlated with another one or more instruction sets for operating the first avatar of the application, wherein at least a portion of the one or more instruction sets for operating the first avatar of the application or at least an information related to the one or more instruction sets for operating the first avatar of the application is at least partially learned in a learning process that includes operating the first avatar of the application by a user, wherein at least a portion of the another one or more instruction sets for operating the first avatar of the application or at least an information related to the another one or more instruction sets for operating the first avatar of the application is at least partially learned in the learning process.

47. The method of claim 39, wherein at least a portion of the one or more instruction sets for operating the first avatar of the application or at least an information related to the one or more instruction sets for operating the first avatar of the application is at least partially learned in a learning process that includes operating the first avatar of the application by a non-human user.

48. The method of claim 39, wherein the one or more inputs are further correlated with another one or more instruction sets for operating a third avatar of the application.

49. The method of claim 39, wherein the one or more inputs are further correlated with another one or more instruction sets for operating a first avatar of an additional application.

50. The method of claim 39, wherein the first collection of object representations represents the multiple objects of the application at the first time in a first area of interest around the first avatar of the application, wherein the second collection of object representations represents the multiple objects of the application at the second time in a second area of interest around the first avatar of the application, wherein the one or more instruction sets for operating the first avatar of the application are applied to the first avatar of the application, wherein the first avatar of the application autonomously performs the one or more operations defined by the one or more instruction sets for operating the first avatar of the application.

51. The method of claim 39, wherein the first collection of object representations represents the multiple objects of the application at the first time in a first area of interest around the second avatar of the application, wherein the second collection of object representations represents the multiple objects of the application at the second time in a second area of interest around the second avatar of the application, wherein the one or more instruction sets for operating the first avatar of the application are applied to the second avatar of the application, wherein the second avatar of the application autonomously performs the one or more operations defined by the one or more instruction sets for operating the first avatar of the application.

52. The method of claim 39, wherein the first collection of object representations represents the multiple objects of the another application at the first time in a first area of interest around the first avatar of the another application, wherein the second collection of object representations represents the multiple objects of the another application at the second time in a second area of interest around the first avatar of the another application, wherein the one or more instruction sets for operating the first avatar of the application are applied to the first avatar of the another application, wherein the first avatar of the another application autonomously performs the one or more operations defined by the one or more instruction sets for operating the first avatar of the application.

53. The method of claim 39, wherein the first collection of object representations represents:
  the multiple objects of the application at the first time in a part of the application within a radius from the first avatar of the application,
  the multiple objects of the application at the first time in a part of the application within a radius from the second avatar of the application, or
  the multiple objects of the another application at the first time in a part of the another application within a radius from the first avatar of the another application,
  wherein the second collection of object representations represents:
  the multiple objects of the application at the second time in a part of the application within a radius from the first avatar of the application,
  the multiple objects of the application at the second time in a part of the application within a radius from the second avatar of the application, or
  the multiple objects of the another application at the second time in a part of the another application within a radius from the first avatar of the another application.

54. The method of claim 39, further comprising:
  (a) generating or receiving another stream of collections of object representations, wherein the another stream includes:

a third collection of object representations that: (i) comprises multiple object representations that each includes: a label indicating object type, and coordinates indicating object location, and (ii) represents: multiple objects of the application at a third time, or multiple objects of the another application at a third time, and a fourth collection of object representations that: (i) comprises multiple object representations that each includes: a label indicating object type, and coordinates indicating object location, and (ii) represents: multiple objects of the application at a fourth time, or multiple objects of the another application at a fourth time;

(b) determining the one or more instruction sets for operating the first avatar of the application at least by: inputting the third collection of object representations of the another stream into the one or more inputs, and using a correlation between the one or more inputs and the one or more instruction sets for operating the first avatar of the application; and (c) autonomously performing, by a third avatar of the application or by a second avatar of the another application, one or more operations defined by the one or more instruction sets for operating the first avatar of the application, wherein the autonomously performing of (c) includes executing the one or more instruction sets for operating the first avatar of the application at least in response to the determining of (b).

55. The method of claim 39, wherein the one or more inputs are further correlated with another one or more instruction sets for operating the first avatar of the application, wherein the method further comprising:
(a) determining the another one or more instruction sets for operating the first avatar of the application at least by: inputting the second collection of object representations of the stream into the one or more inputs, and using a correlation between the one or more inputs and the another one or more instruction sets for operating the first avatar of the application; and
(b) autonomously performing, by the first avatar of the application or by the second avatar of the application or by the first avatar of the another application, one or more operations defined by the another one or more instruction sets for operating the first avatar of the application, wherein the autonomously performing of (b) includes executing the another one or more instruction sets for operating the first avatar of the application at least in response to the determining of (a).

56. The method of claim 39, wherein the one or more inputs are further correlated with another one or more instruction sets for operating a third avatar of the application, wherein the method further comprising:
(a) determining the another one or more instruction sets for operating the third avatar of the application at least by: inputting the second collection of object representations of the stream into the one or more inputs, and using a correlation between the one or more inputs and the another one or more instruction sets for operating the third avatar of the application; and
(b) autonomously performing, by the first avatar of the application or by the second avatar of the application or by the first avatar of the another application, one or more operations defined by the another one or more instruction sets for operating the third avatar of the application, wherein the autonomously performing of (b) includes executing the another one or more instruction sets for operating the third avatar of the application at least in response to the determining of (a).

57. The method of claim 39, wherein the one or more inputs are further correlated with another one or more instruction sets for operating a first avatar of an additional application, wherein the method further comprising:
(a) determining the another one or more instruction sets for operating the first avatar of the additional application at least by: inputting the second collection of object representations of the stream into the one or more inputs, and using a correlation between the one or more inputs and the another one or more instruction sets for operating the first avatar of the additional application; and
(b) autonomously performing, by the first avatar of the application or by the second avatar of the application or by the first avatar of the another application, one or more operations defined by the another one or more instruction sets for operating the first avatar of the additional application, wherein the autonomously performing of (b) includes executing the another one or more instruction sets for operating the first avatar of the additional application at least in response to the determining of (a).

58. The method of claim 39, wherein the coordinates indicating object location of each of the multiple object representations of the first collection of object representations include:
a value indicating object distance relative to: the first avatar of the application, the second avatar of the application, or the first avatar of the another application, and
a value indicating object angle relative to: the first avatar of the application, the second avatar of the application, or the first avatar of the another application,
wherein the coordinates indicating object location of each of the multiple object representations of the second collection of object representations include:
a value indicating object distance relative to: the first avatar of the application, the second avatar of the application, or the first avatar of the another application, and
a value indicating object angle relative to: the first avatar of the application, the second avatar of the application, or the first avatar of the another application.

59. The method of claim 39, wherein the multiple objects of the application at the first time include multiple three dimensional objects of the application at the first time, wherein the multiple objects of the another application at the first time include multiple three dimensional objects of the another application at the first time, wherein the multiple objects of the application at the second time include multiple three dimensional objects of the application at the second time, wherein the multiple objects of the another application at the second time include multiple three dimensional objects of the another application at the second time, wherein the first avatar of the application is a first three dimensional avatar of the application, wherein the second avatar of the application is a second three dimensional avatar of the application, wherein the first avatar of the another application is a first three dimensional avatar of the another application.

60. The method of claim 39, wherein the multiple object representations of the first collection of object representations further each includes: a computer model indicating object size, wherein the multiple object representations of the second collection of object representations further each includes: a computer model indicating object size.

61. The method of claim 39, further comprising:
modifying the one or more instruction sets for operating the first avatar of the application prior to the determining,
wherein the determining the one or more instruction sets for operating the first avatar of the application at least by: the inputting the first collection of object representations of the stream into the one or more inputs, and the using the correlation between the one or more inputs and the one or more instruction sets for operating the first avatar of the application includes determining the modified one or more instruction sets for operating the first avatar of the application at least by: the inputting the first collection of object representations of the stream into the one or more inputs, and using a correlation between the one or more inputs and the modified one or more instruction sets for operating the first avatar of the application,
wherein the autonomously performing, by the first avatar of the application or by the second avatar of the application or by the first avatar of the another application, the one or more operations defined by the one or more instruction sets for operating the first avatar of the application includes autonomously performing, by the first avatar of the application or by the second avatar of the application or by the first avatar of the another application, one or more operations defined by the modified one or more instruction sets for operating the first avatar of the application,
wherein the executing the one or more instruction sets for operating the first avatar of the application includes executing the modified one or more instruction sets for operating the first avatar of the application.

62. The method of claim 39, further comprising:
modifying: the determined one or more instruction sets for operating the first avatar of the application, or a copy of the determined one or more instruction sets for operating the first avatar of the application,
wherein the autonomously performing, by the first avatar of the application or by the second avatar of the application or by the first avatar of the another application, the one or more operations defined by the one or more instruction sets for operating the first avatar of the application includes:
autonomously performing, by the first avatar of the application or by the second avatar of the application or by the first avatar of the another application, one or more operations defined by the modified the determined one or more instruction sets for operating the first avatar of the application, or
autonomously performing, by the first avatar of the application or by the second avatar of the application or by the first avatar of the another application, one or more operations defined by the modified the copy of the determined one or more instruction sets for operating the first avatar of the application,
wherein the executing the one or more instruction sets for operating the first avatar of the application includes: executing the modified the determined one or more instruction sets for operating the first avatar of the application, or executing the modified the copy of the determined one or more instruction sets for operating the first avatar of the application.

63. The method of claim 39, further comprising:
modifying: the first collection of object representations of the stream, or a copy of the first collection of object representations of the stream,
wherein the inputting the first collection of object representations of the stream into the one or more inputs includes: inputting the modified the first collection of object representations of the stream into the one or more inputs, or inputting the modified the copy of the first collection of object representations of the stream into the one or more inputs.

64. The method of claim 39, wherein the one or more inputs are correlated with the one or more instruction sets for operating the first avatar of the application using at least one or more connections, wherein the using the correlation between the one or more inputs and the one or more instruction sets for operating the first avatar of the application includes using at least one connection of the one or more connections between the one or more inputs and the one or more instruction sets for operating the first avatar of the application.

65. The method of claim 39, wherein the knowledgebase further includes one or more outputs that comprise the one or more instruction sets for operating the first avatar of the application, wherein at least a portion of the correlation between the one or more inputs and the one or more instruction sets for operating the first avatar of the application or at least an information related to the correlation between the one or more inputs and the one or more instruction sets for operating the first avatar of the application is at least partially learned in a learning process that includes:
generating or receiving a third collection of object representations that: (i) comprises multiple object representations that each includes: a label indicating object type, and coordinates indicating object location, and (ii) represents multiple objects of the application;
obtaining or receiving the one or more instruction sets for operating the first avatar of the application;
inputting the third collection of object representations into the one or more inputs; and
applying the one or more instruction sets for operating the first avatar of the application to the one or more outputs.

66. The method of claim 39, wherein:
at least a portion of the correlation between the one or more inputs and the one or more instruction sets for operating the first avatar of the application is at least partially learned in a learning process that includes operating the first avatar of the application by a user, or
an information related to the correlation between the one or more inputs and the one or more instruction sets for operating the first avatar of the application is at least partially learned in a learning process that includes operating the first avatar of the application by a user.

67. The method of claim 39, wherein the multiple objects of the application at the first time include: the first avatar of the application at the first time, or the second avatar of the application at the first time, wherein the multiple objects of the another application at the first time include the first avatar of the another application at the first time, wherein the multiple objects of the application at the second time include: the first avatar of the application at the second time, or the second avatar of the application at the second time, wherein the multiple objects of the another application at the second time include the first avatar of the another application at the second time.

68. The method of claim 39, wherein the one or more instruction sets for operating the first avatar of the application include one or more information about one or more states of: the first avatar of the application, or a portion of the first avatar of the application.

69. The method of claim 39, wherein at least a portion of the one or more instruction sets for operating the first avatar of the application or at least an information related to the one or more instruction sets for operating the first avatar of the application is learned in a learning process that includes operating a device, wherein the one or more instruction sets for operating the first avatar of the application are further for operating the device, wherein the one or more instruction sets for operating the first avatar of the application and for operating the device are received from the device.

70. The method of claim 39, wherein the first collection of object representations is a first data structure, wherein each object representation of the multiple object representations of the first collection of object representations is a data structure comprised in the first data structure, wherein the second collection of object representations is a second data structure, wherein each object representation of the multiple object representations of the second collection of object representations is a data structure comprised in the second data structure.

71. The method of claim 39, wherein the generating or the receiving the stream of collections of object representations is the generating the stream of collections of object representations.

72. The method of claim 39, wherein the generating or the receiving the stream of collections of object representations is the receiving the stream of collections of object representations.

73. The method of claim 39, wherein the knowledgebase includes a neural network, wherein the one or more inputs are one or more input neurons of the neural network, wherein the determining the one or more instruction sets for operating the first avatar of the application at least by: the inputting the first collection of object representations of the stream into the one or more inputs, and the using the correlation between the one or more inputs and the one or more instruction sets for operating the first avatar of the application includes determining the one or more instruction sets for operating the first avatar of the application at least by: inputting the first collection of object representations of the stream into the one or more input neurons, and using a correlation between the one or more input neurons and the one or more instruction sets for operating the first avatar of the application.

74. The method of claim 39, wherein at least a portion of the knowledgebase is stored in or on at least one of: one or more non-transitory machine readable media, one or more volatile memories, one or more non-volatile memories, one or more storage devices, or one or more storage systems, wherein the method is implemented using a computing system that includes one or more processors.

\* \* \* \* \*